United States Patent [19]

Ohkura et al.

[11] Patent Number: 5,719,637
[45] Date of Patent: Feb. 17, 1998

[54] TELEVISION SIGNAL RECEIVER AND BROADCAST CHANNEL SELECTING METHOD

[75] Inventors: Yukiko Ohkura, Tokyo; Takashi Otani, Saitama; Noriko Kotabe, Chiba; Hiroyuki Hanaya, Saitama; Kazumasa Okumura, Tokyo; Akira Yamazaki, Chiba; Tomoko Shudo, Kanagawa, all of Japan

[73] Assignee: Sony Corporation, Tokyo, Japan

[21] Appl. No.: 550,703

[22] Filed: Oct. 31, 1995

[30] Foreign Application Priority Data

Nov. 7, 1994 [JP] Japan .................. 6-272001

[51] Int. Cl.$^6$ .................................................. H04N 5/45
[52] U.S. Cl. ................... 348/564; 348/565; 348/569; 348/601
[58] Field of Search .............................. 348/564, 565, 348/566, 567, 569, 588, 601; H04N 5/445, 5/50, 5/45, 9/74

[56] References Cited

U.S. PATENT DOCUMENTS

| | | | |
|---|---|---|---|
| 5,146,335 | 9/1992 | Kim | 348/564 |
| 5,251,034 | 10/1993 | Uh-heui Na | 358/183 |
| 5,414,471 | 5/1995 | Saitoh | 548/565 |

FOREIGN PATENT DOCUMENTS

| | | | |
|---|---|---|---|
| 0557033 | 8/1993 | European Pat. Off. | H04N 5/45 |
| 58196778 | 2/1984 | Japan | H04N 5/44 |
| 4044475 | 5/1992 | Japan | H04N 5/445 |
| 6054267 | 5/1994 | Japan | H04N 5/44 |
| 2227901 | 8/1990 | United Kingdom | H04N 5/45 |

*Primary Examiner*—Sherrie Hsia
*Attorney, Agent, or Firm*—Jay H. Maioli

[57] ABSTRACT

A television signal receiver equipped with a picture display controller and adapted for selecting a desired program quickly from a multiplicity of broadcast programs. In response to designation of a browsing mode, many subsidiary pictures are displayed successively under a main picture in a manner to be scrollable in any of predetermined directions. When a desired subsidiary picture is displayed within a cursor, the program being displayed on the relevant subsidiary screen is registered in a bookmark list by actuating a bookmark button switch incorporated in a remote commander. A bookmark is additionally displayed relative to the picture of the program registered in the bookmark list. Then the program thus registered is received and displayed as a main picture in response to an actuation of a jump button switch, whereby any desired one of many broadcast channels can be selectively received with rapidity and certainty. It thus becomes possible for a user to find the contents of programs in many other broadcast channels.

19 Claims, 98 Drawing Sheets

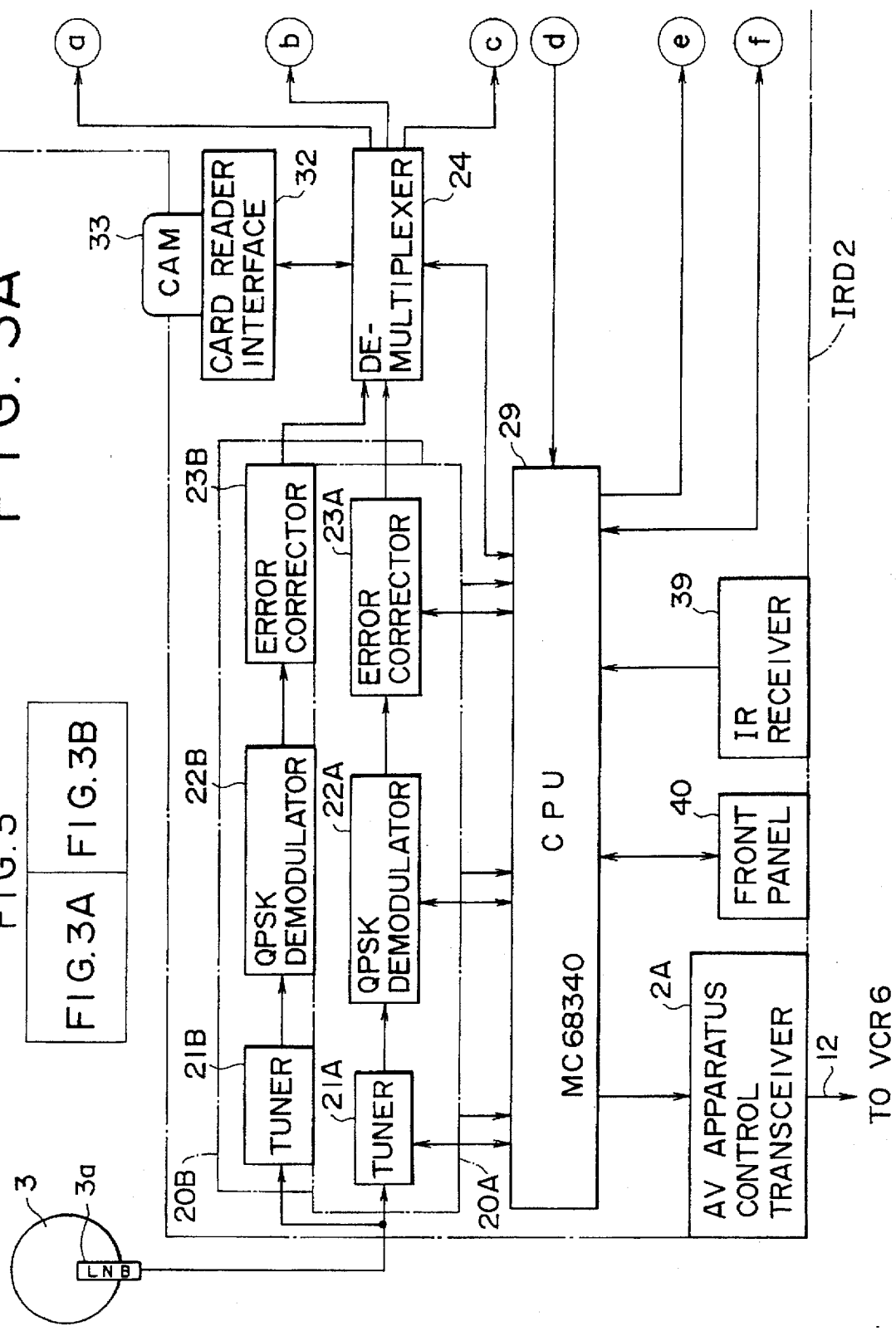

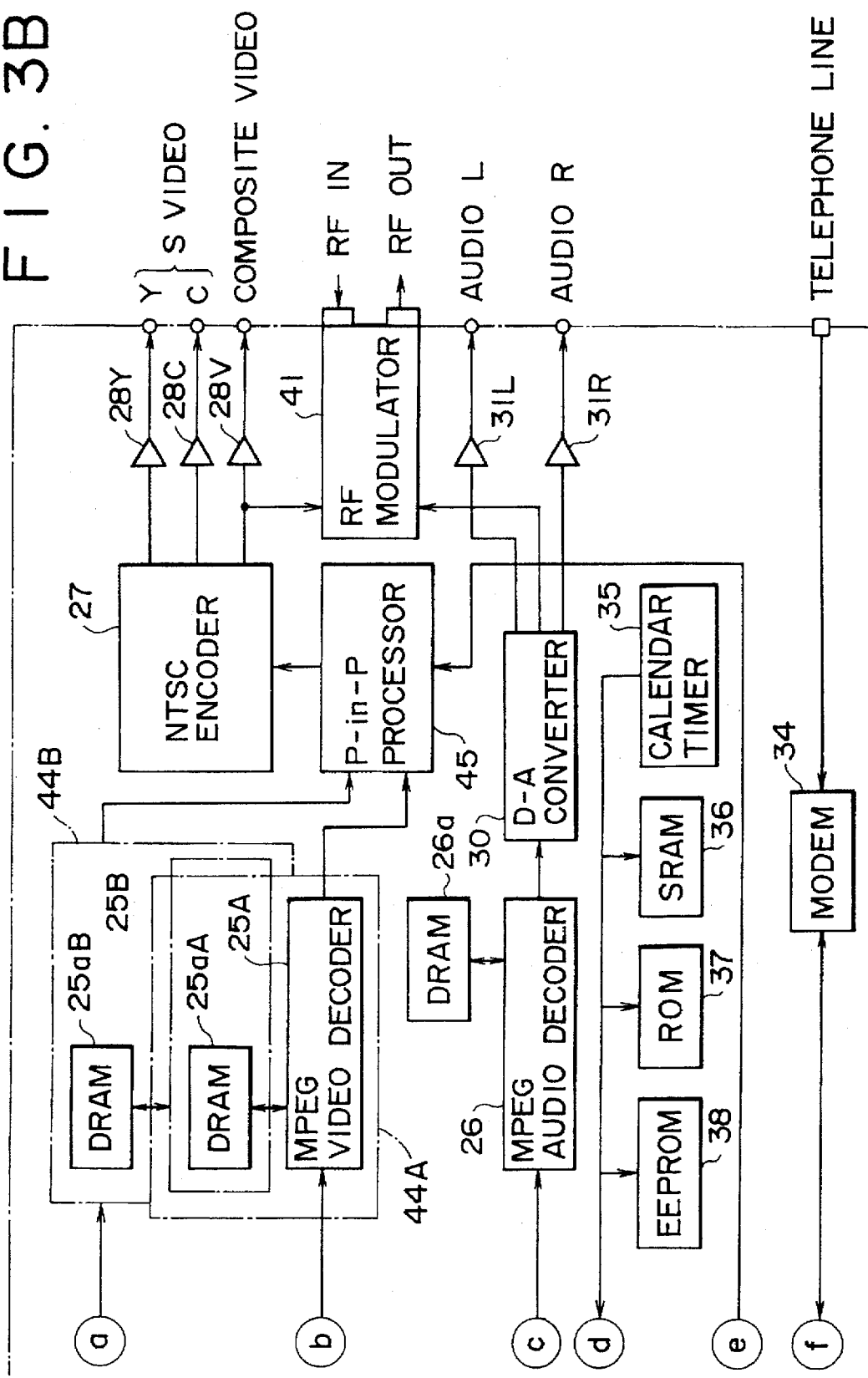

FIG. 48

| | | | | | | | |
|---|---|---|---|---|---|---|---|
| | | | | | | | XX |
| | | | | | | | WW |
| | | | | | | | CBS |
| | | | | | | | QRS |
| | | | | | | | NOP |
| | | | | | | | LMN |
| ABC | HBO | DEF | GHI | CNN | JKL | | |

A (pointing to JKL)

FIG. 51

HBO

TELEVISION SIGNAL RECEIVER AND BROADCAST CHANNEL SELECTING METHOD

BACKGROUND OF THE INVENTION

1. Field of the Invention

The present invention relates to a television signal receiver and a broadcast channel selecting method, and more particularly to a picture display controller adapted for use in receiving video signals of a multiplicity of broadcast channels.

2. Description of the Related Art

In a television receiver, a desired program can be viewed by selecting and designating a predetermined broadcast channel. And when there exist a plurality of broadcast channels, a channel search function may be provided in the television receiver so as to find what programs are being broadcast in the individual channels.

In Japan, twelve channels are allocated in the VHF band, and when such a channel search function is commanded in the television receiver of this type, the channels, which succeed the one being currently received, are received in sequence automatically in such a manner that each channel is displayed for a period of, e.g., three seconds. This search mode is released when the channel prior to start of the search is received again. Consequently it becomes possible to grasp the outline of the program being broadcast in each channel at that time.

However, if successive different broadcast channels are received sequentially in this manner, there occurs a disadvantage that the program that was being watched immediately before the search began cannot be watched at all during the search time. Furthermore, since the picture of merely one broadcast channel alone is displayed at a time, a long time is required for viewing the pictures of all the broadcast channels.

For solving the above problems, there may be contrived such a technique as illustrated in FIG. 100, wherein the picture being currently watched is displayed in a main screen while pictures of other channels are displayed in subsidiary screens. In this example, however, the number of subsidiary pictures displayable simultaneously with the main picture is only three.

The number of subsidiary screens may be increased to five as shown in FIG. 101. Even in this example, however, the number of broadcast channels watchable simultaneously is merely six.

Presently in the U.S.A., the progress of multi-channelization is extensive in the fields of cable or community antenna television (CATV) and digital satellite system (DSS: trade name of Hughes Communications Corporation) by applying the high-efficiency encoding technology inclusive of MPEG (Moving Picture Experts Group) and so forth. And the number of channels reaches a great value of, e.g., 150 to 175.

Due to such an increase of the number of channels, a total time period of seven to eight minutes is rendered necessary for sequentially receiving all of the broadcast channels and displaying each of them for a predetermined time period. Accordingly, there arises a problem that some difficulties are unavoidable in rapidly selecting a desired program.

Also due to an increase of the number of channels, if the whole screen is used to display subsidiary pictures as illustrated in FIG. 102 for example, it is difficult to grasp the contents of the programs of individual broadcast channels.

It is a matter of course that, if the area of each subsidiary screen is reduced to be extremely small, a total of 150 subsidiary pictures may theoretically be displayable on a single whole screen. But in this case, the size of each subsidiary picture is rendered excessively small to eventually bring about difficulty in confirming the content thereof.

SUMMARY OF THE INVENTION

The present invention has been accomplished in view of the circumstances mentioned above. And it is an object of the invention to realize an improvement which enables a user to confirm, while watching a main picture, the contents of programs of other channels with simplicity and certainty.

According to one aspect of the present invention, there is provided a television signal receiver for selecting a desired broadcast channel from signals of a plurality of received broadcast channels. This receiver comprises a means for receiving and tuning television signals selectively; a manipulation means for commanding reception of signals of other broadcast channels in a state where a signal of a predetermined broadcast channel is being received; a display means responsive to an actuation of the manipulation means and displaying, on a main screen, the picture of the broadcast channel already received, while receiving signals of the other broadcast channels and displaying the pictures of the other broadcast channels on subsidiary screens; a change means for sequentially changing the broadcast channels displayed on the subsidiary screens by the receiving means; and a selection means for selecting a desired broadcast channel from the subsidiary pictures being displayed; wherein, after completion of the operation of the selection means, display of the subsidiary pictures is terminated and then the selected broadcast channel is received.

The change means sequentially changes the broadcast channels, which are displayed on the subsidiary screens, in a predetermined period.

The display means interrupts its process for displaying the subsidiary pictures upon completion of one cycle of the sequential change of the broadcast channels displayed on the subsidiary screens, and displays the picture of the predetermined broadcast channel received prior to the display on the subsidiary screens.

And when a predetermined command is inputted from the manipulation means in the state where a plurality of subsidiary pictures are displayed, the change means changes the broadcast channels being displayed on the subsidiary screens.

The selection means includes a cursor which is produced and displayed by the display means and indicates the subsidiary screen being currently instructed. In an initial state where subsidiary pictures start to be displayed, the cursor indicates one subsidiary picture substantially at the center out of the subsidiary pictures being displayed.

The selection means includes a cursor shift means for shifting the cursor in response to a command transmitted by an operator, and a decision means for deciding a desired broadcast channel out of the subsidiary pictures being displayed. And when the decision means is actuated during sequential change of the broadcast channels displayed on the subsidiary screens, the selection means halts the change of the broadcast channels displayed on the subsidiary screens and then receives, while interrupting the display of the subsidiary pictures, the broadcast channel being received on the subsidiary screen selected by the cursor shift means and the decision means during a halt of the subsidiary pictures.

When the cursor shift means is actuated a predetermined number of times during a halt of change of the subsidiary pictures, the change means releases the halt state of change of the broadcast channels displayed on the subsidiary screens, and then sequentially changes again, in a predetermined period, the broadcast channels displayed on the subsidiary screens.

The change means sequentially changes, in accordance with each category, the broadcast channels displayed on the subsidiary screens.

The cursor shift means and the decision means are incorporated in a remote commander.

The receiving means has at least two receiving sections capable of receiving signals independently of each other, and also has a switching means which selectively switches the receiving sections in such a manner that, when the first receiving section is in its operation to receive the broadcast channel to be displayed on the subsidiary screen, the second receiving section is placed in a standby state ready for receiving the broadcast channel which is to be received next.

When the manipulation means is actuated during reception of a predetermined broadcast channel by the second receiving section, the first receiving section starts reception of the broadcast channels to be displayed on the subsidiary screens, and the change means sequentially changes, in a predetermined period, the broadcast channels received by the first receiving section, so that both the picture of the broadcast channel received by the second receiving section and the pictures of the broadcast channels received sequentially by the first receiving section are stored and processed as still pictures by the display means.

When the selection means is actuated, the display means additionally displays, relative to the picture on the subsidiary screen, a mark which signifies such actuation of the selection means. The display means further has a storage means for storing information of the broadcast channel to which such a mark is added, so that the information of the broadcast channel stored in the storage means is accessed by an actuation of the manipulation means and then the stored broadcast channel is received.

A mark displayed for the main picture and a mark for any subsidiary picture are different from each other.

The invention further has a means for receiving program schedule data transmitted with television signals, and a clock means for measuring the present time. The storage means stores at least a channel number and a program end time as broadcast channel information, wherein the stored broadcast channel information is erased after the program end time.

The display means executes such a process that the subsidiary picture being indicated by the cursor becomes dimensionally maximum and also that the sizes of the other subsidiary pictures are sequentially reduced as the channel numbers thereof recede from the broadcast channel of the subsidiary picture being indicated by the cursor.

The broadcast channel selecting method of the present invention for selection of a desired broadcast channel from signals of a plurality of broadcast channels comprises the steps of: during reception of a signal of a predetermined broadcast channel by a first receiving section, outputting a command to sequentially change and receive signals of a plurality of other broadcast channels by a second receiving section; sequentially storing, in a memory, pictures of the broadcast channels changed and received sequentially; displaying, on a main screen, the picture of the predetermined broadcast channel already received by the first receiving section, while reading out the pictures of the stored other broadcast channels and displaying the read pictures on a plurality of subsidiary screens; selecting a desired broadcast channel from the plurality of subsidiary pictures being displayed; and after selection of the desired broadcast channel, terminating the display of the subsidiary pictures and then receiving the selected broadcast channel.

In the above method, the picture of the predetermined broadcast channel received by the first receiving section is also stored in the memory, and the picture received by the first receiving section and read out from the memory is displayed on the main screen, while the plurality of pictures received by the second receiving section and stored in the memory are read out therefrom and then are displayed on the subsidiary screens.

The pictures of the broadcast channels received by the second receiving section and stored in the memory are changed in a predetermined period.

And the broadcast channels changed and received sequentially by the second receiving section are changed sequentially in accordance with each category.

The above and other features and advantages of the present invention will become apparent from the following description which will be given with reference to the illustrative accompanying drawings.

BRIEF DESCRIPTION OF THE DRAWINGS

FIGS. 3, 3A and 3B are block diagram showing an exemplary configuration of an IRD 2 included in FIG. 1;

FIG. 48 is a diagram showing another exemplary arrangement of subsidiary pictures;

FIG. 51 is an explanatory diagram showing a display example on the screen in a normal reception mode;

DETAILED DESCRIPTION OF THE PREFERRED EMBODIMENTS

Hereinafter some preferred embodiments of the present invention will be described in detail with reference to the accompanying drawings.

Figure 1:
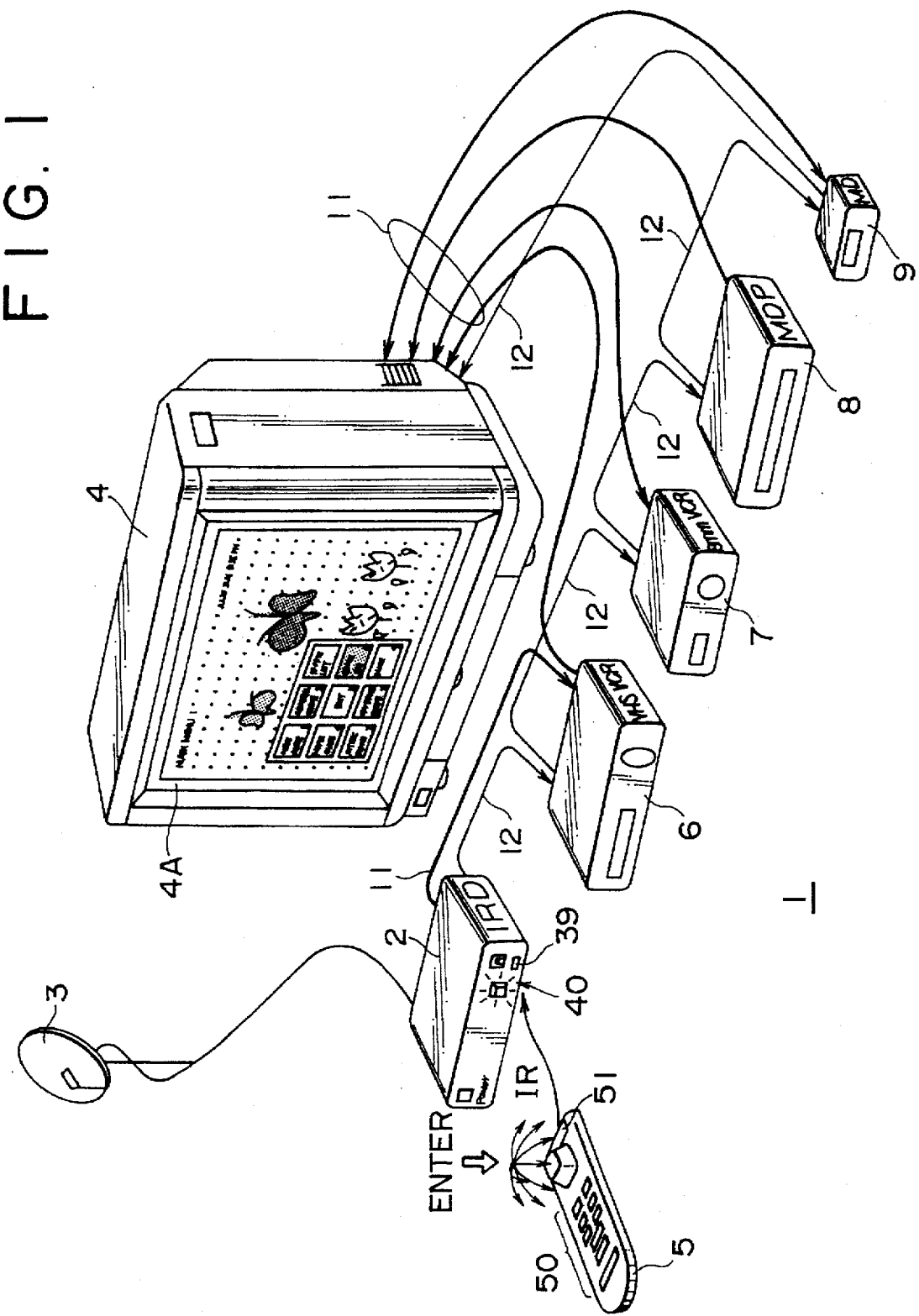
FIG. 1 is a perspective view illustrating an exemplary constitution of an AV system where a reception controller of the present invention is applied.

FIG. 1 shows an exemplary constitution of an AV (Audio Video) system where a reception controller of the present invention is applied. In this embodiment, the AV system i comprises an IRD (Integrated Receiver/Decoder) 2 for receiving an input signal by a parabolic antenna 3 via an unshown broadcast satellite and decoding the received signal, a VHS VCR (Video Cassette Recorder) 6, an 8 mm VCR 7, an MDP (Multi-Disc Player) 8, an MD (Mini Disc) player 9 and a monitor unit 4.

The VCR 6, VCR 7, MDP 8 and MD player 9 are connected via AV lines 11 to the monitor unit 4. And the IRD 2 is connected via an AV line 11 to the VCR 6. These apparatus are successively connected in series to one another via control lines 12.

A command can be inputted to the IRD 2 by an infrared (IR) signal emitted from a remote commander 5. More specifically, when a predetermined one of button switches 50 of the remote commander 5 is actuated, an infrared signal corresponding thereto is emitted from an IR transmitter 51 and then is incident upon an IR receiver 39 of the IRD 2.

The IRD 2 is equipped with a front panel 40 having various kinds of button switches, so that the same command as the one transmitted by manipulating the remote commander 5 can be inputted directly to the IRD 2.

Figure 2:
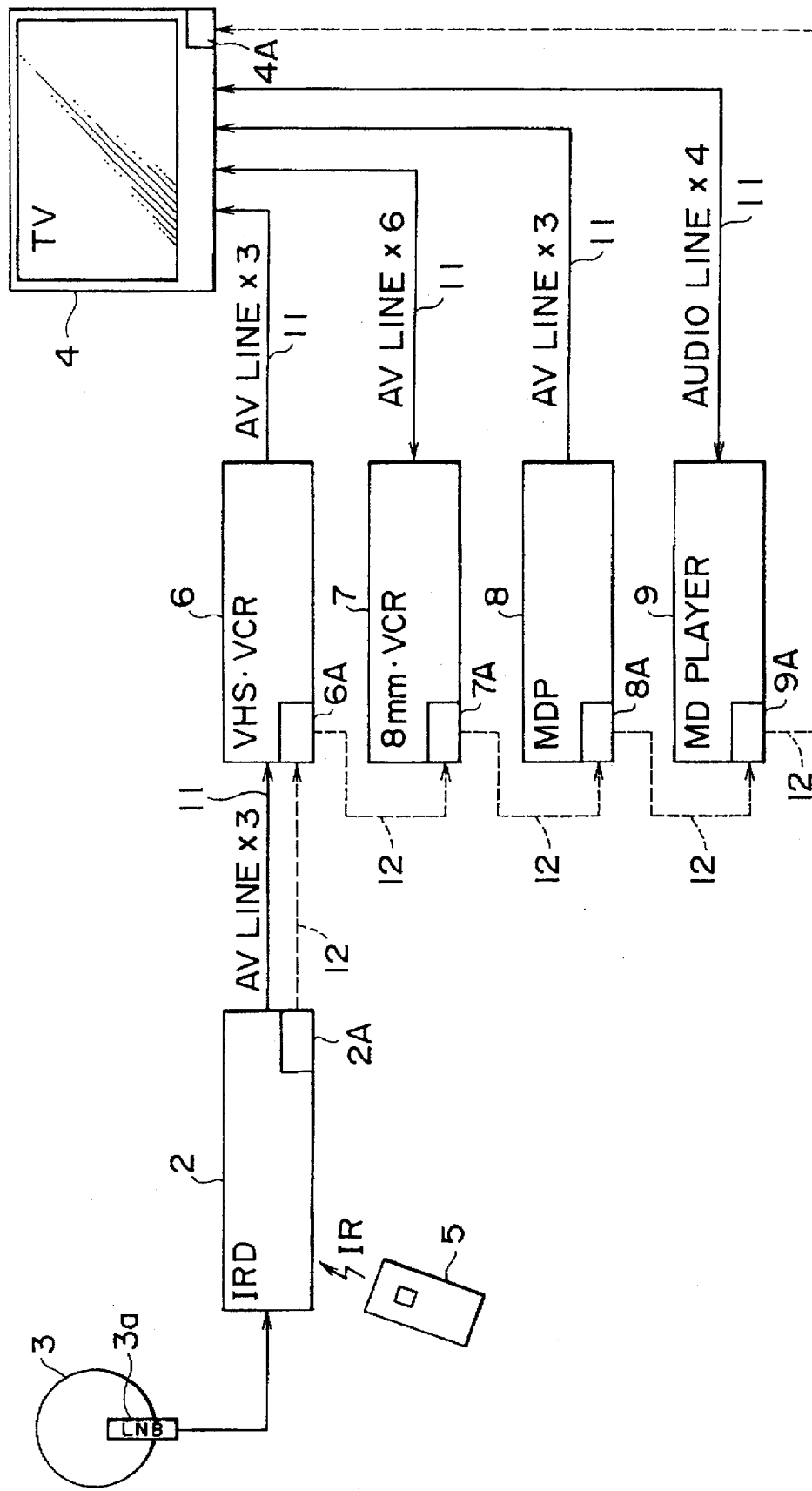
FIG. 2 is a block diagram showing a state of electrical connection in the AV system of FIG. 1.

FIG. 2 shows a state of electrical connection in the AV system of FIG. 1. The parabolic antenna 3 has an LNB (Low Noise Block downconverter) 3a to convert the signal, which has been received from a broadcast satellite, into a signal of a predetermined frequency and then supplies the converted signal to the IRD 2. Subsequently the IRD2 supplies its output to the VCR 6 via three AV lines 11. The output of the VCR 6 is supplied via three AV lines to the monitor unit 4. Meanwhile the VCR 7, the MDP 8 and the MD player 9 are connected to the monitor unit 4 via six, three or four AV lines 11, respectively.

The above IRD 2, VCR 6, VCR 7, MDP 8, MD player 9 and monitor unit 4 have an AV apparatus control signal transceiver 2A, 6A, 7A, 8A, 9A or 4A, respectively. Such transceivers are successively connected in series to one another via a control line 12 which consists of a wired SIRCS (Sony Infrared Remote Control System).

FIG. 3 shows an exemplary internal configuration of the IRD 2. An RF signal outputted from the LNB 3a of the parabolic antenna 3 is supplied to and demodulated in a tuner 21A of a front end 20A. The output of the tuner 21A is supplied to a QPSK demodulator circuit 22A where QPSK demodulation of the signal is performed. The output of the QPSK demodulator circuit 22A is supplied to an error corrector circuit 23A where any error is detected and corrected and, when necessary, a compensation is performed.

Also in a front end 20B consisting of a tuner 21B, a QPSK demodulator circuit 22B and an error corrector circuit 23B similarly to the front end 20A, the same process is executed independently of the front end 20A.

A key required for deciphering a cipher is stored, together with a decipher program, in a CAM (Conditional Access Module) 33 which consists of an IC card comprising a CPU, a ROM, a RAM and so forth. Since the signal transmitted via a broadcast satellite is ciphered, both a key and a decipher process are necessary for deciphering the cipher. For this purpose, the key is read out from the CAM 33 via a card reader interface 32 and then is supplied to a demultiplexer 24. Subsequently the demultiplexer 24 deciphers the ciphered signal by utilizing the key.

In this CAM 33, accounting information and so forth are also stored in addition to the aforementioned key and program required for deciphering the ciphered signal.

The demultiplexer 24 receives the input signal obtained from the error corrector circuit 23 (23A, 23B) of the front end 20 (20A, 20B) and supplies the deciphered video signal to a decoding section 44 while supplying the deciphered audio signal to an MPEG audio decoder 26.

Similarly to the front end 20, the decoding section 44 also consists of independently operable decoding sections 44A and 44B, which have an MPEG video decoder 25A and a DRAM 25aA, or an MPEG video decoder 25B and a DRAM 25aB, respectively.

The MPEG video decoders 25A and 25B properly store the input digital video signal in the DRAMs 25aA and 25aB respectively, and decode the video signal compressed by the MPEG system. The video signal thus decoded is supplied via a picture-in-picture (P-in-P) processor 45 to an NTSC encoder 27, where the video signal is converted into a luminance signal (Y), a chroma signal (C) and a composite signal (V) of the NTSC format. The luminance signal and the chroma signal are outputted as an S video signal via buffer amplifiers 28Y and 28C, respectively. Meanwhile the composite signal is outputted via a buffer amplifier 28V.

The MPEG audio decoder 26 properly stores in a DRAM 26a the digital audio signal supplied from the demultiplexer 24, and decodes the audio signal compressed by the MPEG system. The audio signal thus decoded is supplied to a D-A converter 30 where digital-to-analog conversion is executed, and the audio signal of a left channel is outputted via a buffer amplifier 31L while the audio signal of a right channel is outputted via a buffer amplifier 31R.

An RF modulator 41 outputs RF signals by converting the composite signal obtained from the NTSC encoder 27 and the audio signal obtained from the D-A converter 30. The RF modulator 41 passes therethrough the RF signal of the NTSC format inputted from some other AV apparatus such as an unshown CATV cable box, and then outputs the signal directly to the other AV apparatus such as the VCR 6.

In this embodiment, both the video signal and the audio signal are supplied via the AV lines to the VCR 6.

A CPU (Central Processing Unit) 29 executes various processes in accordance with the program stored in a ROM 37. For example, the CPU 29 controls the tuners 21A, 21B, the QPSK demodulator circuits 22A, 22B, the error corrector circuits 23A, 23B, and the picture-in-picture processor 45. The CPU 29 further controls the AV-apparatus control signal transceiver 2A, thereby outputting a predetermined control signal to the other AV apparatus or receiving a control signal therefrom via the control line 12.

A predetermined command can be directly inputted to the CPU 29 by actuating a button switch (not shown) of the front panel 40. When the remote commander 5 (FIG. 4) is manipulated, an infrared signal is outputted from the IR transmitter 51 and then is received by the IR receiver 39, and the result of such reception is supplied to the CPU 29. Thus, a predetermined command can also be inputted to the CPU 29 by manipulating the remote commander 5 as well.

The CPU 29 takes in signals other than the video and audio signals outputted from the demultiplexer 24, such as broadcast-channel program information (e.g., channels of programs, broadcast hours, titles, categories and so forth) affixed to the essential picture data and transmitted therewith as additional information which ranges from the current time to a later time after several ten hours or so, then generates EPG (Electrical Program Guide) data from the signals thus received, and supplies such EPG data to and stores the same in an SRAM (Static Random Access Memory) 36.

In an EEPROM (Electrically Erasable Programmable Read-Only Memory) 38, there is properly stored the data to be held even after switch-off of the power supply, such as the last channel. The CPU 29 corrects the time information of a calendar timer 35 at a proper timing in accordance with the current time information separated from the signal received by the demultiplexer 24, and then controls a program recording reservation and so forth on the basis of the time information outputted from the calendar timer 35.

The CPU 29 further controls the MPEG video decoders 25A and 25B when generating predetermined OSD (On-Screen Display) data. In response to such control, the MPEG video decoders 25A and 25B generate predetermined OSD data, then write the same in the DRAMs 25aA and 25aB, and read out the data therefrom. Consequently, it becomes possible to output a predetermined character, figure, pattern or the like to the monitor unit 4 and to display the same thereon.

Under control of the CPU 29, a modem 34 transmits or receives data from or to the other apparatus via a telephone network.

Figure 4:
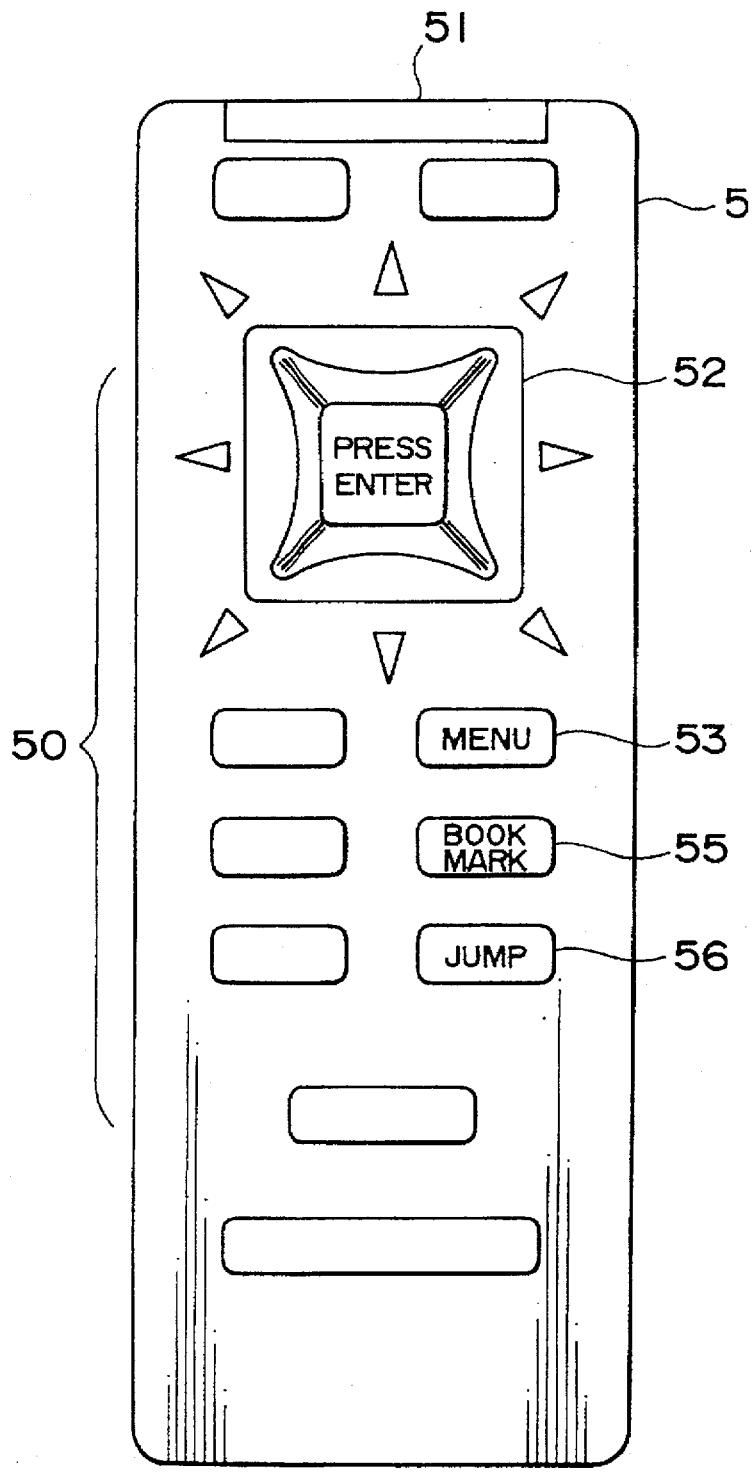
FIG. 4 is a plan view showing an upper plane construction of a remote commander 5 included in FIG. 1.

FIG. 4 shows a detailed exemplary construction of the button switch group 50 of the remote commander 5. As shown in the diagram, the remote commander 5 has an IR transmitter 51 in its upper portion and a manipulator 52 thereunder. The manipulator 52 is so formed as to be operable in any of a total of eight directions, i.e., upward, downward, leftward and rightward directions, and obliquely upward, downward, leftward and rightward directions. When depressed in a direction perpendicular to the drawing paper face, the manipulator 52 functions as an enter button switch. More specifically, the manipulator 52 is so actuated that a desired direction is selected by a user's single finger and further an enter input can be executed by the same finger kept pressed thereto.

A menu button switch 53 is disposed at a lower right position of the manipulator 52. This menu button switch 53 is actuated for displaying a menu on the monitor unit 4.

A bookmark button switch 55 actuated for adding a bookmark to a predetermined program is disposed under the menu button switch 53, and a jump button switch 56 actuated for receiving the program with a bookmark is disposed under the switch 55.

Although a further explanation will be omitted below, other various button switches are also included in the button switch group 50 besides those mentioned above.

Figure 5:
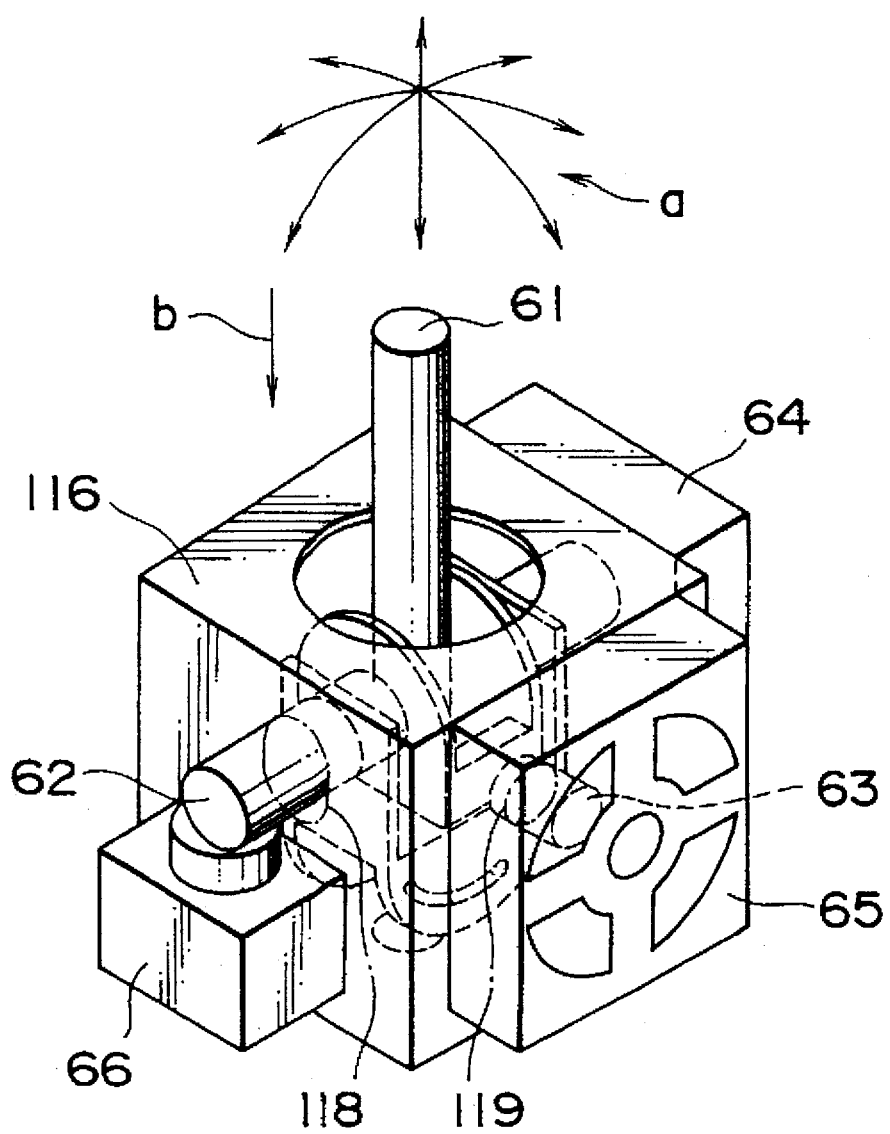
FIG. 5 is a perspective view illustrating an exemplary structure of a small-sized stick controller for detecting an actuation of a manipulator 52 in FIG. 4.
Figure 6:
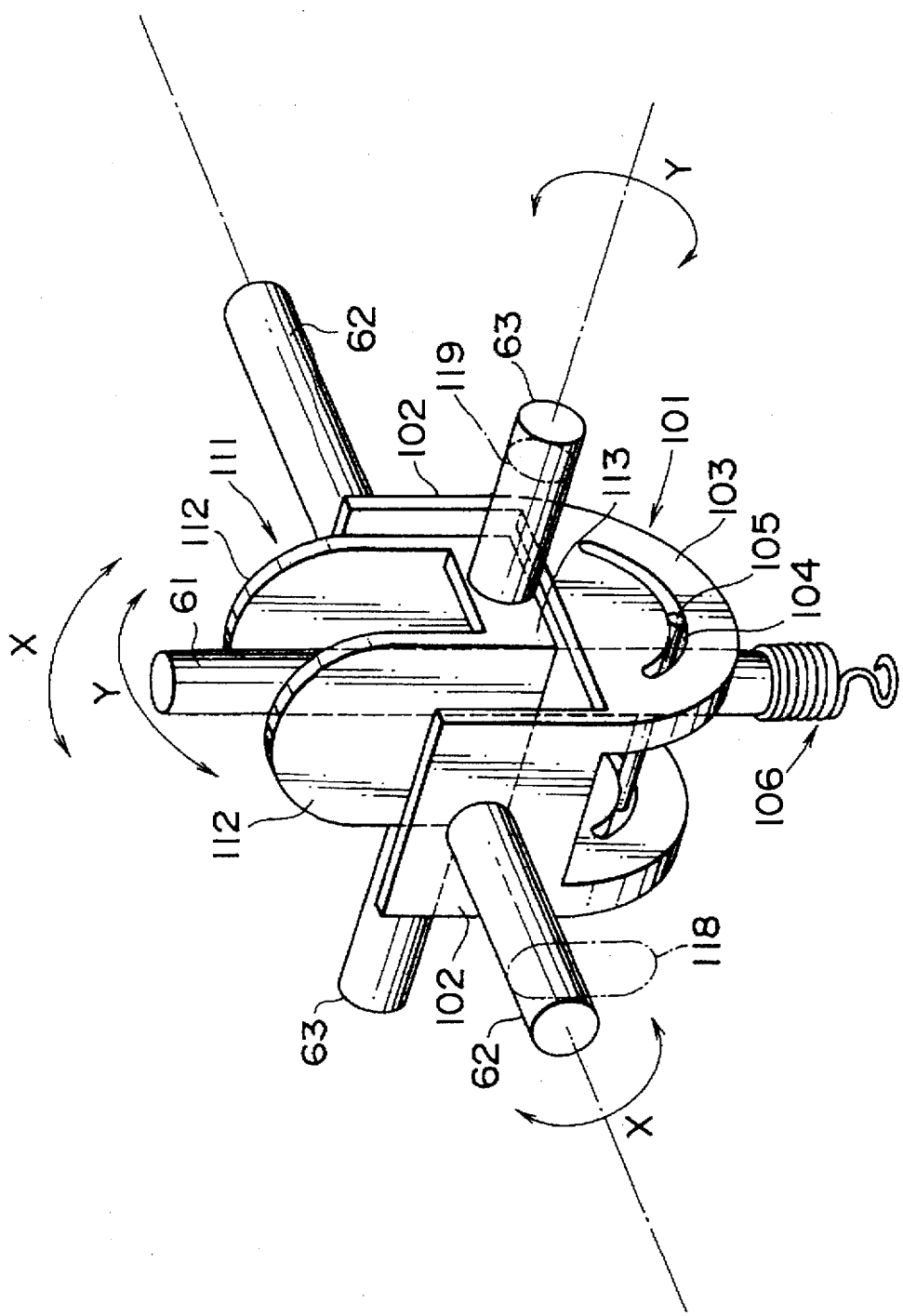
FIG. 6 is a perspective view illustrating an exemplary internal structure of the embodiment of FIG. 5.
Figure 7:
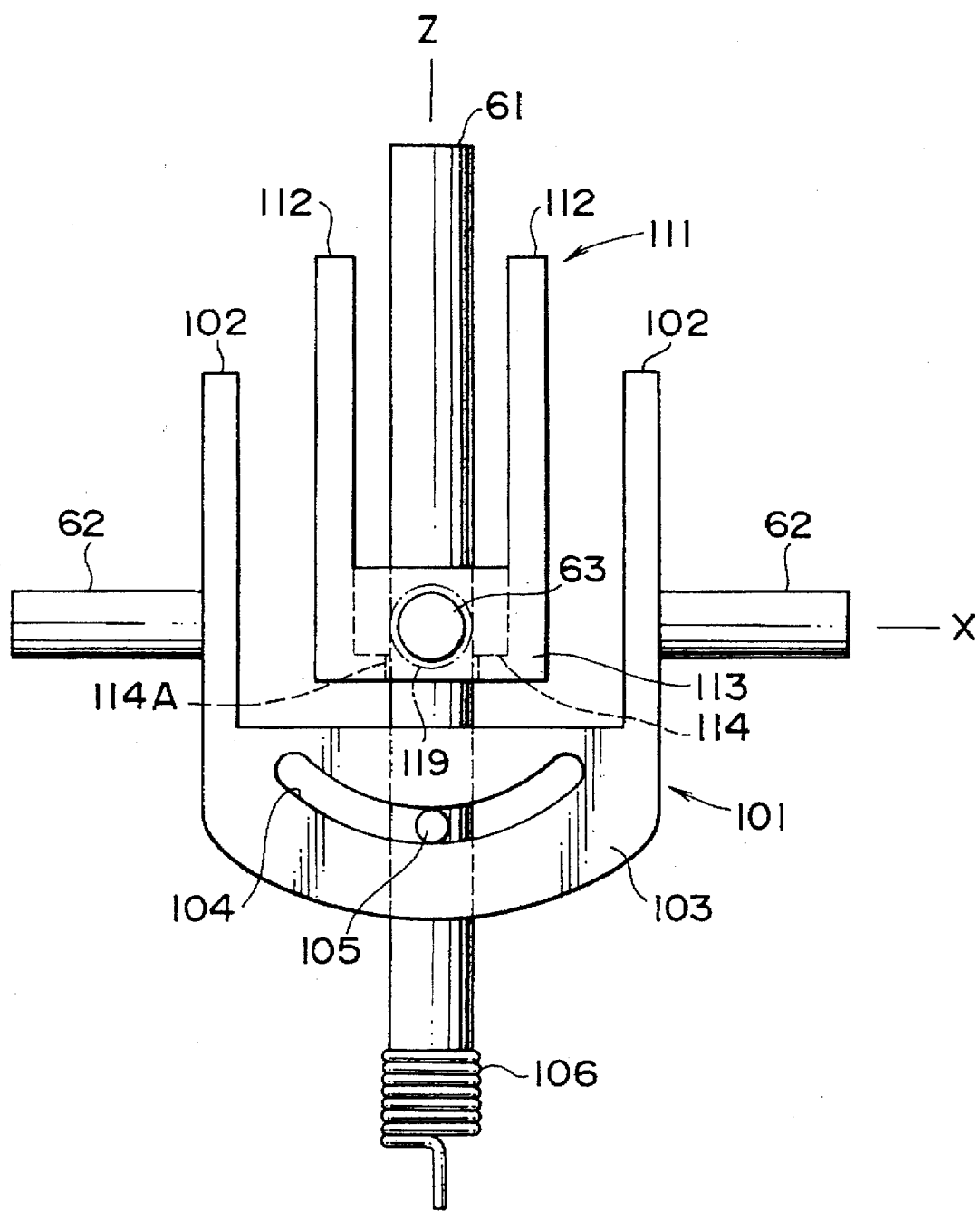
FIG. 7 is a front view illustrating a structure of the embodiment of FIG. 6.
Figure 8:
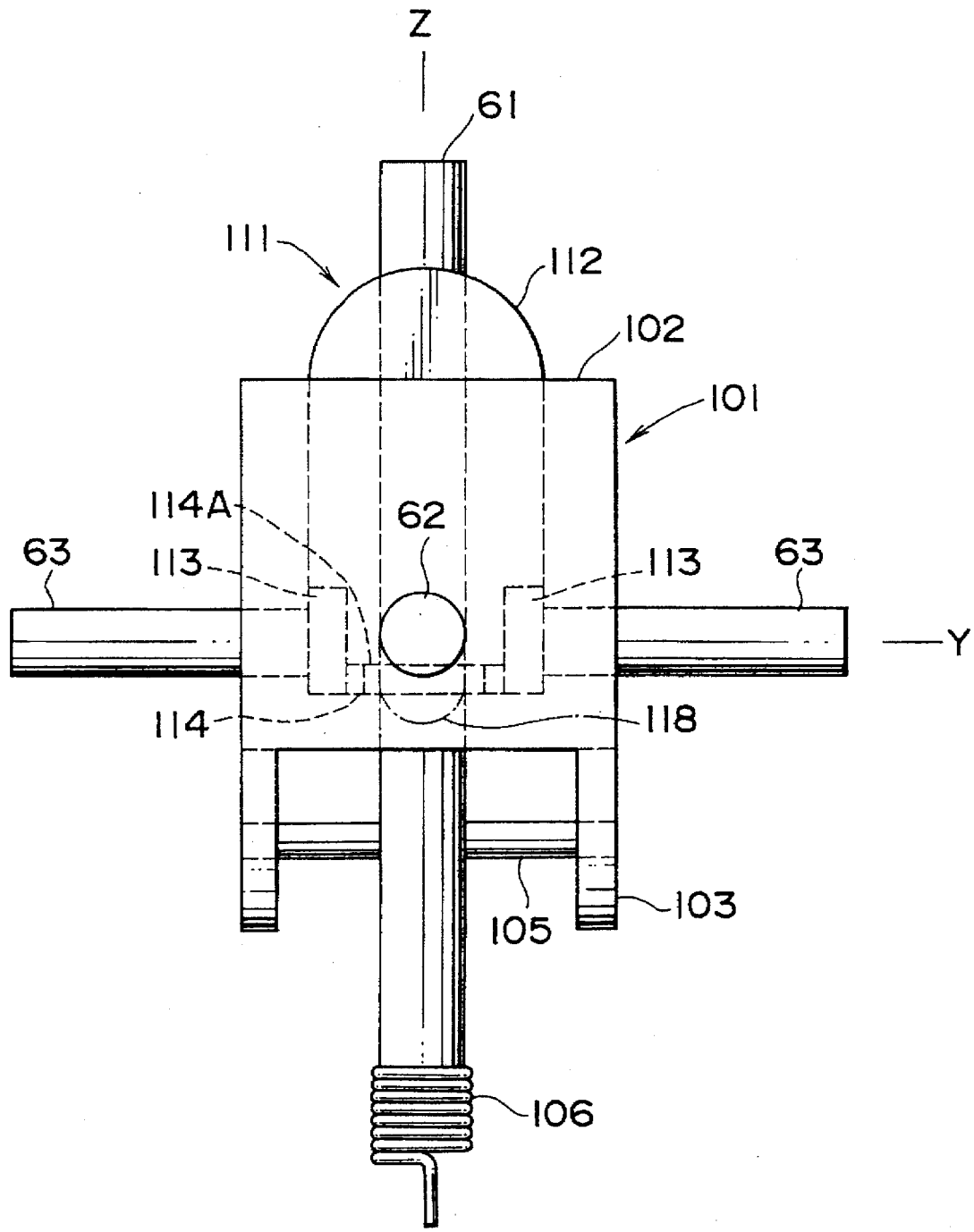
FIG. 8 is a right side view illustrating the structure of the embodiment of FIG. 6.

FIGS. 5 to 9 show exemplary structures for detecting an actuation of the manipulator 52. A small stick controller illustrated in FIG. 5 is incorporated in the remote commander 5 at a position below the manipulator 52. More specifically, a stick 61 is joined integrally to the manipulator 52 which is composed of a flexible material such as resin. Accordingly, when the manipulator 52 is actuated, the stick 61 is moved, in conformity to the direction of such actuation, in one of the eight directions indicated by an arrow a in FIG. 5, or is moved vertically as indicated by an arrow b in the same diagram.

A pin 105 is infixed vertically below the stick 61, and both ends of the pin 105 are inserted into slots 104 formed in guide plates 103 of an outer member 101, so as to be guided along the slots 104. The outer member 101 has side plates 102 which are oriented in the X-axis direction and are joined integrally to the guide plates 103 oriented in the Y-axis direction. And shafts 62 are infixed on the side plates 102 in a manner to extend in the X-axis direction.

Figure 9:
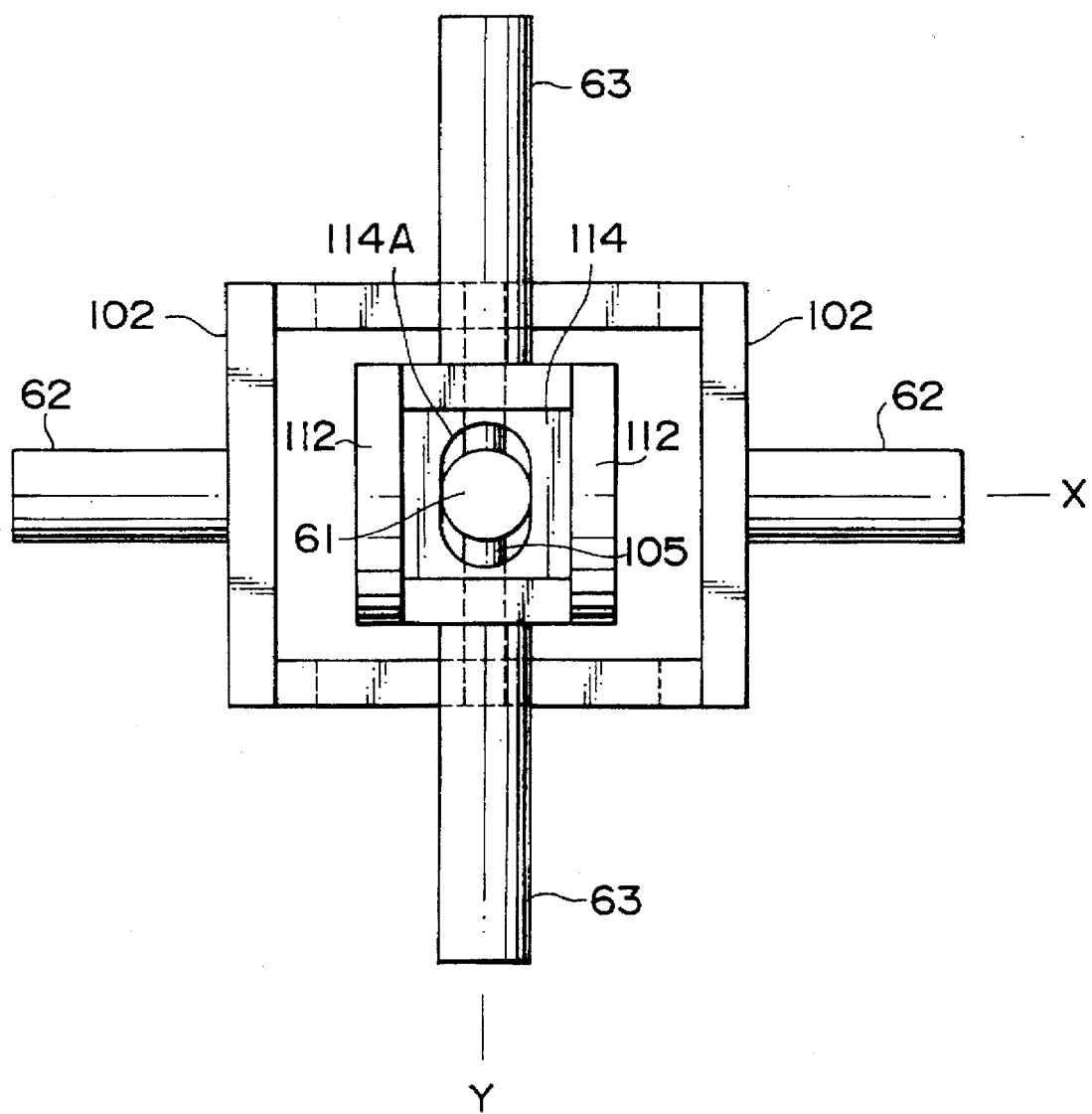
FIG. 9 is a plan view illustrating the structure of the embodiment of FIG. 6.

Meanwhile the stick 61 is inserted into a bore 114A formed in a bottom plate 114 of an inner member 111 so that the inner member 111 can be disposed inside the outer member 101. As illustrated in FIG. 9, the bore 114A is shaped to be elongate in the Y-axis direction. Side plates 112 are provided on the bottom plate 114 of the inner member 111 in a manner to be opposite to each other in the X-axis direction, and joint plates 113 smaller in height than the side plates 112 are provided also on the bottom plate 114 in a manner to be opposite to each other in the Y-axis direction. A shaft 63 extending in the Y-axis direction is infixed in each of such joint plates 113. The slot 104 formed in each of the guide plates 103 of the outer member 101 is shaped to be a circular arc whose center is at the shaft 63.

The small stick controller shown in FIGS. 6 to 9 is disposed in a box 116 as illustrated in FIG. 5, wherein the shafts 62 and 63 extend outward respectively through holes 118 and 119 formed in the box 116. The hole 119 is substantially equal to or slightly larger in diameter than the shaft 63, whereas the hole 118 is shaped to be elongate in the Z-axis direction. And a variable resistor 64 is disposed outside the box 116 in a manner to be joined to one end of the shaft 62, while a push-button type switch 66 is disposed below the other end of the shaft 62. Another variable resistor 65 is disposed outside the box 116 in the Y-axis direction and is joined to the shaft 63.

When the stick 61 is rotated on the X axis, the outer member 101 joined to the guide plates 103 via the pin 105 is also rotated on the shaft 62 (X axis). At this time, the inner member 111 is kept in a still state since the bore 114A, which is elongate in the Y-axis direction, is formed in the bottom plate 114 of the inner member 111.

Meanwhile when the stick 61 is rotated on the Y axis, the inner member 111 is rotated on the shaft 63 (Y axis) together with the rotation of the stick 61, since the bore 114A formed in the bottom plate 114 is shaped to be substantially equal in diameter to the stick 61 in the X-axis direction. At this time, the pin 105 is guided along the slot 104 formed on a circular arc whose center is at the shaft 63. In this case, the side plates 112 of the inner member 111 are kept away from contact with the side plates 102 of the outer member 101 as a sufficient space is maintained between the side plates 112 and 102. Consequently, the outer member 101 is held in a still state.

When the stick 61 is actuated in a direction between the X axis and the Y axis, the inner member 111 is rotated on the Y axis while the outer member 101 is rotated on the X axis.

A return spring 106 is connected to the lower end of the stick 61, so that when the actuation to rotate the stick 61 is brought to a halt, the stick 61 is returned to its origin point (vertical position) by the resilience of the return spring 106.

When the stick 61 is rotated on the X axis, the shaft 62 is also rotated on the X axis, whereby the resistance value of the variable resistor 64 is changed. Accordingly it becomes possible to detect, from the resistance value of the variable resistor 64, both the rotational quantity and the rotational direction of the stick 61 on the X axis.

Similarly, when the stick 61 is rotated on the Y axis, the shaft 63 is also rotated on the Y axis, whereby the resistance value of the variable resistor 65 is changed. Accordingly it becomes possible to detect, from the resistance value of the variable resistor 65, both the rotational quantity and the rotational direction of the stick 61 on the Y axis.

Thus, there is detected an actuation in one of the eight directions indicated by an arrow a in FIG. 5 (in this case, a horizontal actuation) is detected.

When the stick 61 is depressed vertically downward along an arrow b in FIG. 5, the inner member 111 is not changed particularly since the stick 61 is inserted into the bore 114A of the bottom plate 114, but the outer member 101 is depressed downward together with the stick 61 since the pin 105 infixed in the stick 61 is inserted into the guide plates 103 via the slots 104. At this time, the downward motion of the outer member 101 is guided by a vertically elongate hole 118 formed in the box 116 into which the shaft 62 is inserted. And upon descent of the shaft 62 down to a predetermined position, a portion of the shaft 62 depresses the switch 66, whereby the switch 66 is turned on or off to consequently detect the downward depression of the stick 61.

And when the actuation for downward depression of the stick 61 is brought to a halt, the stick 61 is returned to its upper original position by the resilience of an unshown return spring incorporated in the switch 66.

Figure 10:
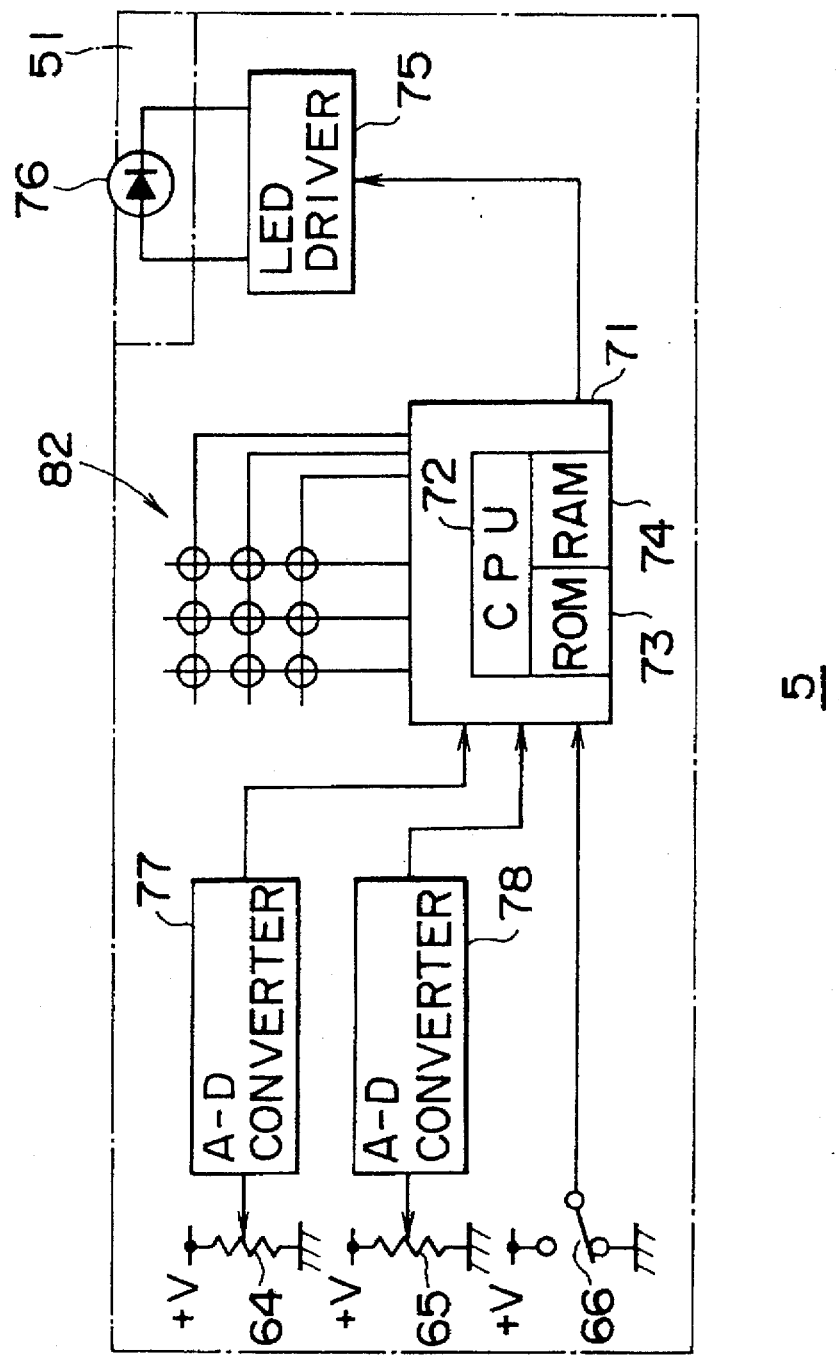
FIG. 10 is a block diagram showing an exemplary internal constitution of the remote commander 5 of FIG. 4.

FIG. 10 shows an exemplary internal circuit configuration of the remote commander 5. In this example, a microcomputer 71 has a ROM 73 for storage of a program, a CPU 72 for executing various processes in accordance with the program stored in the ROM 73, and a RAM 74 for storage of data required for execution of various processes by the CPU 72. A button switch matrix 82 is connected to the microcomputer 71 so as to detect an actuation of any button switch of the switch group 50 shown in FIG. 4.

An A-D converter 77 executes analog-to-digital conversion of the resistance value of the variable resistor 64

(corresponding to the rotation of the stick 61 on the X axis) and outputs the converted value to the microcomputer 71. Meanwhile an A-D converter 78 executes analog-to-digital conversion of the resistance value of the variable resistor 65 (corresponding to the rotation of the stick 61 on the Y axis) and outputs the converted value to the microcomputer 71. Further a signal (corresponding to a vertical actuation of the stick 61) for turning on or off the switch 66 is supplied to the microcomputer 71.

The microcomputer 71 drives an LED 76 of the IR transmitter 51 via an LED driver 75 to thereby generate an infrared signal.

Now an operation performed in the exemplary configuration of the IRD 2 shown in FIG. 3 will be described below. It is assumed here that a predetermined broadcast channel received by the IRD 2 is outputted to and displayed on the monitor unit 4.

In this case, the signal received by the main-picture tuner 21A is QPSK-demodulated by the QPSK demodulator circuit 22A and, after the process executed by the error corrector circuit 23A, the corrected signal is supplied to the demultiplexer 24. Then the demultiplexer 24 separates the input signal into the video signal and the audio signal, and supplies the video signal to the MPEG video decoder 25A of the main-picture decoding section 44A while supplying the audio signal to the MPEG audio decoder 26.

The MPEG video decoder 25A decodes the video signal compressed by the MPEG system and supplies the decoded signal to the NTSC encoder 27 via the picture-in-picture processor 45. The NTSC encoder 27 converts the input signal to a video signal of the NTSC format and then outputs the converted signal via the buffer amplifiers 28Y, 28C and 28V to the monitor unit 4 to display the picture thereon.

Meanwhile the MPEG audio decoder 26 decodes the input audio signal compressed by the MPEG system and then supplies the decoded signal to the D-A converter 30. The audio signal processed through digital-to-analog conversion in the D-A converter 30 is outputted via the buffer amplifiers 31L and 31R to the monitor unit 4 so that the sound is emitted therefrom.

Figure 11:
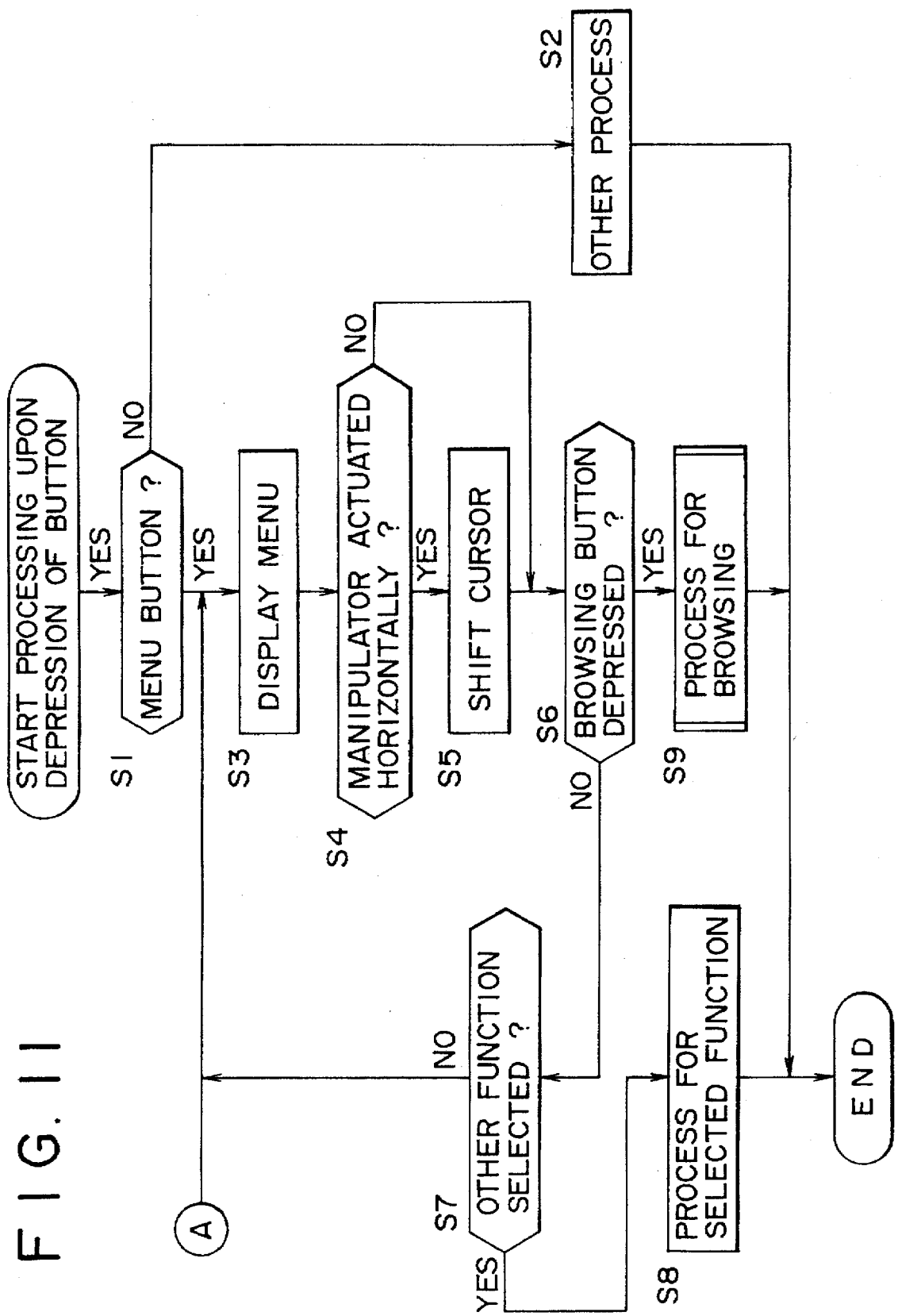
FIG. 11 is a flow chart for explaining an operation of the embodiment of FIG. 3.

In this state, if the user wants to know what programs are now being broadcast in channels other than the one being received, the user actuates the menu button switch 53 of the remote commander 5 shown in FIG. 4. When any one button switch is actuated out of the button switch group 50 in the remote commander 5 including the menu button switch 53, the processing shown in a flow chart of FIG. 11 is started.

First at step S1, a decision is made as to whether the actuated one is the menu button switch 53 or not. This decision is executed in the following manner.

When any one button switch is actuated out of the button switch group 50 in the remote commander 5, this actuation is detected by the button switch matrix 82, and a detection signal therefrom is inputted to the CPU 72. Then the CPU 72 controls the LED driver 75 in response to this input signal and drives the LED 76 to emit an infrared signal corresponding to the actuation.

The infrared signal thus emitted is received by the IR receiver 39 of the IRD 2, and the result of such reception is inputted to the CPU 29. On the basis of this input, the CPU 29 is capable of making a decision as to whether the actuated button switch is the menu button switch 53 or not.

If the result of the decision at step S1 signifies that the actuated one is some switch other than the menu button switch 53 (i.e., if the actuated one is not the menu button switch 53), the operation proceeds to step S2, and a process corresponding to the actuated button switch is executed. Meanwhile, if the result of the decision at step S1 signifies that the actuated one is the menu button switch 53, the operation proceeds to step S3, where a process of displaying a menu is executed. More specifically, the CPU 29 controls the MPEG video decoder 25A to generate menu OSD data and output the same as a video signal. Then the video signal is supplied via the picture-in-picture processor 45 and the NTSC encoder 27 to the monitor unit 4 to be displayed thereon. Consequently, a menu such as illustrated in FIG. 12 for example is displayed.

Figure 12:
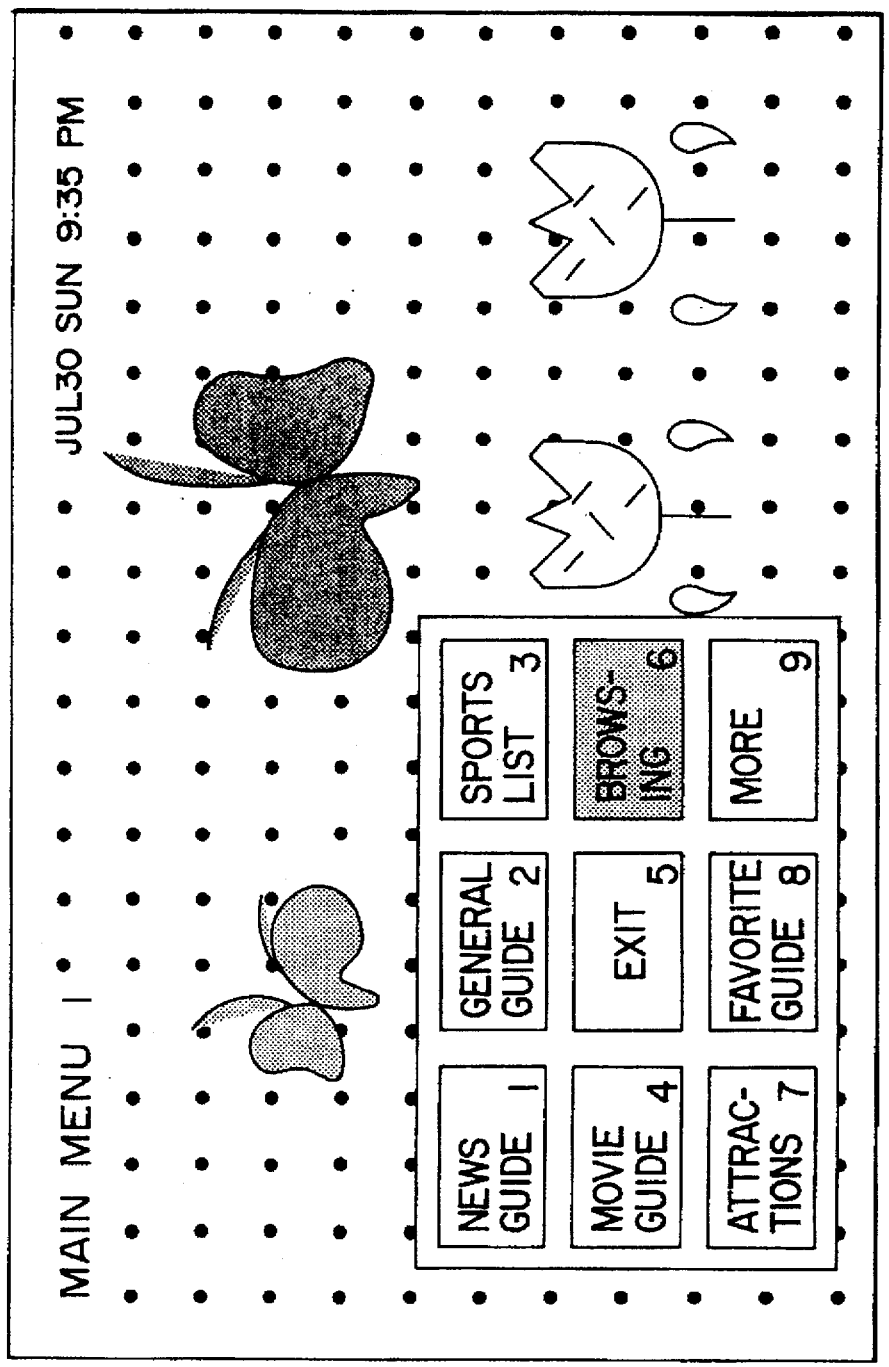
FIG. 12 illustrates a display example of a menu.

On the menu, there is displayed a manipulation palette having nine button icons numbered 1 through 9, as illustrated in FIG. 12. In this embodiment, the button icons Nos. 1 through 8 represent news guide, general guide, sports list, movie guide, exit, browsing, attractions and favorite guide, respectively. And the button icon No. 9 represents more which is manipulated for displaying the second page of the menu.

Subsequently the operation proceeds to step S4, where a decision is made as to whether the manipulator 52 of the remote commander 5 has been actuated or not in the horizontal direction (indicated by an arrow a in FIG. 5). When the manipulator 52 is actuated in the horizontal direction, the resistance values of the variable resistors 64 and 65 are changed as mentioned. Then the CPU 72 reads the resistance values from the outputs of the A-D converters 77 and 78 to thereby decide the direction of the actuation. Thereafter the CPU 72 controls the LED driver 75 to output from the LED 76 an infrared signal corresponding to the direction of the actuation.

In the IRD 2, this infrared signal is inputted via the IR receiver 39 to the CPU 29. When the CPU 29 decides the horizontal actuation of the manipulator 52 from the input signal, the operation proceeds to step S5, where the cursor is shifted in the direction corresponding to such actuation.

In the display example of FIG. 12, the cursor is visually represented by high-light display of a predetermined button icon. In the example of FIG. 12, the browsing button icon (No. 6) is displayed with high light. The CPU 29 controls the MPEG video decoder 25A correspondingly to the input direction of the actuation to thereby shift the cursor in the corresponding direction.

If the result of the decision at step S4 signifies that the manipulator 52 has not been actuated in the horizontal direction, it is not necessary to shift the cursor, so that the process at step S5 is skipped.

Thereafter the operation proceeds to step S6, where a decision is made as to whether the browsing button icon (No. 6) shown in FIG. 12 has been selected or not. If the result of such decision signifies no selection of the browsing button icon, the operation proceeds to step S7 where a decision is made as to whether any button icon corresponding to the other function has been selected or not. And when the result of the decision signifies no selection of any button icon corresponding to the other function, the operation returns to step S3, and the processing subsequent thereto is executed repeatedly. In this case, therefore, the menu is displayed continuously on the screen.

If the result of the decision at step S7 signifies selection of any button icon corresponding to the other function, the operation proceeds to step S8, where a process corresponding to the function of the selected button icon is executed.

At steps S6 and S7, an actuation for selecting a desired button icon is performed by pressing the manipulator 52

(enter actuation) in the direction perpendicular to the drawing paper face in FIG. 4 in a state where the cursor is shifted to the desired button icon.

More specifically, the switch 66 of the remote commander 5 is turned on at this time, and then the CPU 72 of the remote commander 5 controls the LED 76 via the LED driver 75 to thereby output an infrared signal corresponding to the turn-on of the switch 66. And in response to the input signal received via the IR receiver 39, the CPU 29 of the IRD 2 decides that the button icon, where the cursor is positioned at that time, has been selected.

When the result of the decision at step S6 signifies selection of the browsing button icon, the operation proceeds to step S9 to execute a process for browsing. The details of such process for browsing are shown in FIGS. 13 to 19.

Figure 13:
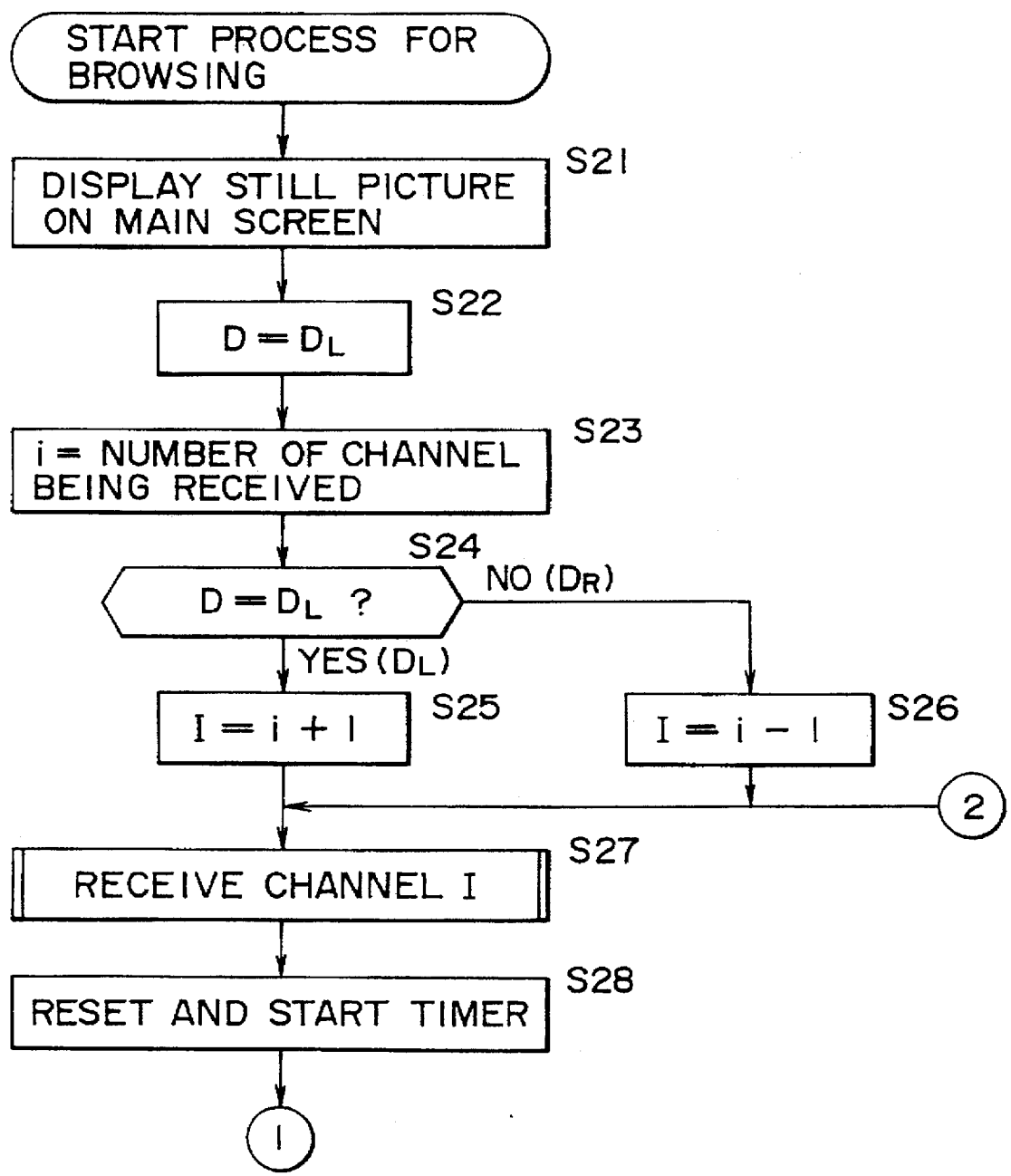
FIG. 13 is a flow chart for explaining a browsing process executed in a first embodiment.
Figure 14:
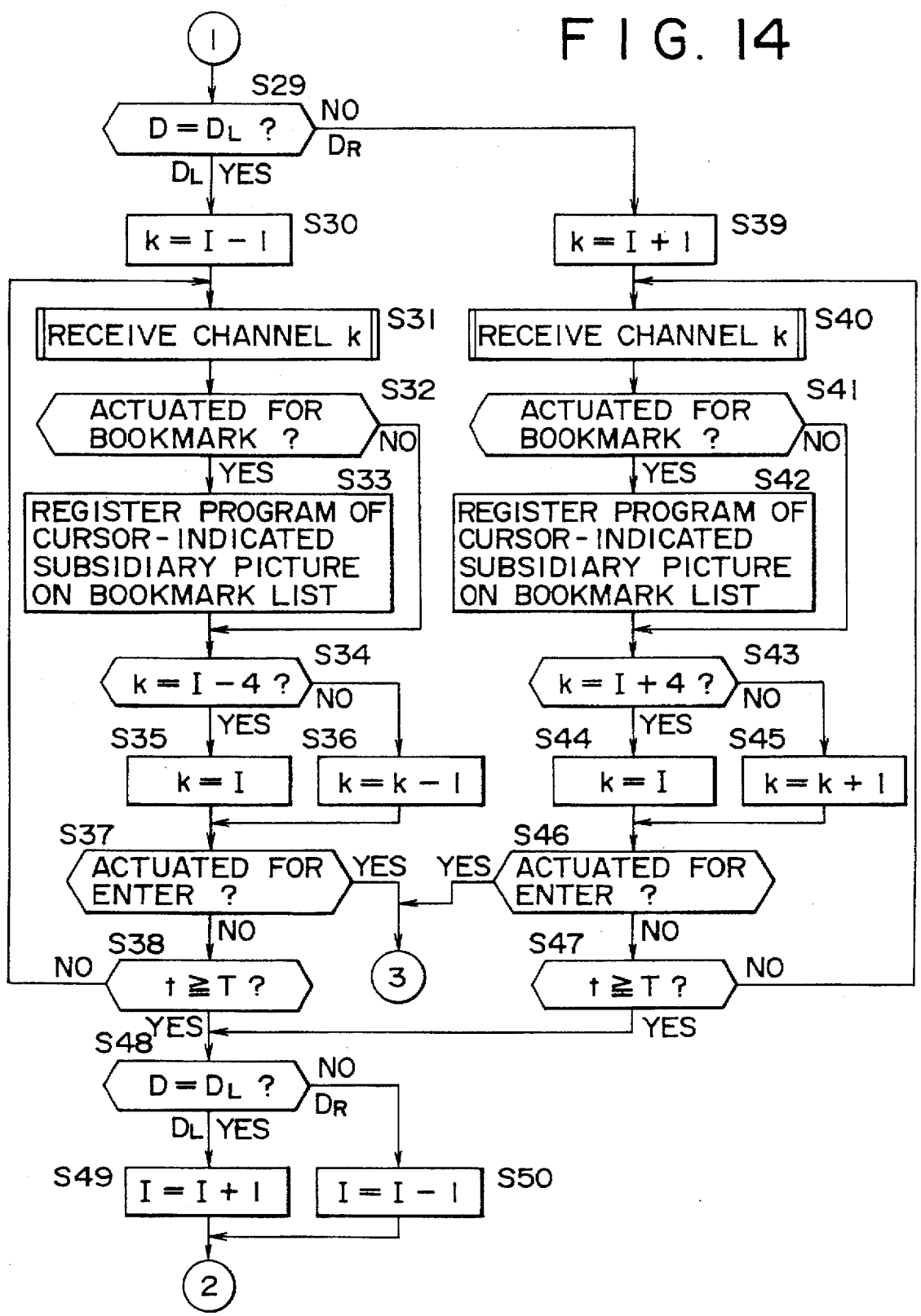
FIG. 14 is a flow chart continued from FIG. 13.
Figure 15:
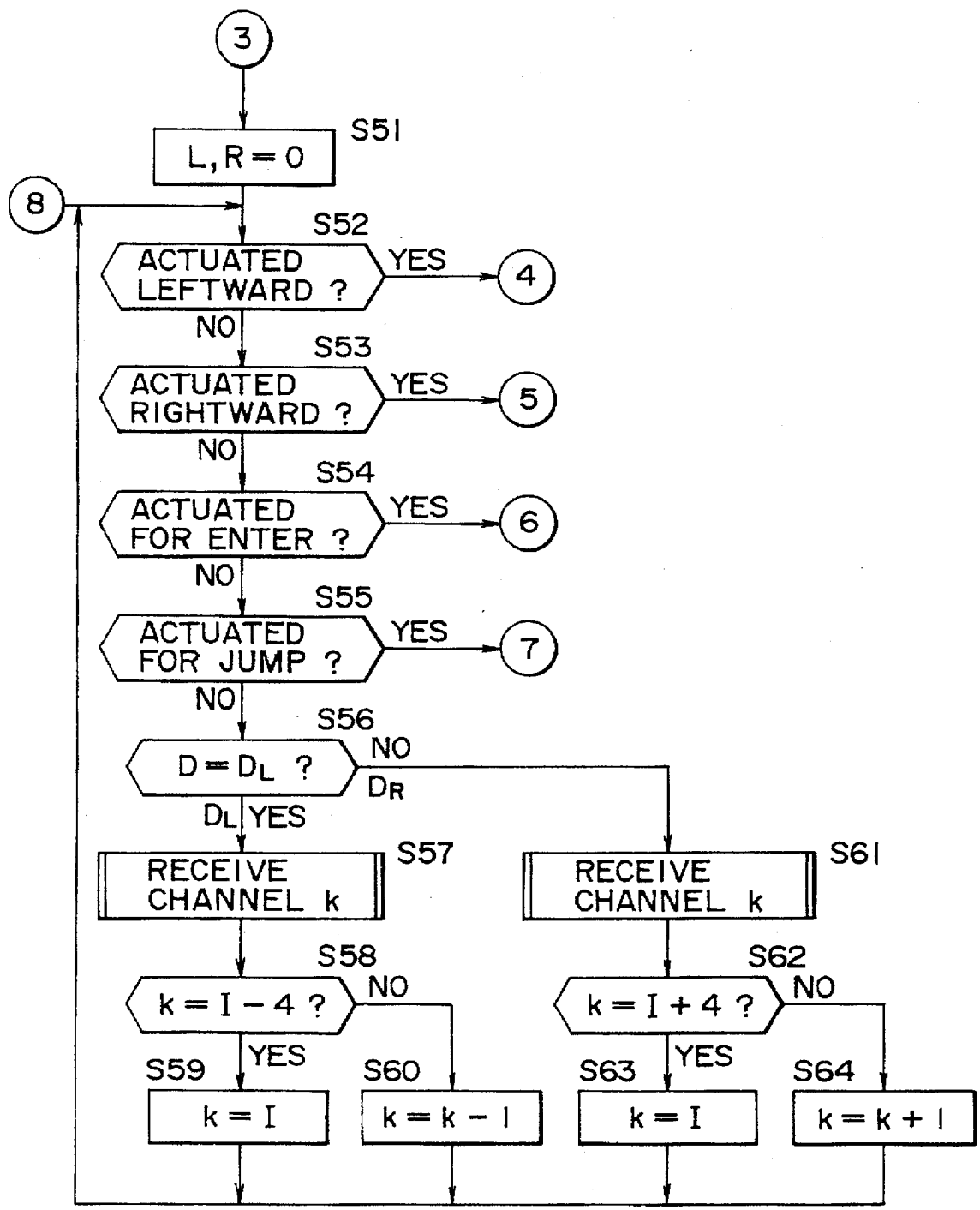
FIG. 15 is a flow chart continued from FIG. 14.
Figure 16:
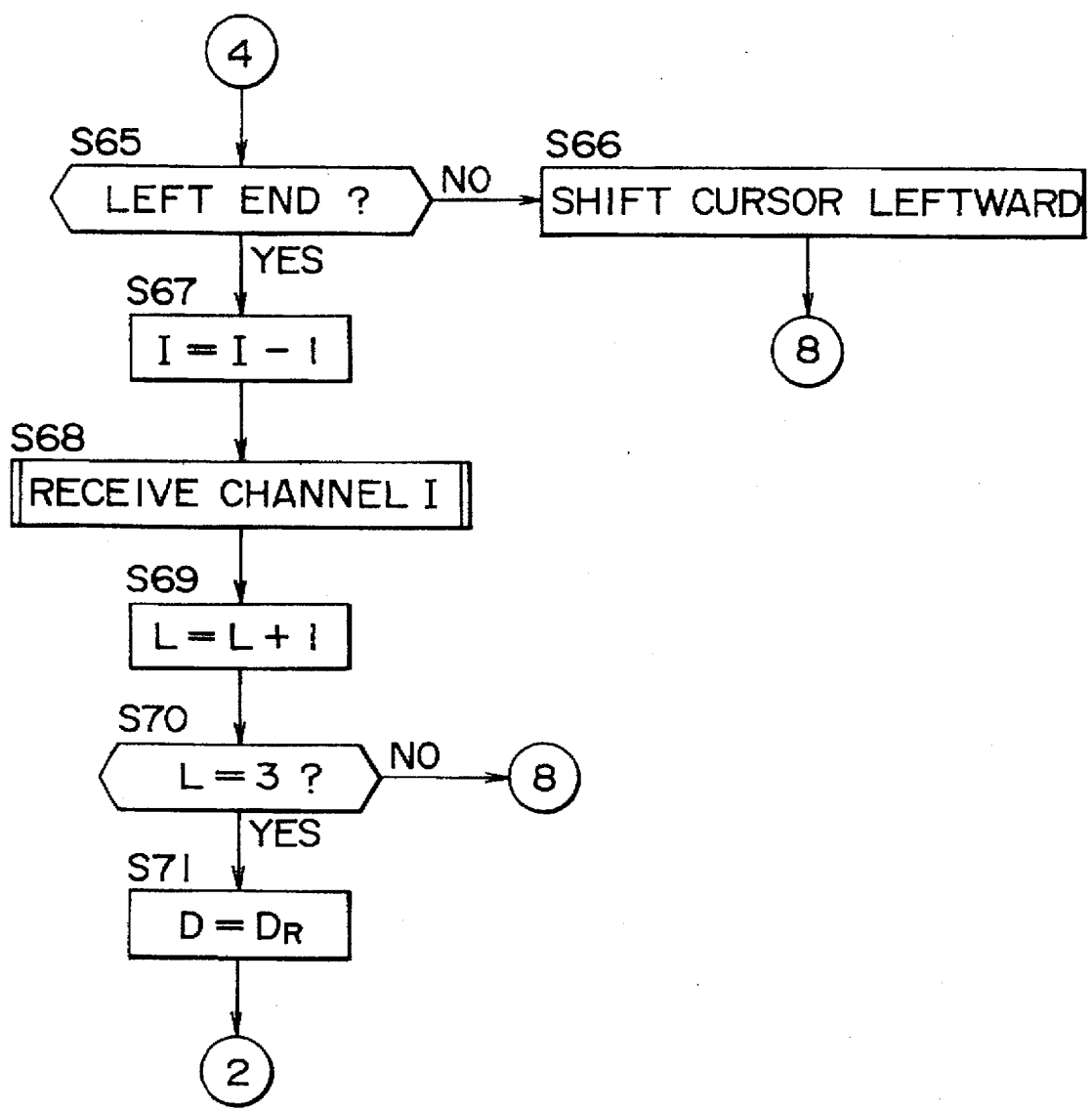
FIG. 16 is a flow chart continued from FIG. 15.
Figure 17:
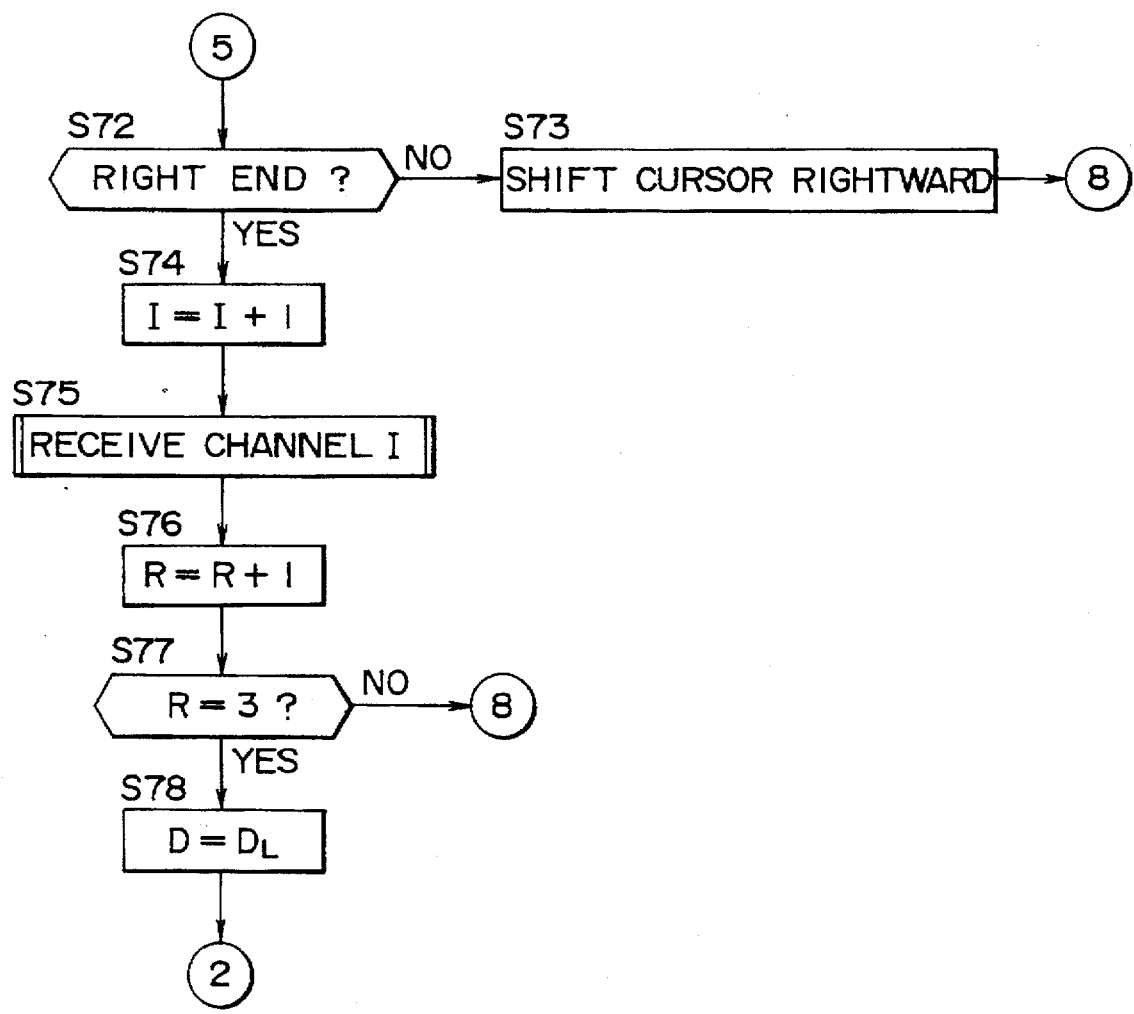
FIG. 17 is a flow chart continued from FIG. 16.
Figure 18:
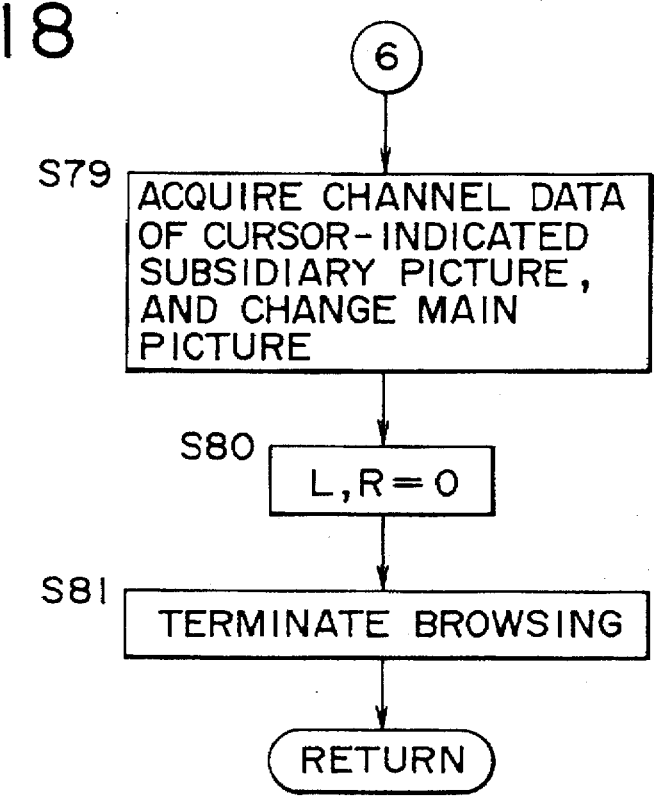
FIG. 18 is a flow chart continued from FIG. 17.
Figure 19:
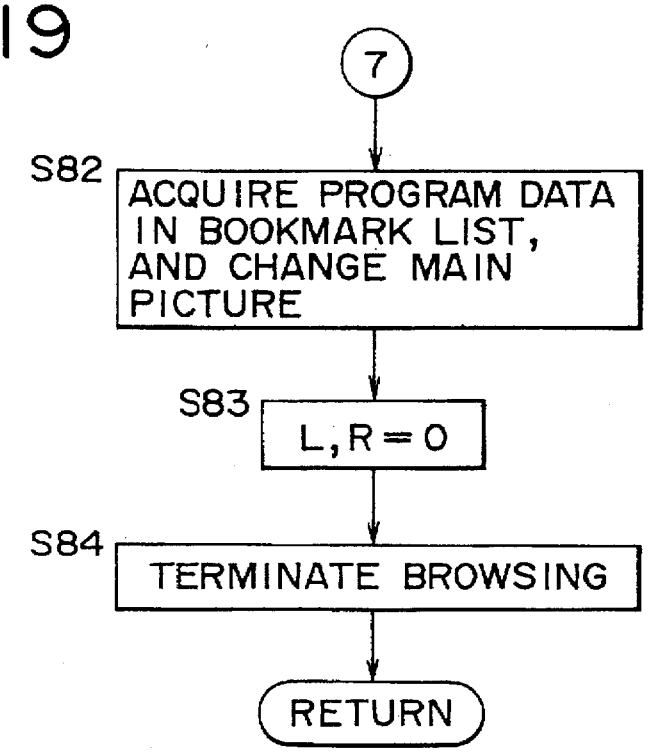
FIG. 19 is a flow chart continued from FIG. 18.

At step S21 in FIG. 13, the CPU 29 controls the picture-in-picture processor 45 and, at the timing of turn-on of the browsing button icon, inhibits renewal of the main-picture data stored in the internal memory, thereby displaying a still picture on the main screen.

However, when it is impossible to ensure a sufficient time for receiving subsidiary pictures, the main picture need not exactly be turned to a still picture. In this case, the process at step S21 is omitted. And the main picture may be turned to a pseudo moving picture instead of a still picture, similarly to subsidiary pictures as will be described later.

Subsequently at step S22, a value DL indicating a leftward direction is initially set as a parameter D which denotes a direction to shift (scroll) subsidiary pictures. Then the operation proceeds to step S23, where the channel number of the main picture being now received by the tuner 21A is set as a parameter i.

Figure 20:
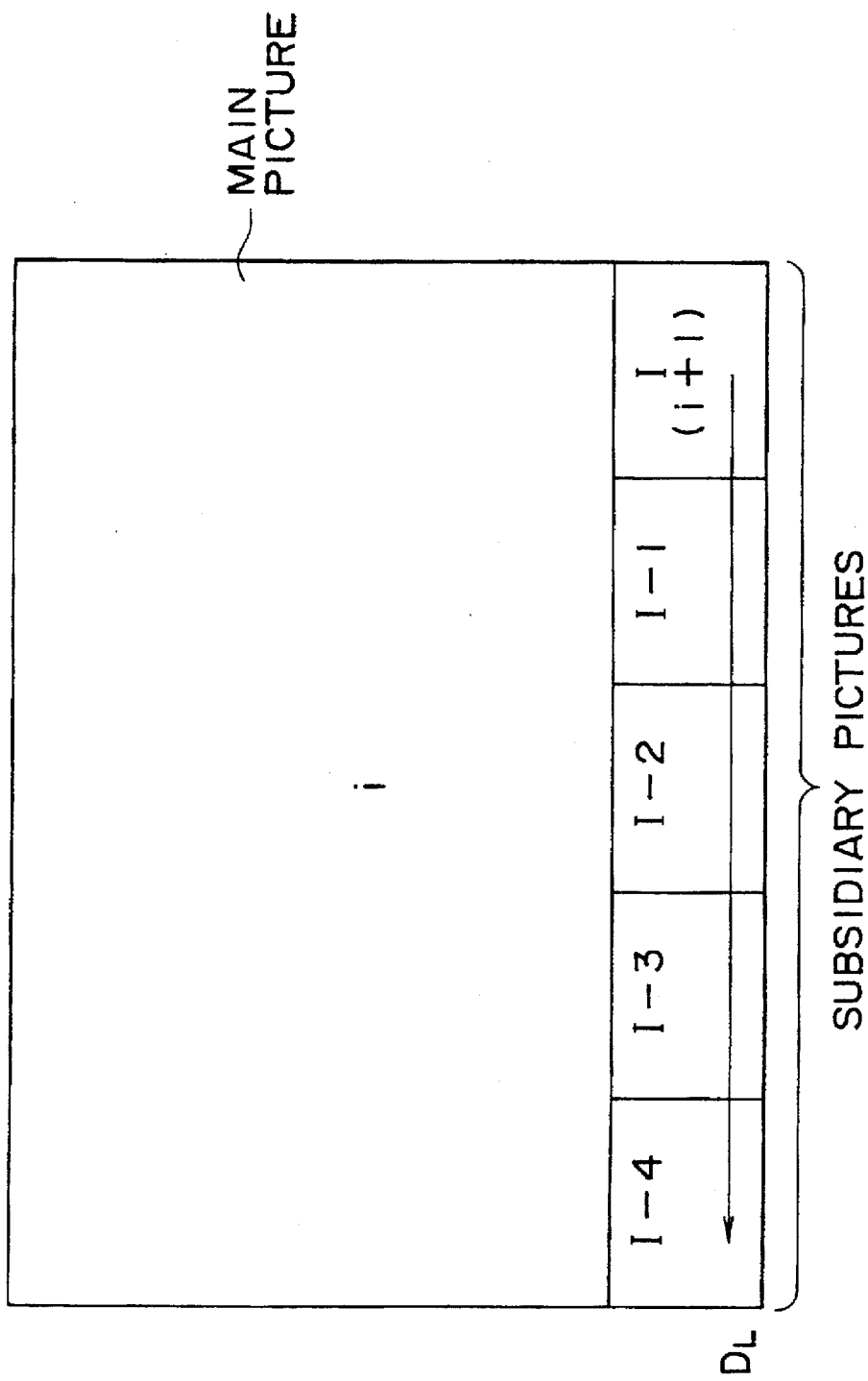
FIG. 20 is a diagram for explaining the direction of scroll of subsidiary pictures.

In this embodiment, as shown in FIG. 20, five subsidiary pictures are displayed horizontally under the main picture on the CRT 4A of the monitor unit 4. And when such subsidiary pictures are to be scrolled leftward, a next channel I (=i+1) following the channel i of the main picture is determined as a lower right (newest) subsidiary picture, and thereafter four subsidiary pictures of channels I−1 to I−4 are successively arranged leftward.

Figure 21:
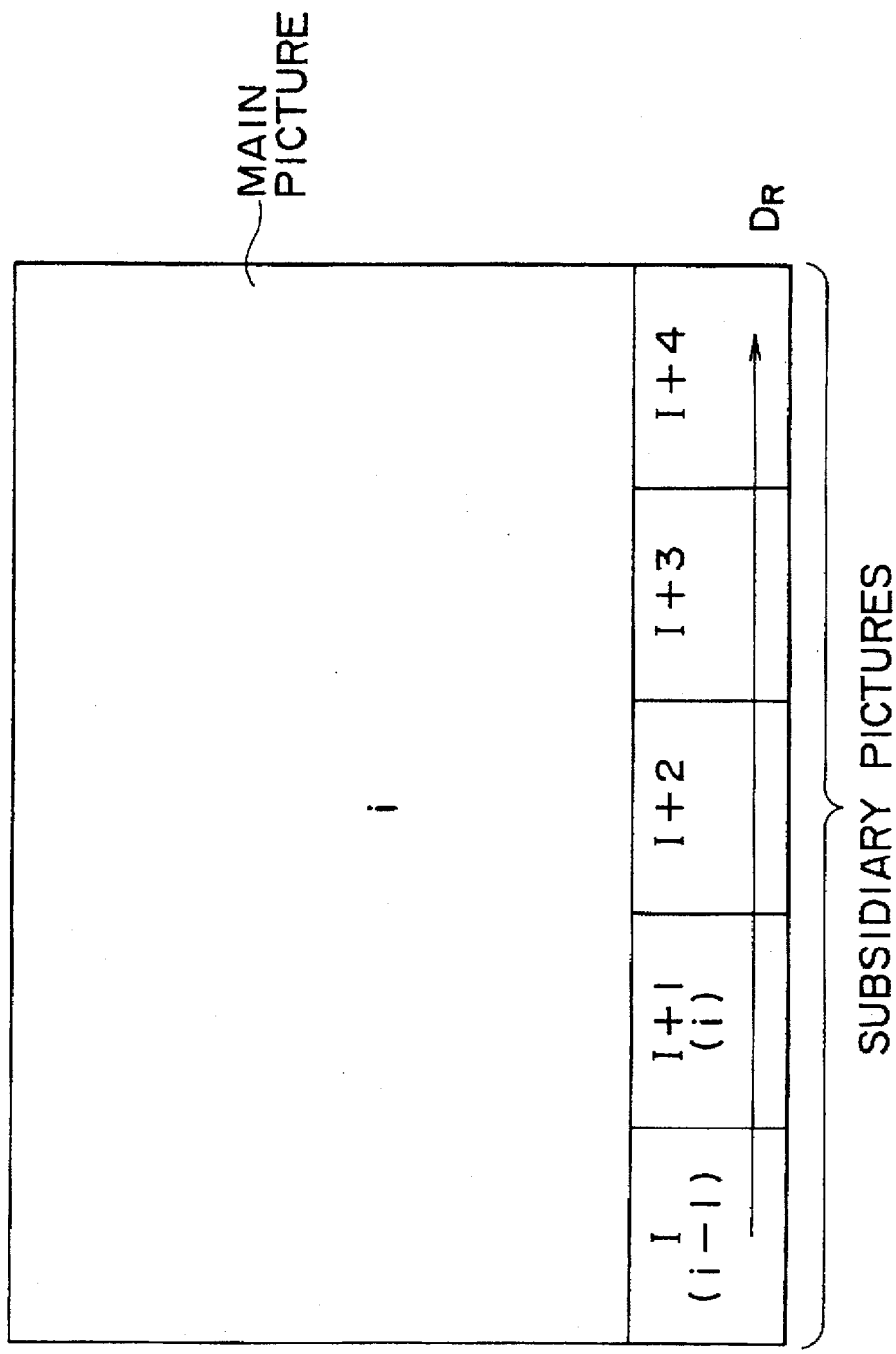
FIG. 21 is another diagram for explaining the direction of scroll of subsidiary pictures.

Meanwhile, when the subsidiary pictures are to be scrolled rightward, as shown in FIG. 21, a preceding channel i−1 prior to the main picture of the channel i is displayed as a channel I on the leftmost subsidiary screen, and thereafter subsidiary pictures of channels I+1 to I+4 are successively arranged rightward.

Then the operation further proceeds to step S24, where a decision is made as to whether the parameter D is equal to DL or not, i.e., whether the scroll direction of the subsidiary pictures is leftward or not. And if the result of such a decision signifies leftward scroll, the operation proceeds to step S25, where a value obtained by incrementing the parameter i by 1 is set as the parameter I.

If the result of the decision at step S24 signifies that the scroll direction of the subsidiary pictures is rightward (i.e., when a value DR indicating rightward scroll of the subsidiary pictures is set as the parameter D), the operation proceeds to step S26, where a value obtained by decrementing the parameter i by 1 is set as the parameter I.

After termination of step S25 or S26, the operation proceeds to step S27 to execute a process of receiving the channel I. More specifically, the CPU 29 controls the subsidiary-picture receiving tuner 21B instead of the tuner 21A which has been receiving the main-picture broadcast channel until then, thereby enabling the tuner 21B to receive the channel I. The signal of the channel I thus received by the tuner 21B is demodulated by the QPSK demodulator circuit 22B and is supplied to the error corrector circuit 23B where error correction is executed, and the corrected signal therefrom is supplied to the demultiplexer 24.

Subsequently the video signal outputted from the demultiplexer 24 is supplied to the MPEG video decoder 25B of the decoding section 44B, and the decoded signal therefrom is supplied to the picture-in-picture processor 45 so as to be stored as subsidiary-picture data of the channel I in the internal memory. The picture of the channel I is the rightmost one when the subsidiary-picture scroll direction is leftward (D=DL) as shown in FIG. 20, or the leftmost one when the subsidiary-picture scroll direction is rightward (D=DR) as shown in FIG. 21.

Thereafter the operation proceeds to step S28, where the CPU 29 resets the calendar timer 35 and starts it immediately. The measured value t of this timer is compared with a preset time T at steps S38 or S47 as will be described later.

Then the operation proceeds to step S29, where a decision is made as to whether the subsidiary-picture scroll direction is leftward or not. And if the result of such a decision signifies that the direction is leftward (i.e., when D=DL), the operation proceeds to step S30 where a value obtained by decrementing the parameter I by 1 is set as the parameter k. That is, the channel number of the second subsidiary picture from the rightmost is set as the parameter k.

Next the operation proceeds to step S31 to execute a process of receiving the channel k set at step S30. More specifically, the CPU 29 controls the tuner 21B to receive the channel k. The picture of the channel k is supplied to the picture-in-picture processor 45 and then is stored in the internal memory as the picture of the second subsidiary screen from the rightmost in FIG. 20.

Subsequently the operation proceeds to step S32, where a decision is made as to whether a bookmark actuation has been executed or not (i.e., whether the bookmark button switch 55 of the remote commander 5 has been actuated or not). If the result of such a decision signifies execution of a bookmark actuation, the operation proceeds to step S33, where the program relative to the subsidiary picture with the cursor positioned thereon at that time is registered on a bookmark list in the EEPROM 38.

More specifically, the CPU 29 reads out the broadcast time and the channel number of the program from the EPG stored in the SRAM 36 and then registers the read data on a bookmark list. When the result of the decision at step S32 signifies no execution of a bookmark actuation, the process at step S33 is skipped.

Thereafter the operation proceeds to step S34, where a decision is made as to whether the parameter k is equal to I−4 or not. That is, a decision is made as to whether the parameter k is equal to the channel number of the leftmost subsidiary picture in FIG. 20. Since k=I−1 in this case, the operation proceeds to step S36, where the parameter k is decremented by 1, i.e., k=I−2.

Next the operation proceeds to step S37, where a decision is made as to whether the manipulator 52 of the remote commander 5 has been actuated for enter or not. If the result of this decision is negative, the operation proceeds to step S38, where a decision is made as to whether the measured time t of the timer started at step S28 is equal to or longer than the preset time T. When the result of this decision signifies that the measured time t has not exceeded the preset time T, the operation returns to step S31 to execute again the process of receiving the channel k. Since k=I−2 in this case, the channel of the subsidiary picture disposed at the center is received, and its data is stored in the memory of the picture-in-picture processor 45.

After termination of steps S32 and S33 executed for registration of a bookmark list, the operation proceeds to step S34 where a decision is made as to whether the parameter k is equal to I−4 or not. Since k=I−2 in this stage, the operation proceeds to step S36 again, where the parameter k is decremented by 1, i.e., k=I−3.

Meanwhile, if the result of the decision at step S37 signifies no actuation for enter and also the result of the decision at step S38 signifies that the measured time t has not reached the preset time T yet, the operation returns to step S31 again to execute the process of receiving the channel k. More specifically, the channel I−3 is received and then is stored in the memory of the picture-in-picture processor 45 as the data relative to the second subsidiary picture from the leftmost in FIG. 20.

After termination of steps S32 and S33 again, the operation proceeds to step S34 where a decision is made as to whether the parameter k is equal to I−4 or not. Since the parameter k=I−3 in this case, the operation proceeds to S36 again, where the parameter k is decremented by 1, i.e., k=I−4. And when the operation has returned to step S31 again via steps S37 and S38, the channel I−4 is received. More specifically, the picture on the leftmost subsidiary screen in FIG. 20 is stored in the memory of the picture-in-picture processor 45.

Subsequently the operation proceeds to step S34 through the process at steps S32 and S33, and a decision is made as to whether the parameter k is equal to I−4 or not. Since the parameter k is equal to I−4 in this case, the operation proceeds to step S35 where the parameter k is set as I. Thereafter the operation returns to step S31 via steps S37 and S38, so that the channel I is received. That is, the channel on the rightmost subsidiary picture in FIG. 20 is received.

As described above, the processing at steps S31 to S38 is executed repeatedly, and pseudo moving pictures are displayed on the five subsidiary screens.

Meanwhile, if the result of the decision at step S29 signifies that the scroll direction of the subsidiary pictures is rightward (i.e., D=DR), the operation proceeds to step S39 where the parameter k is set as I+1. Then the operation proceeds to step S40 to execute a process of receiving the channel k (=I+1). Since the scroll direction of the subsidiary pictures is rightward in this case, first the channel I of the leftmost subsidiary picture in FIG. 21 is received at step S27, and thereafter the second channel I+1 from the left end is received at step S40 and then is stored in the memory of the picture-in-picture processor 45.

Next the operation proceeds to step S41 where a decision is made as to whether the bookmark button switch has been actuated or not. If the result of this decision is affirmative to signify an actuation, the operation proceeds to step S42 to execute a process of registering, on a bookmark list, the program of the subsidiary picture indicated by the cursor. This process is similar to the one executed at step S33.

Meanwhile, if the result of the decision at step S41 is negative to signify no actuation of the bookmark button switch, the process at step S42 is skipped.

Subsequently the operation proceeds to step S43 where a decision is made as to whether the parameter k is equal to I+4 or not, that is, whether it is equal or not to the channel number of the rightmost subsidiary picture in FIG. 21. Since k=I+1 in this case, the operation proceeds to step S45 where the parameter k is incremented by 1, i.e., k=I+2.

At step S46, a decision is made as to whether the manipulator 52 has been actuated or not for enter. And if the result of such a decision signifies no actuation for enter, the operation proceeds to step S47 to make a decision as to whether the measured time t of the timer started at step S28 has become equal to the preset time T. When the result of this decision signifies that the measured time t is still less than the preset time T, the operation returns to step S40 so that the channel I+2 is received, whereby the picture data of the subsidiary picture at the center in FIG. 21 is stored in the memory of the picture-in-picture processor 45.

Thereafter the operation proceeds to step S43 through the process at steps S41 and S42 for registration on the bookmark list, and a decision is made as to whether the parameter k is equal to I+4 or not. Since the parameter k in this case is equal to I+2, the operation proceeds to step S45 where the parameter k is incremented by 1, i.e., k=I+3. Then the operation returns to step S40 again via steps S46 and S47 so that the channel I+3 is received and then the picture data thereof is stored in the memory of the picture-in-picture processor 45. Consequently the picture of the channel I+3, which is the fourth from the leftmost one shown in FIG. 21, is stored.

Subsequently the operation proceeds to step S43 again through the process at steps S41 and S42, and a decision is made again as to whether the parameter k is equal to I+4 or not. Since the parameter k in this case is equal to I+3, the operation proceeds to step S45 where the parameter k is incremented by 1, i.e., k=I+4. Then the operation returns to step S40 via steps S46 and S47, and the channel I+4 is received. Consequently the picture of the rightmost channel I+4 in FIG. 21 is stored in the memory of the picture-in-picture processor 45.

Next the operation proceeds to step S43 through the process at steps S41 and S42, and a decision is made as to whether the parameter k is equal to I+4 or not. Since the parameter k in this case is equal to I+4, the operation proceeds to step S44 where the parameter k is set as I. That is, the number of the leftmost channel in FIG. 21 is set. Consequently the operation returns to step S40 via steps S46 and S47 so that the channel I is received, and the picture data thereof is stored in the memory of the picture-in-picture processor 45. That is, the picture on the subsidiary screen of the leftmost channel I in FIG. 21 is newly stored in place of the preceding picture.

As the operation described above is performed repeatedly, pseudo moving pictures are displayed on the five subsidiary screens.

Upon lapse of the preset time T (e.g., 5 seconds) after reception of the channel I at step S27, the operation proceeds from step S38 or S47 to step S48, where a decision is made as to whether the scroll direction of the subsidiary pictures is leftward or not. And if the result of such a decision signifies the leftward scroll, the operation proceeds to step S49 where the parameter I is incremented by 1. Meanwhile, if the result of the decision signifies the rightward scroll of the subsidiary pictures, the operation proceeds to step S50 where the parameter I is decremented by 1.

Thereafter the operation returns to step S27 to execute a process of receiving the channel I.

Accordingly, when the scroll direction of the subsidiary pictures is leftward, the picture of the rightmost channel I in the state of FIG. 20 is changed to the picture of the channel I+1. As a result, the processing at steps S28 to S38 is executed repeatedly, and the picture of the channel I displayed at the rightmost position until then is shifted to be displayed on the second subsidiary screen from the right end in FIG. 20, and the picture displayed on the second subsidiary screen from the right end until then is shifted to be displayed on the subsidiary screen at the center. Thereafter the pictures on the subsidiary screens are shifted leftward by a space of one picture in a manner similar to the above.

Meanwhile, when the scroll direction of the subsidiary pictures is rightward, the picture of the leftmost channel I in the state of FIG. 21 is changed to the picture of the channel I−1. And the picture of the channel I displayed until then at the leftmost position is shifted to the second subsidiary screen from the left end. Thereafter the pictures on the subsidiary screens are shifted rightward by a space of one picture successively.

In this embodiment, as described above, the five subsidiary pictures are automatically shifted, at an interval of five seconds, either leftward or rightward by a space of one picture. And during the interval of five seconds, renewal of the pictures is executed, and the latest picture data are read out from the picture-in-picture processor 45 and are outputted to the monitor unit 4 to be displayed thereon. Consequently, pseudo moving pictures are displayed on the five subsidiary screens during an interval of five seconds. And after a lapse of five seconds, the pictures on the subsidiary screens are automatically shifted (scrolled) leftward or rightward.

Figure 22:
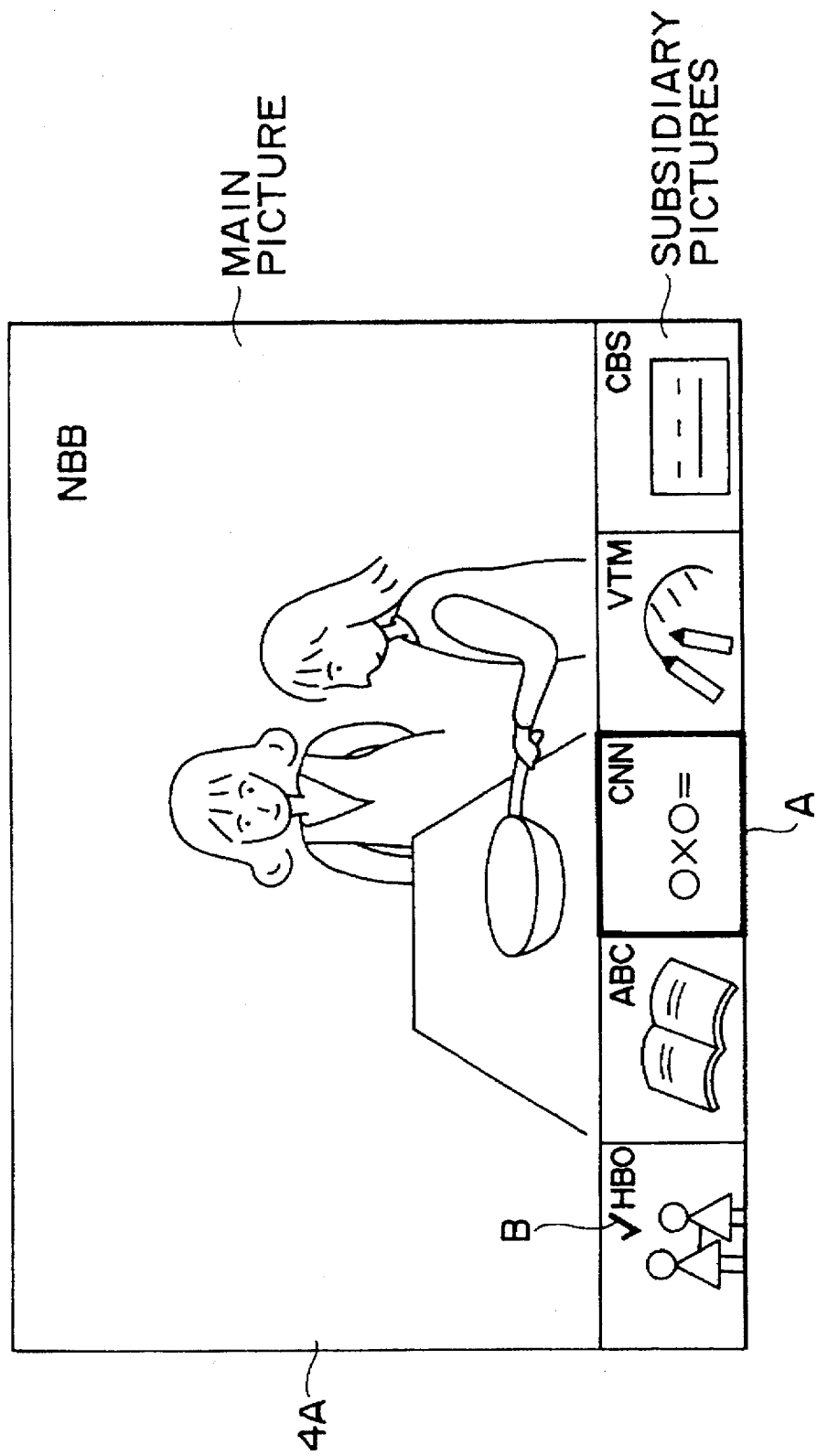
FIG. 22 illustrates display examples of a main picture and subsidiary pictures.

FIG. 22 illustrates an example of a main picture and subsidiary pictures thus displayed. As shown in this example, the CPU 29 performs, when displaying pictures on the subsidiary screens, such a control action that a cursor A is displayed as a default position on the center one of the five subsidiary pictures.

Also in the display example of FIG. 22, a bookmark B is added to a desired number (one in this embodiment) of the five subsidiary pictures.

Suppose now that the subsidiary pictures are successively scrolled leftward as in the case of FIG. 20. When the user actuates the bookmark button switch 55 at the timing of display of a desired subsidiary picture with the cursor A, such actuation is detected at steps S32 and S41 as described, so that the program data relative to the desired subsidiary picture is registered, at steps S33 and S42, on the bookmark list in the EEPROM 38. And the CPU 29 controls the MPEG video decoder 25B to additionally display a bookmark B on the subsidiary picture. In this embodiment, a bookmark B is added to the program HBO.

If the user wants to halt the scroll of the subsidiary pictures in the state with such display, the user actuates the manipulator 52 of the remote commander 5 for enter. Then the actuation for enter is detected at step S37 or S46, and the operation proceeds to step S51 where both parameters L and R are reset to 0. Subsequently at steps S52 to S55, a decision is made as to whether the manipulator 52 has been actuated leftward or rightward or depressed for enter, and another decision is made as to whether the jump button switch 56 has been actuated or not. And if the results of both decisions signify no actuation, the update processing at steps S56 to S64 is executed to display pseudo moving pictures on the subsidiary screens. And after termination of such update processing, the operation returns to step S52 and then the processing subsequent thereto is executed repeatedly.

For execution of the update processing at step S56, a decision is made as to whether the scroll direction of the subsidiary pictures is leftward or not. And if the result of this decision signifies the direction is leftward, the operation proceeds to step S57 to execute a process of receiving the channel k. This parameter k has the value set at steps S35, S36, S44 and S45 prior to the actuation for enter. Thereafter the operation proceeds to step S58, where a decision is made as to whether the parameter k is equal to I−4 or not. If the result of this decision is affirmative, the operation proceeds to step S59 where the parameter k is set as I. However, if the result of the above decision is negative to signify that the parameter k is not equal to I−4, the operation proceeds to step S60 where the parameter k is decremented by 1.

Meanwhile, when the result of the decision at step S56 signifies that the scroll direction of the subsidiary pictures is rightward (i.e., D=DR), the operation proceeds to step S61 to receive the picture of the channel k. Then the operation proceeds to step S62, where a decision is made as to whether the parameter k is equal to I+4 or not. If the result of this decision is affirmative, the operation proceeds to step S63 where the parameter k is set as I. However, if the result of the above decision is negative to signify that the parameter is not equal to I+4, the operation proceeds to step S64 where the parameter k is incremented by 1.

Thus, when the manipulator 52 or the jump button switch 56 is not actuated as mentioned, the processing at steps S52 to S64 is executed repeatedly, so that pseudo moving pictures on the subsidiary screens are successively updated to the newest pictures. In this case, however, the process corresponding to the measured time t of the timer at steps S38 and S47 is omitted. Therefore, even after a lapse of five seconds, the subsidiary pictures are not scrolled and the display positions thereof remain unchanged.

When the user actuates the manipulator 52 leftward in this state, its actuation is detected at step S52, and then the operation proceeds to step S65, where a decision is made as to whether the cursor A is positioned on the leftmost subsidiary screen. And if the result of this decision signifies that the cursor position is not on the leftmost subsidiary screen, the operation proceeds to step S66 to execute a process of shifting the cursor A leftward.

Figure 23:
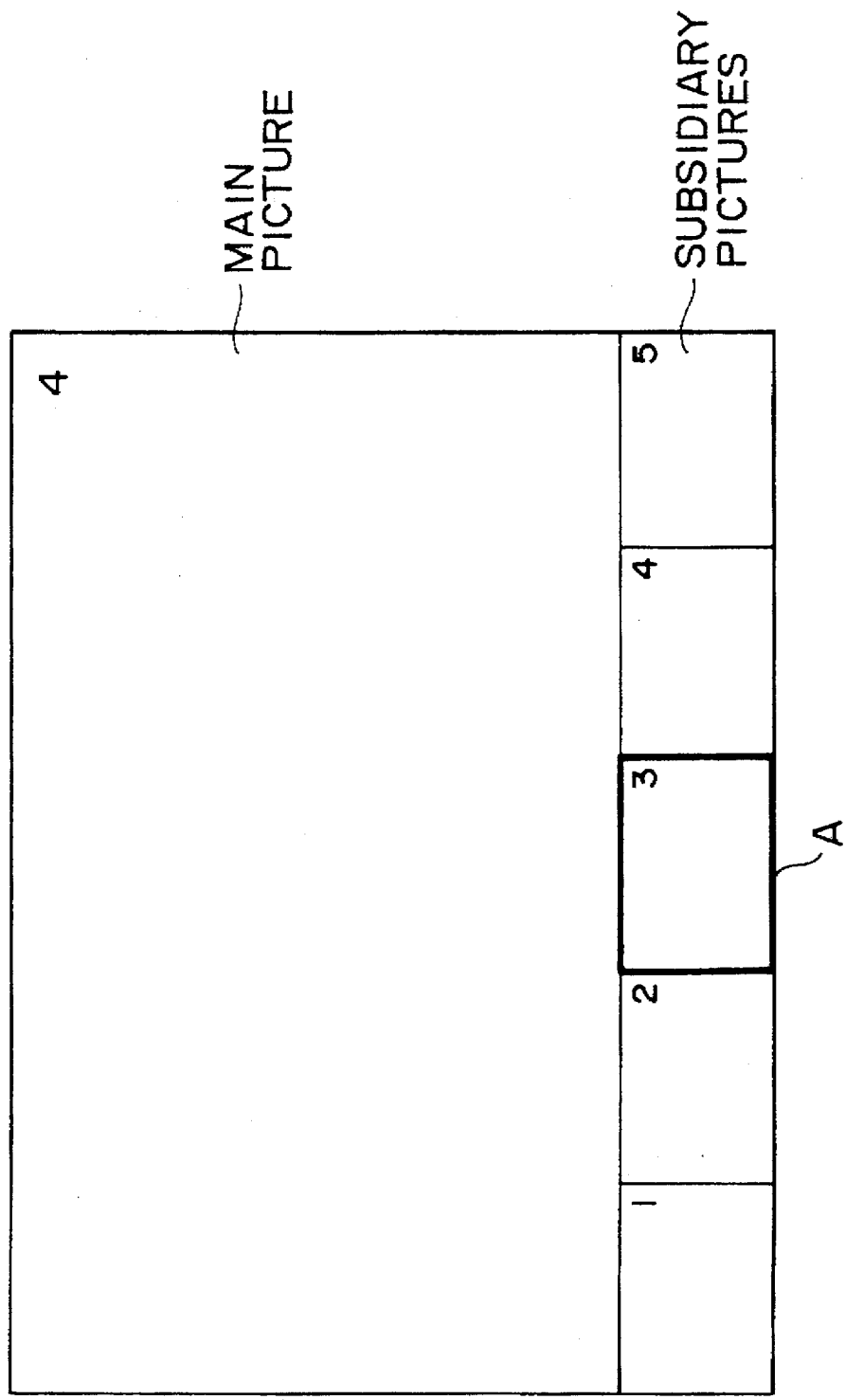
FIGS. 23 to 37 are diagrams for explaining various display states of a main picture and subsidiary pictures.

For example, when a process for browsing is started during reception of a broadcast of the channel 4, pictures are first displayed as shown in FIG. 23. (Although in this diagram the number of a broadcast channel is displayed at the upper right position for the sake of explanatory convenience, the name (abbreviation) of a broadcast channel (station) may be displayed as illustrated in FIG. 22.) More specifically, a still picture of the channel 4 is displayed on the main screen. Since the default (at step S22) indicates that the scroll direction of the subsidiary pictures is leftward, a picture of the next channel 5 following the channel 4 on the main screen is displayed on a lower right subsidiary screen, and pictures of numerically decreasing channels are displayed leftward successively on the subsidiary screens.

And after a lapse of five seconds, the subsidiary pictures are scrolled leftward by a space of one picture, and a picture of the channel 6 is displayed as the newest subsidiary picture (on the rightmost subsidiary screen).

Figure 25:
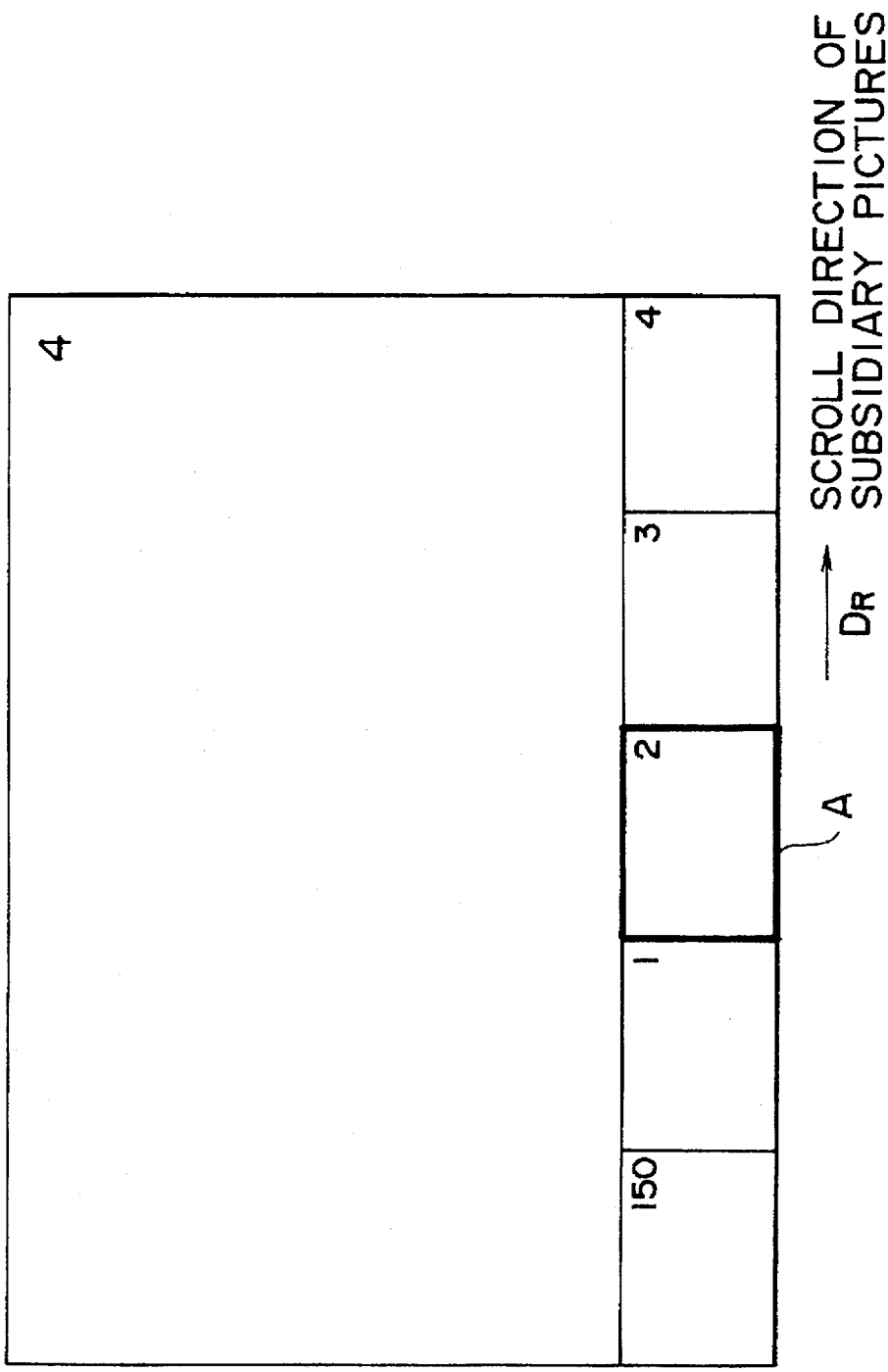

Meanwhile, when the scroll direction of the subsidiary pictures is rightward, the state of displayed pictures shown in FIG. 23 is changed to the state shown in FIG. 25. More specifically, the subsidiary pictures that have been displayed until then are scrolled rightward successively by a space of one picture, and a picture of the channel 150 is displayed as the newest picture on the leftmost subsidiary screen. (It is assumed in this embodiment that there are a total of 150 channels.)

Figure 24:
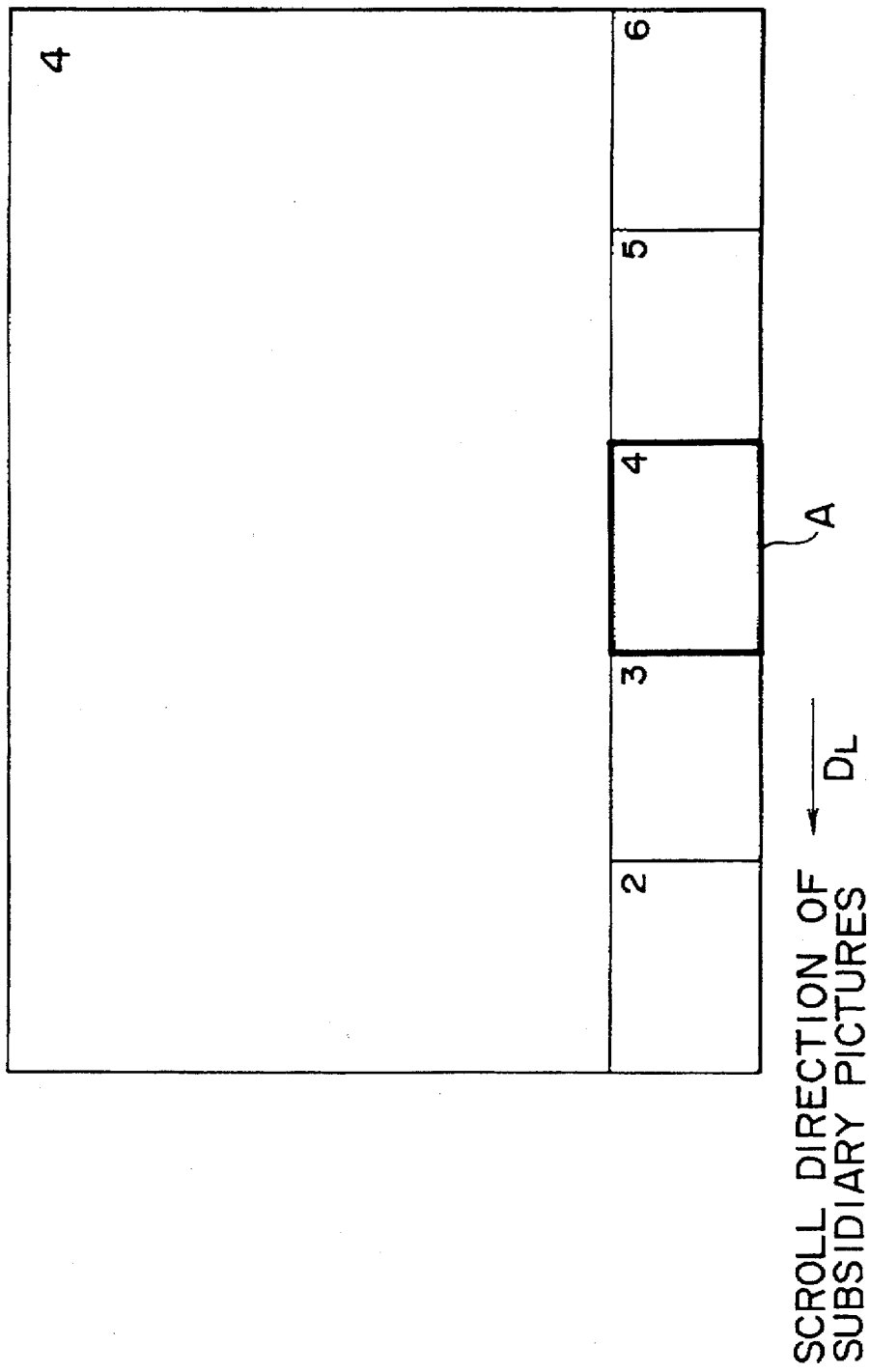
Figure 26:
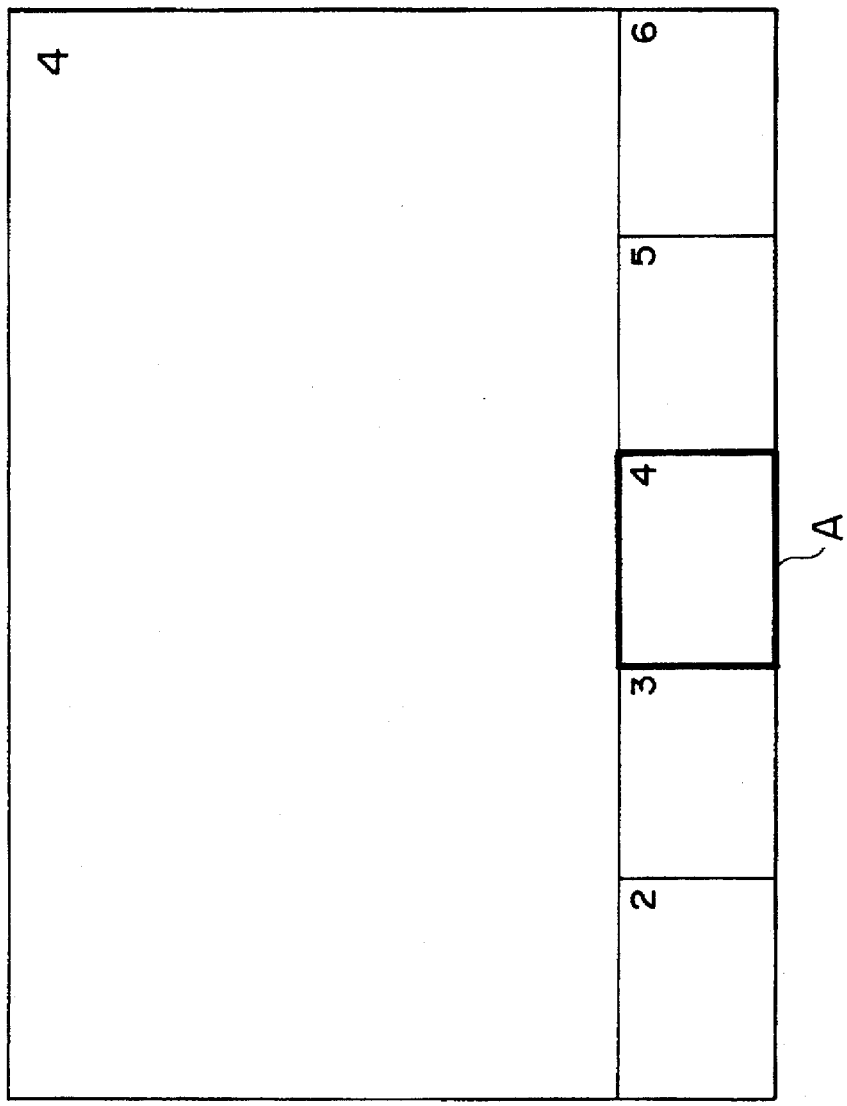

When the manipulator 52 of the remote commander 5 is actuated at the timing of scroll of the subsidiary pictures leftward by a space of one picture from the state of FIG. 23 (i.e., when an actuation for enter is executed in the state of FIG. 24), the scroll of the subsidiary pictures is brought to a halt as shown in FIG. 26. However, the pseudo moving pictures on the subsidiary screens are updated successively to the newest ones.

Figure 27:
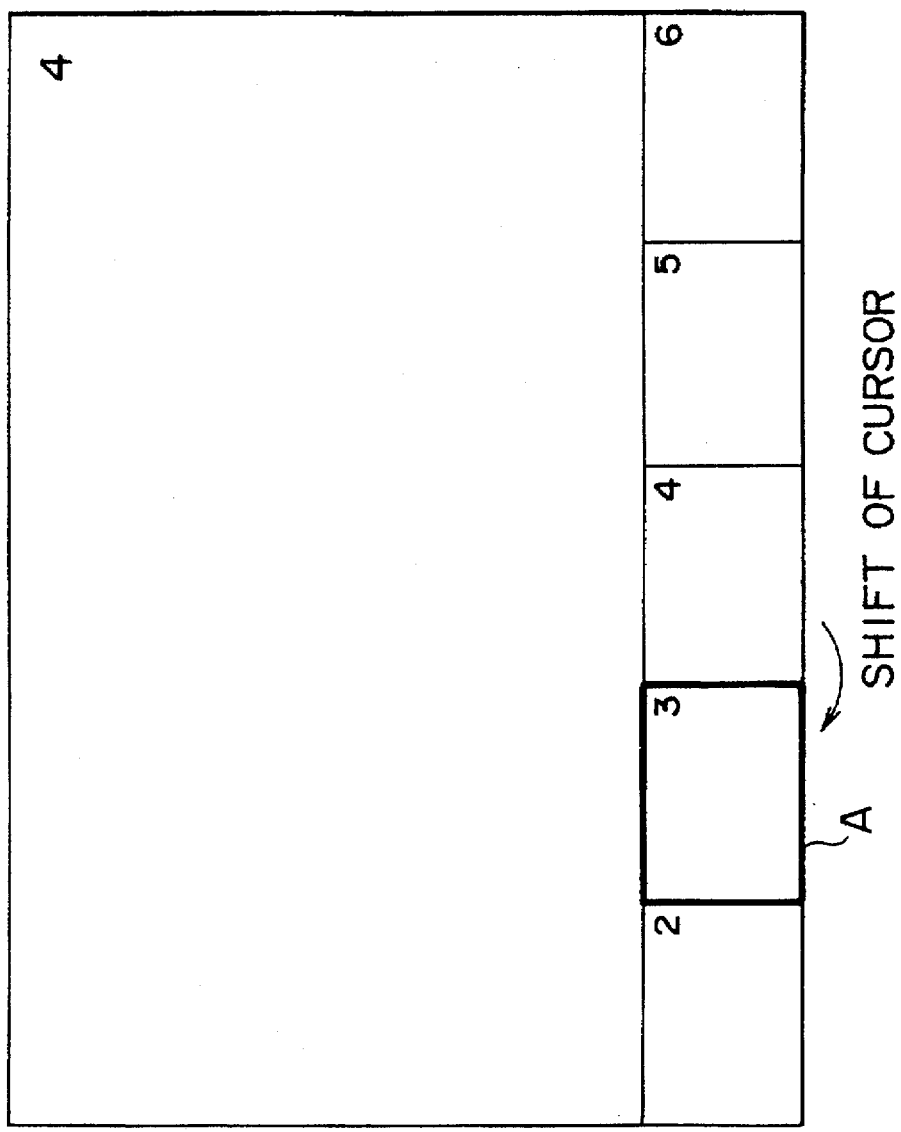

If the manipulator 52 is actuated leftward once in the state of FIG. 26 where the scroll of the subsidiary pictures is at a halt, the cursor A is shifted leftward by the space of one subsidiary picture as shown in FIG. 27.

Figure 28:
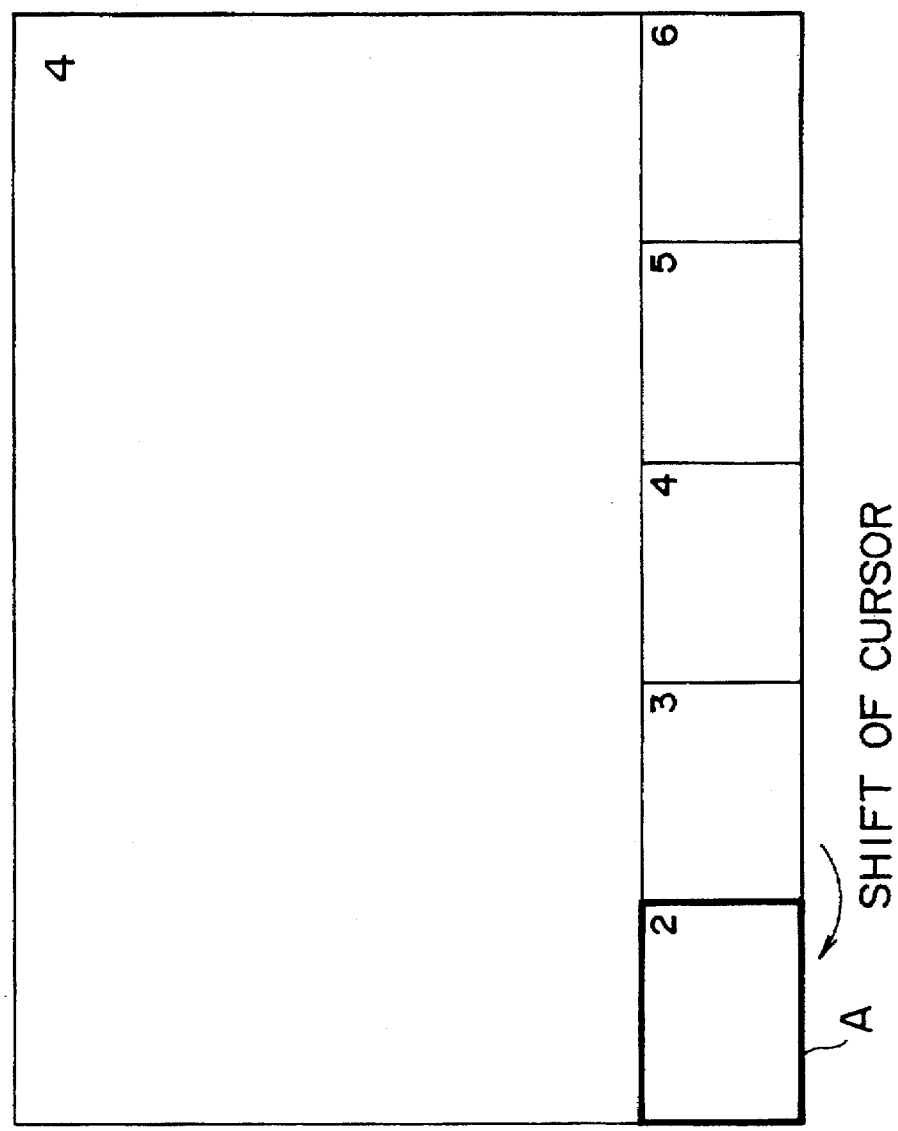

And if the manipulator 52 is further actuated leftward in the state of FIG. 27, since the cursor A is not positioned at the left end in this case either, the operation proceeds to step S66 to execute a process of shifting the cursor A leftward by the space of one subsidiary picture- Then the cursor A is shifted leftward from the position in FIG. 27 by the space of one subsidiary picture, so that the cursor A is positioned on the leftmost subsidiary picture as shown in FIG. 28.

When the manipulator 52 is actuated leftward once again in the state of FIG. 28 where the cursor A is positioned on the leftmost subsidiary picture, the result of the decision at step S65 signifies that the cursor A is positioned at the left end. Then the operation proceeds to step S67 where the parameter I is decremented by 1. Thereafter the operation proceeds to step S68 to execute a process of receiving the channel I which corresponds to the value obtained by such decrement.

In case the scroll direction of the subsidiary pictures is rightward as mentioned, the parameter I denotes the channel number of the leftmost subsidiary picture as shown in FIG. 21. Therefore, in the state of FIG. 28, this parameter I is 2. Due to decrement of the parameter I by 1, its value is set to 1, so that a process of receiving the channel 1 is executed at step S68, and a picture of this channel is displayed on the leftmost subsidiary screen as the picture of the newest channel.

Figure 29:
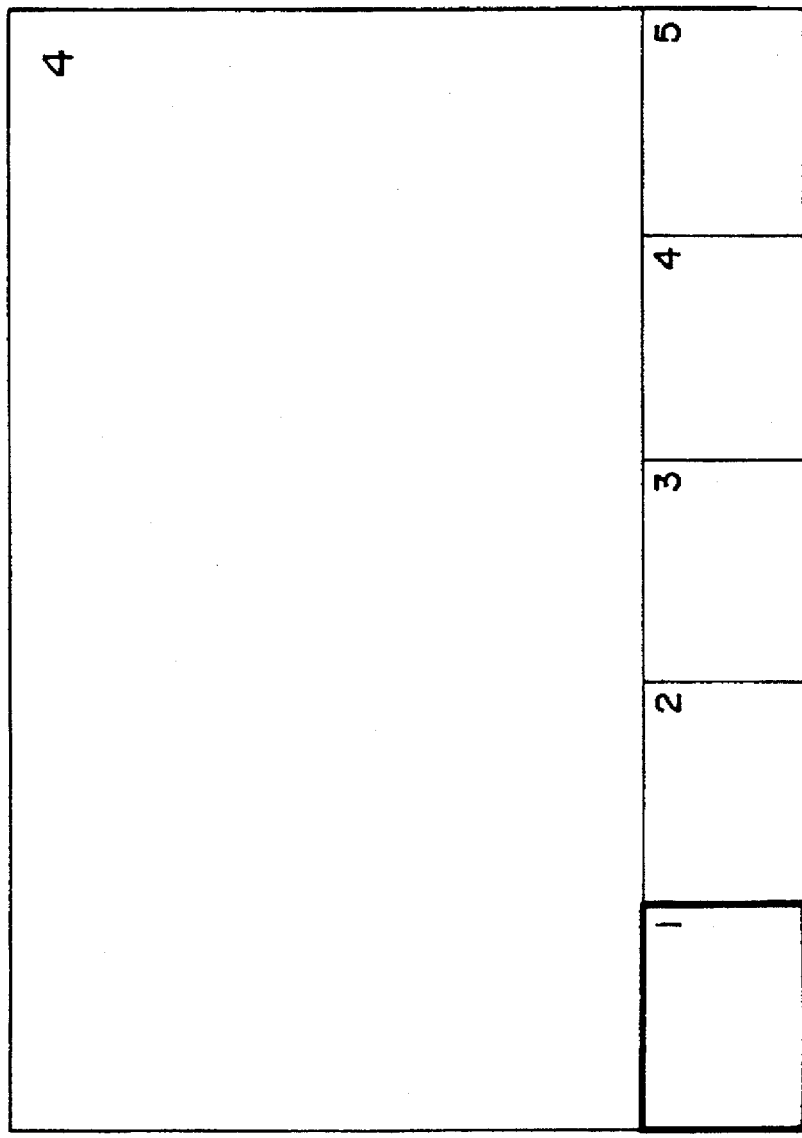

As a result, the operation returns to step S52 via steps S69 and S70 as will be described later, and the processing at steps S52 to S64 is executed repeatedly, whereby the subsidiary picture of the channel 2 displayed at the left end until then is shifted rightward by the space of one picture as shown in FIG. 29, and thereafter the pictures of the channels 3, 4 and 5 are shifted rightward successively. And the picture of the channel 6 that has been displayed at the right end until then disappears from the screen.

Subsequently the operation proceeds to step S69, where a parameter L is incremented by 1 to L=1 in this case. This parameter L denotes the number of times of inputting a command to further shift the cursor A leftward in the state where the cursor A is positioned on the leftmost subsidiary picture. Thereafter the operation proceeds to step S70, where a decision is made as to whether the parameter L is equal to 3 or not. Since L=1 in this case, the operation returns to step S52, and the processing subsequent thereto is executed repeatedly.

Figure 30:
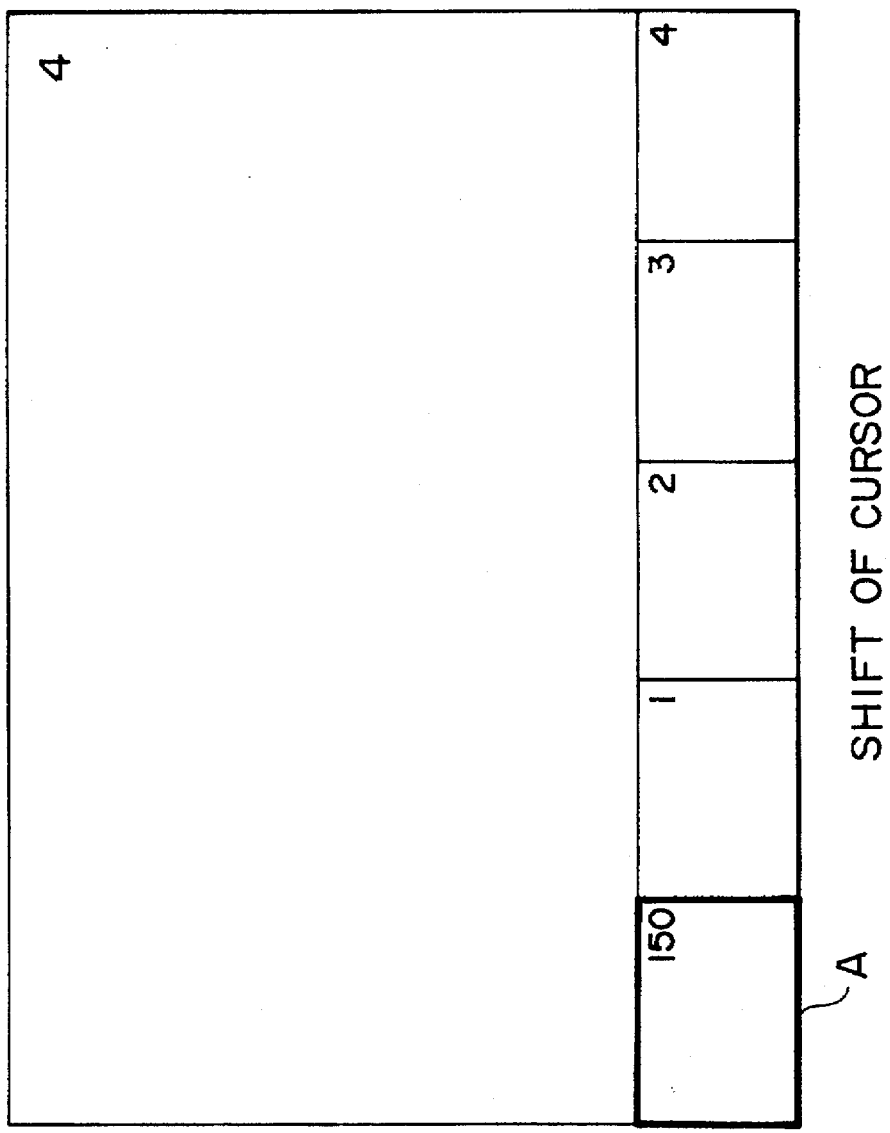

Accordingly, when a command of actuation is inputted for shifting the cursor A further leftward in the state where the cursor A is positioned on the leftmost subsidiary picture of the channel 1 as shown in FIG. 29, a subsidiary picture of the channel 150 is displayed at the left end, and subsidiary pictures of the channels 1 to 4 are displayed successively on the right thereof, as shown in FIG. 30. In this case, the parameter L is further incremented by 1 to L=2.

Figure 31:
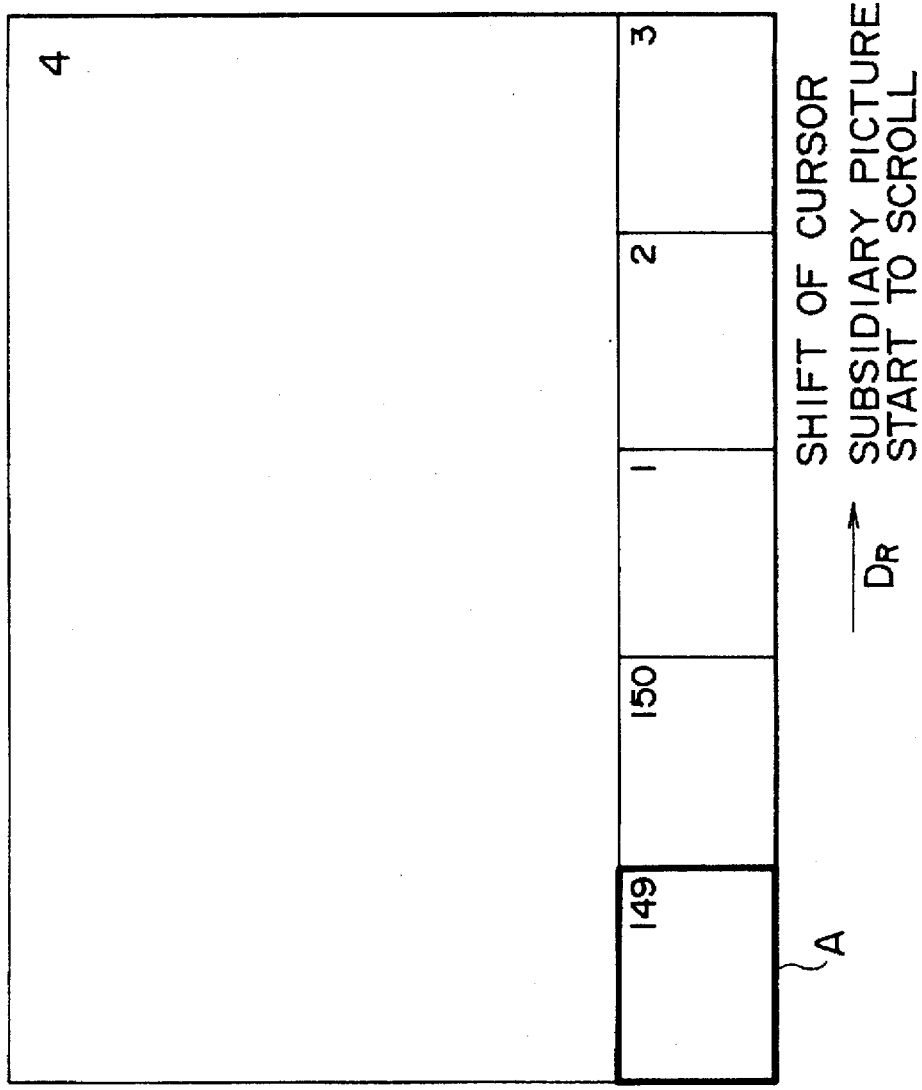

When the manipulator 52 is actuated to input a command for further leftward shift from the state shown in FIG. 30, a subsidiary picture of the channel 149 is displayed at the left end, and subsidiary pictures of the channels 150, 1, 2 and 3 are displayed successively on the right thereof, as shown in FIG. 31. In this case, the parameter L is further incremented by 1 to L=3.

Thus, when the parameter L is equalized to 3 (i.e., when a command for scrolling the subsidiary pictures leftward is inputted three times in the state where the subsidiary pictures are at a halt and the cursor A is positioned at the left end), the operation proceeds from step S70 to step S71, where the parameter D is set as DR. Then the operation returns to step S27 to execute a process of receiving the channel I. As a result, scrolling the subsidiary pictures is resumed as shown in FIG. 31. In this case, since the subsidiary pictures are to be scrolled rightward three times with leftward shift of the cursor A, the subsidiary pictures are automatically scrolled rightward after each lapse of five seconds.

Meanwhile, if the result of the decision at step S53 signifies a rightward actuation of the manipulator 52, the operation proceeds to step S72, where a decision is made as to whether the cursor A is positioned on the rightmost subsidiary picture or not. For example, when a command for shifting the cursor A rightward is inputted in the state of FIG. 26, the operation proceeds to step 73 since the cursor A is not positioned at the right end, whereby a process of shifting the cursor A rightward is executed. As a result, the cursor A is shifted rightward by the space of one subsidiary picture, as shown in FIG. 32.

Thereafter the operation returns to step S52, and the above processing is executed repeatedly.

Figure 32:
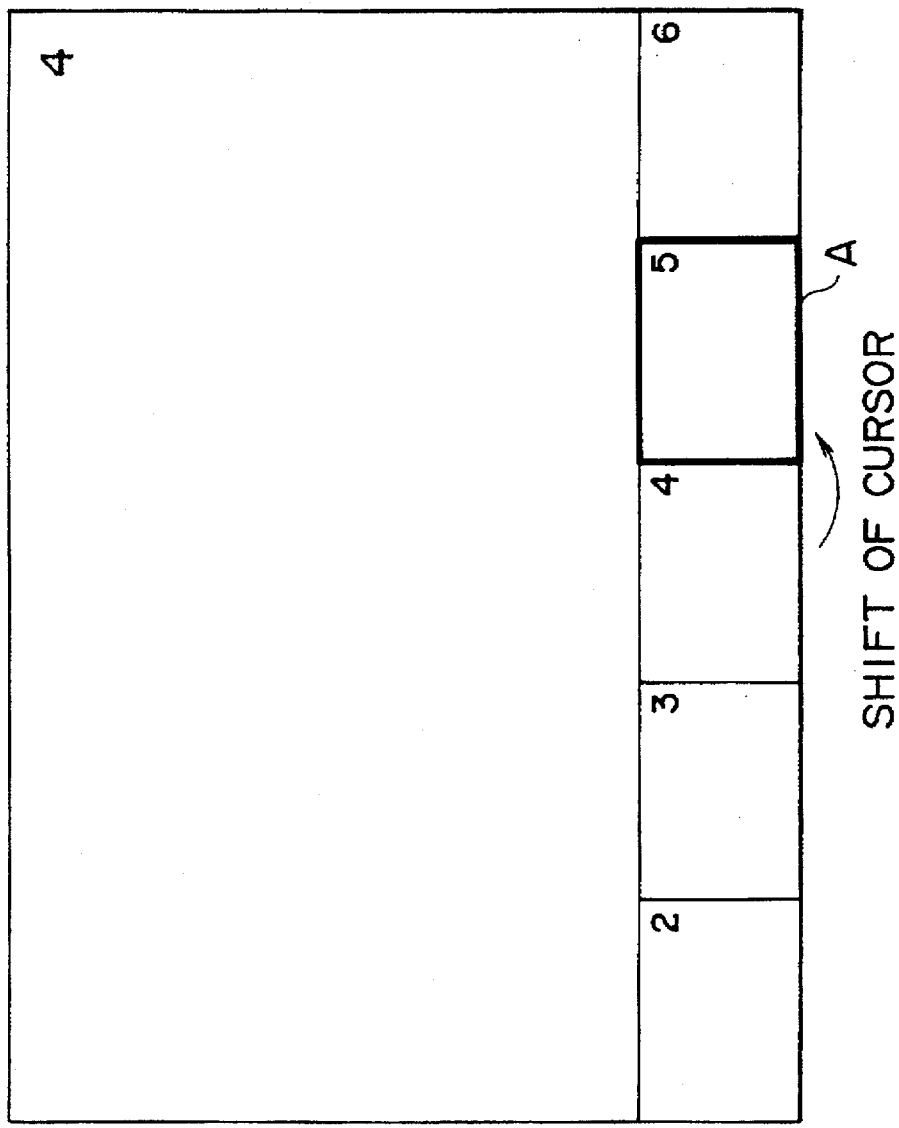
Figure 33:
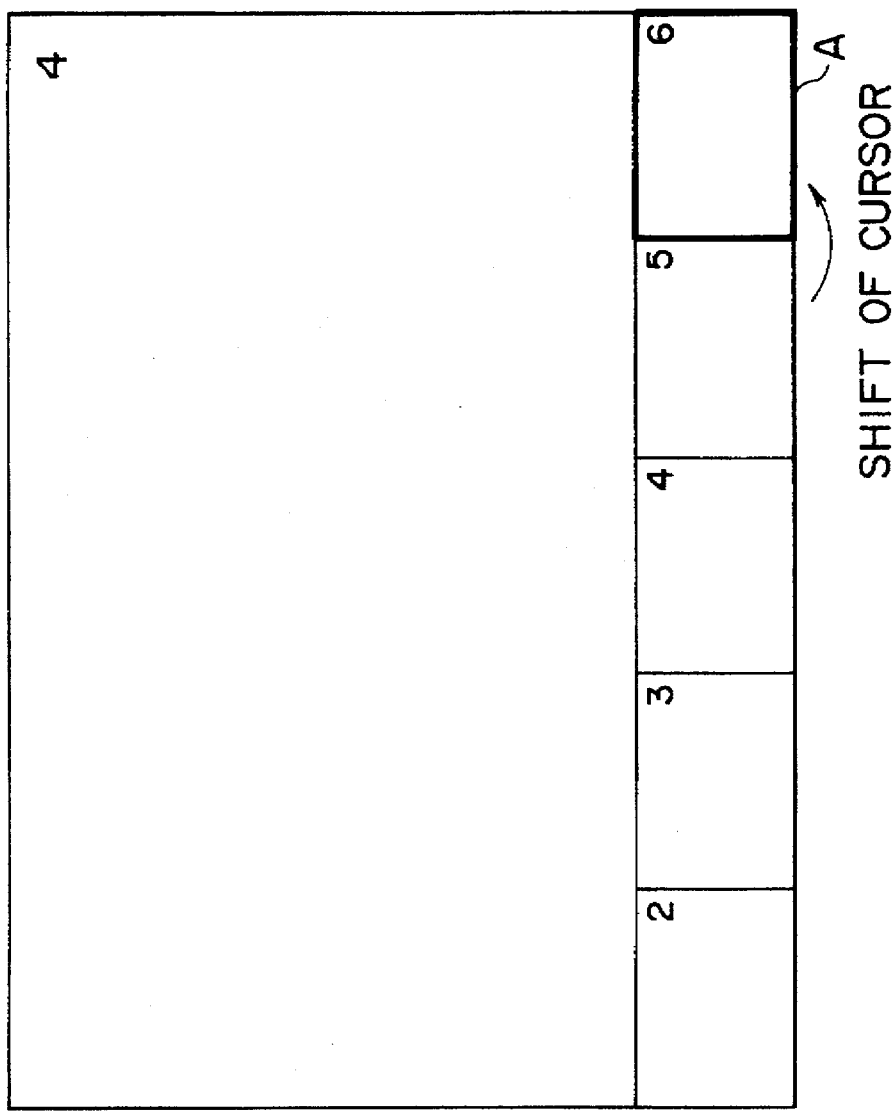

Accordingly, when a command is inputted for further shifting the cursor A rightward from the position shown in FIG. 32, the cursor A is shifted onto the rightmost subsidiary picture of the channel 6, as shown in FIG. 33.

And when another command is inputted for further shifting the cursor A rightward from the position shown in FIG. 33, the operation proceeds from step S72 to step S74 since the cursor A is positioned at the right end, and the parameter I is incremented by 1. Then the operation proceeds to step S75 to execute a process for receiving the channel I which corresponds to the value obtained by such increment.

Figure 34:
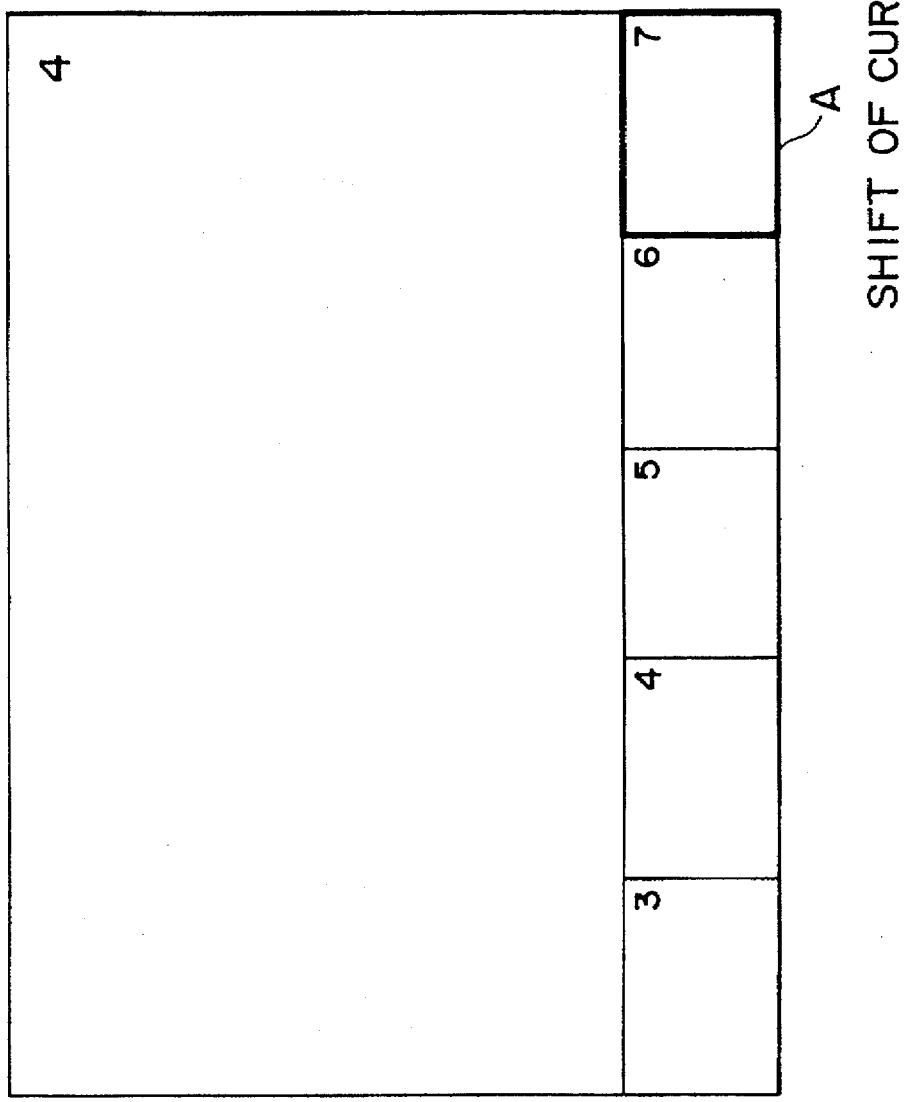

In case the scroll direction of the subsidiary pictures is leftward, the parameter I denotes the channel number of the rightmost subsidiary picture, as shown in FIG. 20. In the state of FIG. 33, the channel number is 6. Therefore the number 6 is incremented by 1, and a process for receiving the channel 7 is executed, so that a picture of this channel is displayed on the rightmost subsidiary picture, as shown in FIG. 34. Subsequently, as will be described later, the operation returns to step S52 via steps S76 and S77, and the processing at steps S52 to S64 is executed repeatedly, whereby the subsidiary pictures of the channels 6 to 3 are successively scrolled leftward and displayed.

Next the operation proceeds to step S76, where a parameter R is incremented by 1 to R=1 in this case. The parameter R denotes the number of times of inputting a command to further shift the cursor A rightward in the state where the cursor A is positioned on the rightmost subsidiary picture. Thereafter the operation proceeds to step S77, where a decision is made as to whether the parameter R is equal to 3 or not. If the result of this decision is negative, the operation returns to step S52, and the processing subsequent thereto is executed repeatedly.

Accordingly, when a command is inputted for shifting the cursor A further rightward from the position shown in FIG.

Figure 35:
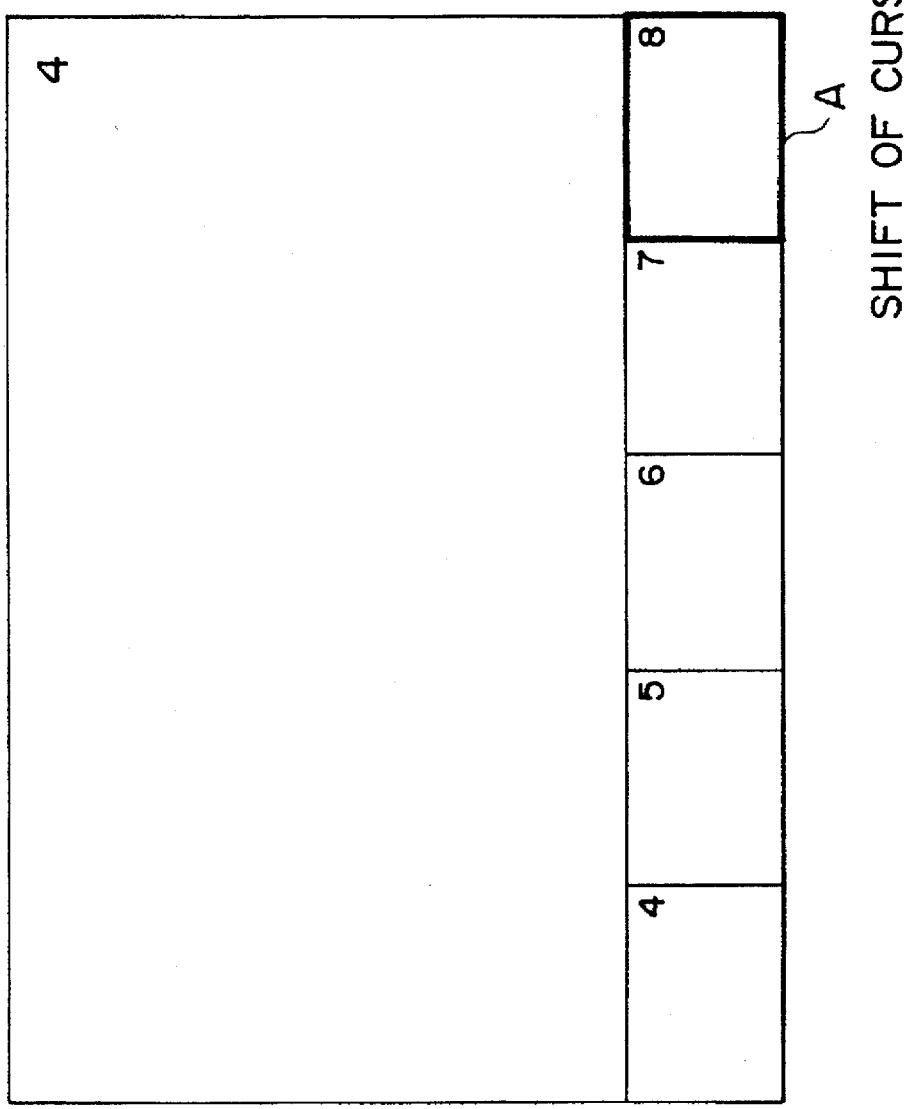

34, subsidiary pictures of five channels numbered 4 to 8 are displayed as shown in FIG. 35, and the parameter R is incremented to 2.

Figure 36:
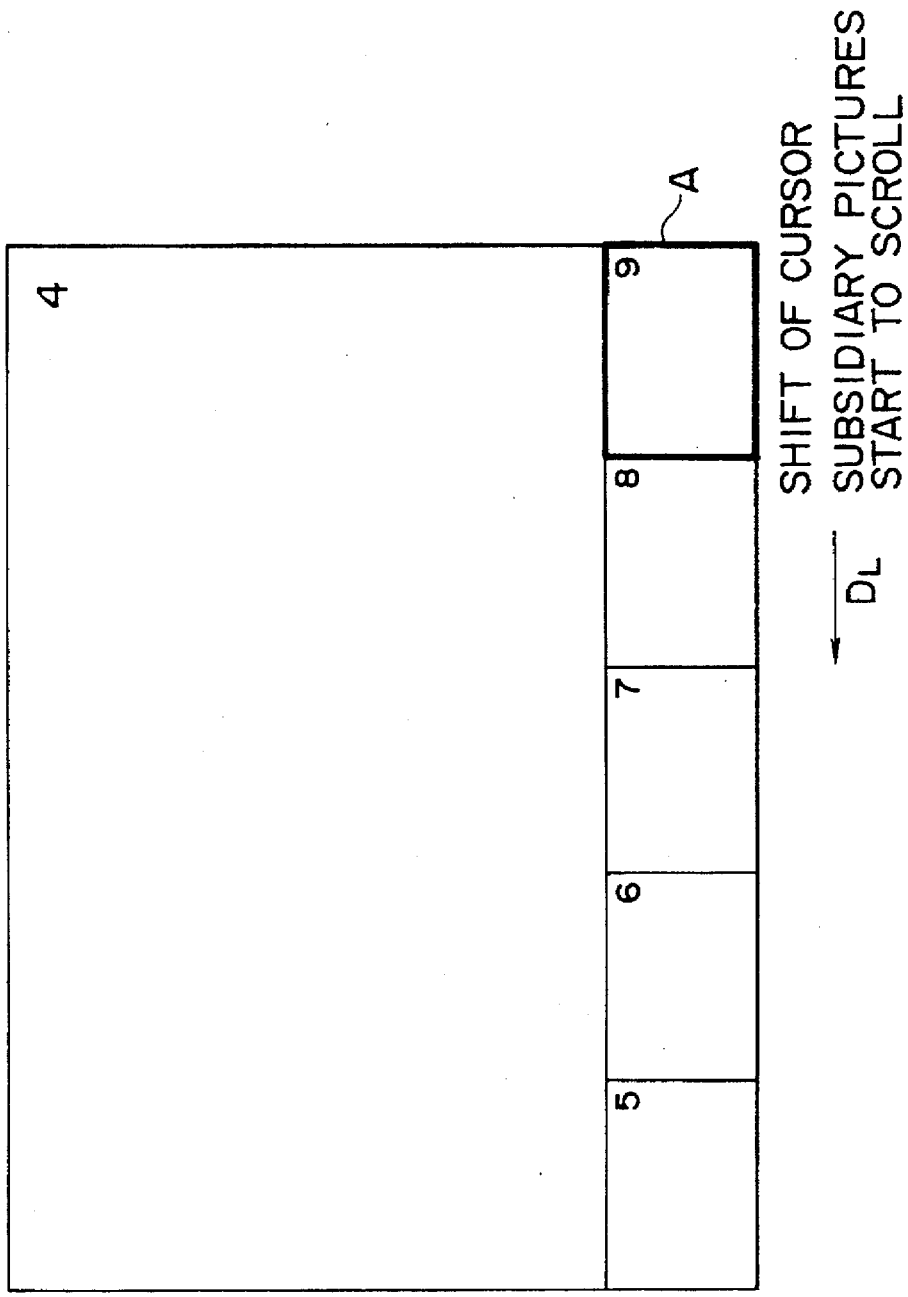

And when another command is inputted for further shifting the cursor A rightward from the position shown in FIG. 35, subsidiary pictures of five channels numbered 5 to 9 are displayed as shown in FIG. 36, and the parameter R is incremented to 3.

As a result, the operation proceeds from step S77 to S78, where the direction of the subsidiary pictures is designated to be leftward (D=DL).

Subsequently the operation returns to step S27 to execute a process for receiving the channel I, and then the subsidiary pictures are scrolled leftward again after each lapse of five seconds.

Meanwhile, when the manipulator 52 is actuated to output a command for enter during a halt of scroll of the subsidiary pictures, the operation proceeds from step S54 to step S79 to acquire the channel data of the subsidiary picture where the cursor A is positioned at that time, so that the picture of the relevant channel is displayed on the main screen. More specifically, the CPU 29 controls the main picture tuner 21A to receive the channel of the number designated by the cursor A.

Thereafter the operation proceeds to step S80 where the parameters L and R are reset to 0, and further proceeds to step S81 to complete the browsing.

Figure 37:
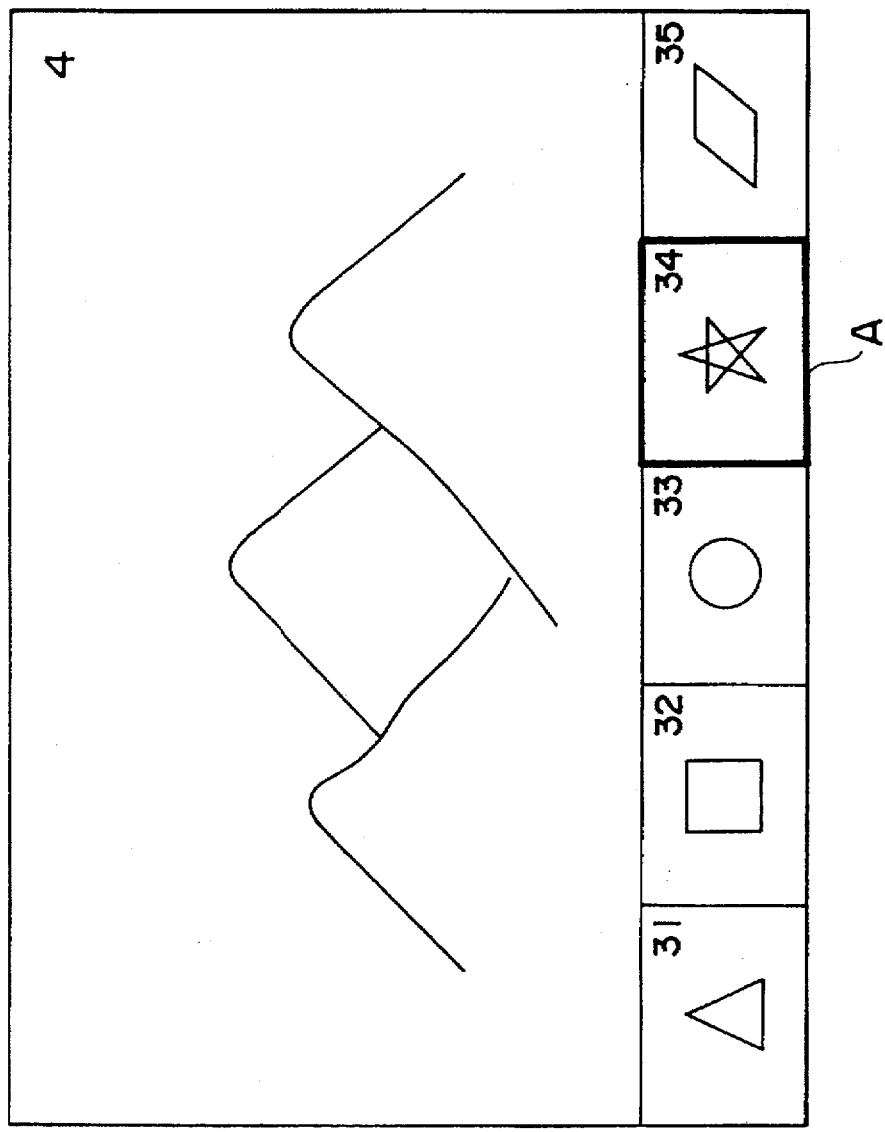
Figure 38:
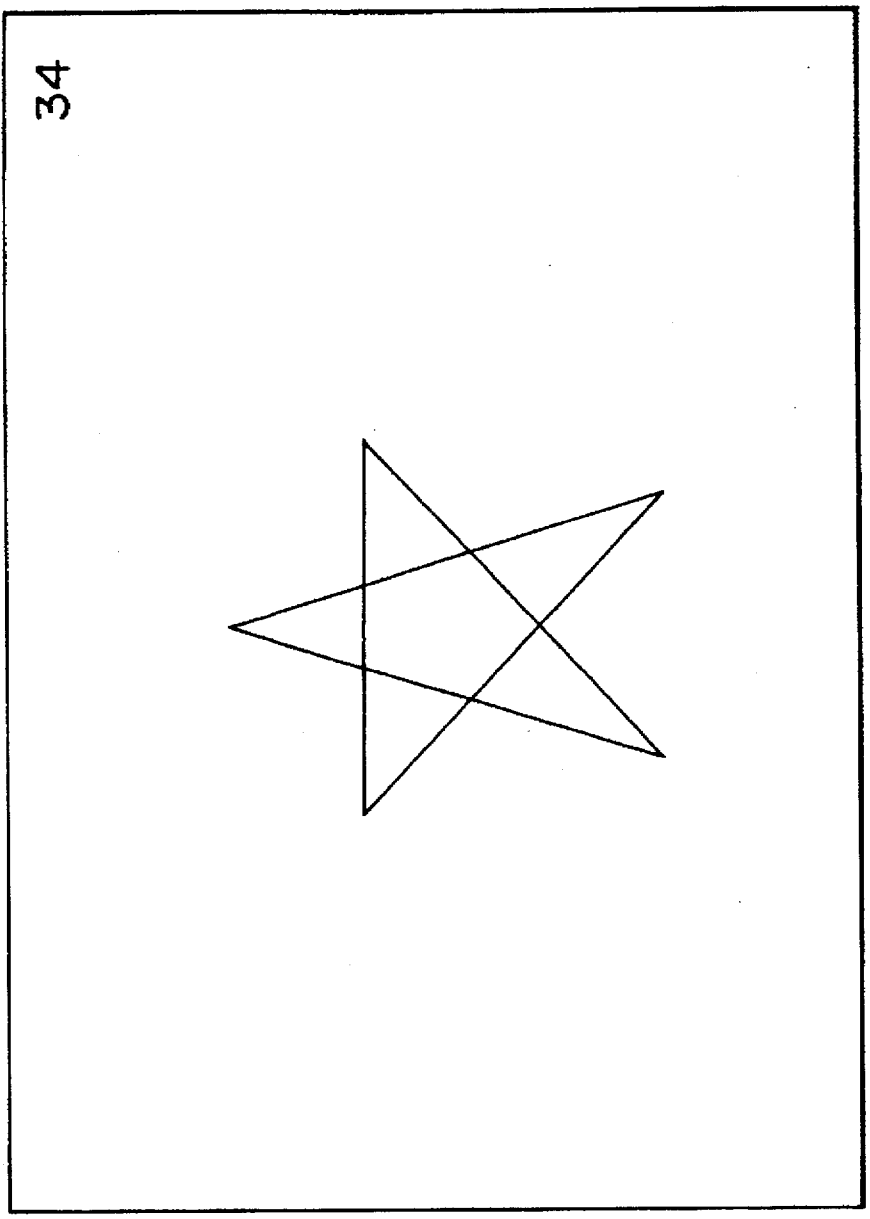
FIG. 38 shows an exemplary main picture.

For example, when an actuation for enter is executed in the state where the cursor A is positioned on the subsidiary screen with a picture of a star displayed thereon as shown in FIG. 37, the picture that has been displayed on that subsidiary screen until then is displayed on the main screen as shown in FIG. 38, and the display of the entire subsidiary pictures is canceled. In this embodiment, the picture of the channel 4 is replaced with the picture of the channel 34.

When the jump button switch 56 is actuated to output a command for jump during a halt of scroll of the subsidiary pictures, such an actuation is detected at step S55, and then the operation proceeds from step S55 to step S82 to acquire the desired program data (broadcast channel number) on the bookmark list stored in the EEPROM 38, and the picture of the desired channel is displayed on the main screen. More specifically, the CPU 29 controls the main picture tuner 21A to receive the desired broadcast channel. Consequently, a bookmark B is added as shown in FIG. 22, and the subsidiary picture program registered on the bookmark list is displayed on the main screen.

Subsequently the operation proceeds to step S83 where the parameters L and R are reset to 0, and further proceeds to step S84 to complete the browsing.

Figure 50:
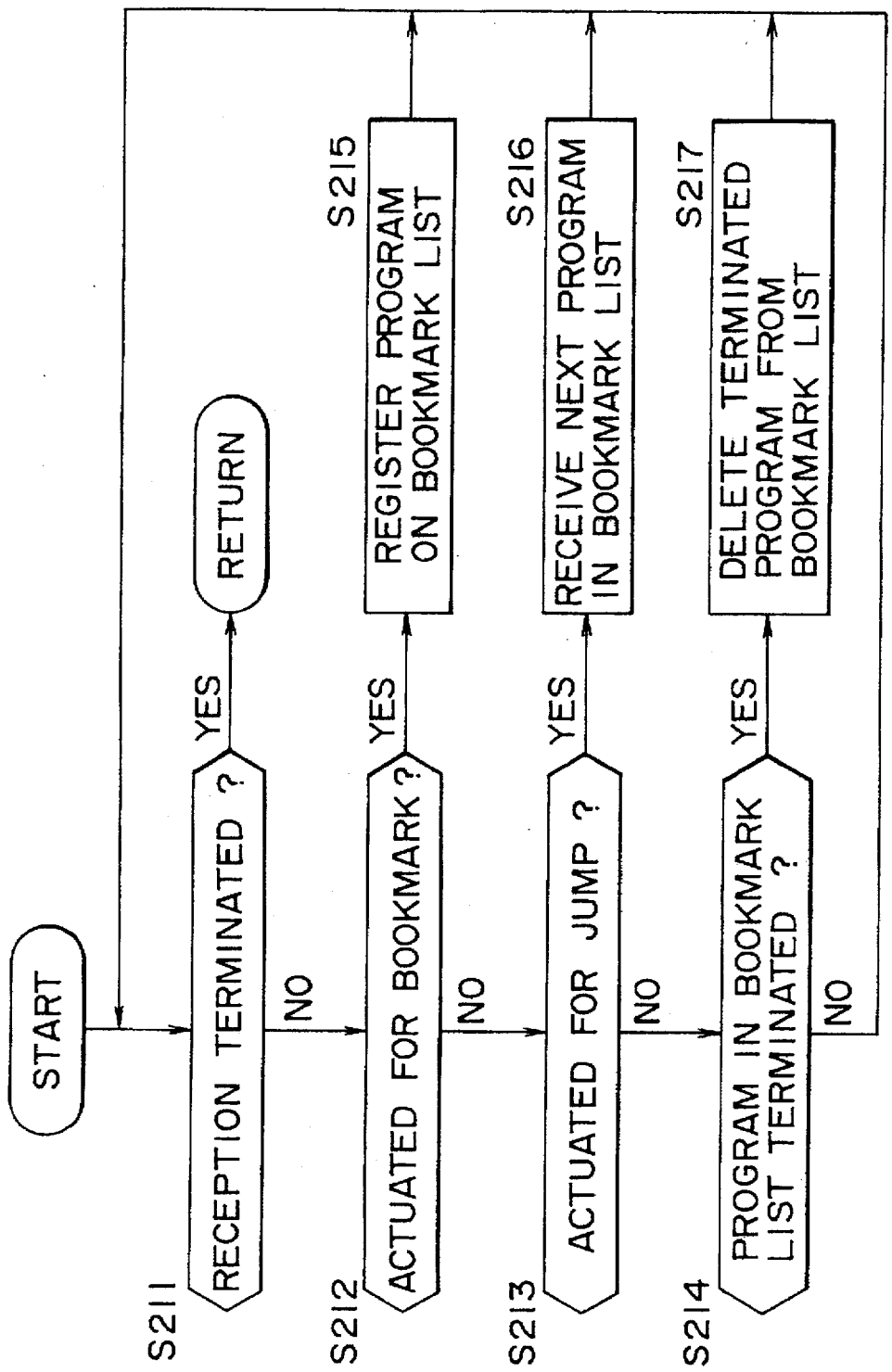
FIG. 50 is a flow chart for explaining a process executed in a normal reception mode.

Thus, there is resumed the former state where merely the main picture alone is displayed on the entire screen. And in this state, a process shown in FIG. 50 is executed as will be described later. As a result, every time the jump button switch 56 is actuated, a program designated with addition of a bookmark B during execution of the browsing can be displayed as a main picture in sequence.

Figure 39:
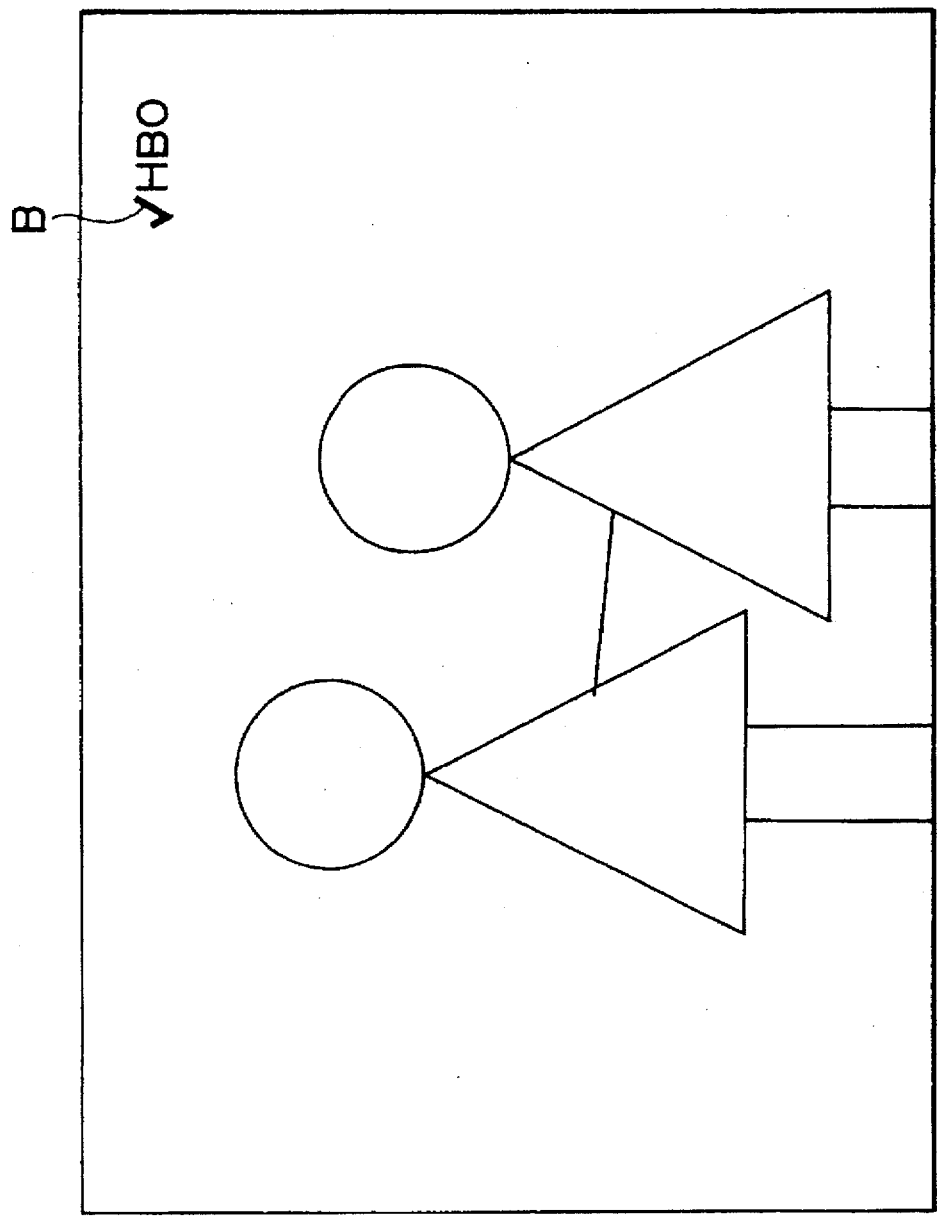
FIGS. 39 to 41 illustrate display examples of programs each having a bookmark added thereto.
Figure 40:
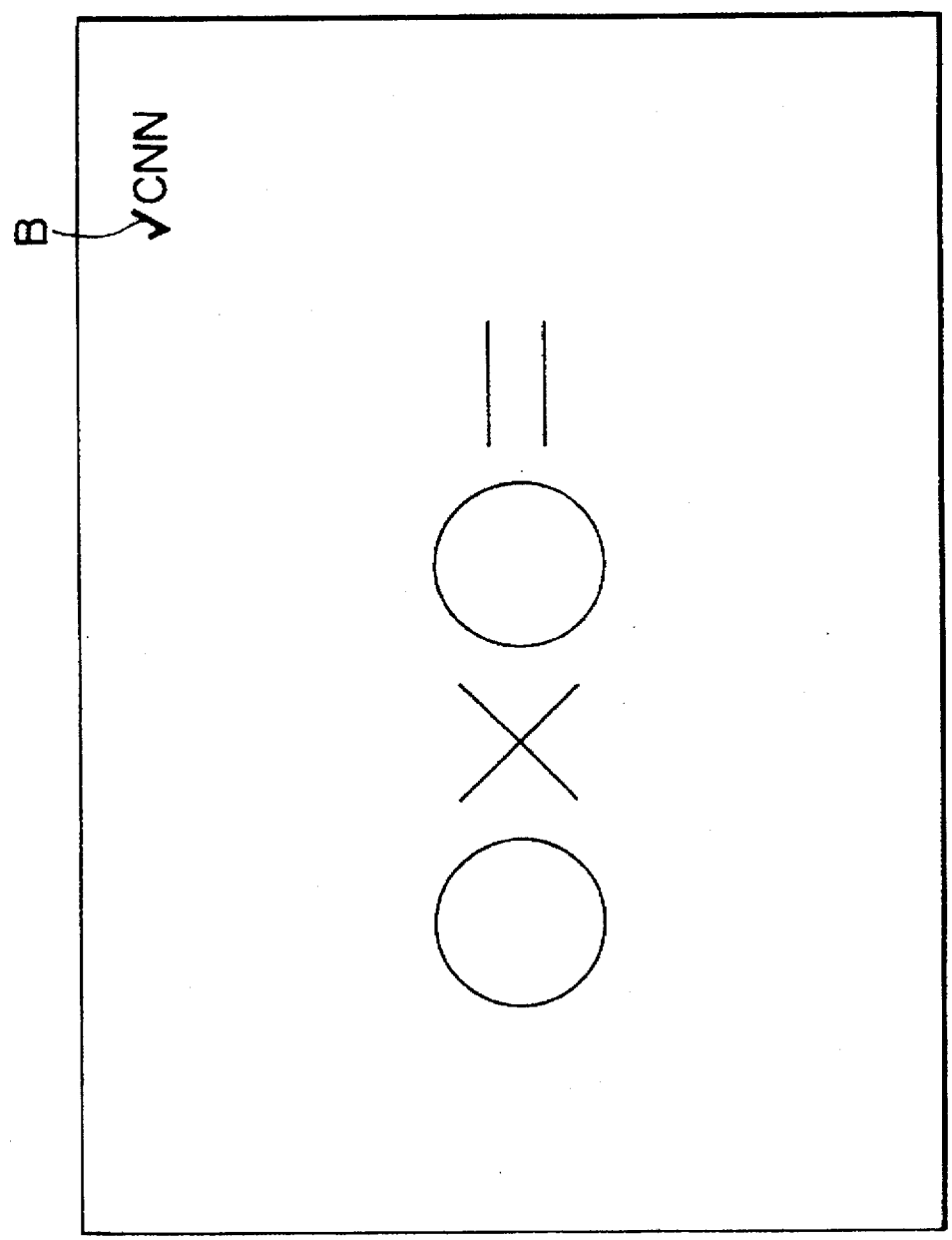

Suppose now that the bookmark button switch 55 is actuated to add a bookmark B in a state where, as shown in FIG. 22 for example, a bookmark B is added to a broadcast channel HBO and further broadcast channels CNN and CBS are displayed in the cursor A. And after such channels with bookmarks B added thereto are registered on the bookmark list, the jump button switch 56 is actuated. Then, at a first actuation of the jump button switch 56, the broadcast channel HBO is received by the tuner 21A and is displayed on the monitor unit 4, as shown in FIG. 39. And at a second actuation of the jump button switch 56, the broadcast channel CNN is received by the tuner 21A and is displayed as shown in FIG. 40. Further at a third actuation of the jump button switch 56, the broadcast channel CBS is received by the tuner 21A and is displayed on the monitor unit 4, as shown in FIG. 41.

Figure 41:
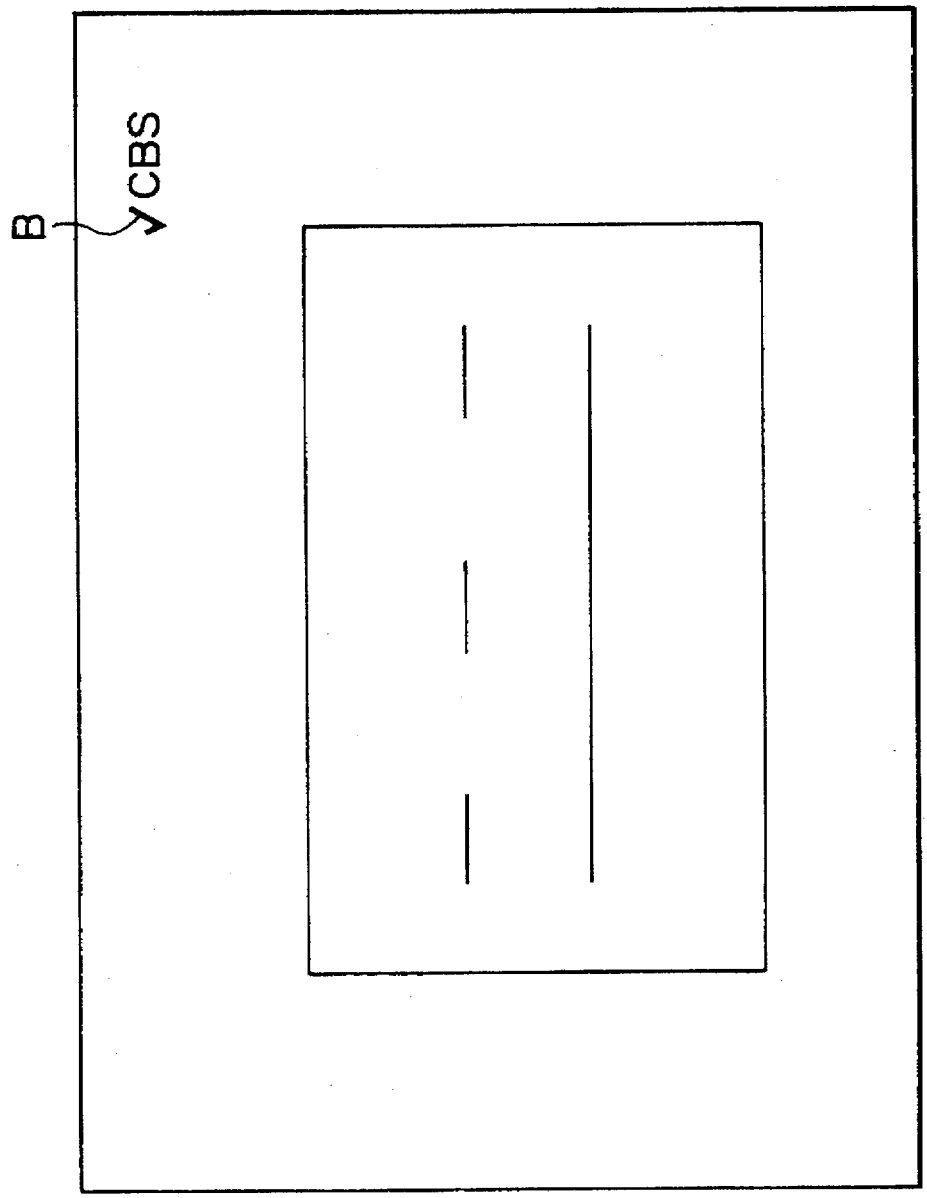

For the sake of explanatory convenience, the displayed pictures in FIGS. 39 to 41 are the same as the subsidiary pictures shown in FIG. 22. Normally, however, the timing to actuate the jump button switch 56 is later than the timing to add a bookmark by actuation of the bookmark button switch 55, so that practically the picture being broadcast at the timing of actuation of the jump button switch 56 is received and displayed as a main picture.

Figure 42:
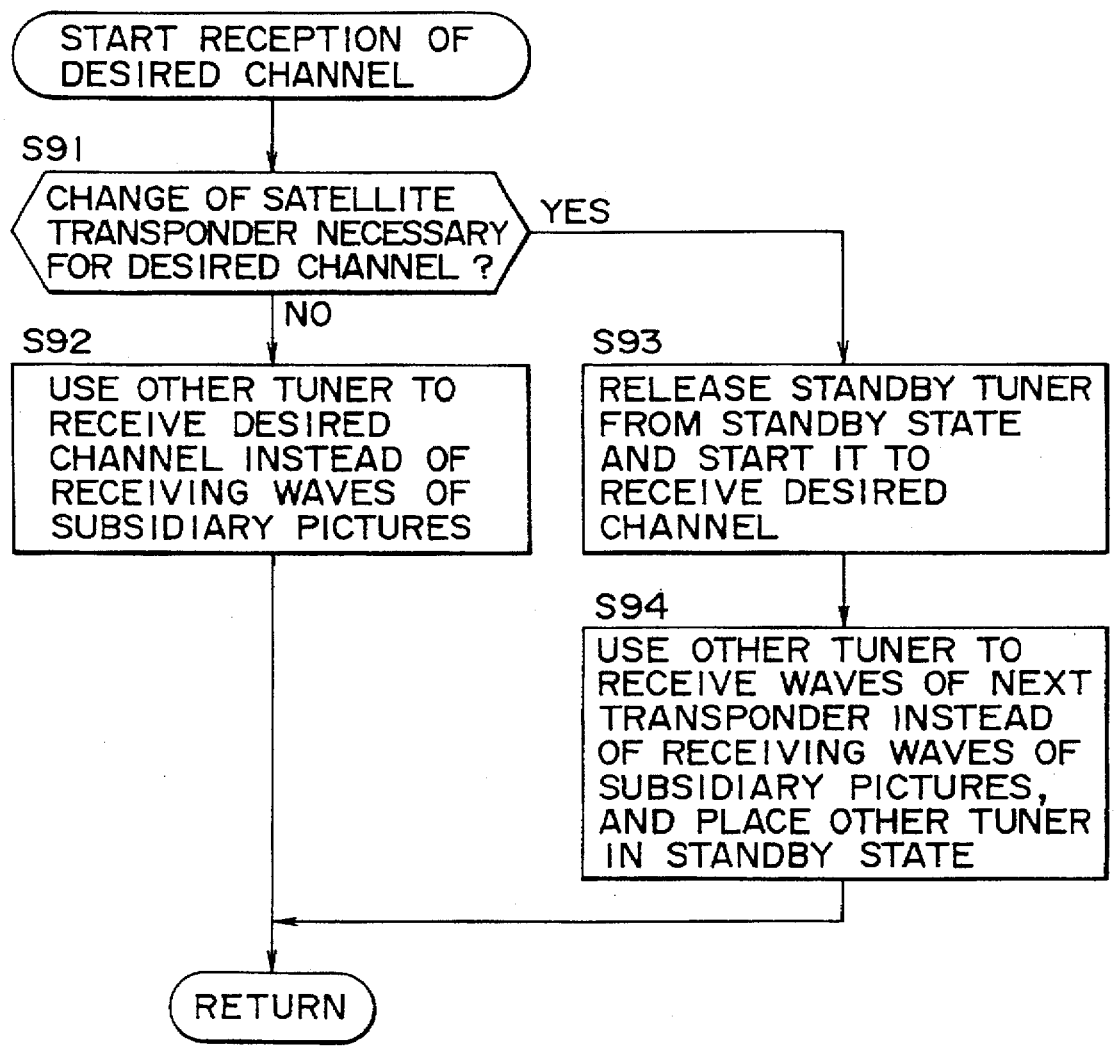
FIG. 42 is a flow chart for explaining a process to receive a broadcast channel.

Out of the whole processing in the flow charts of FIGS. 13 to 19 described above, the process for receiving a predetermined channel is executed as shown in further detail in a flow chart of FIG. 42. First at step S91, a decision is made as to whether a desired channel to be received requires selective change of the satellite transponder. The transponder transmits each program packet of a plurality of channels at a predetermined frequency. And the number of channels transmitted from one transponder with waves of the corresponding frequency ranges from four to six although different depending on the complication of pictures.

In an exemplary case where the tuner 21B is now receiving signals of channels 1 to 5 as those of subsidiary pictures, when it becomes necessary to change the state of reception to another state of receiving signals of channels 2 to 6, the reception frequency need not be changed if the signal of the channel 6 is transmitted with the same carrier as that of the signals of channels 1 to 5 (i.e., the transponder need not be changed). In this case, therefore, the operation proceeds to step S92, where the tuner (21B in this case) used until then to receive the subsidiary pictures is used continuously to receive the signal of the channel 6.

Meanwhile, if the result of the decision at step S91 signifies the necessity of changing the reception carrier frequency, the operation proceeds to step S93, where the other tuner (21A in this case) held on standby until then is used to receive the relevant channel (6 in this case).

More specifically, when the tuner 21B is in a state of receiving the channels 1 to 5, the CPU 29 holds the other tuner 21A on standby at step S94 while controlling it to receive waves of the channels to be received next. For example, in case the scroll direction of subsidiary pictures is leftward, channels 6 to 10 need to be received next to the channels 1 to 5. Therefore, the tuner 21A is held on standby while being so controlled as to receive broadcasts of the channels 6 to 10.

In case the scroll direction of the subsidiary pictures is rightward contrary to the above, channels of smaller numbers are to be received next, so that it is necessary to receive programs of channels 146 to 150. In this case, therefore, the CPU 29 holds the tuner 21A on standby while controlling it to receive signals of the channels 146 to 150.

For this purpose, at step S93, the tuner held on standby until then is released therefrom to substantially start reception of signals. More concretely, the picture-in-picture processor 45 is so switched as to receive an output of the MPEG video decoder 25A instead of receiving an input from the MPEG video decoder 25B. That is, the output of the tuner 21A held on standby until then is supplied from the MPEG video decoder 25A to the picture-in-picture processor Thereafter the operation proceeds to step S94, where the tuner (21B in this case) used until then to receive waves of subsidiary pictures is switched to receive waves of the next transponder and is held on standby. More specifically, when the scroll direction of the subsidiary pictures is leftward, the tuner 21B is so controlled as to receive signals of channels 11 to 15 and is held on standby. In case the scroll direction of the subsidiary pictures is rightward, the tuner 21B is so controlled as to receive signals of channels 141 to 145 and is held on standby.

In this manner, the tuner not placed in a state of receiving the signals of the subsidiary pictures displayed at that time is enabled to receive the next channels and is held on standby, so that it becomes possible to achieve faster switching of the pictures on the subsidiary screens.

It is a matter of course that the tuner 21A for example may be used continuously for the main picture alone while the tuner 21B may be used to receive signals of the subsidiary pictures. In this arrangement, however, a time of approximately 600 msec is required for selectively changing the reception frequency. For this reason, as shown in FIG. 42, the other tuner is held on standby, and the two tuners are alternately switched to thereby prevent or minimize any dropout of pictures at the switchover time.

If the required number of tuners for subsidiary pictures can be ensured, it is rendered possible to continuously use the tuner 21A for the main picture alone, so that moving pictures can always be displayed on both the main and subsidiary screens. In this example, step S21 in FIG. 13 can be omitted as described.

Figure 43:
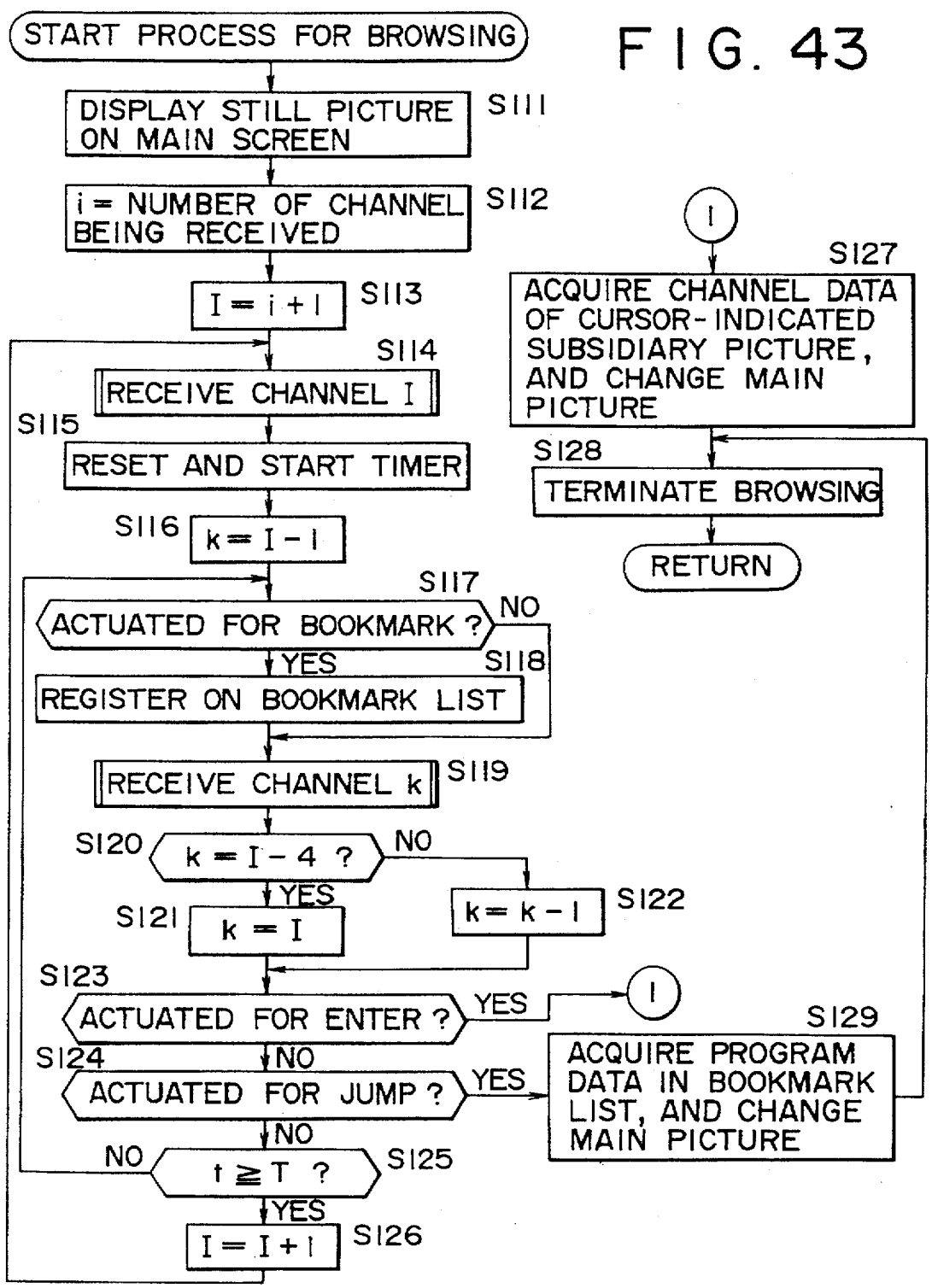
FIG. 43 is a flow chart for explaining a browsing process executed in a second embodiment.

In the embodiment mentioned above, subsidiary pictures scrolled automatically in a predetermined period are brought to a halt by an actuation for enter, and when another actuation for enter is executed after a cursor is shifted to a predetermined position in response to requirement, the channel designated by the cursor is displayed as a main picture. However, this embodiment may be so modified that the cursor is displayed fixedly at a predetermined position, and when an actuation for enter is executed at the timing of display of a desired subsidiary picture at the position indicated by the cursor, the desired picture is selected or designated. A flow chart of FIG. 43 shows the processing executed in this modification.

First at step S111, there is executed a process for displaying a still picture on the main screen. Then at step S112, a parameter i is set to the number of the channel being received now. Thereafter at step S113, a parameter I is set to a value greater by 1 than the parameter i. Subsequently at step S114, there is executed a process for receiving the channel I set at step S113.

Next the operation proceeds to step S115, where a timer is reset and started simultaneously to begin its timing action. At step S116, a parameter k is set to I-1, and a decision is made at step S117 as to whether an actuation for bookmark has been executed or not. If the result of such a decision is affirmative, the operation proceeds to step S118, where the program of a displayed subsidiary picture indicated by a cursor at that time is registered on a bookmark list. In case the result of the decision at step S117 is negative to signify no actuation for bookmark, the process at step S118 is skipped.

Subsequently at step S119, there is executed a process for receiving the channel k set at step S116. More specifically, a picture of the rightmost channel I in the state of FIG. 20 is received at step S114, and then a process for receiving the next channel I-1 on the left thereof is executed at step S119.

Thereafter the operation proceeds to step S120 where a decision is made as to whether the parameter k is equal to I-4 or not. If the result of this decision is negative, the operation proceeds to step S122 where the parameter k is decremented by 1, i.e., k=I-2 in this case.

Next, if the results of decisions at steps S123 and S124 are both negative to signify no actuation for enter or jump either, the operation proceeds to step S125, where a decision is made as to whether the measured time t of the timer exceeds the preset time T or not. When the result of this decision is negative, the operation returns to step S119 to receive the channel k (i.e., channel I-2 in this case).

Thereafter the same processing is repeated, so that the channels I-3 and I-4 are received at step S119.

Due to further repeated execution of the processing at steps S119 to S125, pictures on the subsidiary screens are updated continuously to become the newest ones which are therefore pseudo moving pictures.

If the result of the decision at step S125 signifies that the pictures on the subsidiary screens have been displayed for the predetermined time (five seconds), the operation proceeds to step S126 where the parameter I is incremented by 1 to be set to the next channel number that follows the channel received until then. Thereafter the operation returns to step S114 to receive the channel I. Subsequently the same processing is repeatedly executed in sequence, so that in this embodiment the subsidiary pictures are displayed while being scrolled leftward successively at an interval of five seconds.

That is, the pictures are displayed in a state of FIG. 24 for example.

The user actuates the manipulator 52 for enter at the timing of display of a desired subsidiary picture within the cursor A which is positioned on the center one of the five subsidiary pictures. Then such actuation for enter is detected at step S123, and the operation proceeds to step S127 to acquire the channel data of the subsidiary picture where the cursor is positioned. Further at this step S127, the signal of that channel is received by the tuner 21A and is displayed as a main picture. Subsequently the operation proceeds to step S128, where the process for browsing is terminated and the subsidiary pictures are caused to disappear.

In case the result of the decision at step S124 is affirmative to signify an actuation for jump, the operation proceeds to step S129, where data of the program on the bookmark list stored in the EEPROM 38 is acquired therefrom, then the broadcast channel of that program is received by the tuner 21A and is displayed as a main picture on the monitor unit 4. Thereafter the operation proceeds to step S128 where the process for browsing is terminated.

Figure 44:
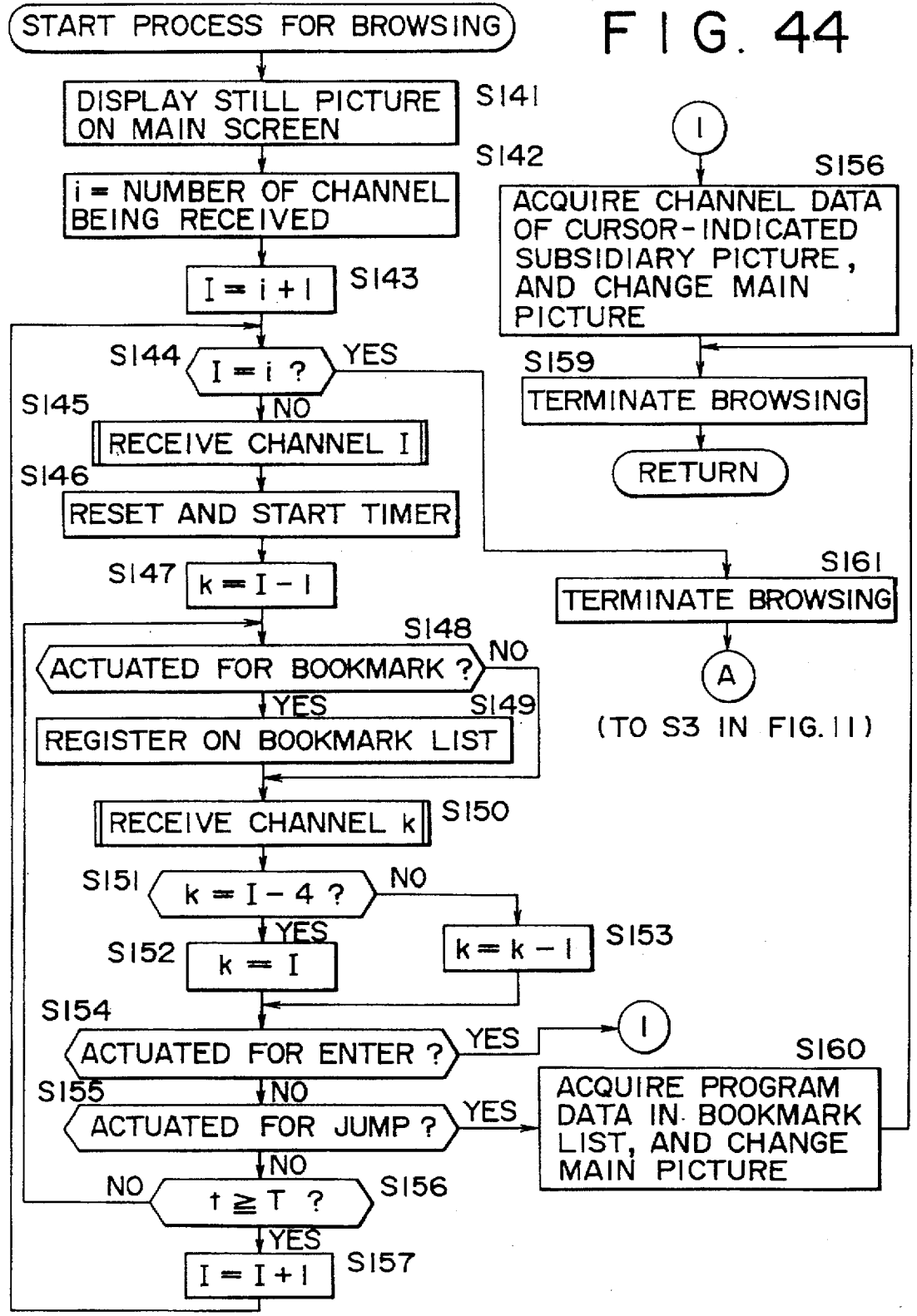
FIG. 44 is a flow chart for explaining a browsing process executed in a third embodiment.

In the embodiment of FIG. 43, subsidiary pictures are displayed repeatedly and endlessly even after completion of one display cycle of the subsidiary pictures. Regarding this point, it is possible to modify the processing in such a manner that, upon completion of one display cycle of the subsidiary pictures, the initial picture (former picture immediately before start of the browsing) is resumed. A flow chart of FIG. 44 shows an example of such modified processing.

First at step S141, the main picture is processed to be a still picture, and then at step S142, a parameter i is set to the number of the channel being received now. Subsequently at step S143, a parameter I is set to a value greater by 1 than the parameter i. The above processing is the same as that executed at steps S111 to S113 in FIG. 43.

Thereafter the operation proceeds to step S144, where a decision is made as to whether the parameters I and i are equal to each other. And if the result of this decision signifies that the two parameters are not yet equal mutually, the operation proceeds to step S145 to execute a process for receiving the channel I. Subsequently the same processing as that at steps S114 to S126 in FIG. 43 is executed at steps S145 to S157. As a result, there is repeated such a process that pseudo moving pictures are displayed on five subsidiary screens while the subsidiary pictures are successively updated to the newest pictures and are scrolled leftward in sequence after each lapse of five seconds.

The parameter I is incremented by 1 at step S157, and when the result of the decision at S144 signifies that the parameter I has been equalized to the parameter i stored as the main picture, the operation proceeds to step S161 to terminate the browsing. That is, the displayed subsidiary pictures are caused to disappear. And then the operation proceeds to step $3 in FIG. 11, so that there is resumed again the former state where the menu is displayed.

Since the other processing in FIG. 44 is the same as that in FIG. 43, a repeated explanation thereof is omitted here.

In the above processing, there are displayed subsidiary pictures of channel numbers that follow the channel being received at that time. However, it is also possible to display subsidiary pictures of predetermined channel numbers in sequence, e.g., those of the channel 1 and so forth. In this case, the parameter i is set to 1 initially.

Figure 45:
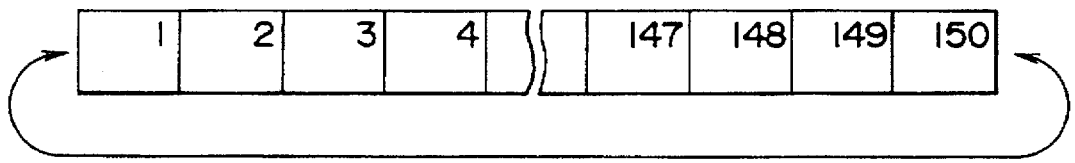
FIG. 45 is an explanatory diagram of a state where subsidiary pictures are displayed in the order of channel numbers.

Also in the embodiment mentioned, channels 1 to 150 are successively displayed on the subsidiary pictures in the order of channel numbers, as shown in FIG. 45. However, the subsidiary pictures can be displayed in accordance with the individual categories thereof, as shown in FIG. 46.

Figure 46:
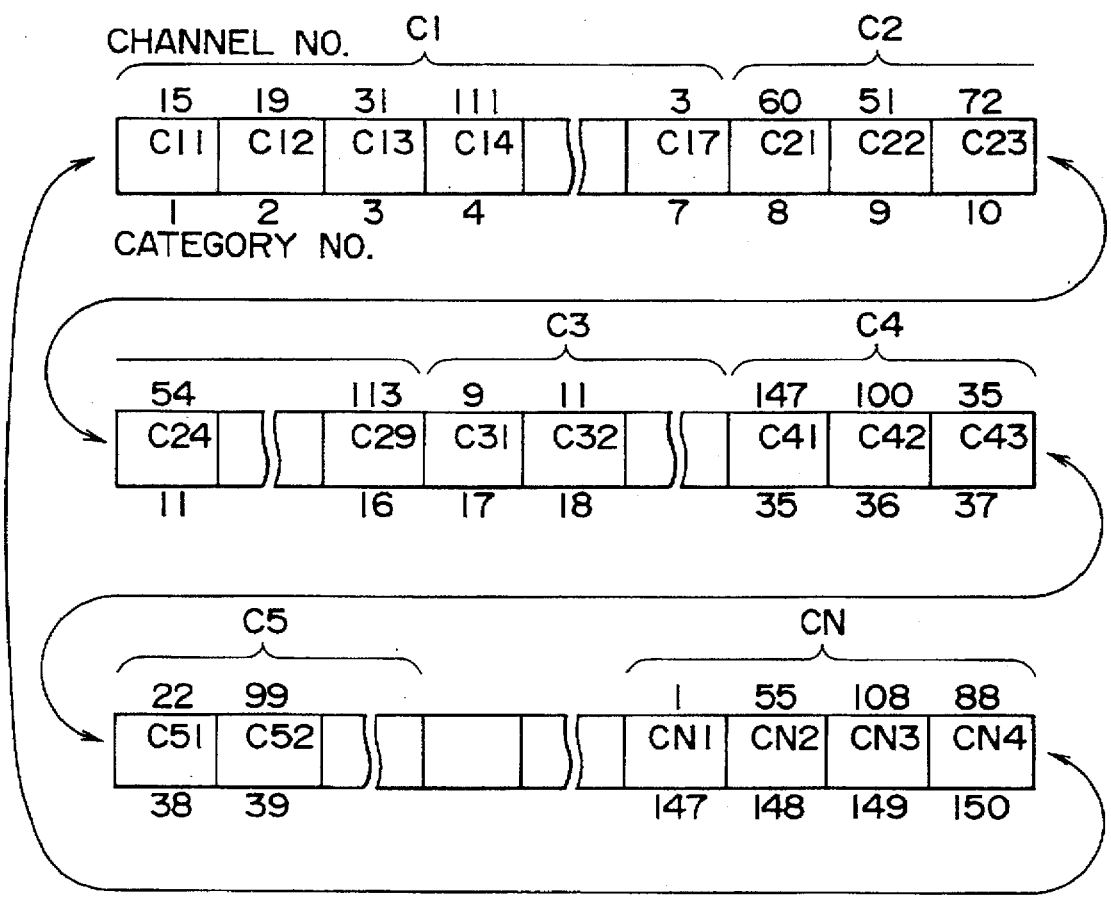
FIG. 46 is an explanatory diagram of a state where subsidiary pictures are scrolled in accordance with individual categories.

In the embodiment of FIG. 46, a total of 150 channels are divided into N categories ranging from C1 to CN. And each category Ci is classified into a predetermined number of channels. The number of channels included in each category is not a predetermined value in particular. In this embodiment, for example, seven channels are existent in the category C1, and nine channels are existent in the category C2.

The numbers shown in the upper part of FIG. 46 denote the channel numbers from 1 to 150 shown in FIG. 45. And the numbers shown in the lower part of FIG. 46 denote category numbers given successively for receiving the channels in accordance with the categories. Therefore the category numbers are also represented by numerical values from 1 to 150.

Figure 47:
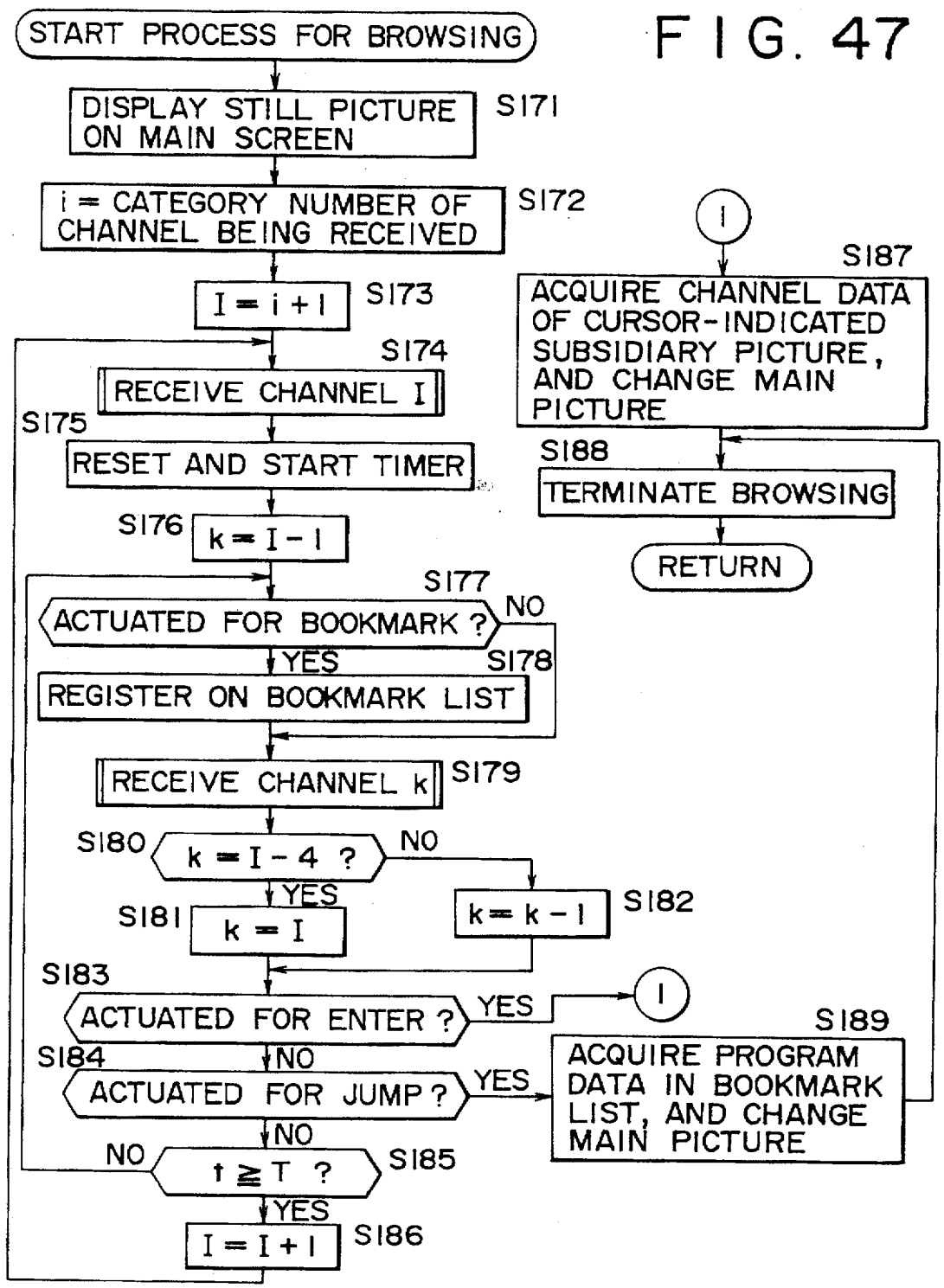
FIG. 47 is a flow chart for explaining a browsing process executed in a fourth embodiment.

Due to the addition of such category numbers, it becomes possible, as shown in FIG. 47, to fix a cursor and display subsidiary pictures successively in accordance with the categories by the same processing as that shown in FIG. 43.

The processing at steps S171 to S188 in FIG. 47 is fundamentally the same as that executed at steps S111 to S128 in FIG. 43. However, the value of the parameter i set at step S172 denotes the category number of the channel now being received, differently from that the value set at step S112 in FIG. 43 denotes the number of the channel being received. Thus, with mere change of setting of the parameter i from a channel number to a category number, desired subsidiary pictures can be displayed in accordance with the individual category as shown in FIG. 47 by the same processing as that in FIG. 43.

For example, the categories may include news, weather forecast, movies, sports, economics, politics, entertainment and so forth.

Figure 49:
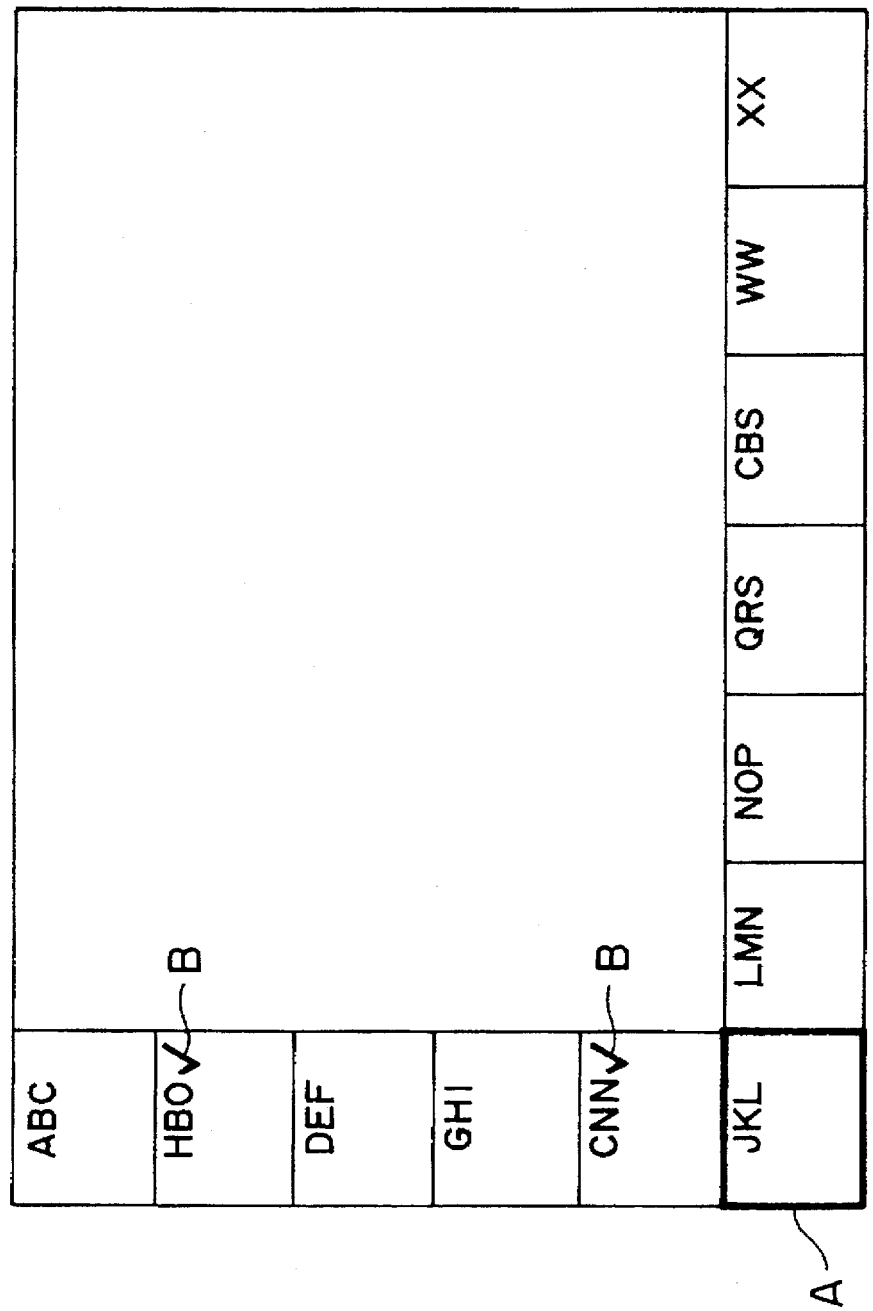
FIG. 49 shows a state where bookmarks are added to subsidiary pictures.

In this embodiment, five subsidiary pictures are displayed along the lower periphery of the entire screen of the monitor unit 4. However, it is also possible to display more subsidiary pictures along the left periphery in addition to the lower periphery as illustrated in FIG. 48, so that the whole subsidiary pictures are displayed substantially in an L-shaped arrangement. In this case also, a bookmark B is superimposed, as illustrated in FIG. 49, on any subsidiary picture for which the bookmark button switch 55 has been actuated.

FIG. 50 is a flow chart of the processing executed by the CPU 29 in a state where the program received by the tuner 21A is displayed as a main picture on the monitor unit 4 (i.e., in a state where none of subsidiary pictures is displayed). First at step S211, a decision is made as to whether the signal reception by the tuner 21A has been terminated or not. And if the result of this decision signifies termination of the signal reception, the processing in this flow chart is completed.

In case the result of the decision at step S211 signifies that the signal reception by the tuner 21A has not yet terminated, the operation proceeds to step S212, where a decision is made as to whether the bookmark button switch 55 of the remote commander 5 has been actuated or not. If the result of this decision is affirmative to signify an actuation, the operation proceeds to step S215, where the program received now by the tuner 21A and displayed on the monitor unit 4 is registered on the bookmark list stored in the EEPROM 38. Thereafter the operation returns to step S211, and the processing subsequent thereto is repeatedly executed.

Figure 51:
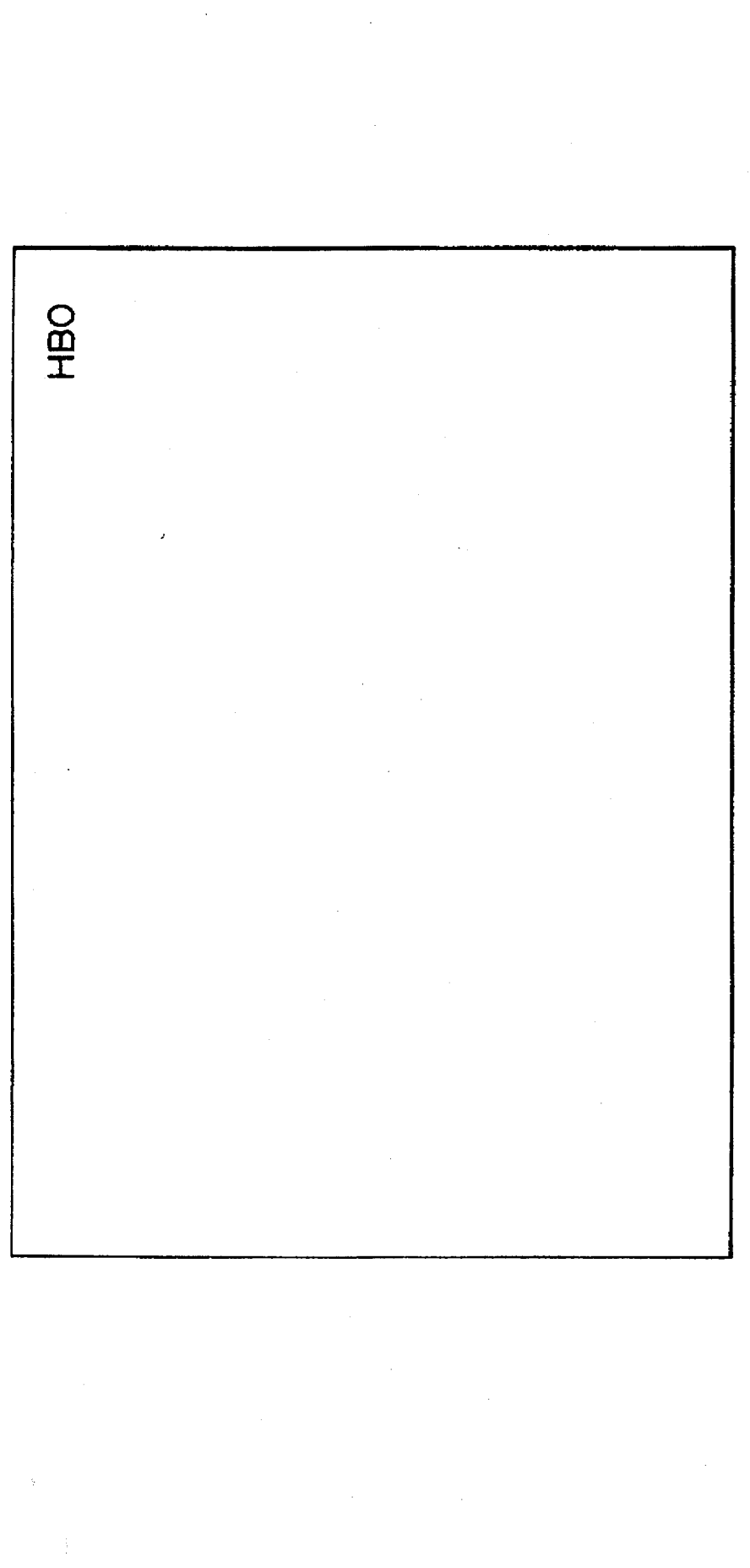
Figure 52:
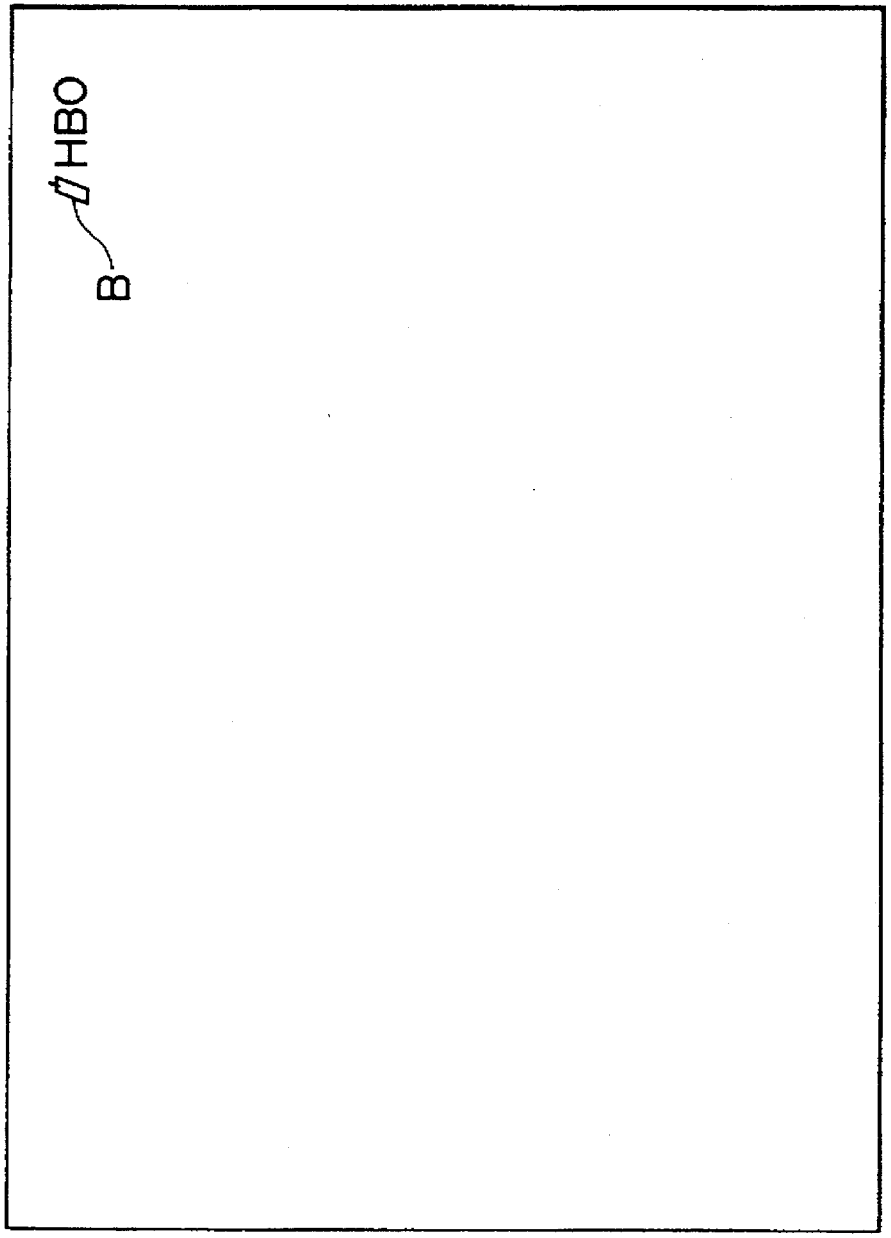
FIG. 52 shows a state where a bookmark is added to the example displayed on the screen of FIG. 51.

Consequently, when the bookmark button switch 55 is actuated during reception of a broadcast channel HBO for example as shown in FIG. 51, a bookmark B is additionally displayed on the left of characters (HBO in this embodiment) which denote the name (abbreviation) of the broadcast channel, as shown in FIG. 52.

As obvious from comparison of FIG. 52 with FIG. 22, a bookmark B (in FIG. 52) added to a main picture is different from a bookmark B (in FIG. 22) added to a subsidiary picture during execution of a browsing process. Therefore the user is enabled to identify the bookmark added in either a browsing mode or a normal reception mode.

Figure 53:
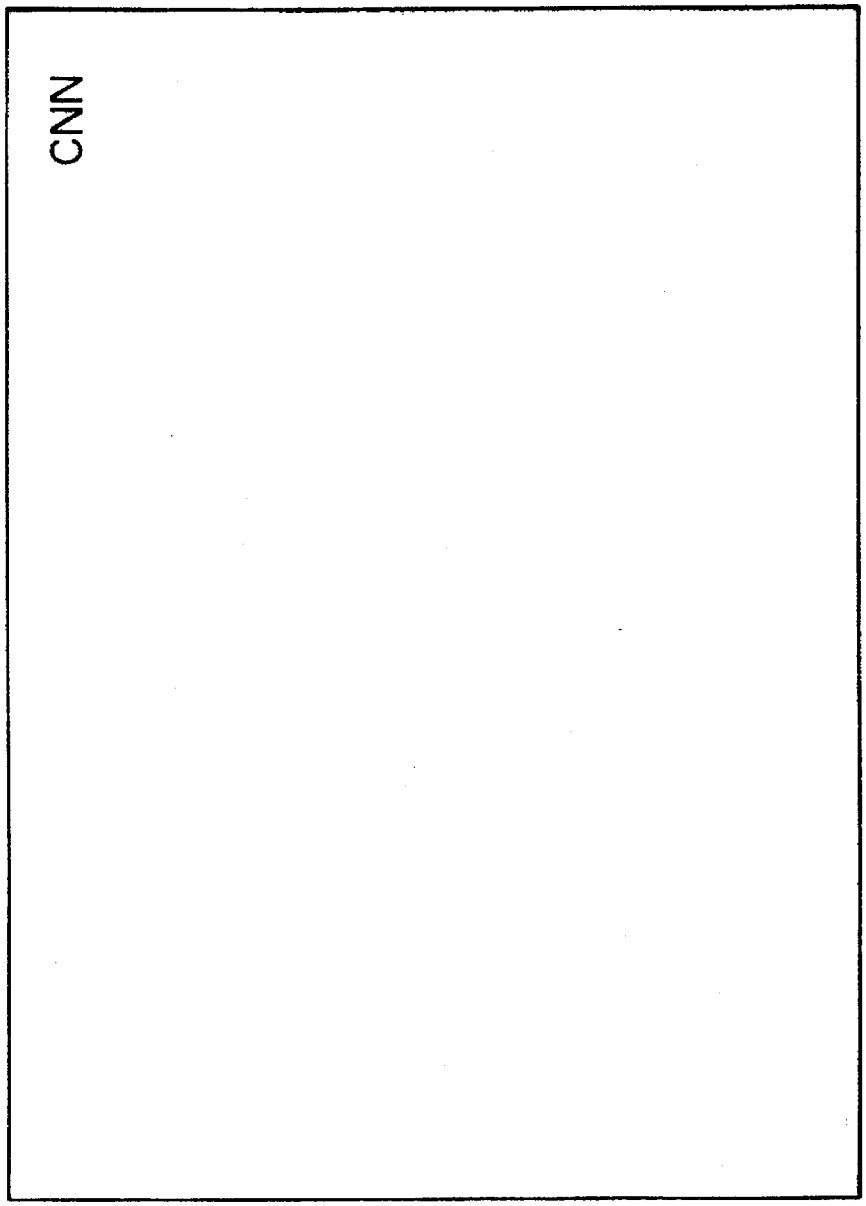
FIG. 53 is an explanatory diagram showing a display example on the screen in a normal reception mode.
Figure 54:
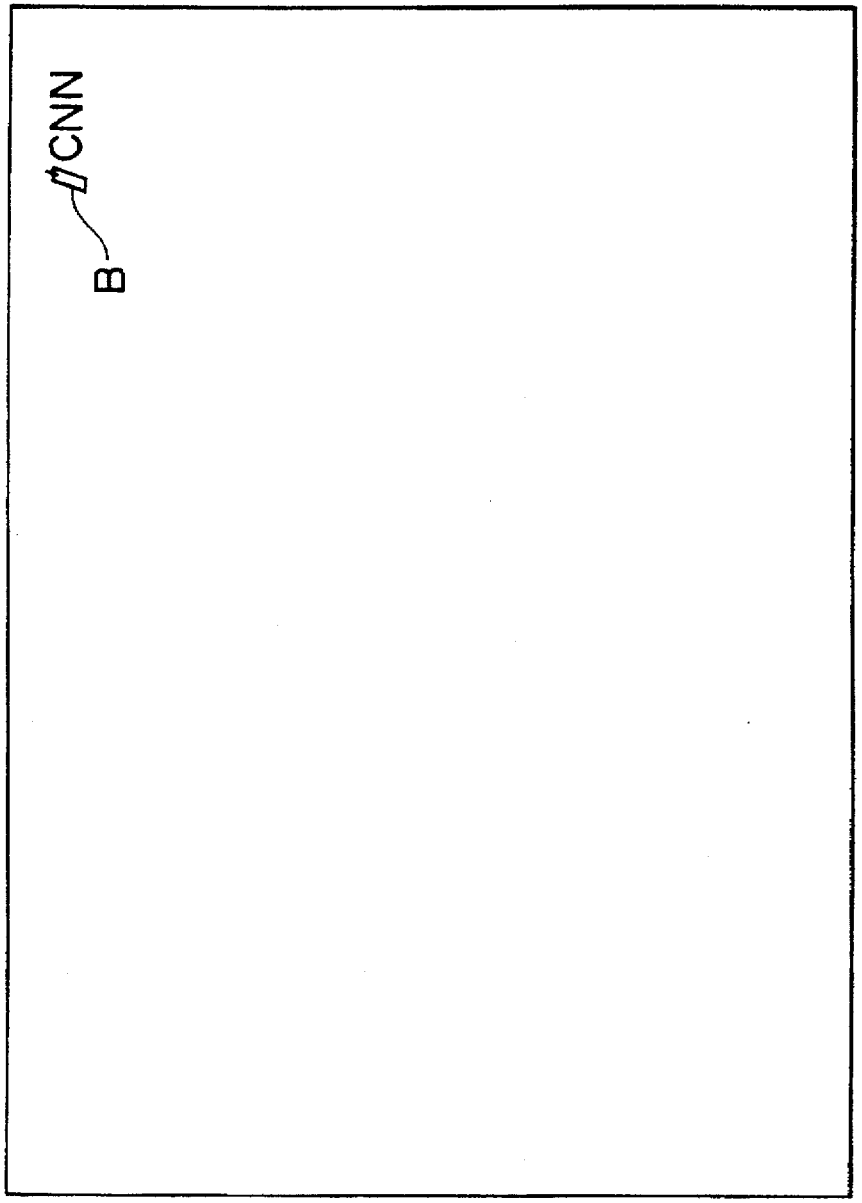
FIG. 54 shows a state where a bookmark is added to the example displayed on the screen of FIG. 53.

Similarly, when the bookmark button switch 55 is actuated during normal reception of a broadcast channel CNN as shown in FIG. 53 for example, a program being broadcast at that time in the channel CNN is registered on the bookmark list, and simultaneously a bookmark B is added to a picture of that program as shown in FIG. 54.

Figure 55:
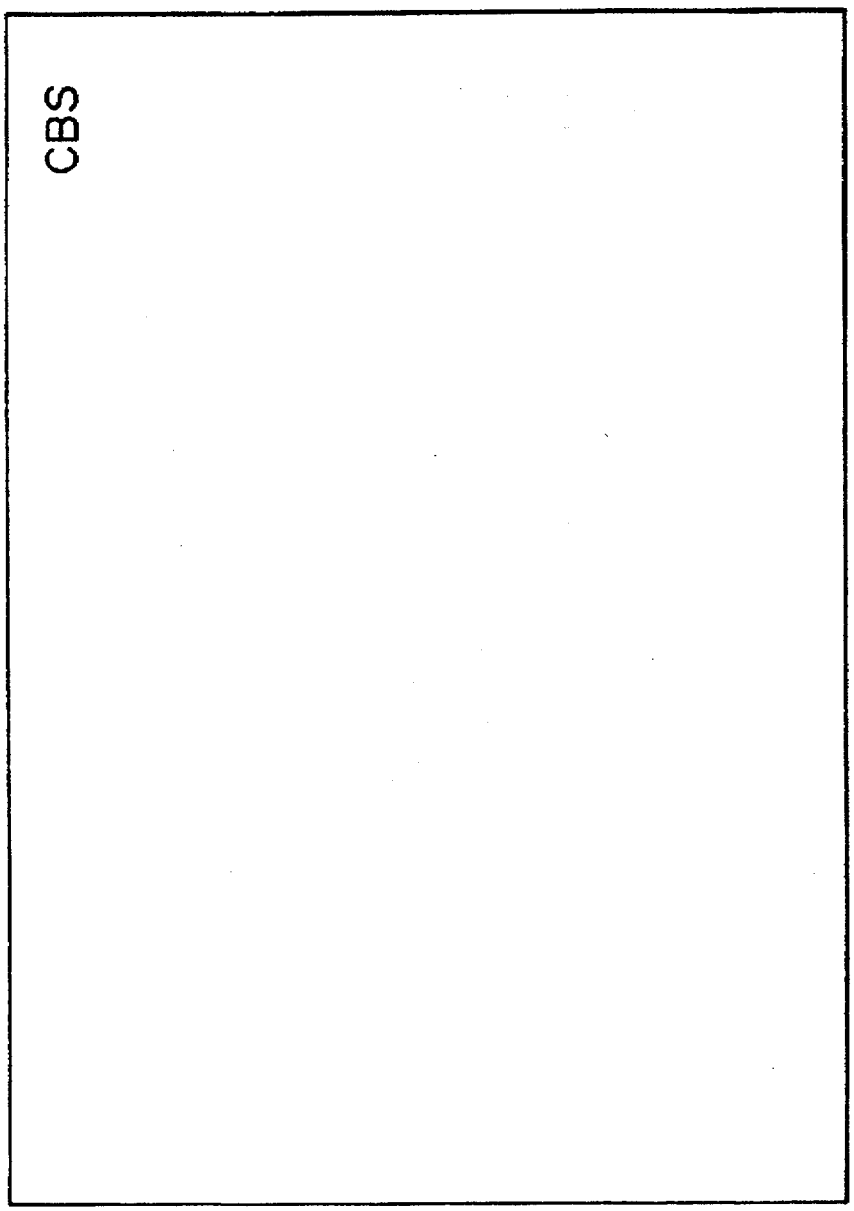
FIG. 55 is an explanatory diagram showing a display example on the screen in a normal reception mode.
Figure 56:
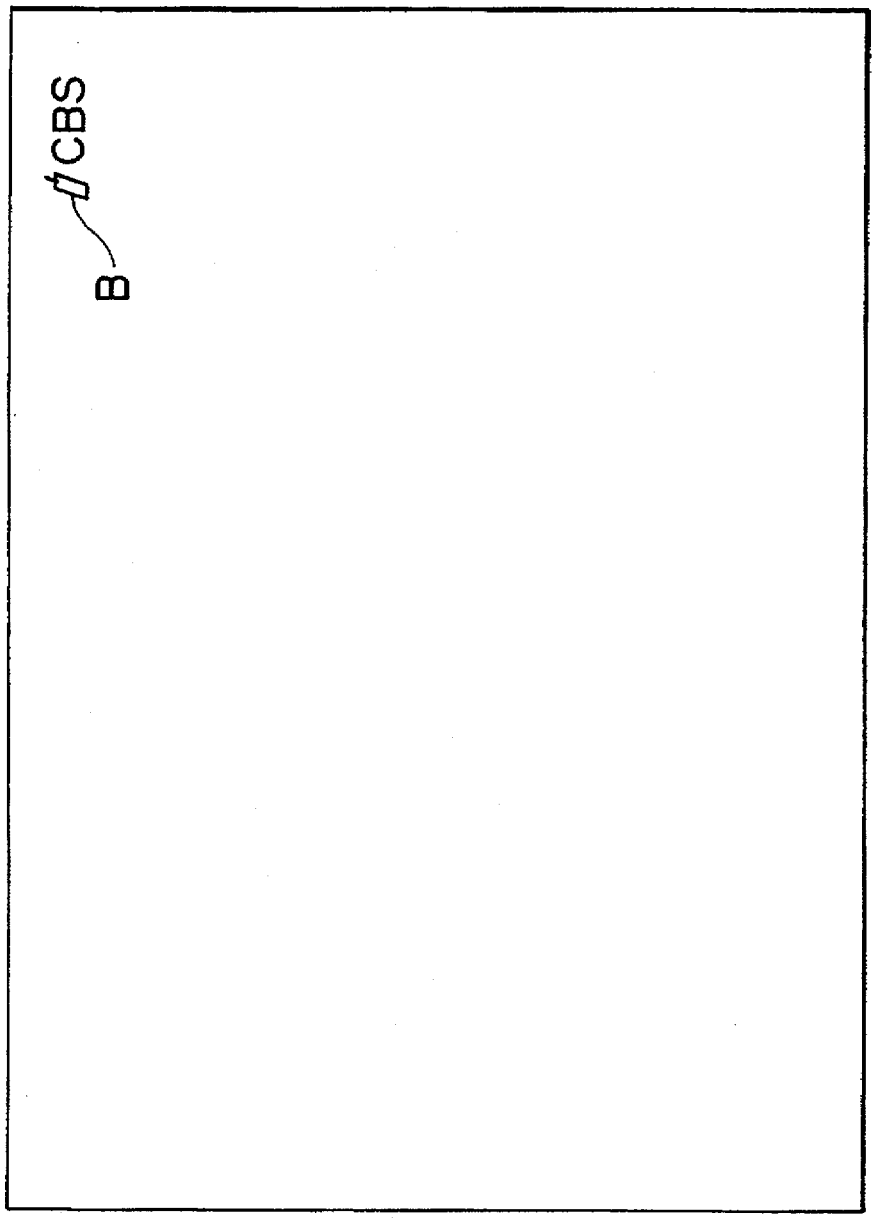
FIG. 56 shows a state where a bookmark is added to the example displayed on the screen of FIG. 55.

Further, when the bookmark button switch 55 is actuated during normal reception of a broadcast channel CBS as shown in FIG. 55 for example, a program being broadcast at that time in the channel CBS is registered on the bookmark list, and simultaneously a bookmark B is added to a picture of that program as shown in FIG. 56.

Referring back to FIG. 50, if the result of the decision at step S212 signifies no actuation for bookmark, the operation proceeds to step S213, where a decision is made as to whether the jump button switch 56 has been actuated or not. And if the result of this decision is affirmative to signify an actuation for jump, the operation proceeds to step S216 to execute a process for reading out the program data from the bookmark list stored in the EEPROM 38 and receiving the relevant program.

In case a bookmark has already been added to each of broadcast channels HBO, CNN and CBS as shown in FIGS. 51 to 56 for example, the program of the broadcast channel HBO, CNN or CBS shown in FIG. 52, 54 or 56 is displayed while being changed successively every time the jump button switch 56 is actuated.

Similarly, when the jump button switch 56 is first actuated after addition of a bookmark to each of the broadcast channels HBO, CNN and CBS in a browsing mode as shown in FIGS. 39 to 41 for example, the browsing mode is terminated as described above, and then the broadcast channel HBO with a bookmark B added thereto is first received by the tuner 21A and is displayed on the monitor unit 4, as shown in FIG. 39. This state is not the browsing mode any longer, but is already the normal reception mode.

When the jump button switch 56 is actuated in this mode, the broadcast channel CNN registered previously in the bookmark list is received by the tuner 21A and then is displayed on the monitor unit 4 as shown in FIG. 40.

Subsequently, when the jump button switch 56 is further actuated in the state of FIG. 40, the broadcast channel CBS registered next in the bookmark list is received and then is displayed on the monitor unit 4 as shown in FIG. 41.

Thus, due to previous addition of a bookmark B to each of predetermined programs, merely the programs registered in the bookmark list can be successively displayed every time the jump button switch 56 is actuated.

In case the result of the decision at step S213 signifies no actuation for jump, the operation proceeds to step S214, where a decision is made as to whether the program in the bookmark list stored in the EEPROM 38 has already been terminated or not. More specifically, the broadcast time of the program (start hour and end hour) is also registered in the bookmark list simultaneously with the number of the broadcast channel, as described above. Then the CPU 29 compares the broadcast end hour with the current hour outputted from the calendar timer 35, and when the current hour has become later than the broadcast end hour of the program registered in the bookmark list, the operation proceeds to step S217 to delete that program from the bookmark list.

In this manner, a bookmark is added not to a broadcast channel but to a program. Therefore, upon termination of the program broadcasted at the time of addition of a bookmark thereto, the terminated program is deleted from the bookmark list. This is exactly the point that the above embodiment is widely different from the conventional one where a search function designates a broadcast channel itself.

If the result of the decision at step S214 is negative to signify that the program in the bookmark list has not been terminated yet, the operation returns to step S211, so that the processing subsequent thereto is executed repeatedly.

Figure 57:
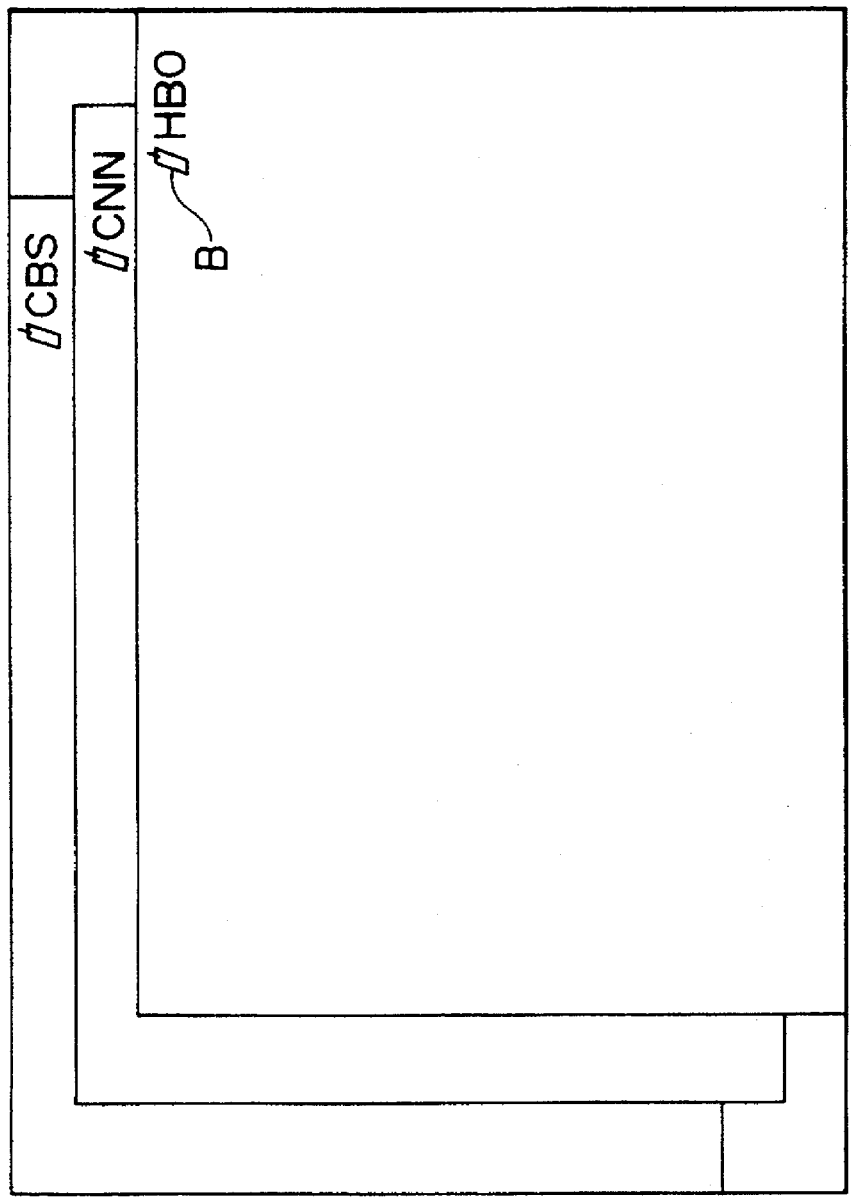
FIGS. 57 to 59 show other display examples of selected pictures on the screen with bookmarks added thereto.
Figure 58:
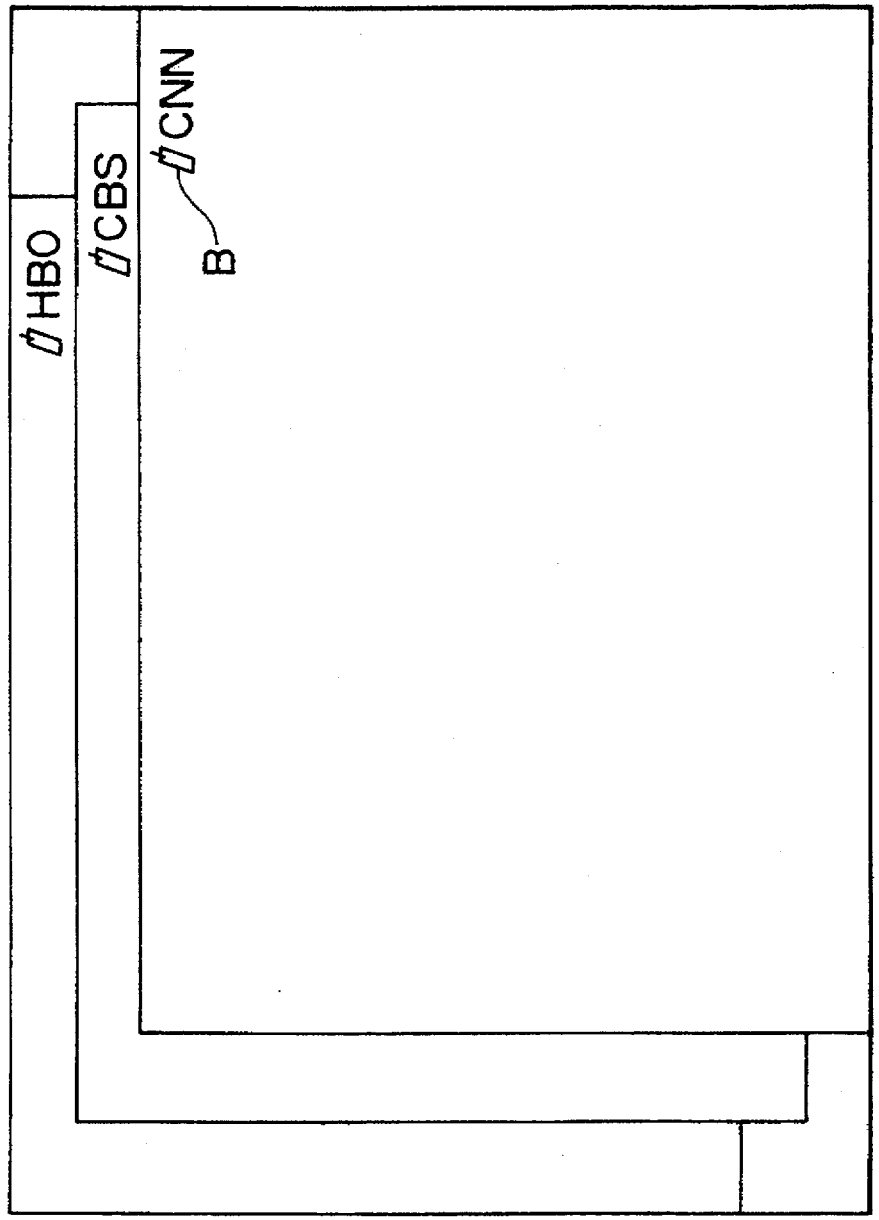
Figure 59:
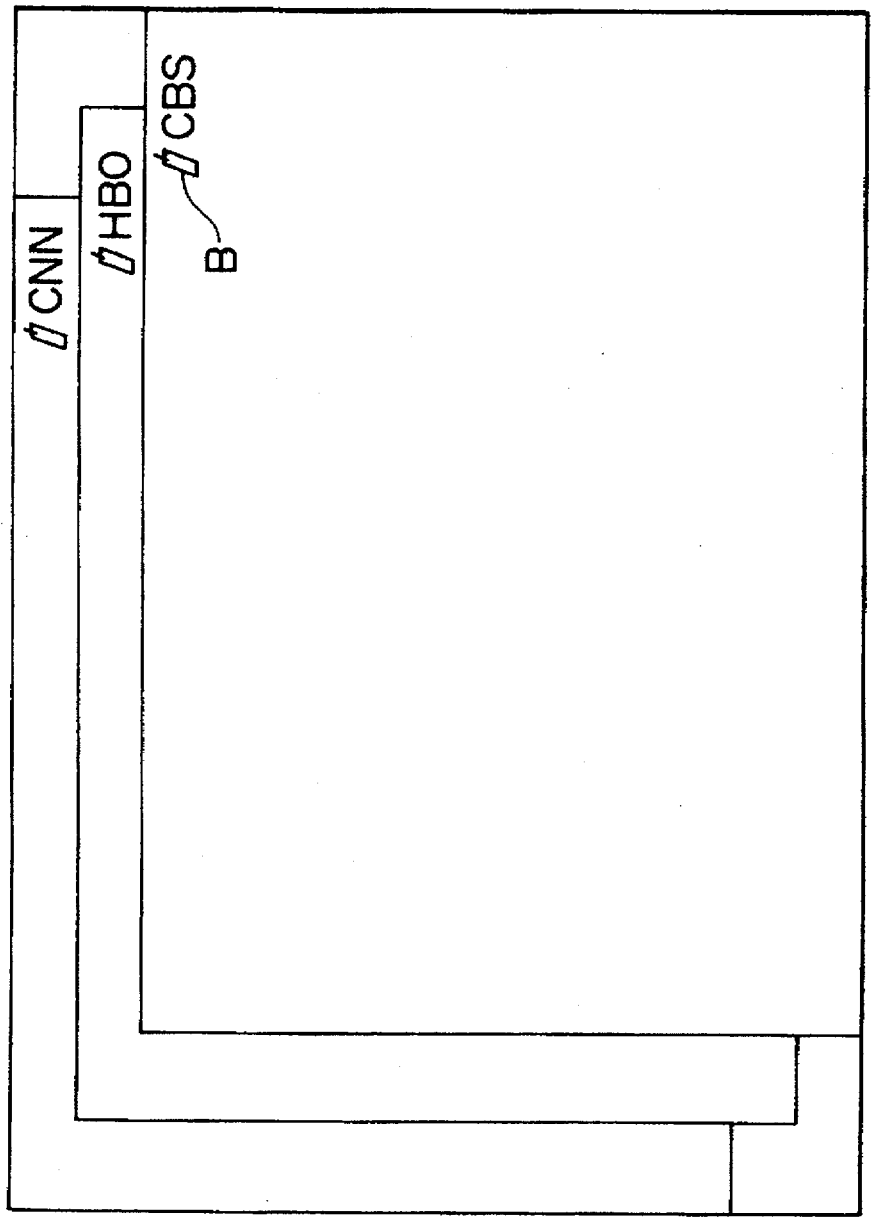

In the embodiment mentioned above, a picture of the program designated with a bookmark is displayed as an independent picture on the monitor unit 4. However, it can be so modified as illustrated in FIGS. 57 to 59 for example, wherein programs registered on a bookmark list are displayed successively as windows in response to actuation of the jump button switch 56. In this case, the newest picture is displayed at the uppermost position.

Figure 60:
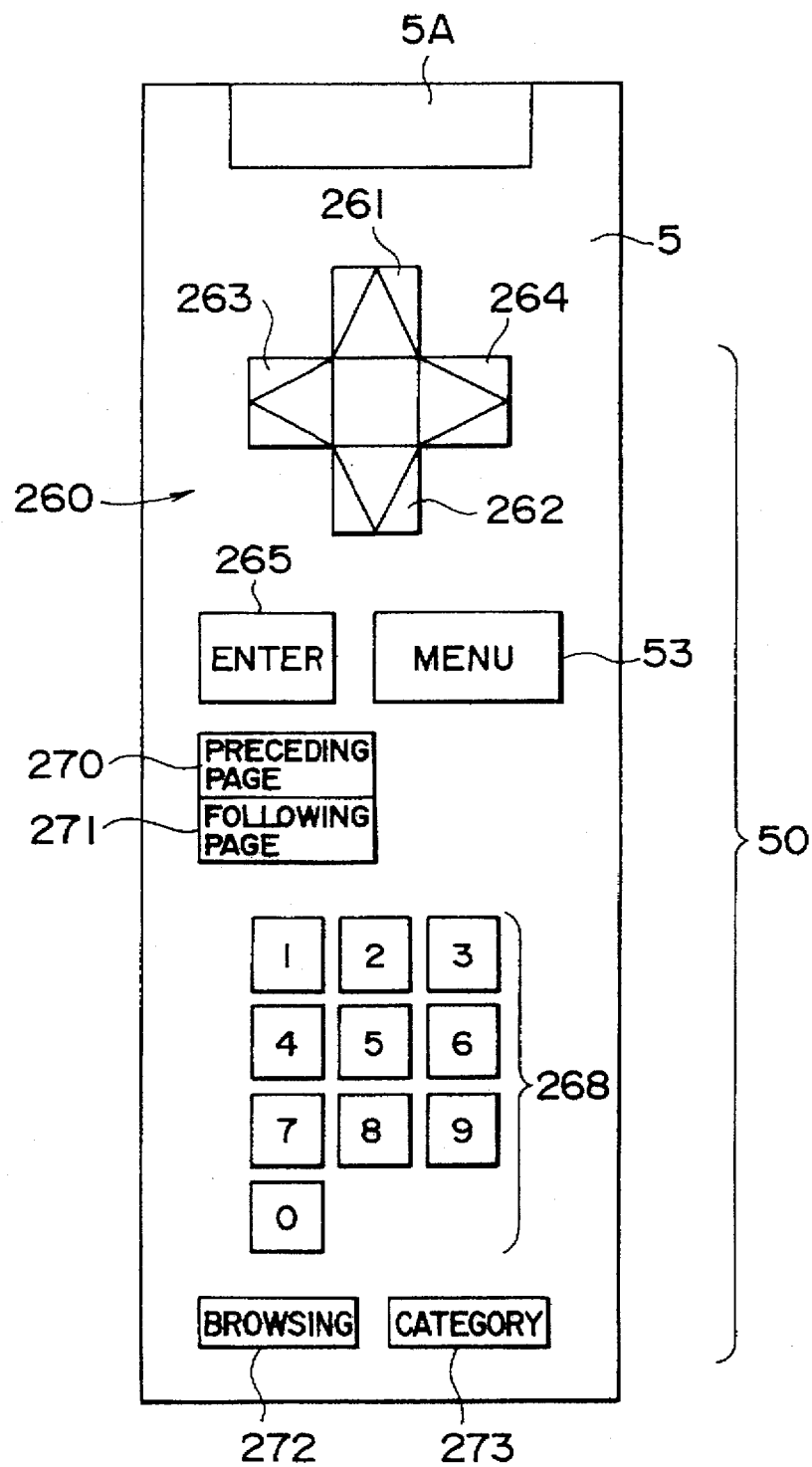
FIG. 60 shows another exemplary construction of the remote commander 5.

Also in the above embodiment, a browsing button icon is disposed on the menu, and a process for browsing is executed by actuating such icon. However, a browsing button switch may be provided on the remote commander 5, and the browsing may be executed in response to a command transmitted from the remote commander 5. FIG. 60 shows an exemplary construction of the remote commander 5 contrived for this purpose.

In this embodiment, a direction button switch Group 260 consisting of an up button switch 261, a down button switch 262, a left button switch 263 and a right button switch 264 is provided under an IR transmitter 5A. The four switches of the direction button switch Group 260 are actuated for shifting a cursor upward, downward, leftward and rightward respectively. That is, the direction button switch Group 260 is functionally the same as the manipulator 52 of the remote commander 5 shown in FIG. 4 when the latter is actuated horizontally.

A menu button switch 53 is disposed at a lower right position of the direction button switch Group 260, and an enter button switch 265 is disposed at a lower left position thereof. The enter button switch 265 has a function corresponding to an enter actuation which vertically depresses the manipulator 52 of the remote commander 5 in FIG. 4.

Further a preceding page button switch 270 and a following page button switch 271 are disposed under the enter button switch 265. The preceding page button switch 270 or the following page button switch 271 is actuated for scrolling subsidiary pictures forward or backward simultaneously.

Under the following page button switch 271, there are disposed numeral button switches 268 consisting of ten numerals 0 to 9. Further a browsing button switch 272 and a category button switch 273 are disposed under the numeral button switches 268.

Figure 61:
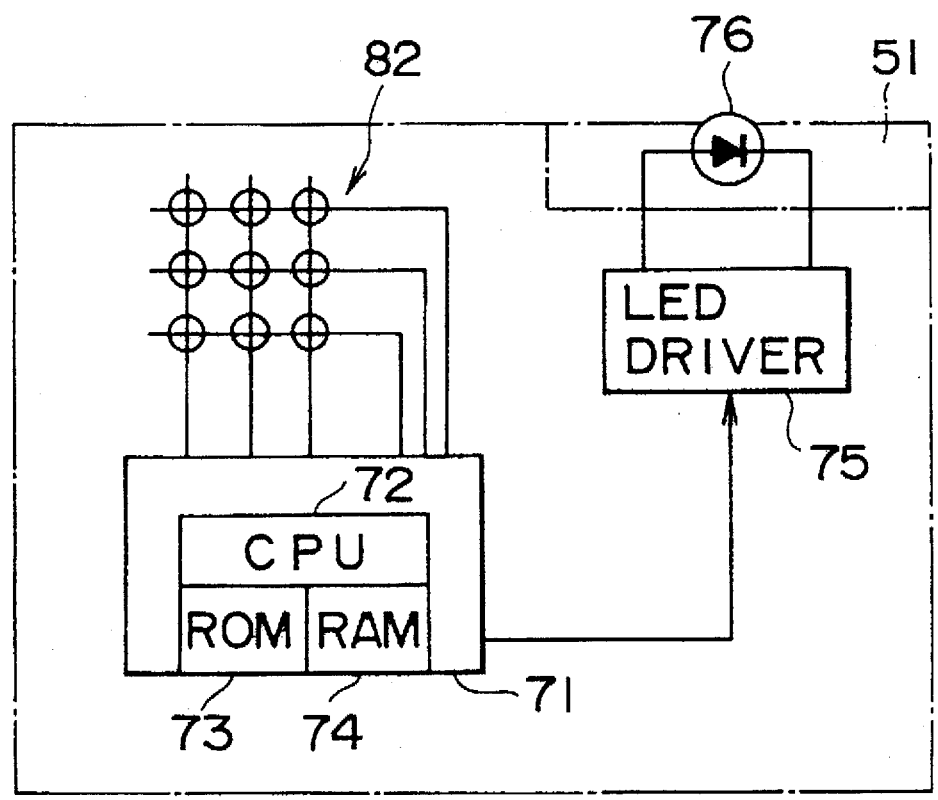
FIG. 61 is a block diagram showing an exemplary internal structure of the remote commander 5 in FIG. 60.
Figure 62:
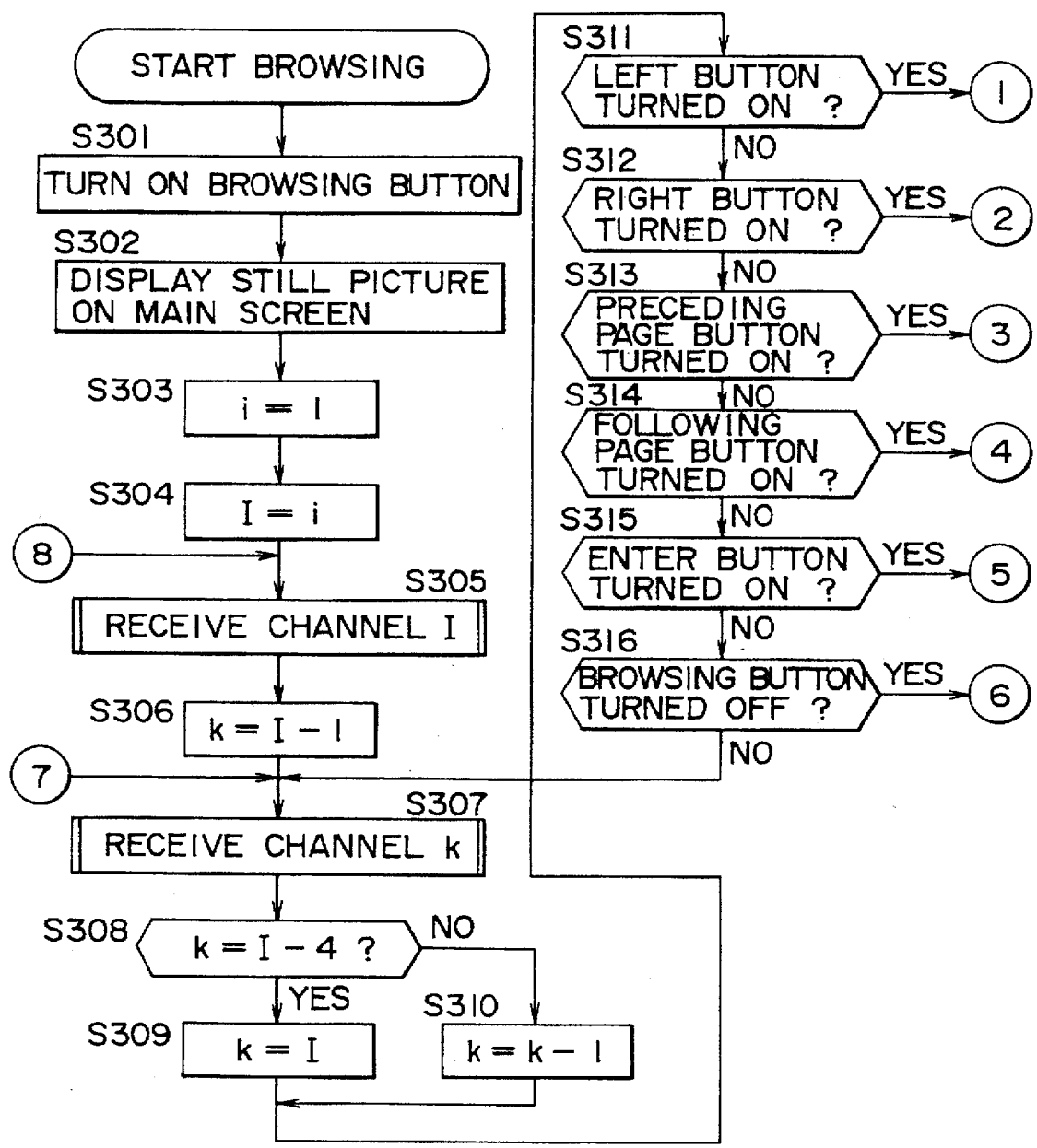
FIG. 62 is a flow chart for explaining a browsing process executed in a fifth embodiment.
Figure 63:
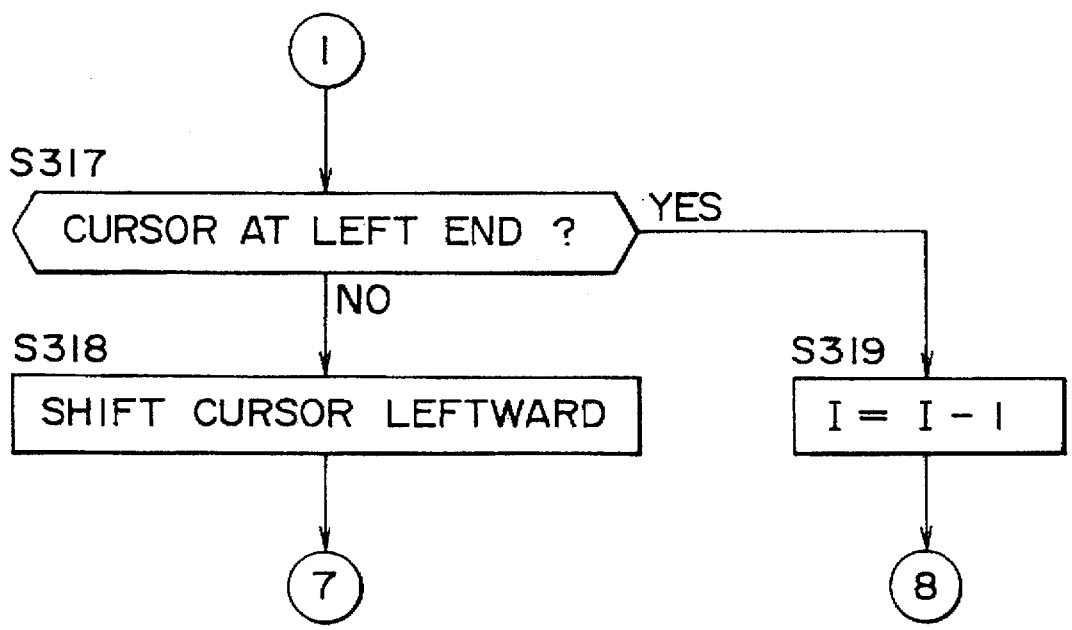
FIG. 63 is a flow chart continued from FIG. 62.
Figure 64:
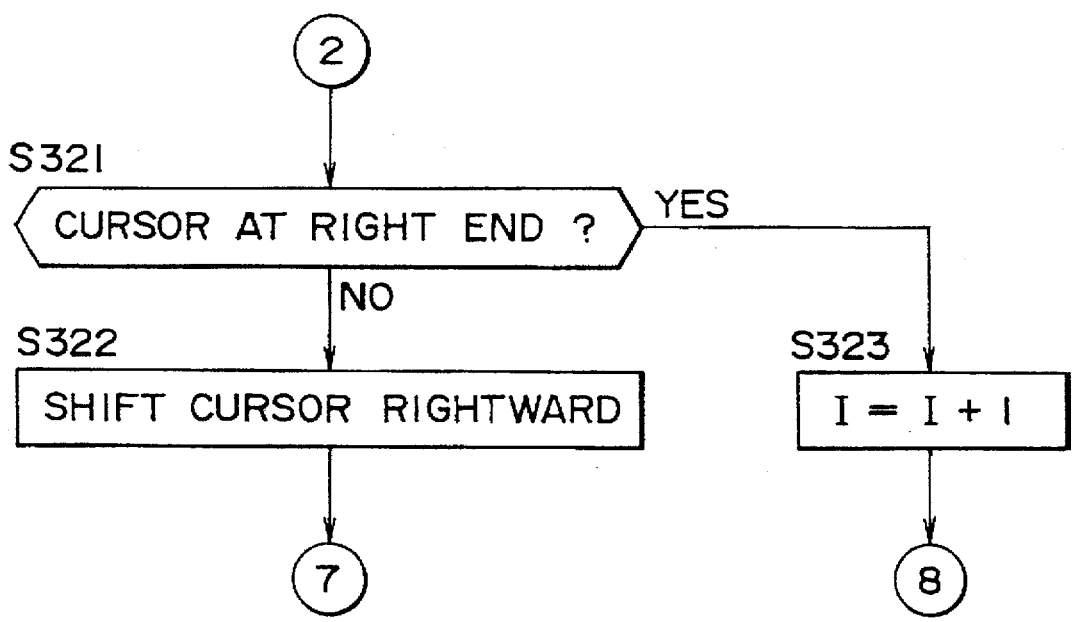
FIG. 64 is a flow chart continued from FIG. 63.
Figure 65:
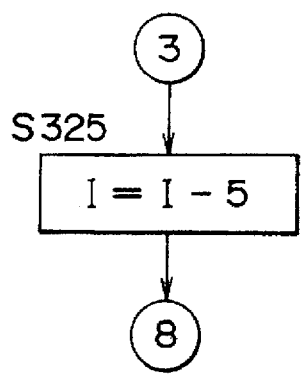
FIG. 65 is a flow chart continued from FIG. 64.
Figure 66:
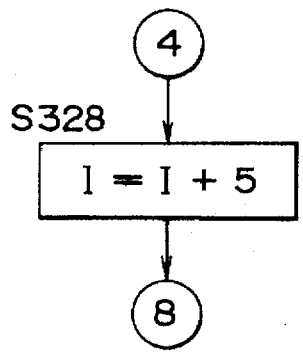
FIG. 66 is a flow chart continued from FIG. 65.
Figure 67:
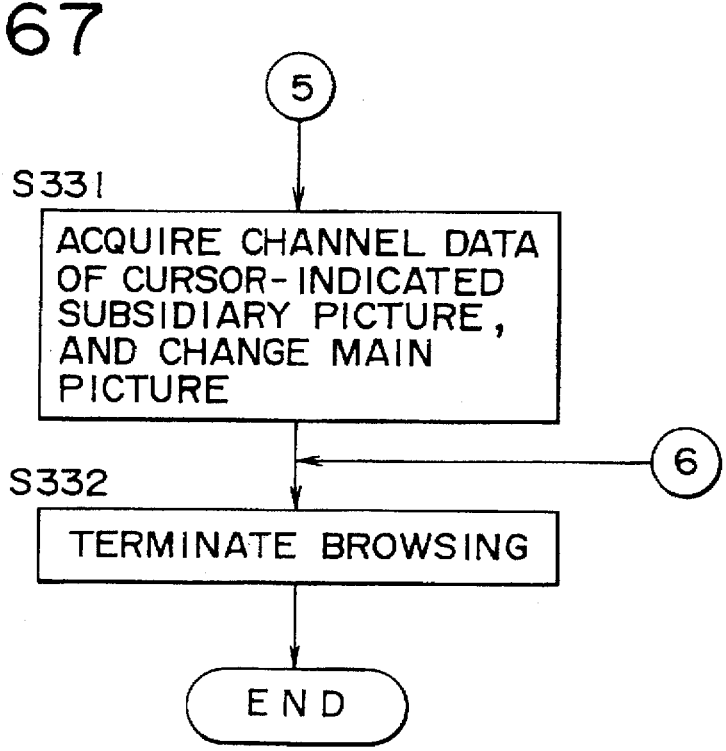
FIG. 67 is a flow chart continued from FIG. 66.

FIG. 61 shows an exemplary internal structure of the remote commander 5 in FIG. 60. Although its fundamental structure is the same as the aforementioned one shown in FIG. 10, the variable resistors 64, 65, the switch 66 and the A—D converters 77, 78 employed in FIG. 10 are omitted here. More specifically, any actuation of the button switch assembly 50 inclusive of the direction button switch group 260 can be detected by a button switch matrix 82 in this embodiment.

Referring now to flow charts of FIGS. 62 to 67, an explanation will be given on the operation of an IRD 2 performed when the remote commander 5 of FIG. 60 is actuated.

First at step S301, the user actuates the browsing button switch 272 to turn it on. When a CPU 29 in the IRD 2 has received via an IR receiver 39 an input detection signal indicative of such actuation of the browsing button switch 272, a still picture of the program being now received is displayed as a main picture on the screen. Then the operation proceeds to step S303, where a parameter i is set to 1. Subsequently a parameter I is set to i at step S304. That is, I=1 in this case.

Thereafter the operation proceeds to step S305 to execute a process for receiving the channel I. More specifically, in this case, the channel 1 is received as a subsidiary picture by the tuner 215. Next the operation proceeds to step S306, where a parameter k is set to a value of I−1. Since I=1 in this case, the parameter k is set to 150. Then the operation proceeds to step S307 to receive the channel k as a subsidiary picture.

At step S308, a decision is made as to whether the parameter k is equal to I−4 or not. And if the result of this decision is negative, the operation proceeds to step S310 where the parameter k is decremented by 1. Meanwhile, if the result of the decision at step S308 signifies that the parameter k is equal to I−4, the operation proceeds to step S309 where the parameter k is set to I.

In this manner, a picture of the channel I at a lower right position in FIG. 20 is received and displayed at step S305, and a picture of the channel I−1 is received and displayed at step S307.

Subsequently at steps S311 to S316, a decision is made as to whether any of the aforementioned left button switch 263, right button switch 264, preceding page button switch 270, following page button switch 271, enter .button switch 265 and browsing button switch 272 of the remote commander 5 has been actuated or not. And if the result of the decision is negative to signify no actuation of any switch, the operation returns to step S307 to execute a process for receiving the channel k. Since the parameter k is set to I–2 in this case due to the process at step S310, a subsidiary picture of the channel I–2 at the center in FIG. 20 is received.

Thereafter the operation proceeds from step S308 to step S310 where the parameter k is set to I–3, and the decision at steps S311 to S316 is made with regard to actuation of each of the button switches.

And if the result of the above decision is negative to signify no actuation of any button switch, the operation returns to step S307 again to receive a picture of the channel k. In this case, a signal of the channel I–3 is received. Then the operation proceeds from step S308 again to step S310 where the parameter k is set to I–4, and further returns to step S307 via steps S311 through S316 so that a picture of the channel I–4 is received and displayed.

Next at step S308, the result of the decision here signifies that the parameter k is equal to I–4. Therefore the operation proceeds to step S309 where the parameter k is set to I. Consequently, when the operation has returned to step S307 after the processing at steps S311 to S316, a picture of the channel I is received and displayed again.

Since the above processing at steps S307 to S316 is executed repeatedly, pseudo moving pictures displayed on five subsidiary screens of the channels I to I–4 shown in FIG. 20 are updated repeatedly. However, such subsidiary pictures are not scrolled even after a lapse of five seconds and are displayed continuously at the same positions.

In case the result of the decision at step S311 signifies turn-on of the left button switch 263, the operation proceeds to step S317, where a decision is made as to whether a cursor is positioned on the leftmost subsidiary picture or not. And if the result of this decision is negative to signify that the cursor is not positioned at the left end, the operation proceeds to step S318 to execute a process for shifting the cursor leftward. Then the operation returns to step S307 again, and the processing subsequent thereto is executed repeatedly.

In case the result of the decision at step S317 signifies that the cursor is positioned on the leftmost subsidiary picture, the operation proceeds to step S319 where the parameter I is decremented by 1. Thereafter the operation returns to step S305 to receive the decremented channel I. More specifically, as shown in FIG. 20, the picture on the rightmost subsidiary screen is changed to the picture of the channel I–1 displayed at the left adjacent position until then.

Subsequently the parameter k is set to I–1 at step S306, and the channel k is received at step S307, so that the picture of the channel I–2 displayed until then on the third subsidiary screen from the right end in FIG. 20 is displayed on the second subsidiary screen from the right end.

Thereafter the same processing is repeated, so that the subsidiary pictures in FIG. 20 are scrolled rightward one by one successively.

If the result of the decision at step S312 signifies turn-on of the right button switch 264, the operation proceeds to step S321, where another decision is made as to whether the cursor is positioned on the rightmost subsidiary picture or not. And when the result of this decision is negative to signify that the cursor is not positioned at the right end, the operation proceeds to step S322 to execute a process for shifting the cursor rightward. Then the operation returns to step S307, and the processing subsequent thereto is executed repeatedly.

Meanwhile, if the result of the decision at step S321 signifies that the cursor is positioned on the rightmost subsidiary picture, the operation proceeds to step S323 where the parameter I is incremented by 1. Then the operation returns to step S305 to execute a process for receiving the channel I. Consequently, the rightmost subsidiary picture shown in FIG. 20 is changed to the subsidiary picture of the channel number incremented by 1.

Subsequently the parameter k is set to I–1 at step S306, and the channel k is received at step S307, so that the picture of the channel displayed until then on the rightmost subsidiary screen in FIG. 20 is displayed on the second subsidiary screen from the right end.

Thereafter the same processing is repeated, so that the subsidiary pictures in FIG. 20 are scrolled leftward one by one successively.

If the result of the decision at step S313 signifies turn-on of the preceding page button switch 270, the operation proceeds to step S325, where the parameter I is decremented by 5. Thereafter the operation returns to step S305 to receive the channel I decremented by 5. More specifically, the picture on the rightmost subsidiary screen shown in FIG. 20 is changed to the subsidiary picture of the channel number anterior by 5. Subsequently the parameter k is set to I–1 at step S306, and a signal of the channel k is received at step S307, so that the subsidiary picture of the channel I–6 is displayed on the second subsidiary screen from the right end in FIG. 20.

Thereafter the same processing is repeated successively, so that the five subsidiary pictures are changed simultaneously (in succession microscopically) to pictures of younger-number channels.

Figure 68:
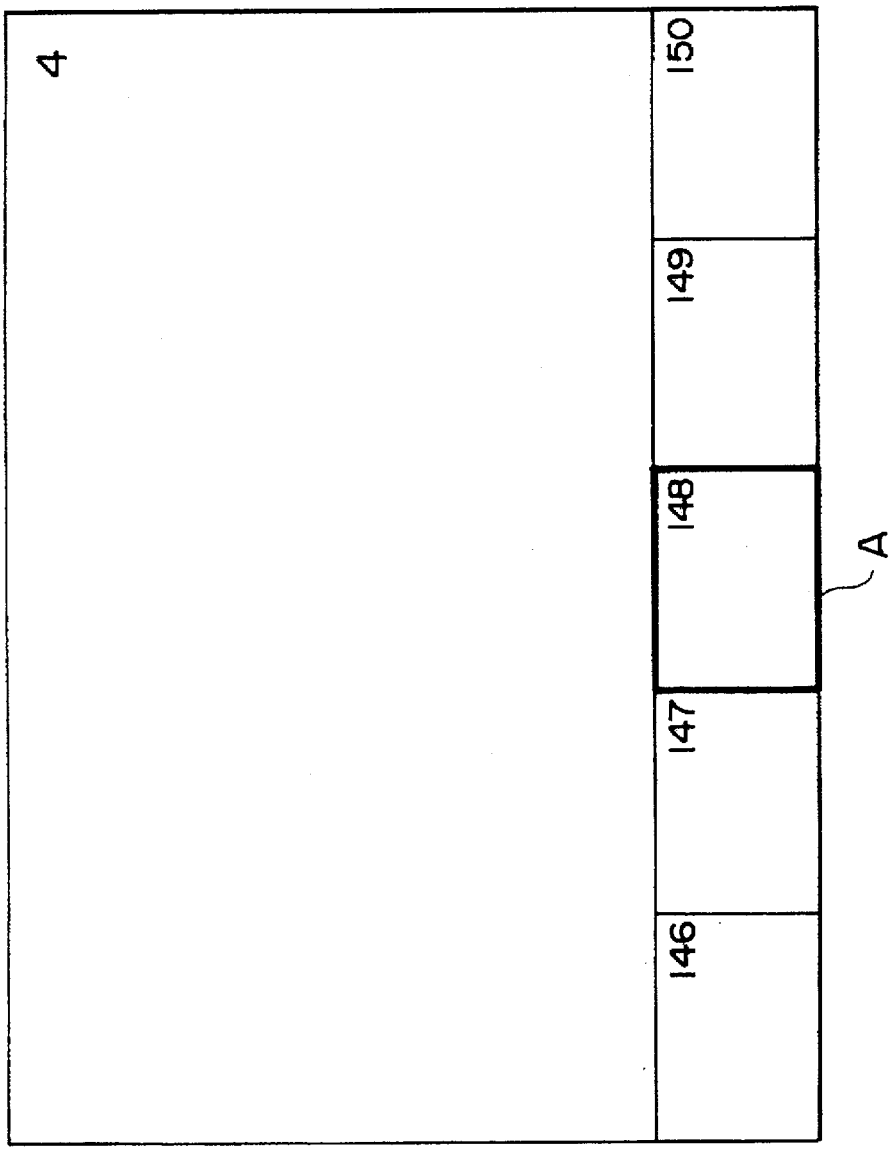
FIG. 68 shows an example displayed when a preceding page button switch is actuated.

For example, when the preceding page button switch 270 is turned on in a state where five subsidiary pictures of the channels 5 to 1 are displayed as shown in FIG. 23, the five pictures on the subsidiary screens are changed to pictures of the channels 150 to 146 as shown in FIG. 68.

Meanwhile, if the result of the decision at step S314 signifies turn-on of the following page button switch 271, the operation proceeds to step S328 where the parameter I is incremented by 5. Then the operation returns to step S305 to receive the channel I incremented by 5. Consequently, the rightmost subsidiary picture of the channel I shown in FIG. 20 is changed to the picture of the channel number larger by 5 than the one displayed until then. Thereafter the operation proceeds to step S306 where the parameter k is set to I–1, and a signal of the channel k is received at step S307, so that a subsidiary picture of the channel I+4 is displayed on the second subsidiary screen from the right end in FIG. 20.

Thereafter the same processing is repeated successively, so that the five subsidiary pictures are changed simultaneously to pictures of the channel numbers larger than 1 respectively than those displayed until then.

Figure 69:
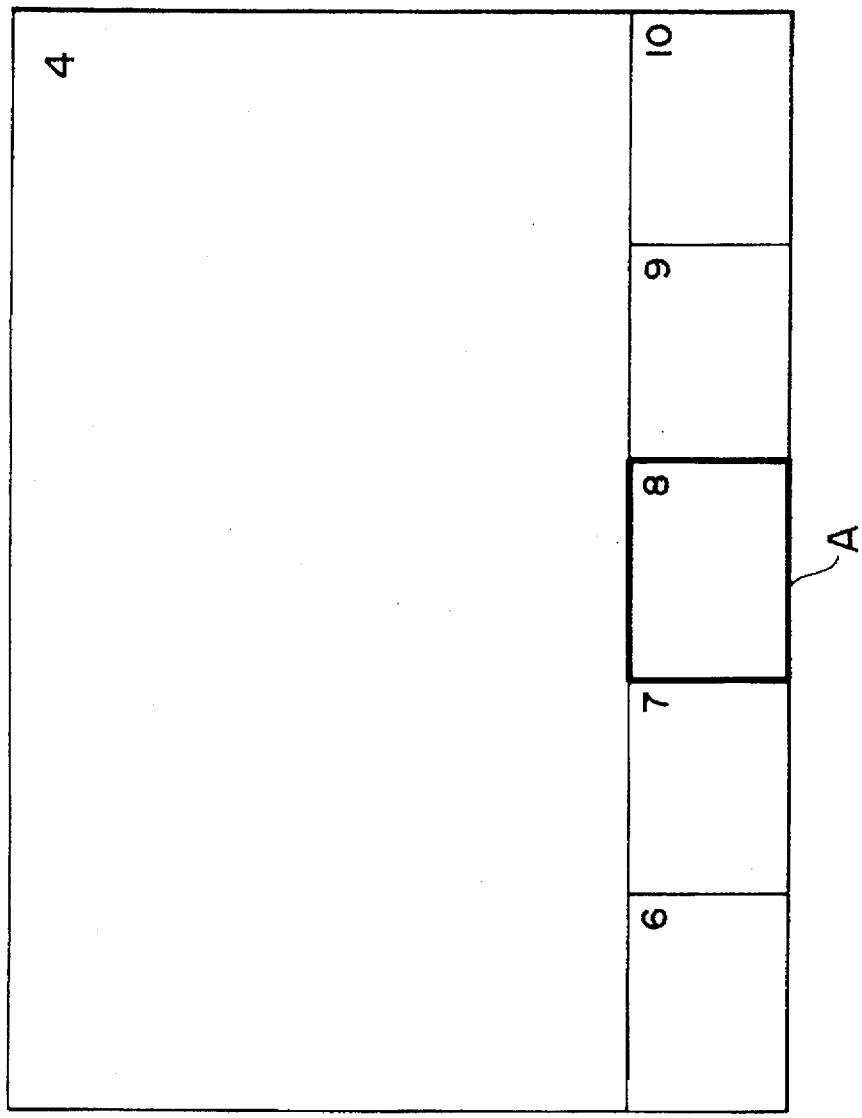
FIG. 69 shows an example displayed when a following page button switch is actuated.

For example, when the following page button switch 271 is turned on in a state where five subsidiary pictures of the channels 5 to 1 are displayed as shown in FIG. 23, the five pictures on the subsidiary screens are changed to pictures of the channels 10 to 6 as shown in FIG. 69.

Further, if the result of the decision at step 315 signifies turn-on of the enter button switch 265, the operation proceeds to step S331, where the number of the channel data of the cursor-indicated subsidiary picture is acquired, and the main picture is changed to the picture of that channel. Then the operation proceeds to step S332, so that the browsing is terminated with disappearance of the subsidiary pictures.

Meanwhile, if the result of the decision at step S316 signifies an actuation (turn-off) of the browsing button switch 272, the operation proceeds to step S332 to thereby terminate the browsing.

Figure 70:
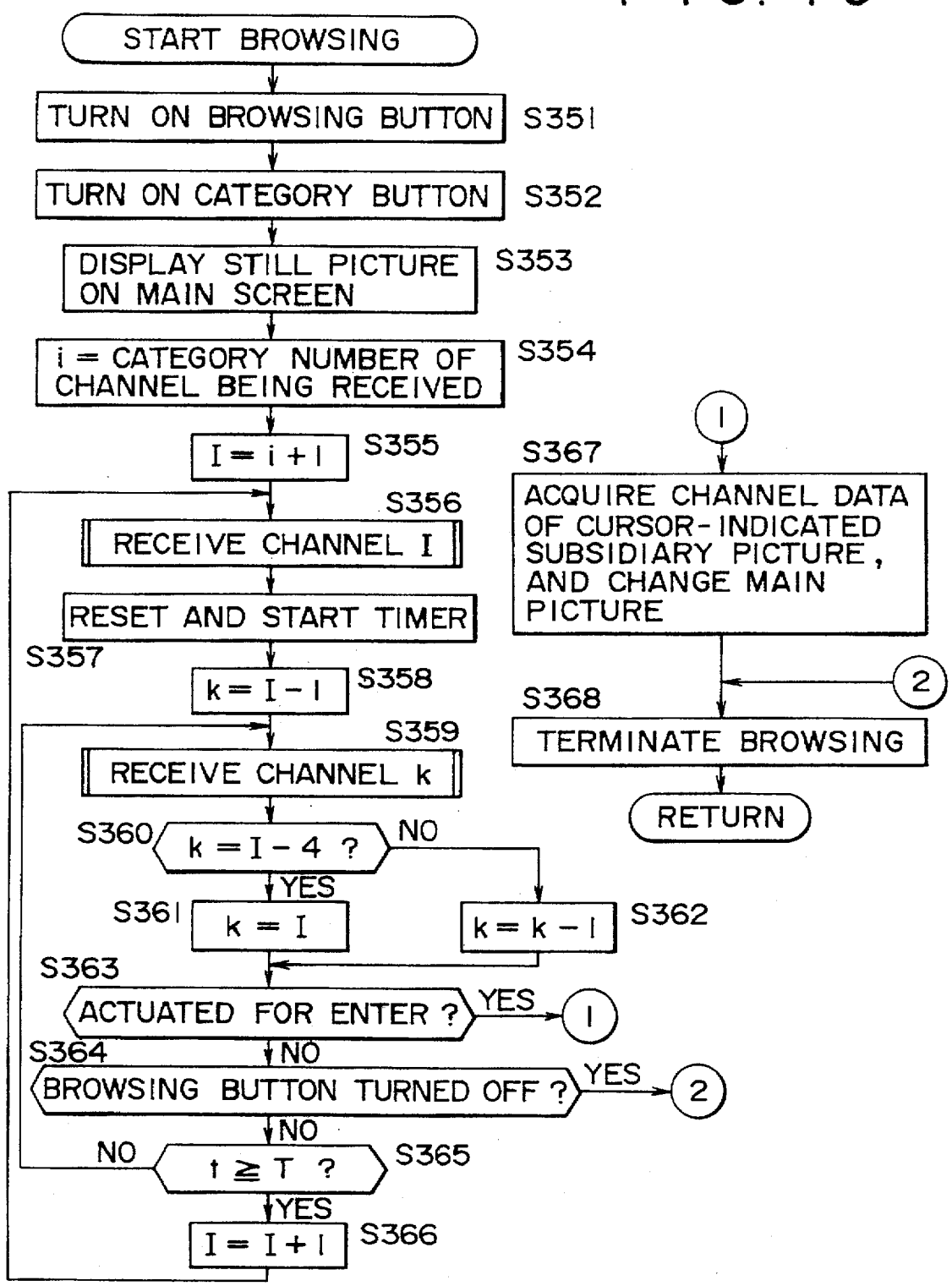
FIG. 70 is a flow chart for explaining a browsing process executed in a sixth embodiment.
Figure 71:
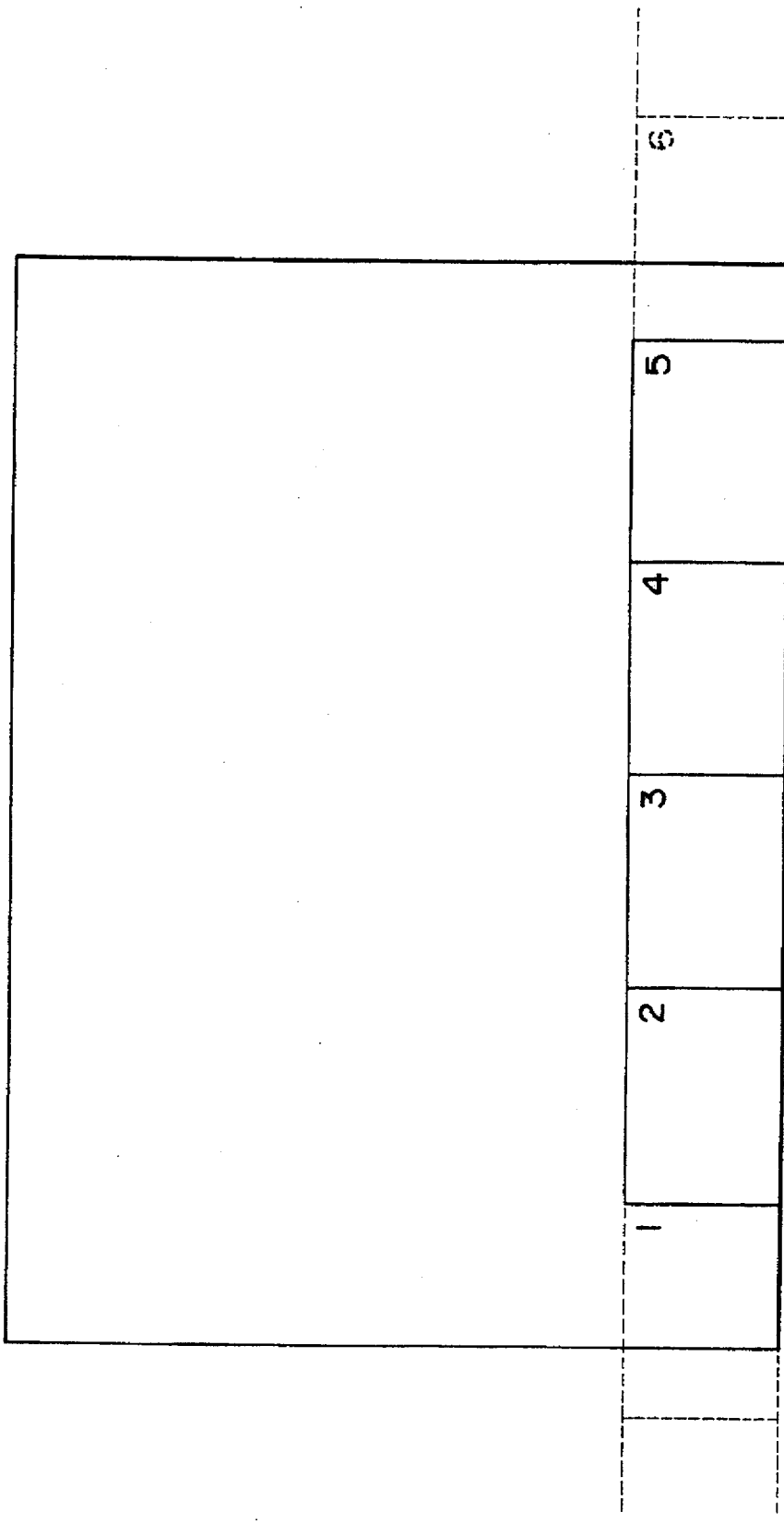
FIG. 71 shows another method of scrolling subsidiary pictures.

The processing in a flow chart of FIG. 70 is executed when displaying subsidiary pictures of each category by the use of the remote commander 5 shown in FIG. 60.

First the user turns on the browsing button switch 272 at step S351 and then turns on the category button switch 273 at step S352. In case the category button switch 273 is turned on in succession to the browsing button switch 272, the CPU 29 in the IRD 2 executes fundamentally the same processing as that shown in FIG. 47.

More specifically, the processing at steps S353 to S368 is fundamentally the same as that at steps S171 to S188 in FIG. 47. However, when the result of a decision at step S363 is negative to signify no actuation for enter, the operation does not proceed immediately to step S365 where a decision is made as to whether the measured time t of the timer has exceeded the preset time T or not, but the operation proceeds to step S364 where a decision is made as to whether the browsing button switch 272 has been actuated (turned off) or not. And if the result of this decision is negative to signify no turn-off of the browsing button switch 272, the operation proceeds to step S365, and thereafter the same processing as that shown in the flow chart of FIG. 47 is executed.

Meanwhile, if the result of the decision at step S364 signifies turn-off of the browsing button switch 272, the operation proceeds to step 368 to terminate the browsing.

The embodiment mentioned above is so constructed that, when subsidiary pictures are changed, merely the channel numbers displayed thereon are changed while the display positions of the subsidiary pictures are kept unchanged. However, it is possible to scroll the subsidiary pictures leftward or rightward by smoothly changing the display positions of the subsidiary pictures without fixing such display positions.

Figure 72:
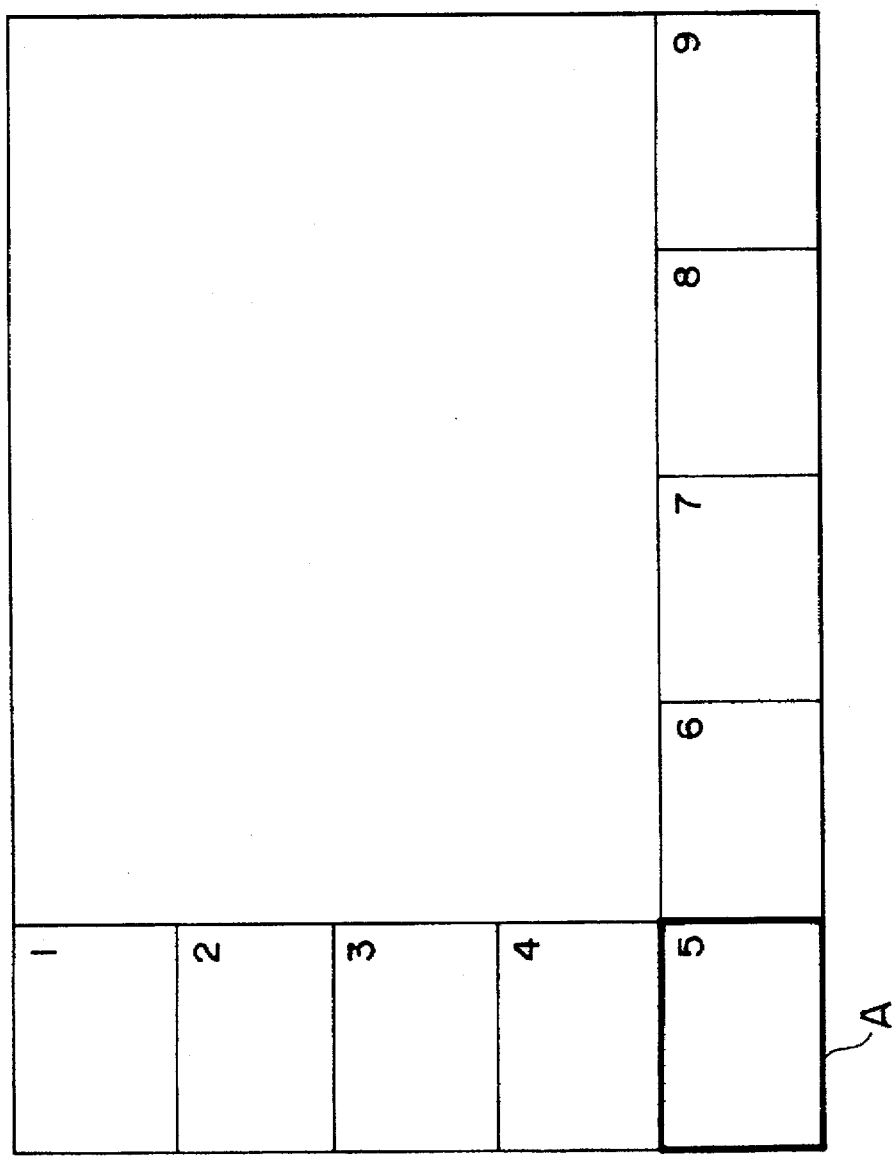
FIGS. 72 to 74 show other exemplary arrangements of subsidiary pictures.
Figure 73:
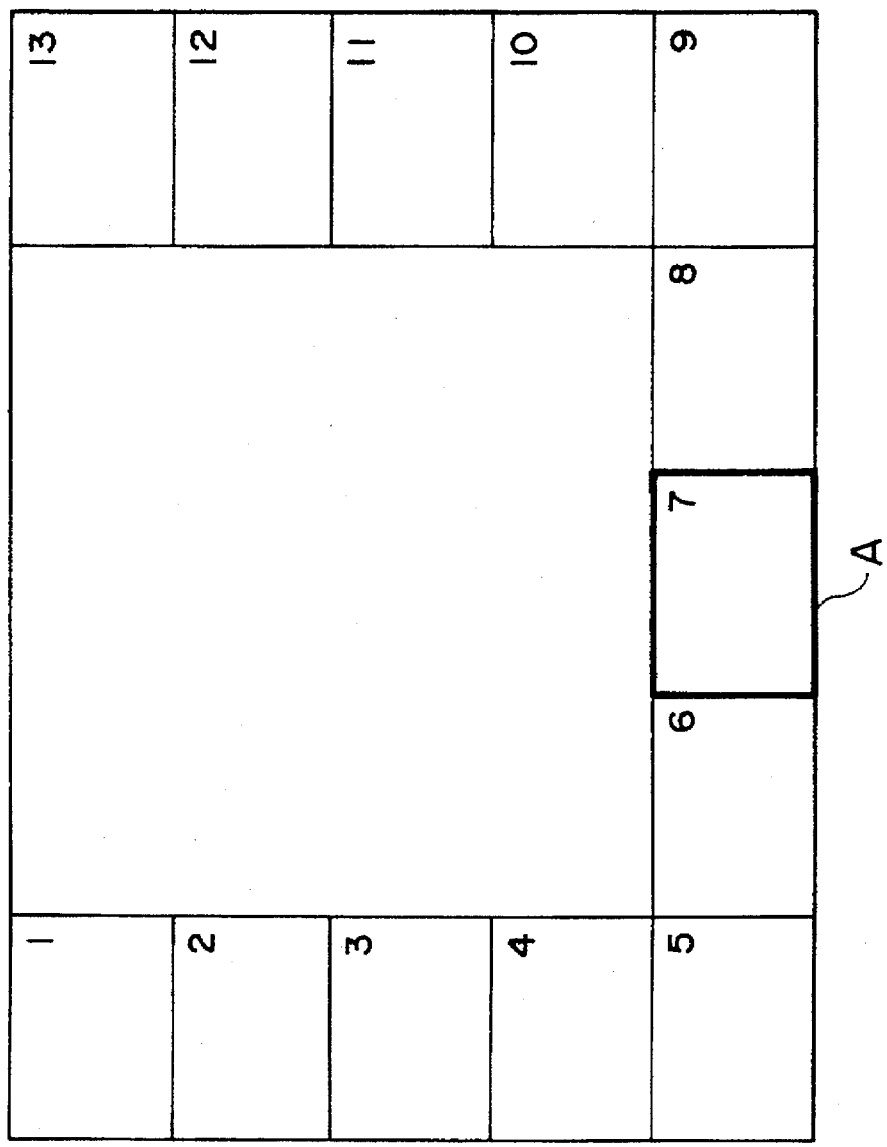
Figure 74:
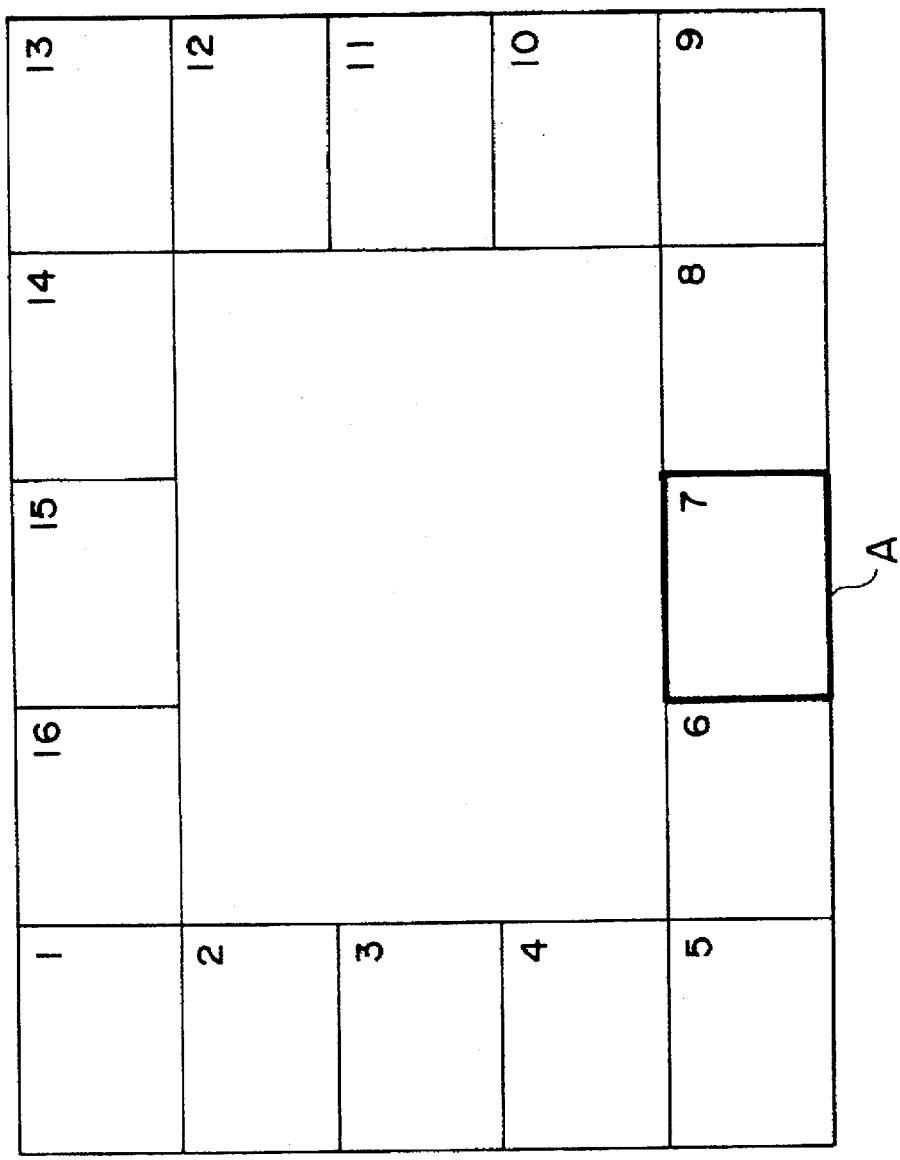

Although in the above embodiment the subsidiary pictures are displayed horizontally along the lower periphery of the CRT 4A, the subsidiary pictures may be displayed along both the left and lower peripheries in a shape of L as illustrated in FIG. 72, or may be displayed along the left, lower and right peripheries in a shape of U as illustrated in FIG. 73, or may be displayed along all the left, right, upper and lower peripheries of the screen as illustrated in FIG. 74.

In any of such cases, it is preferred that the initial display position of the cursor A (display position of the default) be on the center subsidiary picture. For example, this display position may be at the lower left corner in the embodiment of FIG. 72, or at the center of the lower periphery in the embodiment of FIG. 73, or at the center of the lower periphery in the embodiment of FIG. 23 or 74. Thus, the average shift distance of the cursor A can be minimized by initially positioning the cursor A substantially at the center of the display area of the plural subsidiary pictures.

Hereinafter an explanation will be given on another example of processing which displays subsidiary pictures in sequentially decreased sizes for realizing simultaneous watch of a greater number of subsidiary pictures while continuously keeping watch of a main picture. The details of such browsing will be described below with reference to FIGS. 75 to 78.

Figure 75:
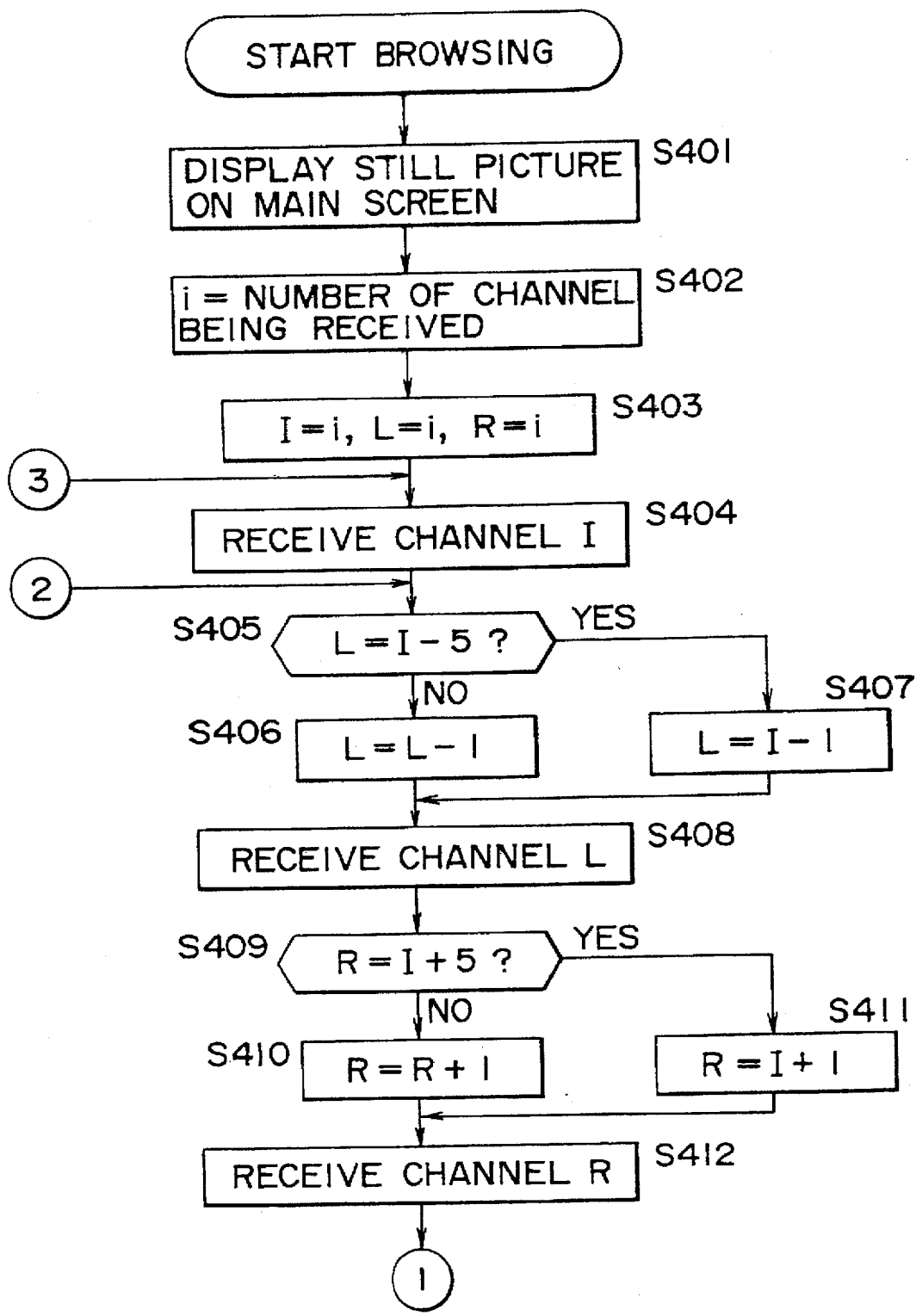
FIG. 75 is a flow chart for explaining a browsing process executed in a seventh embodiment.

At step S401 in a flow chart of FIG. 75, the CPU 29 controls the picture-in-picture processor 45 and, at the timing of turn-on of a browsing button icon, inhibits renewal of the main picture data stored in the internal memory, thereby displaying a still picture on the main screen.

However, similarly to the aforementioned case, it is not exactly necessary to display a still picture on the main screen when a sufficient time for receiving subsidiary pictures cannot be ensured. In such a case, the process of step S40 is omitted. A pseudo moving picture, instead of a still picture, may be displayed on the main screen as on any of subsidiary pictures, similarly to the foregoing example.

Subsequently the operation proceeds to step S402, where a parameter i is set to the channel number of the main picture being now receivedby the main picture tuner 21A. At step S403, each of parameters I, L and R is set to the value i which denotes the number of the channel being currently received.

Figure 79:
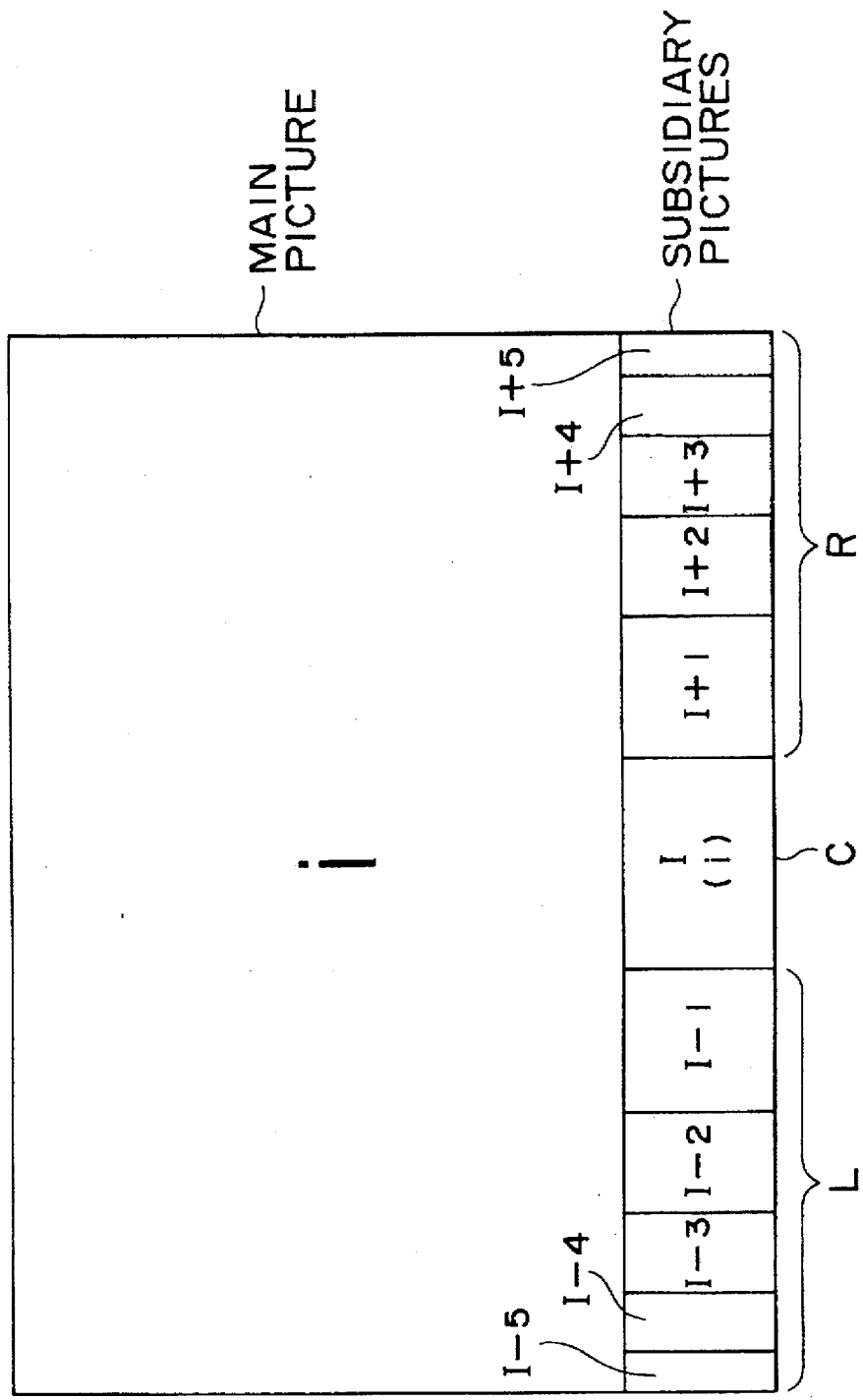
FIG. 79 is a diagram for explaining an arrangement of subsidiary pictures.

In this embodiment, fundamentally a total of eleven subsidiary pictures are displayed horizontally under a main picture along a lower periphery of the CRT 4A of the monitor unit 4, as shown in FIG. 79.

The center one of such eleven subsidiary pictures is that of the channel I and is displayed in the greatest size of all. The five subsidiary pictures of channels I+1 to I+5 displayed successively on the right side are gradually decreased in size toward the right end. Similarly, the five subsidiary pictures of channels I-1 to I-5 displayed on the left side of the center subsidiary picture of the channel I are gradually decreased in size toward the left end.

After termination of step S403, the operation proceeds to step S404 to execute a process for receiving the channel I. The CPU 29 controls the subsidiary picture receiving tuner 21B instead of the tuner 21A which has been receiving the broadcast channel of the main picture until then, thereby enabling the tuner 21B to receive the channel I. The signal of the channel I thus received by the tuner 21B is demodulated by the QPSK demodulator circuit 22B and then is supplied to the error corrector circuit 23B, and the corrected signal therefrom is supplied to the demultiplexer 24.

The video signal outputted from the demultiplexer 24 is supplied to the MPEG video decoder 25B of the decoding section 44B, and the decoded signal is supplied to the picture-in-picture processor 45 to be stored as subsidiary picture data of the channel I. This picture of the channel I corresponds to the subsidiary picture shown at the center in FIG. 79.

Subsequently the operation proceeds to step S405, where a decision is made as to whether the parameter L denoting the channel numbers of the five subsidiary pictures displayed on the left side of the center subsidiary picture of the channel I as shown in FIG. 79 is equal to the channel number I-5 at the left end. Since L=i and it is not I-5 in this case, the operation proceeds to step S406 where the parameter L is decremented by 1, so that L=i-1 in this case. Then the operation proceeds to step S408 to receive the channel L (i.e., channel i-1 in this case). The received signal of the channel L is supplied to the picture-in-picture processor 45 similarly to the aforementioned signal of the channel I and is stored as the subsidiary picture data in the internal memory.

Thereafter the operation proceeds to step S409, where a decision is made as to whether the parameter R denoting the channel numbers of the five subsidiary pictures displayed on the right side of the center subsidiary picture of the channel I as shown in FIG. 79 is equal to the channel number I+5 at the right end. Since R=i and it is not I+5 in this case, the operation proceeds from step S409 to step S410 where the parameter R is incremented by 1, so that R=i+1 in this case. Then the operation proceeds to step S412 to receive the channel R (i.e., channel i+1 in this case). The data corresponding to the received signal of the channel R is also supplied to the picture-in-picture processor 45 and is stored as the subsidiary picture data in the internal memory.

Next the operation proceeds to step S413 where a decision is made as to whether the parameter R is equal to I+5 or not. More specifically, a decision is made as to whether the parameter R is equal to the channel number of the rightmost subsidiary picture. Since the result of this decision is negative in this case, the operation returns to step S405, and the processing subsequent thereto is executed repeatedly.

At step S405, a decision is made again as to whether the parameter L is equal to I-5 or not. Since L=I-1 in this case, the operation proceeds to step S406 where the parameter L is further decremented by 1, so that L=I-2. Then the operation proceeds to step S408 to receive the channel L (i.e., channel I-2). This signal is also supplied to the picture-in-picture processor 45 and is stored as the subsidiary picture data in the internal memory.

Subsequently the operation proceeds to step S409 where a decision is made as to whether the parameter R is equal to I+5 or not. Since R=I+1 in this case, the operation proceeds to step S410 where the parameter R is incremented by 1, so that R=I+2. Then the operation proceeds to step S412 to receive the channel R (i.e., channel I+2). The received signal is supplied to the picture-in-picture processor 45 and is stored as the subsidiary picture data in the internal memory.

Thereafter the operation proceeds again to step S413 where a decision is made as to whether the parameter R is equal to I+5 or not. Since R=I+2 in this case, the operation returns again to step S405, and the similar processing is executed repeatedly.

Due to such repeated execution of the processing at steps S405 to S413, there are stored, in the picture-in-picture processor 45, the center subsidiary picture of the channel I in FIG. 79, also the five subsidiary pictures of the channels I-1 to I-5 displayed on the left of the center subsidiary picture, and further the five subsidiary pictures of the channels I+1 to I+5 displayed on the right thereof.

Figure 80:
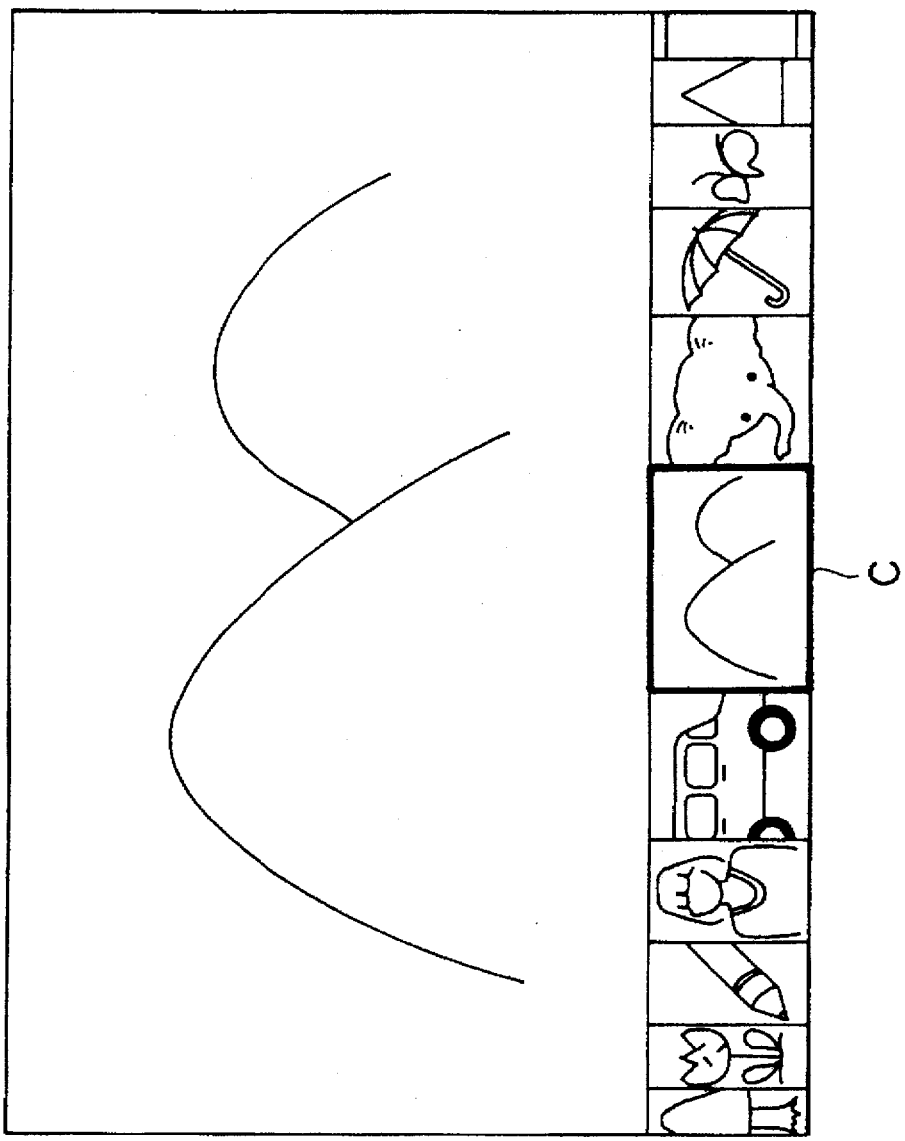
FIG. 80 shows a display example of subsidiary pictures.

Thus, the data of a total of eleven subsidiary pictures are stored in the picture-in-picture processor 45, and such picture data are read out therefrom and displayed on the monitor unit 4, whereby pictures such as those shown in FIG. 80 for example are displayed on the monitor unit 4. As illustrated, the picture-in-picture processor 45 generates the subsidiary pictures in a manner that the sizes (horizontal widths) thereof become gradually smaller (narrower) toward the left and right ends (wherein merely a central partial range of each subsidiary picture is displayed).

At this time, the MPEG video decoder 25B displays a cursor C on the center subsidiary picture.

Thus, when the rightmost subsidiary picture is received at step S412, the result of the decision at step S413 signifies R=I+5, so that the operation proceeds from step S413 to steps S414, S415 and S416, where a decision is made as to whether the manipulator 52 of the remote commander 5 has been actuated leftward, rightward or for enter. In the case no such actuation, the operation returns from step S416 to step S404 to execute again the process for receiving the channel I of the center subsidiary picture.

At step S405, a decision is made as to whether the parameter L is equal to I-5 or not. Since the parameter L is equal to I-5 in this case, the operation proceeds to step S 407 where the parameter L is set to I-1. More specifically, the parameter L is set to the number of a left channel adjacent to the channel I of the center subsidiary picture. And the operation proceeds to step S408 to receive the channel L (i.e., channel I-1).

Subsequently the operation proceeds to step S409 where a decision is made as to whether the parameter R is equal to I+5 or not. Since the parameter R is equal to I+5 in this case, the operation proceeds to step S411 where the parameter R is set to I+1, i.e., the number of a right channel adjacent to the center channel I. And at step S412, the channel R (i.e., channel I+1) is received.

Thereafter the operation proceeds to step S413 where a decision is made as to whether the parameter R is equal to I+5 or not. Since the result of this decision is negative in this case, the operation returns to step S405, and the processing subsequent thereto is executed repeatedly.

Due to such repeated execution of the processing at steps S404 to S415 as described, the eleven subsidiary pictures are updated successively to the newest ones and are therefore displayed as pseudo moving pictures.

If the result of the decision at step S414 signifies that the manipulator 52 has been actuated leftward, the operation proceeds to step 419 where the time T of the timer is calculated on the basis of the following equation:

$$T = A/LL + B$$

In the above equation, A and B are constants, and LL denotes the leftward rotational quantity of the manipulator 52. Therefore, the time T is rendered either shorter or longer in accordance with an increase or a decrease of the leftward rotational quantity of the manipulator 52.

After termination of step S419, the operation proceeds to step S421 where the CPU 29 resets the timer and starts it immediately. At step S422, each of the parameters I, L and R is set to i+1, that is, to the adjacent channel displayed on the right side of the center subsidiary picture and greater in number than the channel displayed on the main picture (center subsidiary picture). Then the operation proceeds to step S423 to receive the channel I set at step S422. Consequently, on the center subsidiary screen of the channel I, there is displayed the picture of the channel i+1 displayed until then on the right side of the center subsidiary picture.

Next the operation proceeds to step S424 where a decision is made as to whether the parameter L is equal to I-5, i.e., whether it is equal to the number of the leftmost channel. Since L=i+1 in this case, the operation proceeds to step S425 where the parameter L is decremented by 1, that is, L=i. Then the operation proceeds to step S427 to receive the channel L (i.e., channel i), whereby the picture of the channel i is displayed on the adjacent subsidiary screen on the left side of the center one.

Subsequently the operation proceeds to step S428 where a decision is made as to whether the parameter R is equal to I+5, i.e., whether it is set to the channel number of the rightmost subsidiary picture. Since R=i+1 in this case, the operation proceeds to step S429 where the parameter R is incremented by 1, that is, R=i+2. Then the operation proceeds to step S431 to receive the channel R (i.e., channel i+2), whereby the picture of the channel i+2 is displayed on the adjacent subsidiary screen on the right side of the center one.

Thereafter the operation proceeds to step S432 where a decision is made as to whether the parameter R is set to the channel number of the rightmost subsidiary picture. Since R=I+1 in this case, the operation returns to step S424, and the processing subsequent thereto is executed repeatedly.

In the first-cycle processing, L=I−5 and R=I+5, so that the operation proceeds from step S424 to step S426 where the parameter L is set as L=I−1. Further the operation proceeds from step S428 to step S430 where the parameter R is set as R=I+1, thereby generating again adjacent subsidiary pictures successively on the left and right sides of the center subsidiary picture.

In the manner described above, a subsidiary picture of the channel i+1 is displayed at the center, and subsidiary pictures of the channels i to i−4 are displayed on the left side thereof, and further subsidiary pictures of the channels i+2 to i+6 are displayed on the right side thereof.

Figure 81:
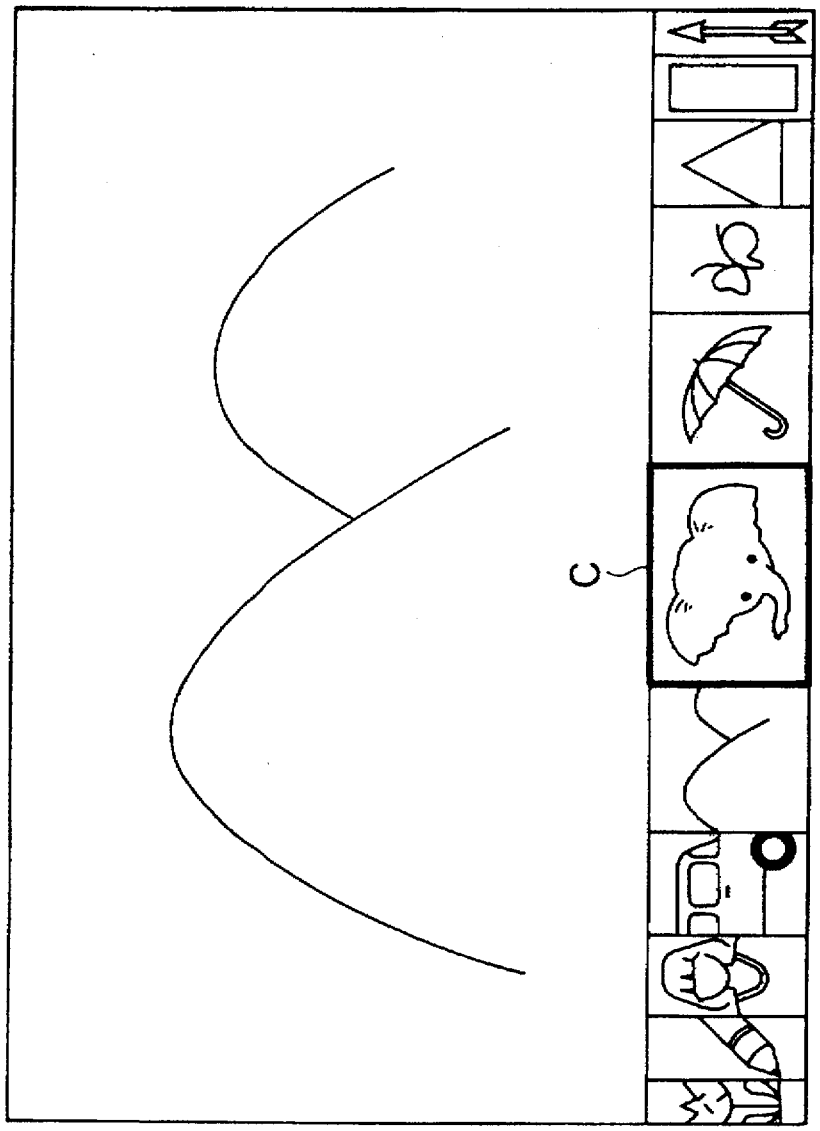
FIGS. 81 and 82 are diagrams for explaining how subsidiary pictures are scrolled.

Therefore, when the manipulator 52 is actuated leftward in a state of FIG. 80 for example, the pictures displayed on the screen of the monitor unit 4 are so changed as illustrated in FIG. 81. That is, each of the subsidiary pictures is scrolled leftward to the position of the adjacent one.

If the result of the decision at step S432 signifies that the parameter R is equal to I+5 (when eleven subsidiary pictures are displayed), the operation proceeds to step S433, where a decision is made as to whether the measured time t of the timer started at step S421 is equal to or larger in value than the time T preset at step S419. And if the result of this decision signifies that t is smaller than T, the operation returns to step S423, and the processing subsequent thereto is executed repeatedly. Thus, the center subsidiary picture and the five subsidiary pictures on each of the left and right sides thereof are successively updated until a lapse of the preset time T and are thereby displayed as pseudo pictures.

Meanwhile, if the decision at step S433 signifies that the measured time t of the timer has become equal to or exceeded the time T preset at step S419, the operation proceeds to step S434 where another decision is made as to whether the manipulator 52 is still actuated leftward. And if the result of this decision signifies a continuous leftward actuation, the operation proceeds to step S435 where the parameter I is incremented by 1 (I=i+2 in this case). Then the operation returns again to step S423, and the processing subsequent thereto is executed repeatedly.

Consequently at step S423, a picture of the channel i+2 is displayed on the center subsidiary screen. And pictures of the channels i+1 to i−3 are displayed on the left side thereof, while pictures of the channels i+3 to i+7 are displayed on the right side thereof.

As mentioned, the time T preset at step S419 is reduced in accordance with an increase of the rotational quantity of the manipulator 52. Therefore the pictures on the subsidiary screens are successively scrolled leftward at a higher speed in accordance with an increase of the leftward rotational quantity of the manipulator 52. To the contrary, the scroll speed of the pictures is rendered lower with a decrease of the rotational quantity of the manipulator 52.

If the result of the decision at step S434 signifies no leftward actuation of the manipulator 52, the operation returns to step S414 and the processing subsequent thereto is executed repeatedly. In this case, the leftward scroll of the subsidiary pictures is brought to a halt.

Meanwhile, if the result of the decision at step S415 signifies a rightward actuation of the manipulator 52, the operation proceeds to step S420 where the time T is calculated on the basis of the following equation:

$$T = A/LR + D$$

In the above equation, LR denotes the rightward rotational quantity of the manipulator 52. Therefore, the time T is rendered either shorter or longer in accordance with an increase or a decrease of the rightward rotational quantity of the manipulator 52, as in the case at step S419.

Thereafter the operation proceeds to step S440 where the CPU 29 resets the timer and starts it immediately. And at step S441, each of the parameters I, L and R is set to i−1, that is, to the channel number of the subsidiary picture displayed on the left side of the center subsidiary picture.

Then the operation proceeds to step S442 to receive the channel I (i.e., channel i−1 in this case) set at step S441. Consequently, the picture of the channel i−1 is displayed on the center subsidiary screen.

Next the processing at steps S443 to S451 is executed. The processing at these steps is the same as the aforementioned one at steps S424 to S432. And due to execution of such processing, five subsidiary pictures are displayed on the left side of the center subsidiary picture, and also five subsidiary pictures are displayed on the right side thereof.

After a total of such eleven subsidiary pictures are thus displayed, the operation proceeds from step S451 to step S452, where a decision is made as to whether the measured time t of the timer is equal to or greater in value than the time T preset at step S240. And if the result of this decision signifies that the measured time t is smaller than the preset time T, the operation returns to step S442, and the processing subsequent thereto is executed repeatedly. Due to such repeated execution of the processing at steps S442 to S452, the pictures on the eleven subsidiary screens are successively updated and are therefore displayed as pseudo moving pictures.

In case the result of the decision at step S452 signifies that the measured time t has exceeded the preset time T, the operation proceeds to step S453 where another decision is made as to whether the rightward actuation of the manipulator 52 is still kept on. And if the result of this decision is affirmative, the parameter I is decremented by 1 (i.e., I=i−2 in this case) at step S454. Then the operation returns to step S442, and the processing subsequent thereto is executed repeatedly, whereby the channel to be displayed on the center subsidiary screen is changed to the subsidiary picture displayed until then on the left adjacent screen. And the pictures of the adjacent channels on the left and right sides thereof are successively displayed.

Consequently, the subsidiary pictures are scrolled and displayed rightward at a higher speed in accordance with an increase of the rightward rotational quantity of the actuated manipulator 52.

Figure 82:
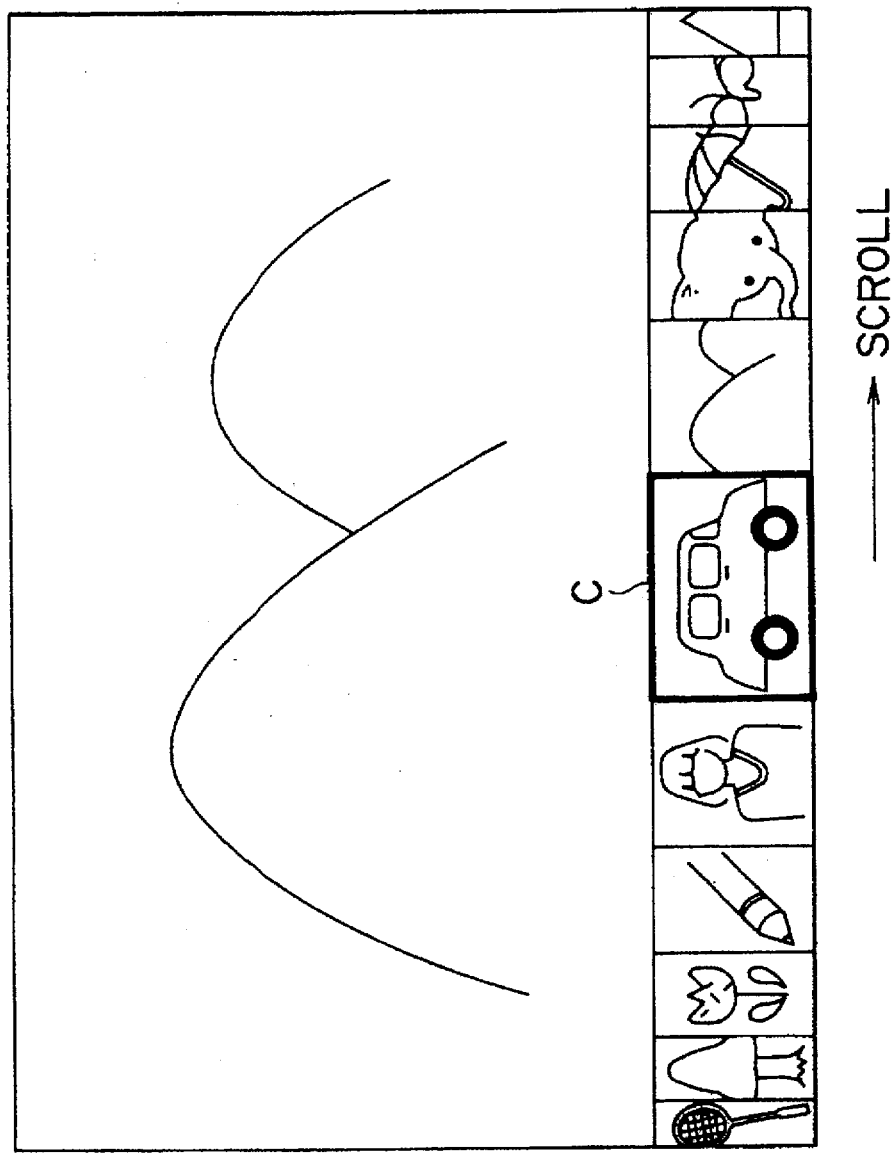

Meanwhile, if the result of the decision at step S453 signifies no rightward actuation of the manipulator 52, the operation returns to step S414, and the processing subsequent thereto is executed. Therefore, when the manipulator 52 is actuated rightward in the state of FIG. 80 for example, the displayed subsidiary pictures on the screen of the monitor unit 4 are so changed as illustrated in FIG. 82. It is thus seen therefrom that the eleven subsidiary pictures are scrolled rightward by a space of each picture.

If the result of the decision at step S416 signifies that the manipulator 52 has been actuated for enter, the operation proceeds to step S417 to execute a process for acquiring the channel data of the cursor-indicated subsidiary picture and displaying the picture of that channel on the main screen.

More specifically, the CPU 29 acquires the channel data of the subsidiary picture indicated by the cursor at that time, and controls the tuner 21A to receive the acquired channel data. Further the CPU 29 controls the tuner 21B to terminate reception of the subsidiary pictures.

Subsequently the operation proceeds to step S418 to terminate the browsing.

Figure 83:
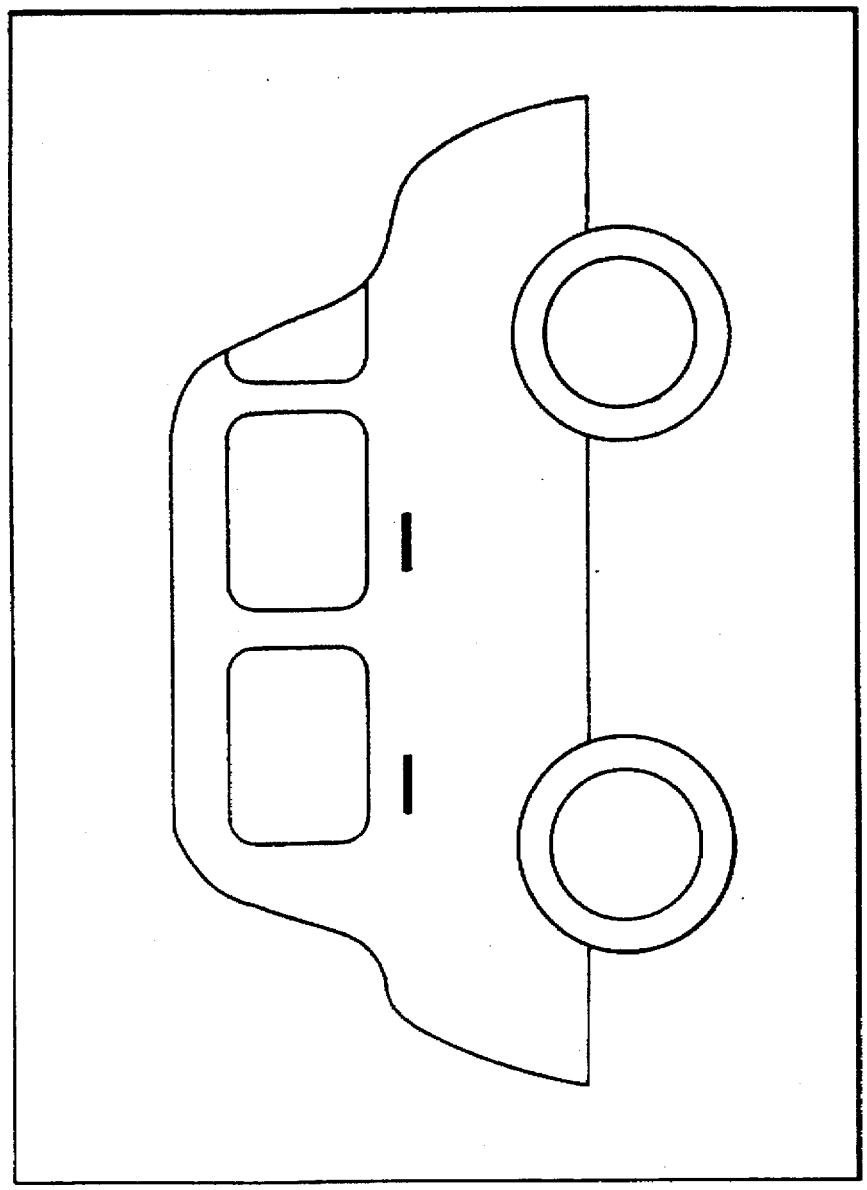
FIG. 83 is a diagram for explaining a display example when a subsidiary picture is selected.

As described above, when the manipulator 52 is actuated for enter in the state of FIG. 82 for example, the pictures displayed on the monitor unit 4 are changed from the state of FIG. 82 to that of FIG. 83. In this embodiment, the picture of a car on the center subsidiary screen indicated by the cursor C is displayed on the main screen.

Although the above embodiment is so contrived that the subsidiary pictures are scrolled without a shift of the cursor C, it may be modified to shift the cursor C as well. FIGS. 84 to 87 are flow charts showing the processing executed in this case.

Figure 76:
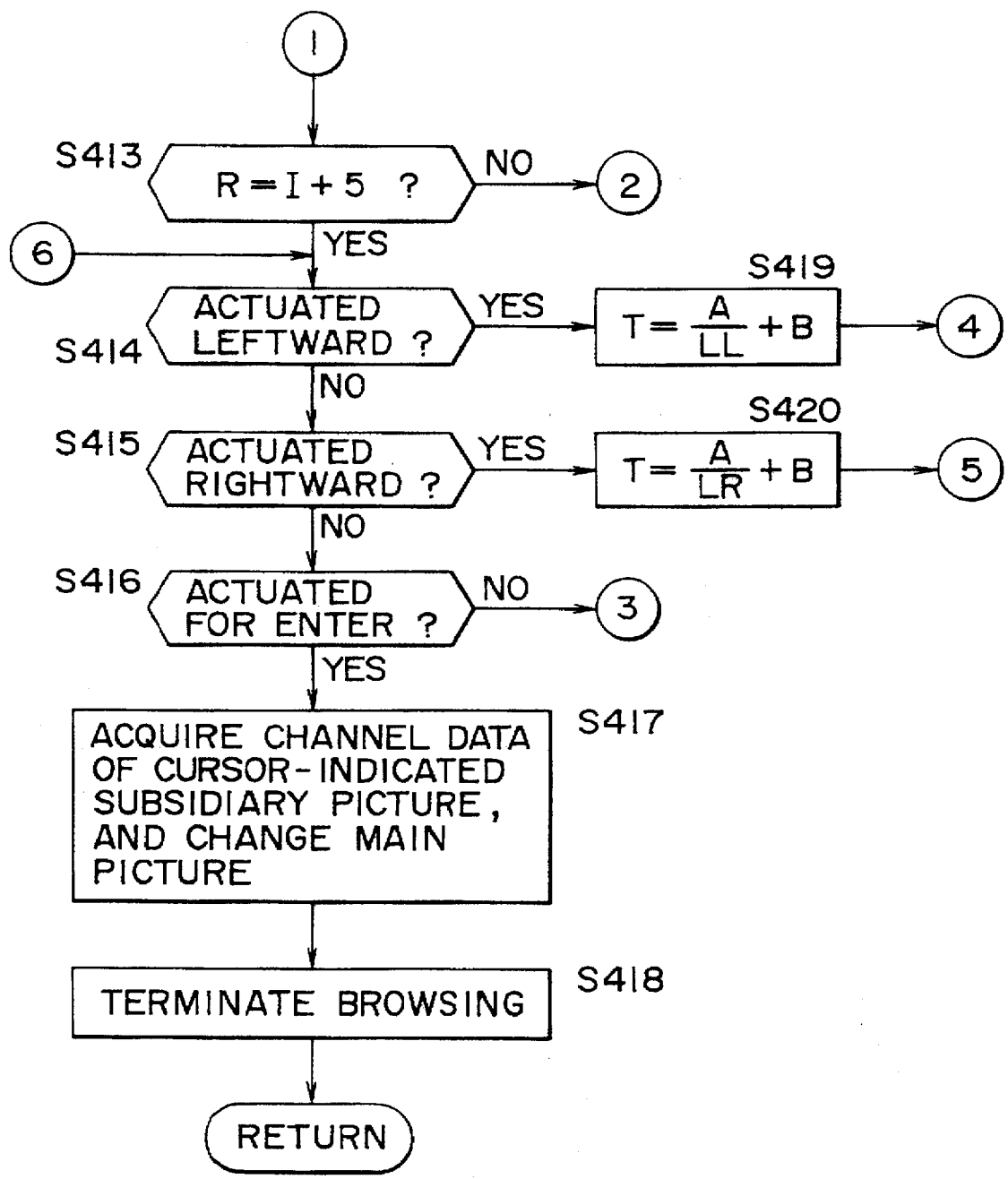
FIG. 76 is a flow chart continued from FIG. 75.
Figure 77:
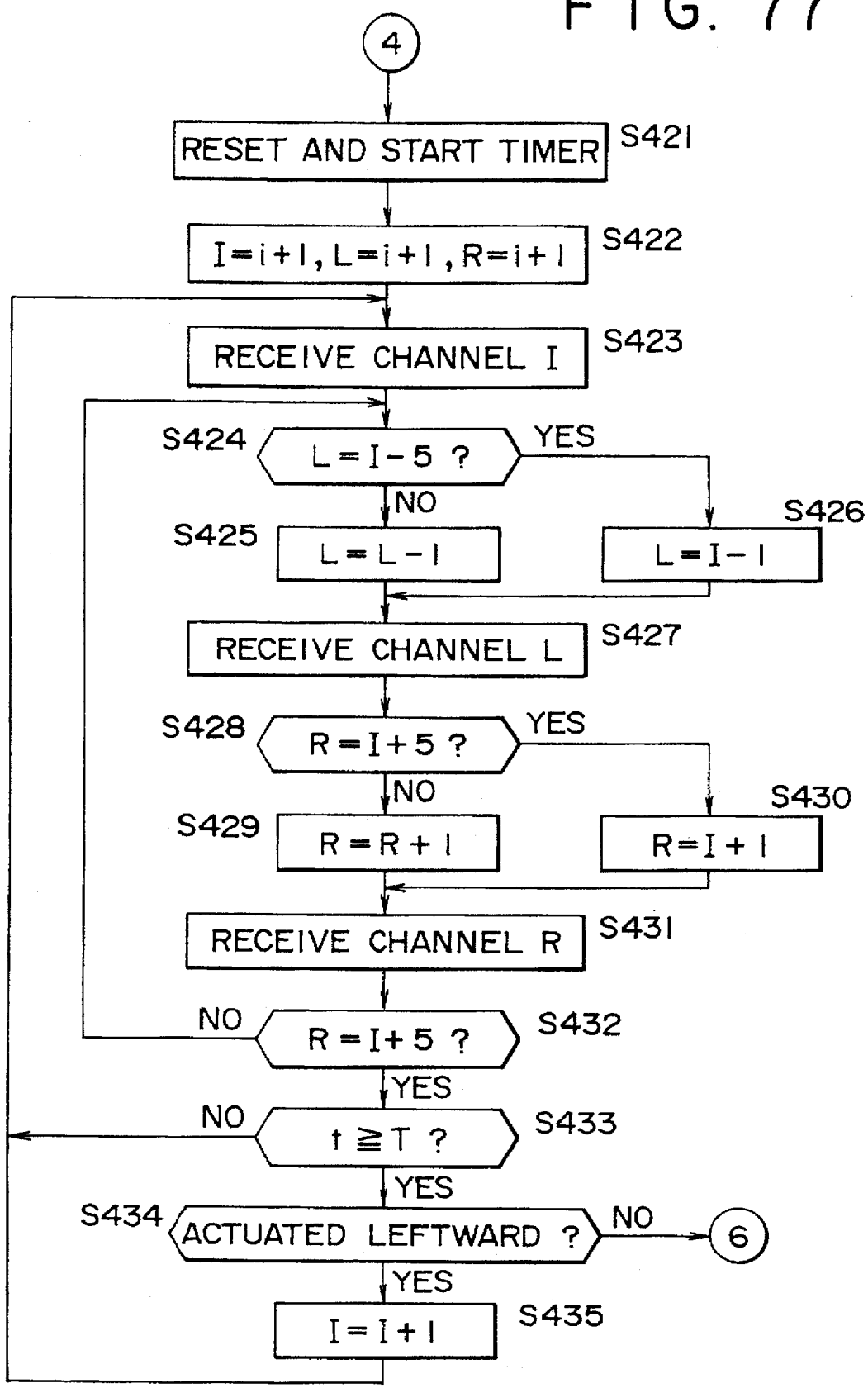
FIG. 77 is a flow chart continued from FIG. 76.
Figure 78:
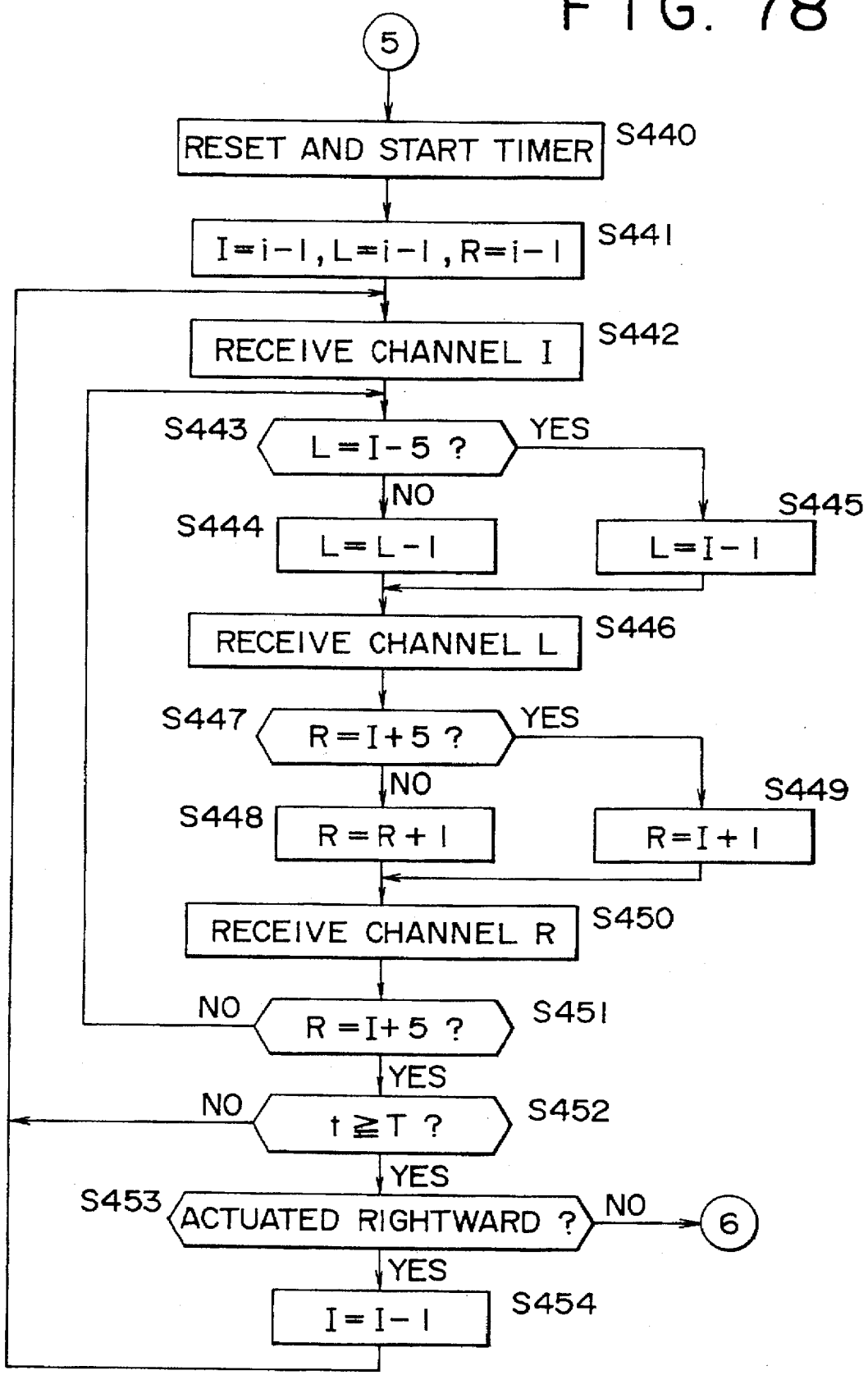
FIG. 78 is a flow chart continued from FIG. 77.
Figure 84:
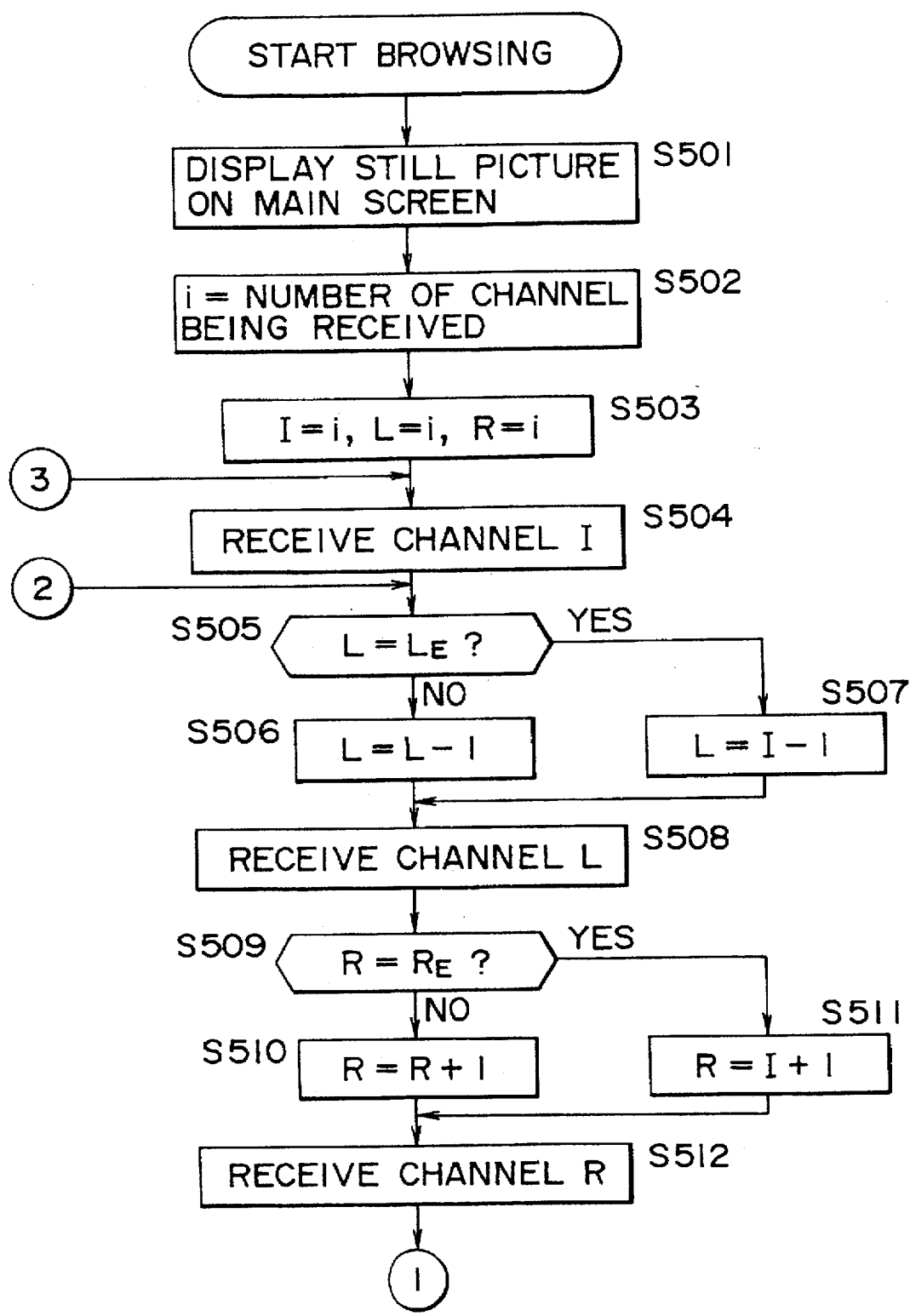
FIG. 84 is a flow chart for explaining a browsing process executed in an eighth embodiment.
Figure 85:
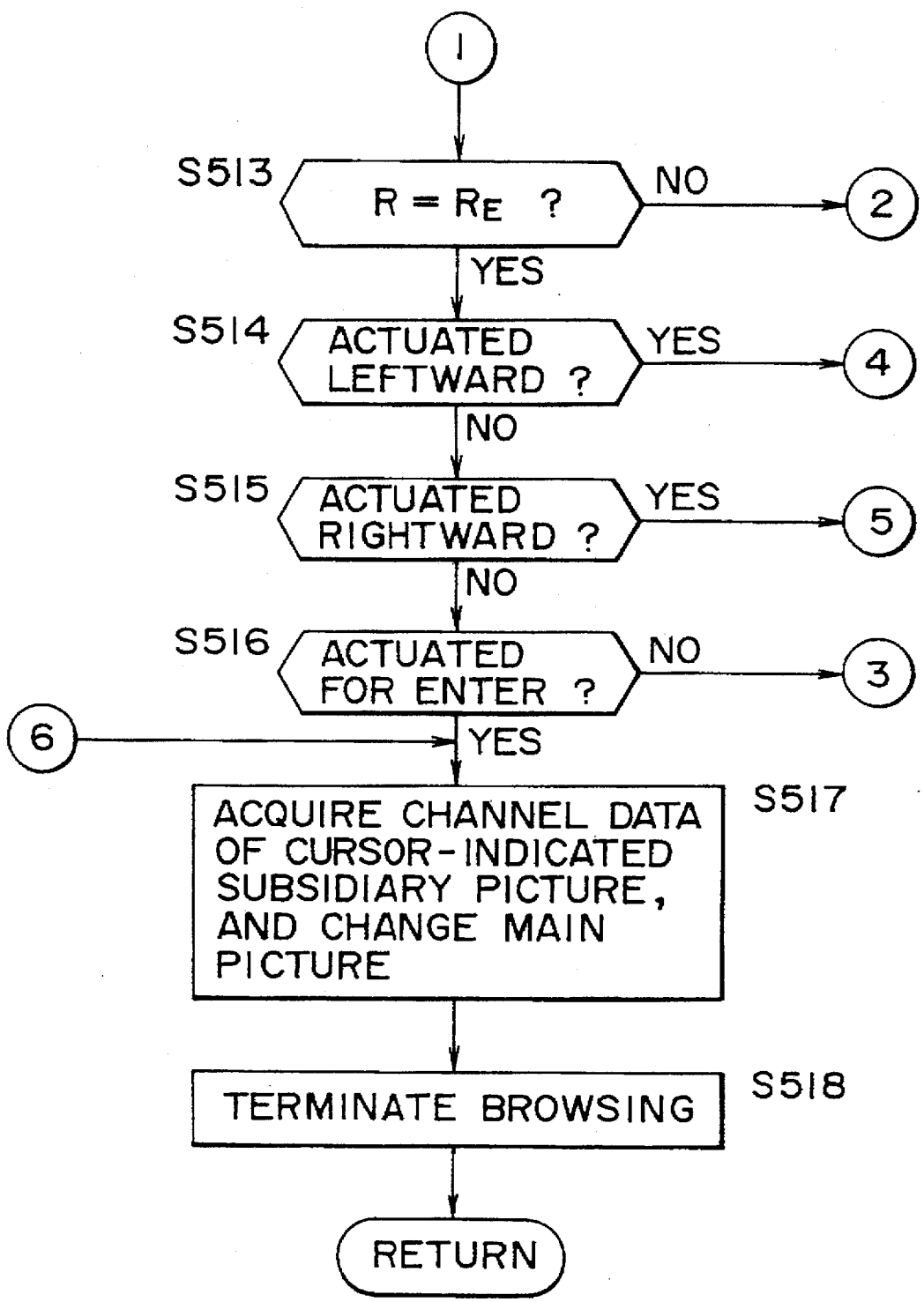
FIG. 85 is a flow chart continued from FIG. 84.
Figure 86:
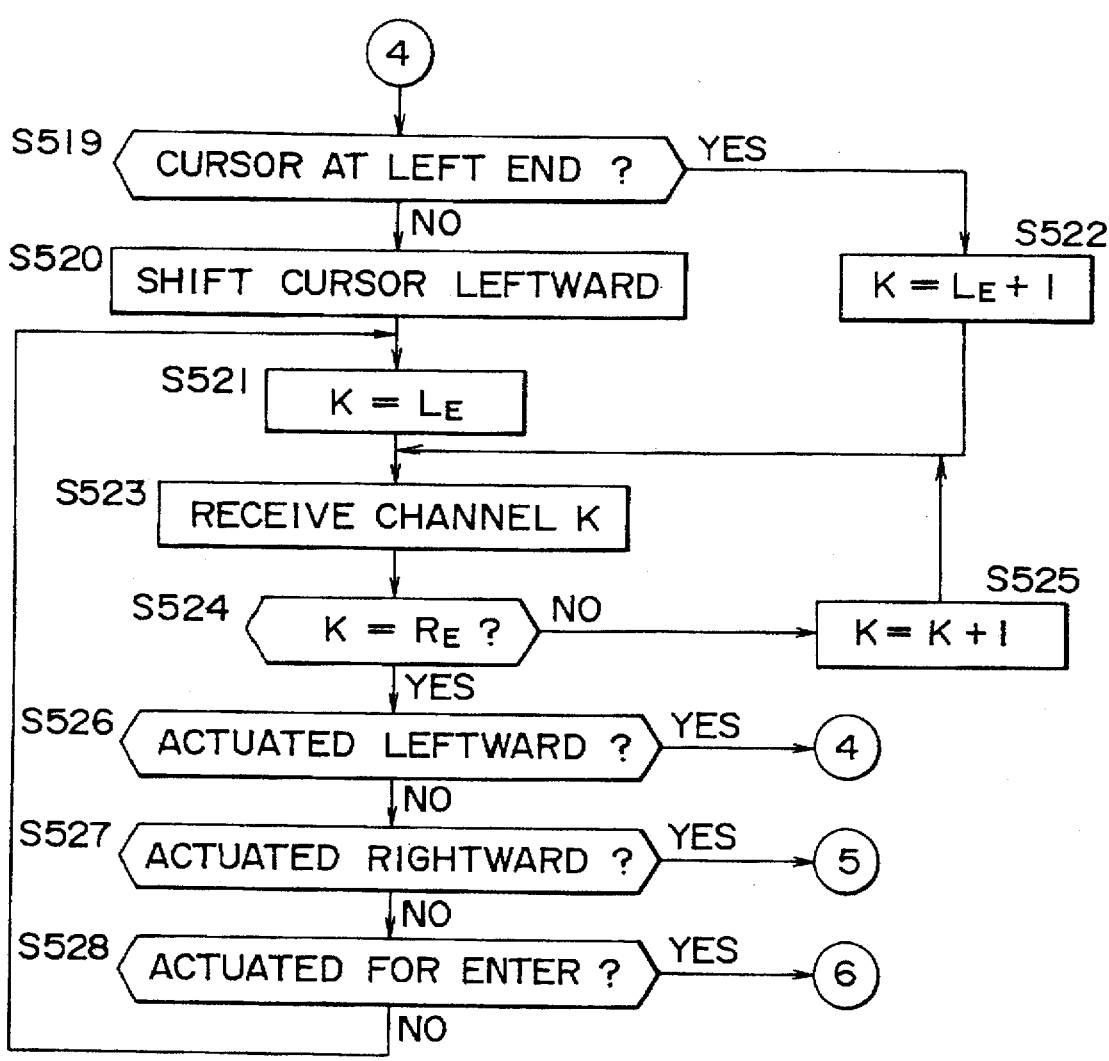
FIG. 86 is a flow chart continued from FIG. 85.
Figure 87:
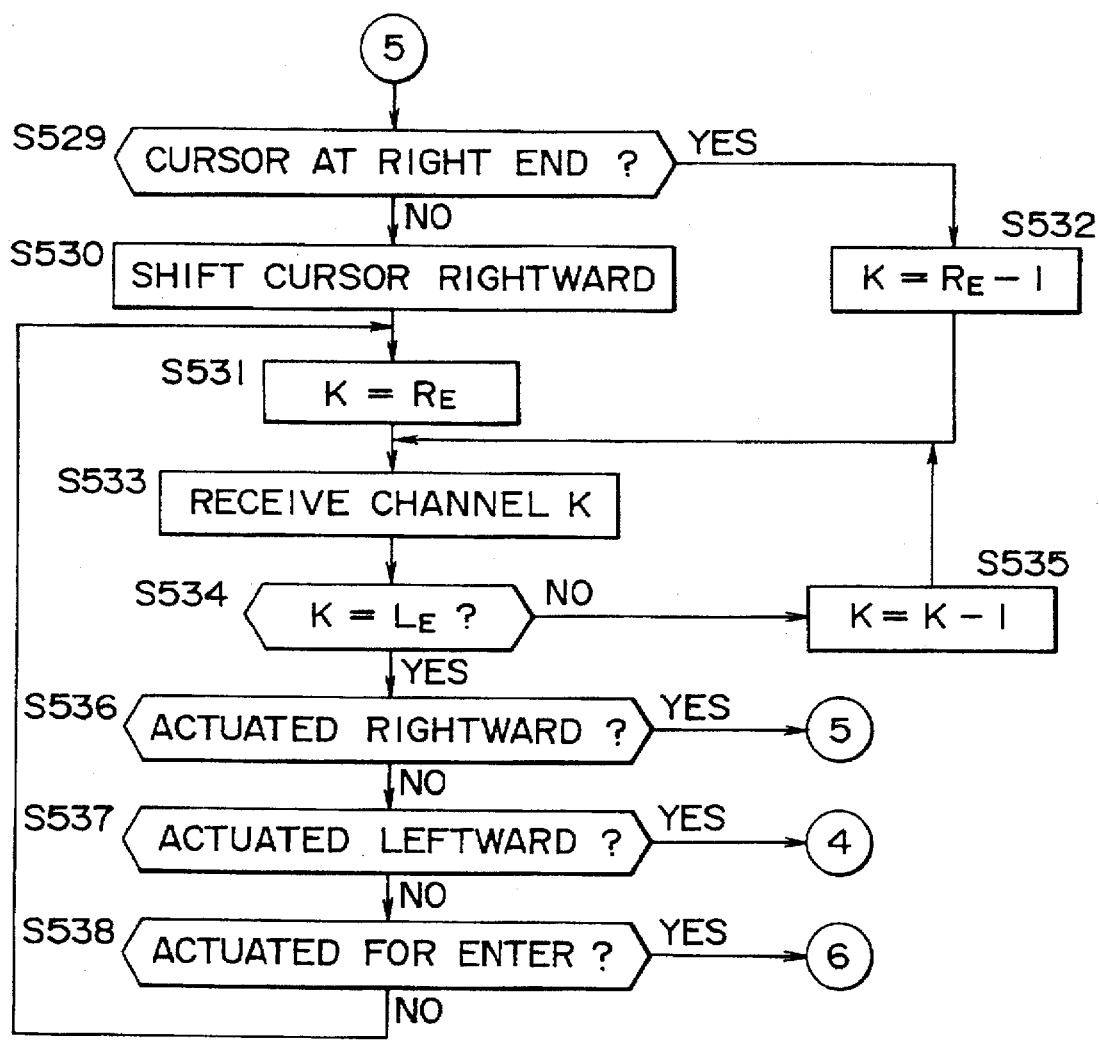
FIG. 87 is a flow chart continued from FIG. 86.

The processing at steps S501 to S518 in FIGS. 84 and 85 corresponds fundamentally to the one executed at steps S401 to S418 in FIGS. 75 and 76. However, differently from the foregoing embodiment where the channel number of the leftmost subsidiary picture is denoted by I−5 at step S405 in FIG. 75, this channel number is denoted by LE at step S505 in FIG. 84. Because, in the processing shown in FIGS. 84 to 87, the number of subsidiary pictures displayed on the left side of the largest-size center subsidiary picture is not exactly limited to five, so that the leftmost channel number is denoted by LE.

For the same reason, differently from the foregoing embodiment where the channel number of the rightmost subsidiary picture is denoted by I+5 at step S409 in FIG. 75 and at step S413 in FIG. 76, this channel number is denoted by RE at step S509 in FIG. 84 and at step S513 in FIG. 85. Because, in this embodiment, the number of subsidiary pictures displayed on the right side of the largest-size center subsidiary picture is not exactly limited to five, so that the rightmost channel number is denoted by RE.

However, there exists substantially no essential difference between the two embodiments except the numbers of subsidiary pictures. Therefore, by execution of the processing at steps S501 to S518, as in the foregoing example at steps S401 to S418 in FIGS. 75 and 76, the center subsidiary picture of the channel I is displayed in the largest size, and five subsidiary pictures of the channels I−1 to I−5 are displayed on the left side thereof, and further five subsidiary pictures of the channels I+1 to I+5 are displayed on the right side thereof. And unless the manipulator 52 is actuated, such subsidiary pictures are successively updated and are therefore displayed as pseudo moving pictures. When the manipulator 52 is actuated for enter, the subsidiary picture indicated by the cursor C is displayed on the main screen.

Meanwhile, if the result of the decision at step S514 in FIG. 85 signifies that the manipulator 52 has been actuated leftward, the operation proceeds to step S519, where the CPU 29 makes another decision as to whether the cursor C is positioned on the leftmost subsidiary picture or not. And if the result of this decision signifies that the cursor C is not positioned at the left end, the operation proceeds to step S520 to execute a process for shifting the cursor C leftward. In this case, the subsidiary picture indicated by the cursor C is scrolled simultaneously with a leftward shift of the cursor C.

Subsequently the operation proceeds to step S521, where a parameter K is set to the channel number LE of the subsidiary picture displayed at the leftmost position. Then the operation proceeds to step S523 to execute a process for receiving the channel K (i.e., channel LE) set at step S521.

Figure 89:
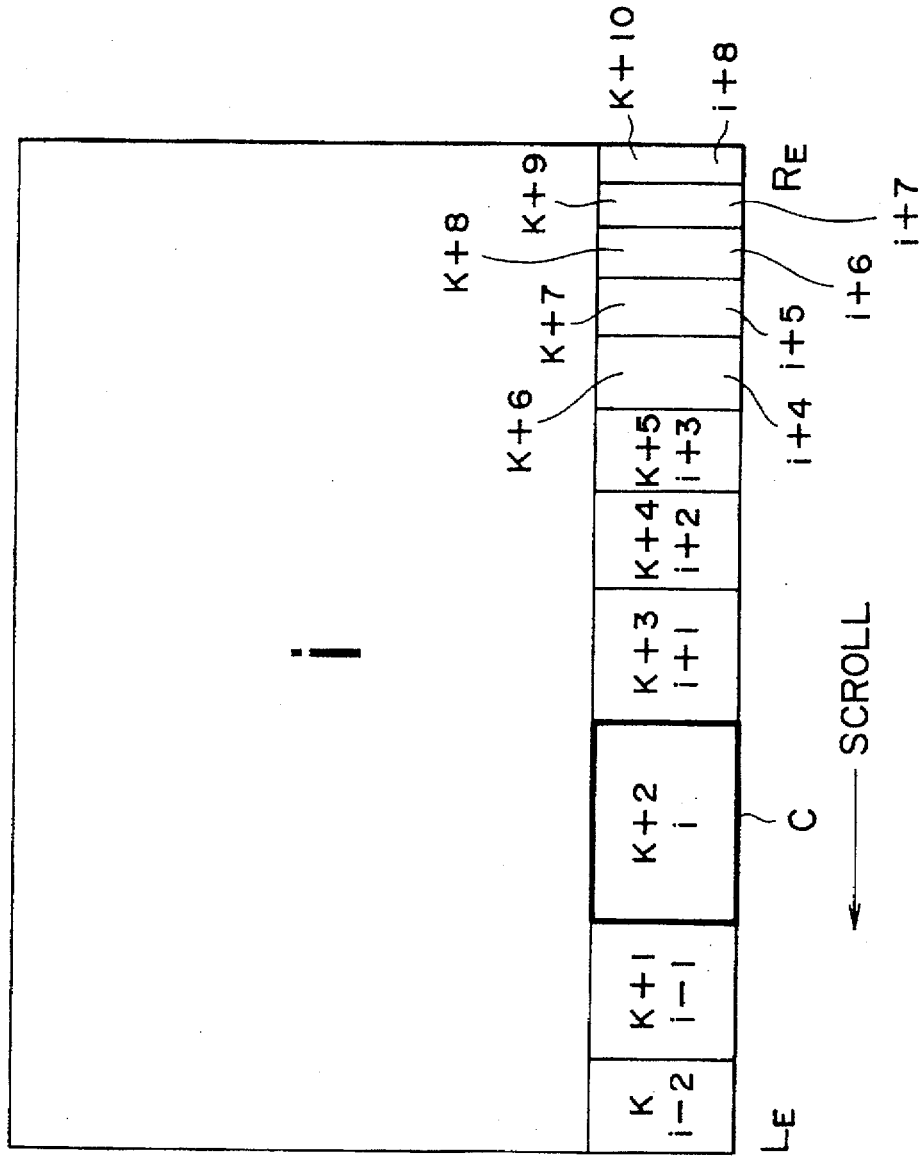
FIGS. 89 to 94 are diagrams for explaining how a cursor is shifted.

As shown in FIG. 89, this parameter K denotes the channel number of the leftmost subsidiary channel when the cursor C is shifted leftward. Therefore, the subsidiary picture of the leftmost channel K shown in FIG. 89 is displayed by the process at step S523.

Thereafter the operation proceeds to step S524 where a decision is made as to whether the parameter K is equal to the channel number RE of the rightmost subsidiary picture. Since K=LE in this case, the operation proceeds to step S525 where the parameter K is incremented by 1. Then the operation returns to step S523 to execute a process for receiving the channel K. Consequently, a picture of the second channel K+1 from the left end in FIG. 89 is displayed on the subsidiary screen.

Next the operation proceeds to step S524 where a decision is made as to whether the parameter K is equal to RE or not. And if the result of this decision is negative, the operation proceeds to step S525 where the parameter K is incremented by 1. Then the operation returns to step S523 again to execute a process for receiving the channel K.

Due to repeated execution of the above processing, subsidiary pictures ranging from the leftmost channel K to the rightmost channel K+10 (=RE) in FIG. 89 are displayed.

Upon completion of displaying the entire subsidiary pictures down to the rightmost one, the result of the decision at step S524 signifies K=RE, so that the operation proceeds to step S526 where a decision is made as to whether the manipulator 52 has been actuated leftward or not. In the case of no leftward actuation, the operation proceeds to step S527 where a decision is made as to whether the manipulator 52 has been actuated rightward or not. And in the case of no rightward actuation either, the operation proceeds to step 528 where a decision is made as to whether the manipulator 52 has been actuated for enter. If the result of this decision signifies no actuation for enter either, the operation returns to step S521 where the parameter K is set to LE. And then the operation proceeds to step S523 to execute a process for receiving the channel K.

Figure 88:
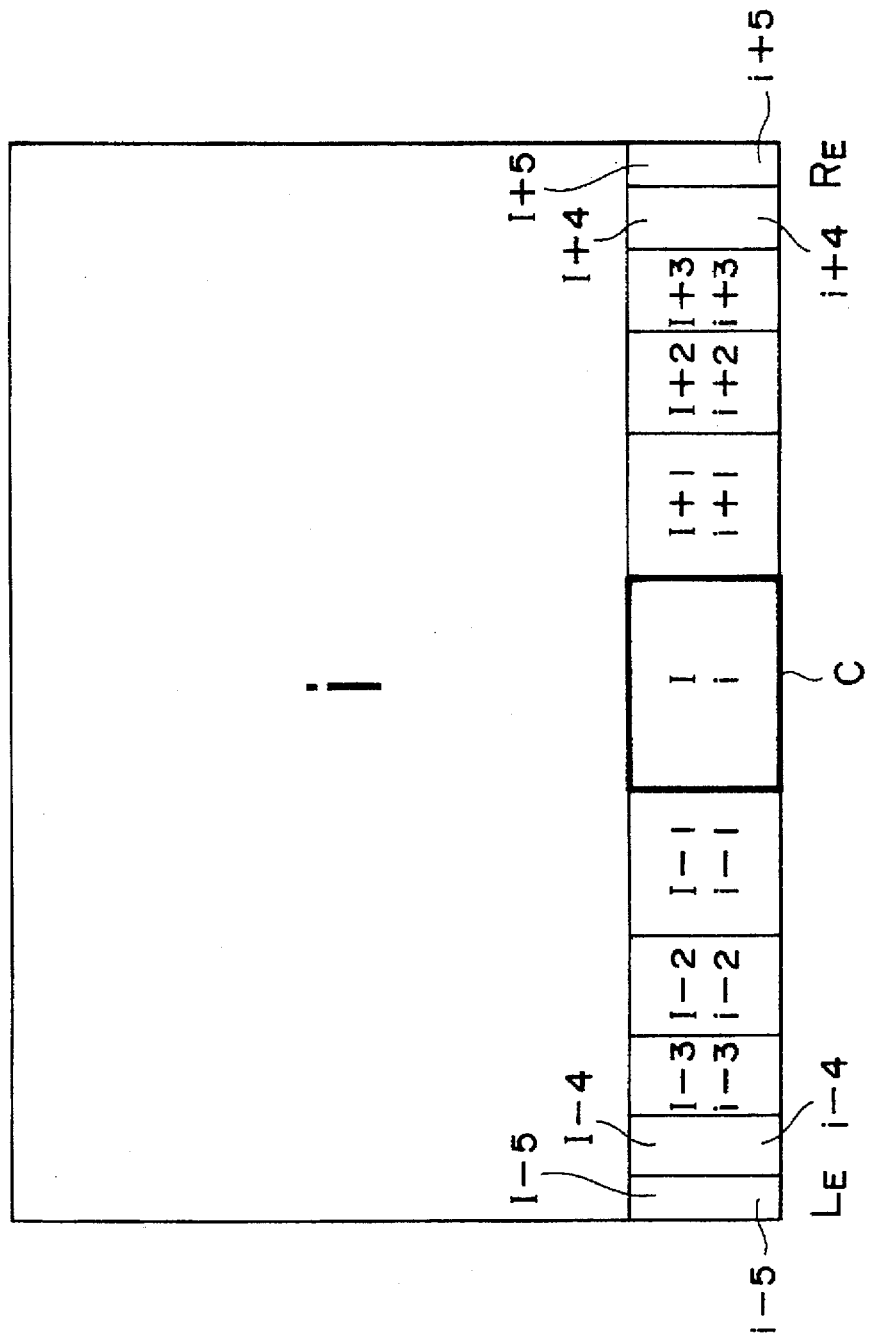
FIG. 88 is a diagram for explaining an arrangement of subsidiary pictures in the processing shown in the flow charts of FIGS. 84 to 87.

Since the processing at steps S521 to S528 is executed repeatedly as described, the cursor C is shifted leftward at step S520 from the position shown in FIG. 88 and, after the display state of FIG. 89 is obtained, the pictures on the subsidiary screens are updated to be pseudo moving pictures until next actuation of the manipulator 52.

In case the result of the decision at step S526 signifies that the manipulator 52 has been actuated leftward again, the operation returns to step S519 where a decision is made as to whether the cursor C is positioned at the left end or not. And if the result of this decision is negative, the operation proceeds to step S520 to execute a process for shifting the cursor C leftward.

More specifically, when the manipulator 52 is actuated leftward in the state of FIG. 88, the displayed pictures are changed from such state to the state of FIG. 89 (i.e., the subsidiary pictures are scrolled leftward with a shift of the cursor C). And when the manipulator 52 is further actuated leftward in the state of FIG. 89, the cursor C is shifted with scroll of the subsidiary pictures, as illustrated in FIG. 90.

Figure 90:
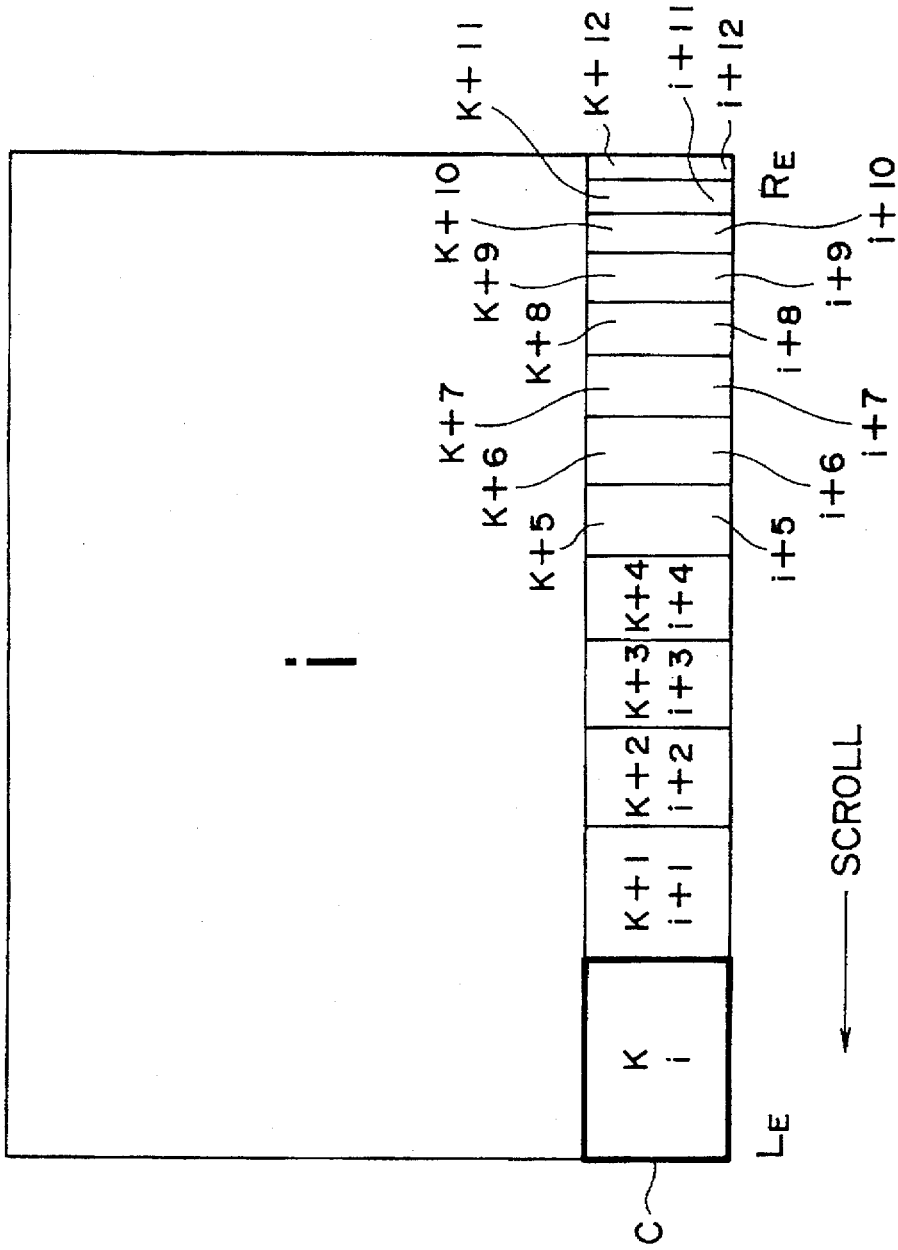

Thereafter the processing at steps S521 to S528 is executed repeatedly in the same manner as described above, so that the subsidiary pictures illustrated in FIG. 90 are updated to be displayed as pseudo moving pictures.

When the manipulator 52 is further actuated leftward in the state of FIG. 90 where the cursor C is positioned at the left end, the operation proceeds from step S519 to step S522, where the parameter K is set to a value obtained by adding 1 to the channel number LE of the leftmost subsidiary picture (indicated by the cursor C), i.e., to the channel number of the adjacent subsidiary pictures displayed on the right side of the cursor C.

Subsequently the operation proceeds to step S523 to execute a process for receiving the channel K, whereby the channel of the subsidiary picture indicated by the cursor C is changed from i to i+1. Thereafter the processing at steps S524, S525 and S523 is executed repeatedly, so that subsidiary pictures of the channels K+1 to K+12 (rightmost channel) in FIG. 91 are displayed.

Figure 91:
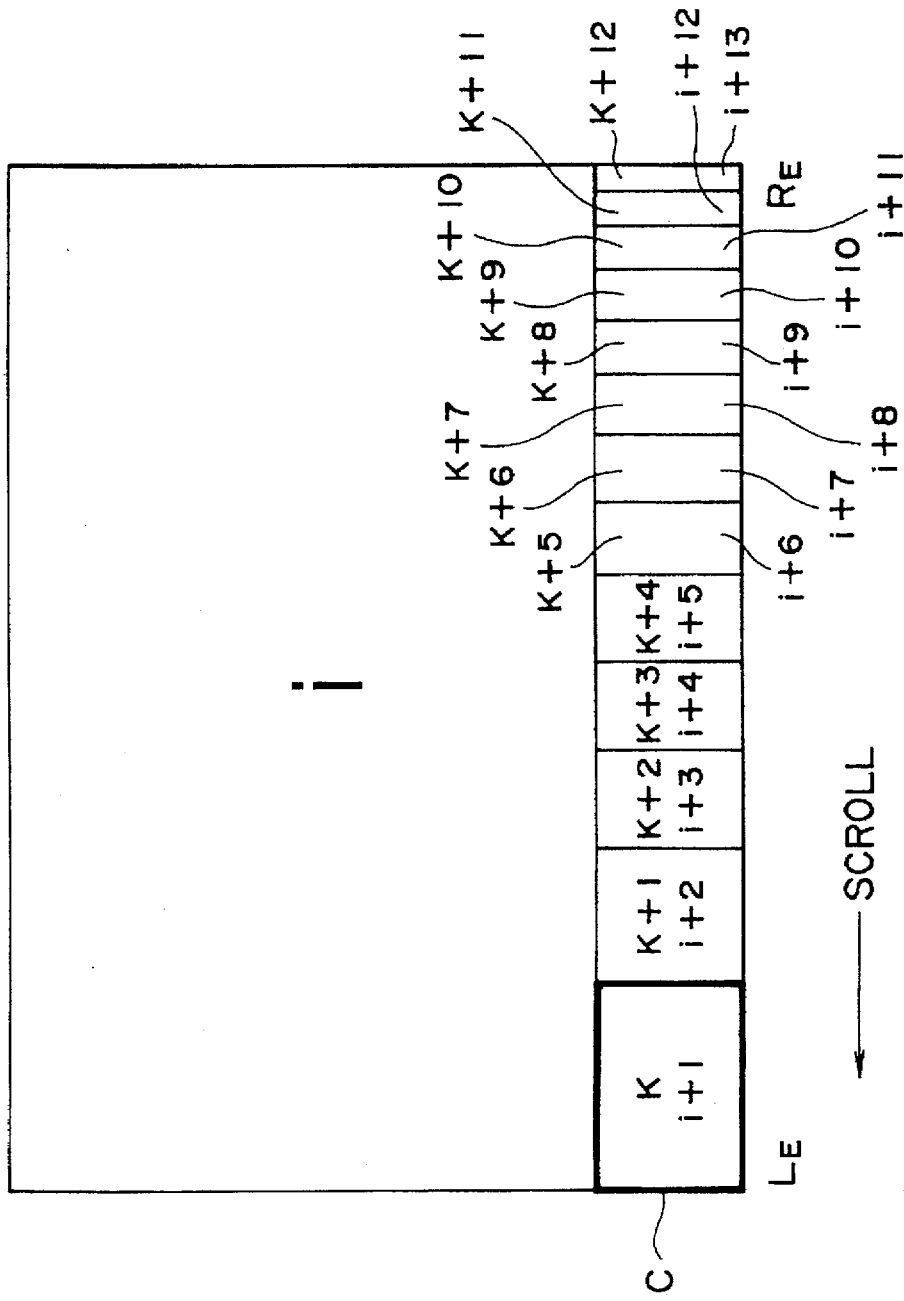

In case the result of the decision at any of steps S526 to S528 signifies no actuation of the manipulator 52, the operation returns to step S521, and a total of thirteen subsidiary pictures of the channels K to K+12 shown in FIG. 91 are updated to be displayed as pseudo moving pictures.

Thus, when the manipulator 52 is so actuated as to further shift the cursor C leftward in the state of FIG. 90 where the cursor C is positioned on the leftmost subsidiary picture, the cursor C is not shifted while the subsidiary pictures are scrolled leftward by a space of each picture, as shown in FIG. 91.

If the result of the decision at step S527 signifies that the manipulator 52 has been actuated rightward, the operation proceeds to step S529. The processing executed at and after step S529 will be described later.

Meanwhile, if the result of the decision at step S515 signifies that the manipulator 52 has been actuated rightward, the operation proceeds to step S529 where a decision is made as to whether the cursor C is positioned on the rightmost subsidiary picture or not. And if the result of this decision is negative to signify that the cursor is not on the rightmost subsidiary picture, the operation proceeds to step S530 to execute a process for shifting the cursor rightward.

Figure 92:
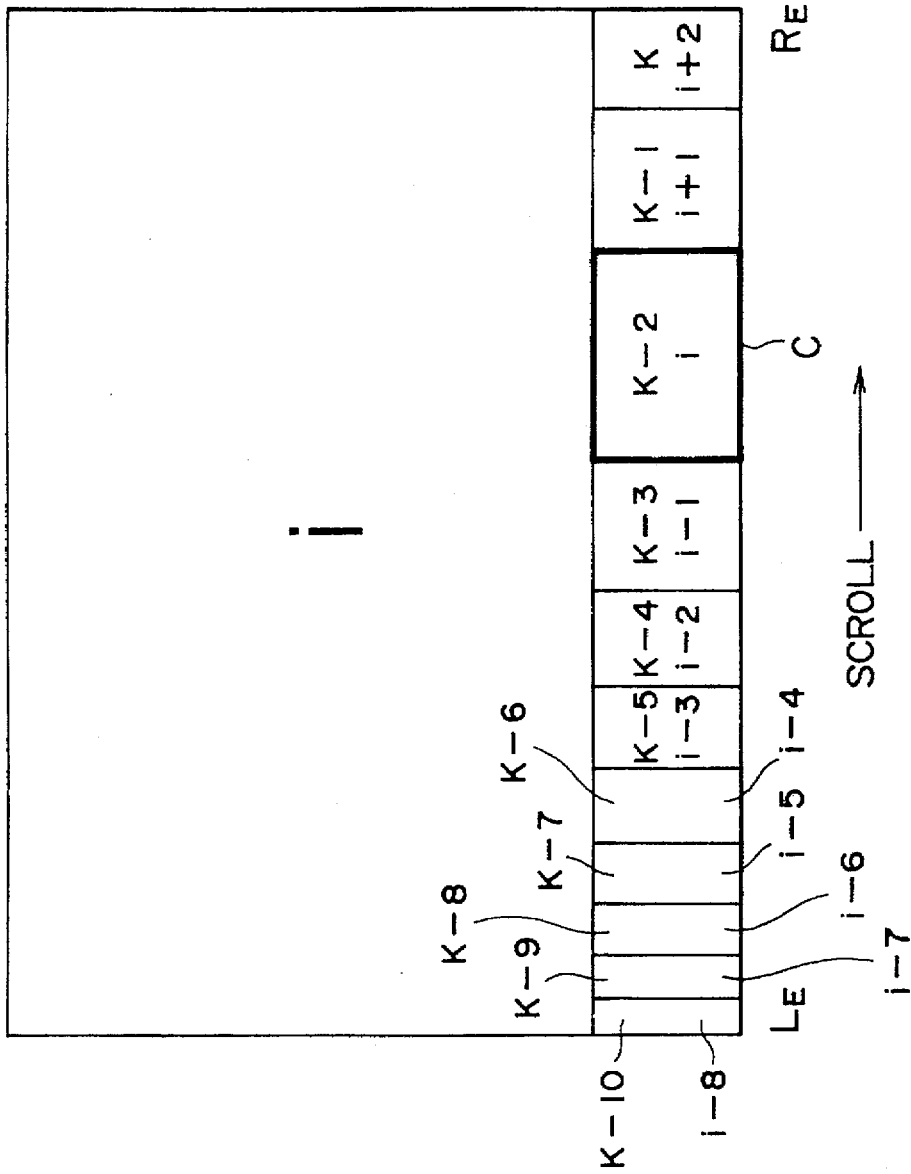

For example, when the manipulator 52 is actuated rightward in the state of FIG. 88, the cursor C is shifted rightward with scroll of the subsidiary pictures, as illustrated in FIG. 92.

Thereafter at step S531, the parameter K is set to the channel number RE of the rightmost subsidiary picture. More specifically, when the cursor C is shifted rightward as illustrated in FIG. 92, the parameter K corresponds to the channel number of the rightmost subsidiary picture, and subsequently the parameters K-1 to K-10 are allocated successively to the subsidiary pictures on the left side thereof. That is, allocation of the parameters K is directionally reverse to the aforementioned one in FIG. 89.

Next a process for receiving the channel K is executed at S533, whereby the rightmost subsidiary picture in FIG. 92 is received. Thereafter the operation proceeds to step S534 where a decision is made as to whether the parameter K is equal to the channel number LE of the leftmost subsidiary picture or not. And if the result of this decision is negative, the operation proceeds to step S535 where the parameter K is decremented by 1. And a process for receiving the decremented channel K-1 is executed at step S533, whereby the subsidiary picture of the second channel K-1 from the right end in FIG. 92 is received.

Subsequently the processing at steps S533 to S535 is executed repeatedly, so that the subsidiary pictures of the channels K-1 to K-10 in FIG. 92 are received and displayed.

Upon completion of receiving the leftmost subsidiary picture (channel LE), the operation proceeds from step S534 to step S536. And a decision is made at each of steps S536 to S538 as to whether the manipulator 52 has been actuated rightward, leftward or for enter. And if the result of the decision at any step signifies no actuation at all, the operation returns to step S531, and the processing subsequent thereto is executed repeatedly. In this manner, a total of eleven subsidiary pictures ranging from the channels K to K-10 in FIG. 92 are updated successively to be displayed as pseudo moving pictures.

In case the decision at step S536 signifies that the manipulator 52 has been actuated rightward, the operation returns to step S529 where a decision is made as to whether the cursor is positioned at the right end or not. And if the result of this decision is negative, the operation proceeds to step S530 to execute a process for shifting the cursor rightward.

Figure 93:
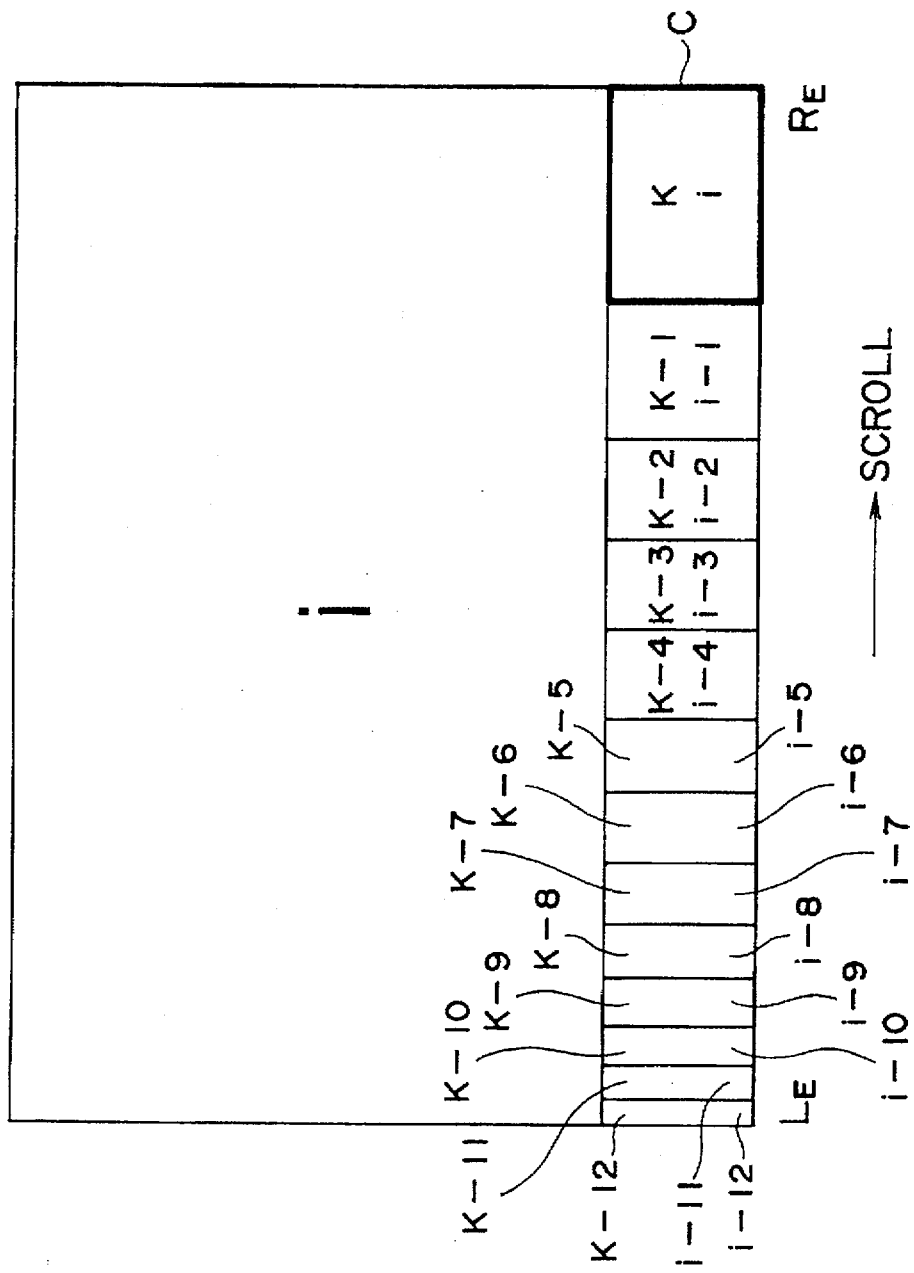

For example, when the manipulator 52 is actuated rightward in the state of FIG. 92, the cursor C is positionally changed from the state of FIG. 92 to that of FIG. 93. In this case, the cursor C is shifted to be positioned on the rightmost subsidiary picture.

Thereafter the processing at steps S531 to S538 is executed repeatedly, so that a total of eleven subsidiary pictures in FIG. 93 are updated to be displayed as pseudo moving pictures.

Figure 94:
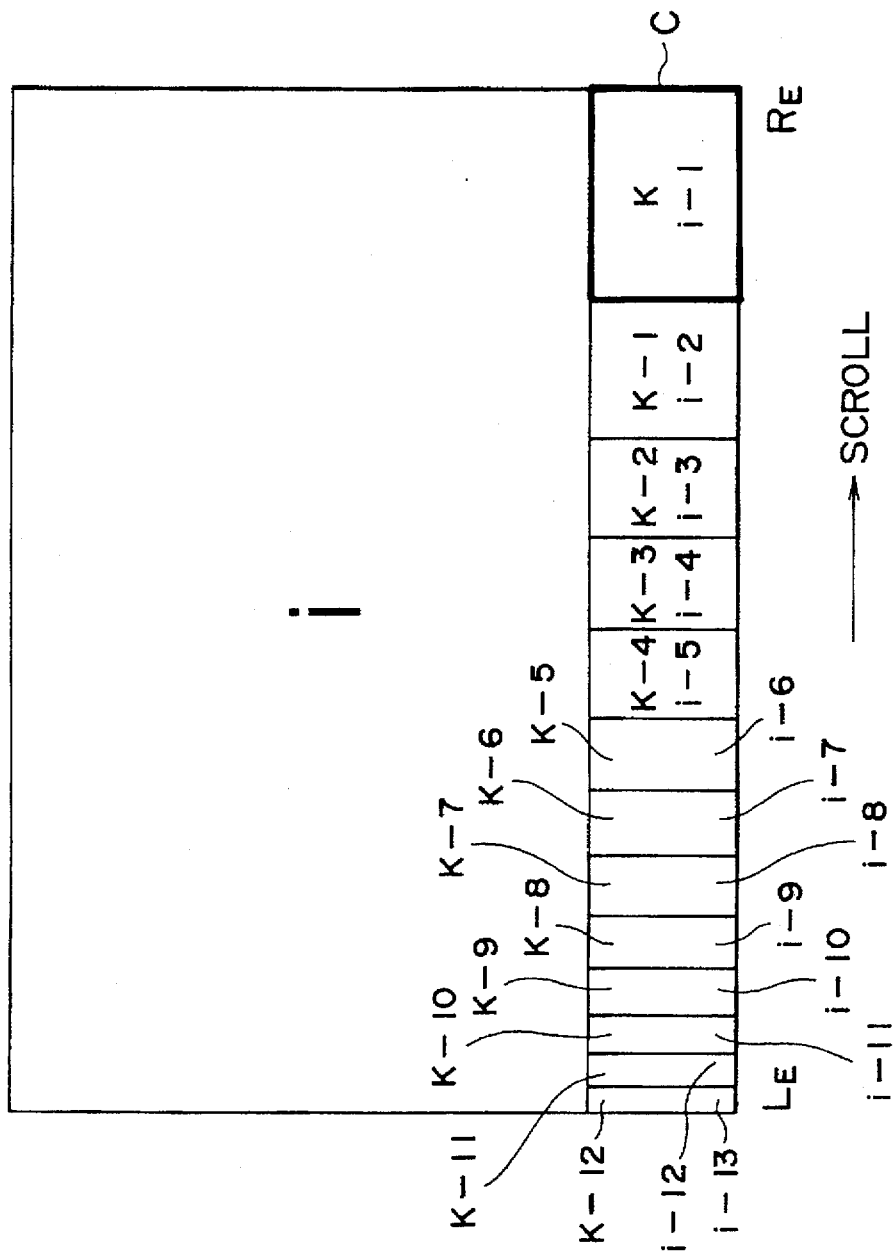

And when the manipulator 52 is further actuated rightward in the state of FIG. 93 where the cursor C is positioned on the rightmost subsidiary picture, the operation proceeds from step S529 to step S532, where the parameter K is set to a value obtained by decrementing the rightmost channel number RE by 1. More specifically, in FIG. 93, the parameter K is set to the channel number of the adjacent subsidiary picture on the left side of the subsidiary picture indicated by the cursor C. Thereafter the operation proceeds to step S533 to receive the channel corresponding to the parameter K, so that the picture on the subsidiary screen within the cursor C is changed to the picture of the channel i-1, as shown in FIG. 94. That is, the adjacent picture displayed on the left side of the cursor C until then in FIG. 93 is displayed within the cursor C.

Thereafter the processing at steps S534, S535 and S533 is executed repeatedly, so that subsidiary pictures of the channels K-1 to K-11 in FIG. 94 are received and displayed. More specifically, the subsidiary pictures are scrolled rightward from the state of FIG. 93 by a space of each subsidiary picture.

In case the result of the decision at step S527 signifies that the manipulator 52 has been actuated rightward, the operation proceeds to step S529 to execute the same processing as the aforementioned one.

Meanwhile, if the result of the decision at step S537 signifies that the manipulator 52 has been actuated leftward, the operation returns to step S519, and the processing subsequent thereto is executed as described above.

And if the result of the decision at step S528 or S538 signifies that the manipulator 52 has been actuated for enter, the operation proceeds to step S517 to execute a process for displaying the picture on the main screen.

Figure 95:
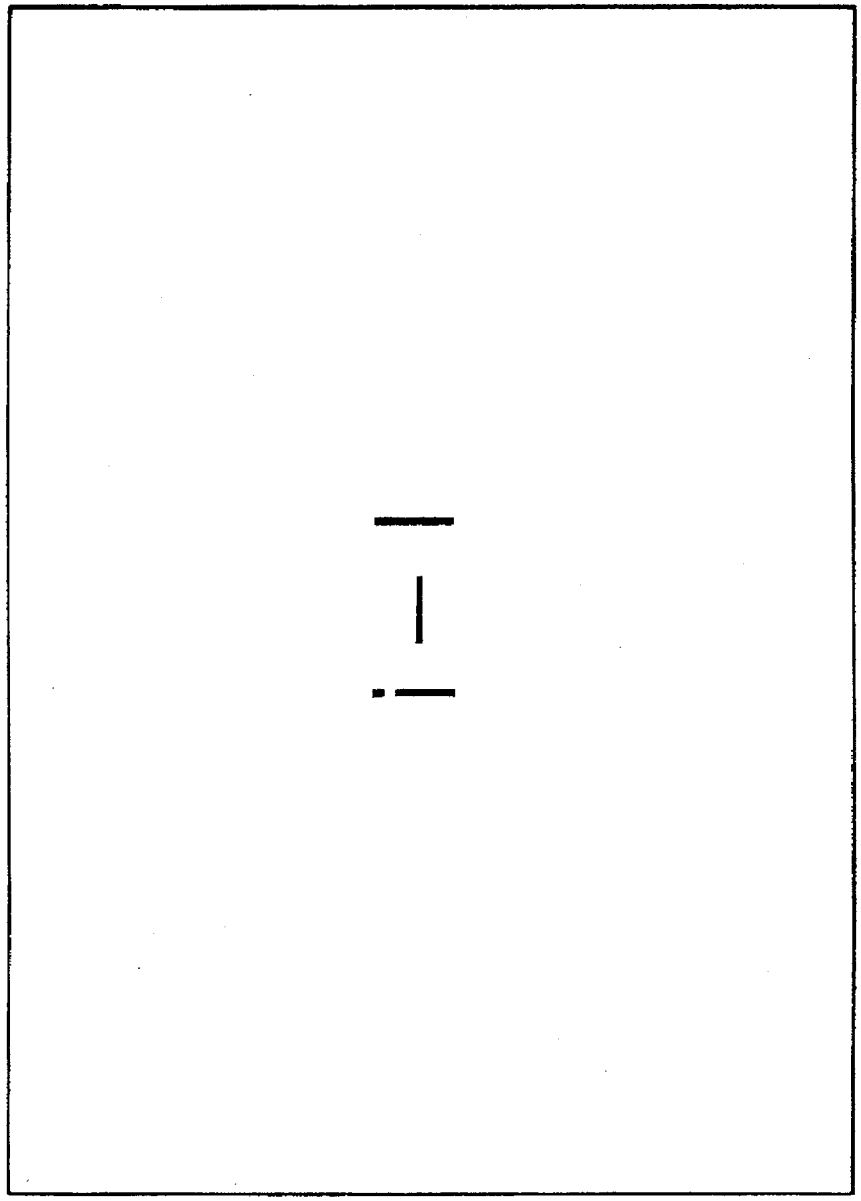
FIG. 95 is a diagram for explaining a display example when a subsidiary picture is selected in the state of FIG. 94.

More specifically, when the manipulator 52 is actuated for enter in the state of FIG. 94 for example, the cursor-indicated picture of the channel i-1 is displayed on the main screen as illustrated in FIG. 95, while display of the subsidiary pictures is brought to a halt.

Figure 96:
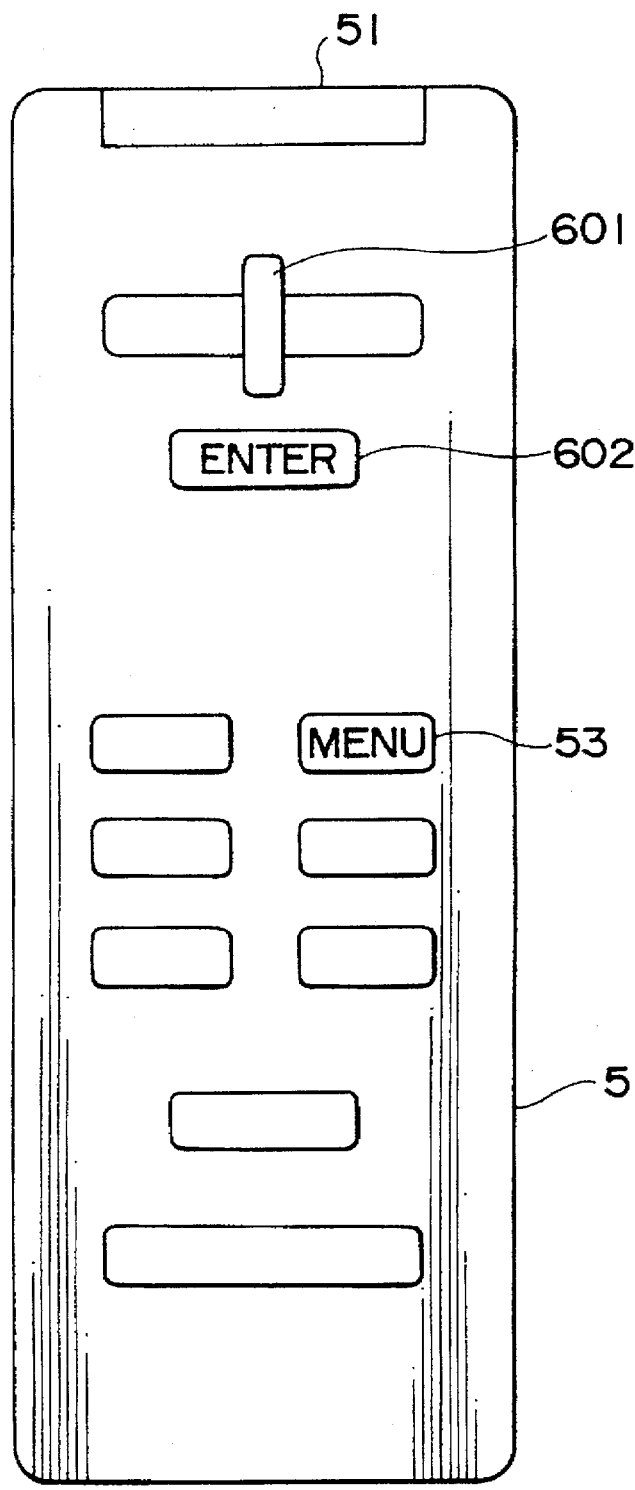
FIGS. 96 to 98 show other exemplary constructions of the remote commander 5.

FIG. 96 shows another exemplary construction of the remote commander 5. In this embodiment, a slide button 601 and an enter button switch 602 are employed instead of the manipulator 52 shown in FIG. 4. This embodiment is so contrived that, differently from the foregoing example where the manipulator 52 is moved (rotated) leftward or rightward, the slide button 601 is slid leftward or rightward in FIG. 96. And instead of actuating the manipulator 52 for enter, the enter button switch 202 is actuated for the same purpose.

Figure 97:
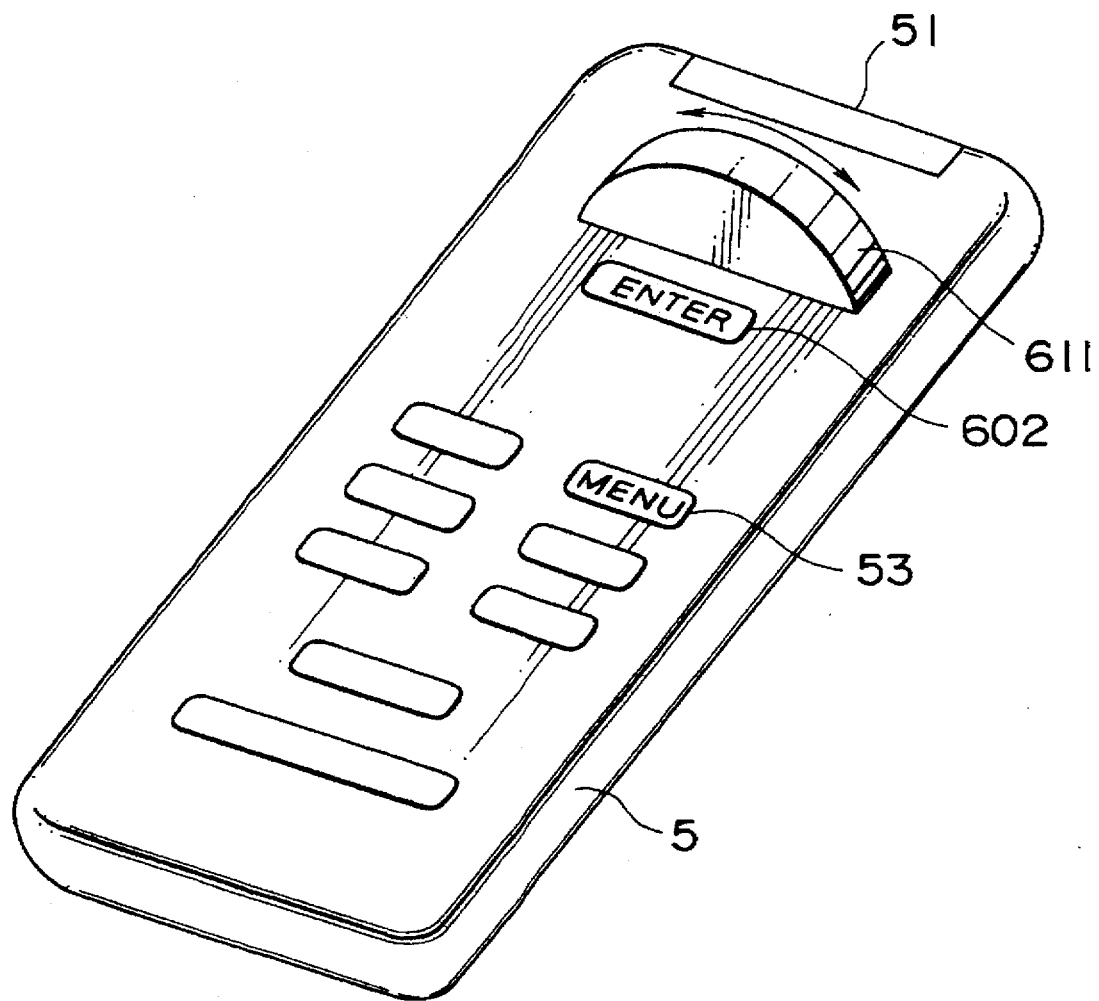

FIG. 97 shows a further exemplary construction of the remote commander 5. In this embodiment, a roller 611 is employed instead of the slide button 601 in FIG. 96. A leftward or rightward turn of this roller 611 is capable of inputting the same command as that in the case of sliding the slide button 601 leftward or rightward.

Figure 98:
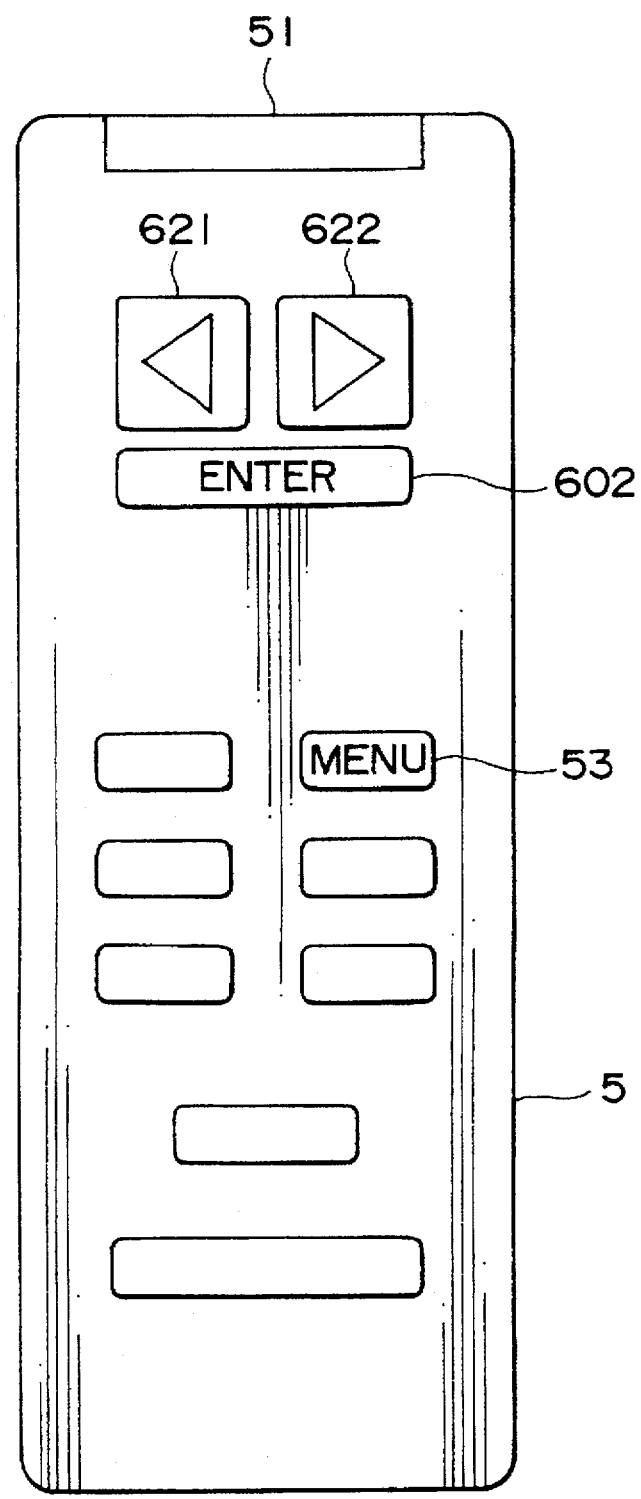

FIG. 98 shows a still further exemplary construction of the remote commander 5. In this embodiment, a left button switch 621 and a right button switch 622 are employed instead of the slide button 601 in FIG. 96 and the roller 611 in FIG. 97. More specifically, a triangular arrow mark indicative of leftward or rightward shift of a cursor is shown on the corresponding button switch, and a command for shifting the cursor C leftward or rightward can be inputted by actuating either of such button switches.

In the embodiments of FIGS. 96 and 97, a leftward or rightward actuation is performed by the slide button 601 or the roller 611, so that it is possible to input a slide or turn quantity in addition to a command for mere leftward or rightward shift. Therefore, the internal structure of the remote commander 5 in each of FIGS. 96 and 97 may be the same as that shown in FIG. 10.

However, in the embodiment of FIG. 98 where a command for leftward or rightward shift is produced by actuating the left button switch 621 or the right button switch 622, it is impossible to directly input the leftward or rightward actuation quantity. In this case, therefore, the actuation time of the left button switch 621 or the right button switch 622 may be detected and, when the detected actuation time is longer, the input command may be regarded to indicate a larger leftward or rightward shift.

Since none of analog input is performed in the embodiment of FIG. 98, it is not necessary to provide the variable resistors 64, 65, the switch 66 and the A–D converters 77, 78 shown in FIG. 10. More specifically, the internal structure of this embodiment is such as shown in FIG. 61, wherein any actuation of the left button switch 621, the right button switch 622 and the enter button switch 602 is detected by the button switch matrix 82 as an actuation of the button switch group 50.

Figure 99:
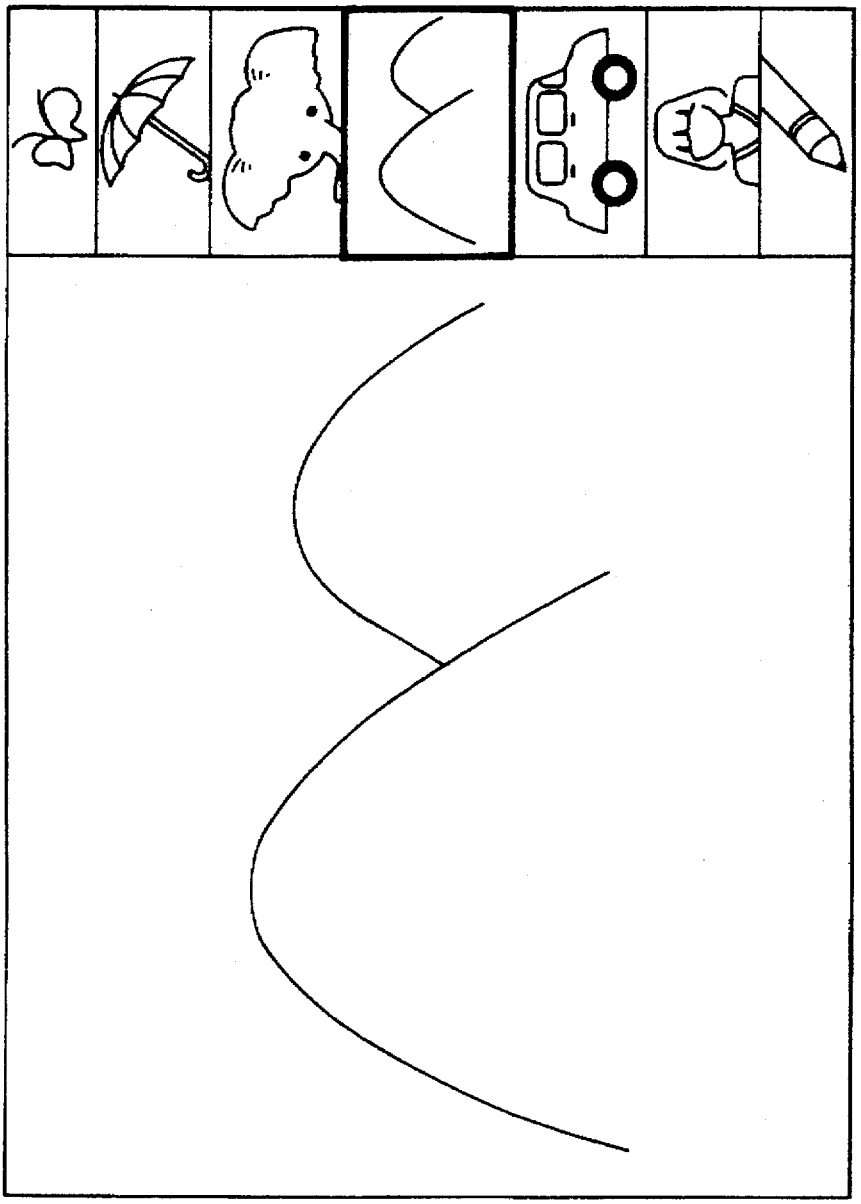
FIG. 99 shows another display example of subsidiary pictures.
Figure 100:
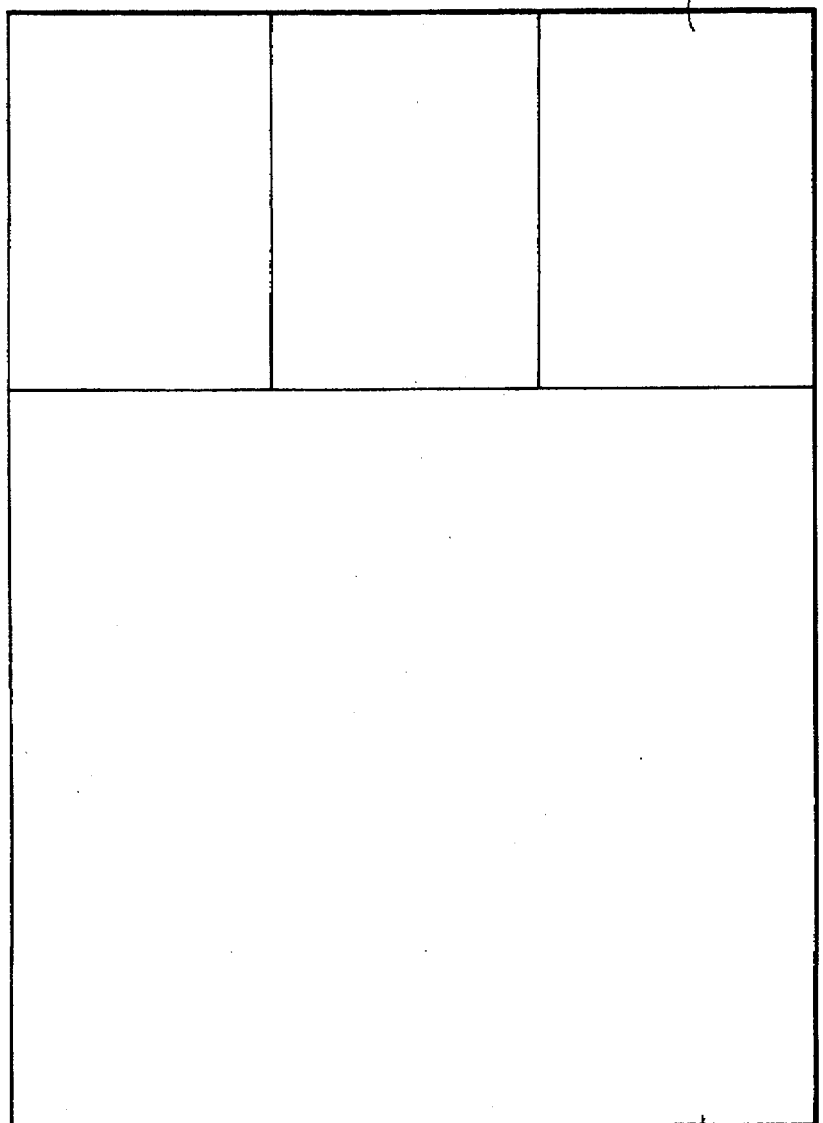
FIGS. 100 to 102 show conventional display examples in the prior art.
Figure 101:
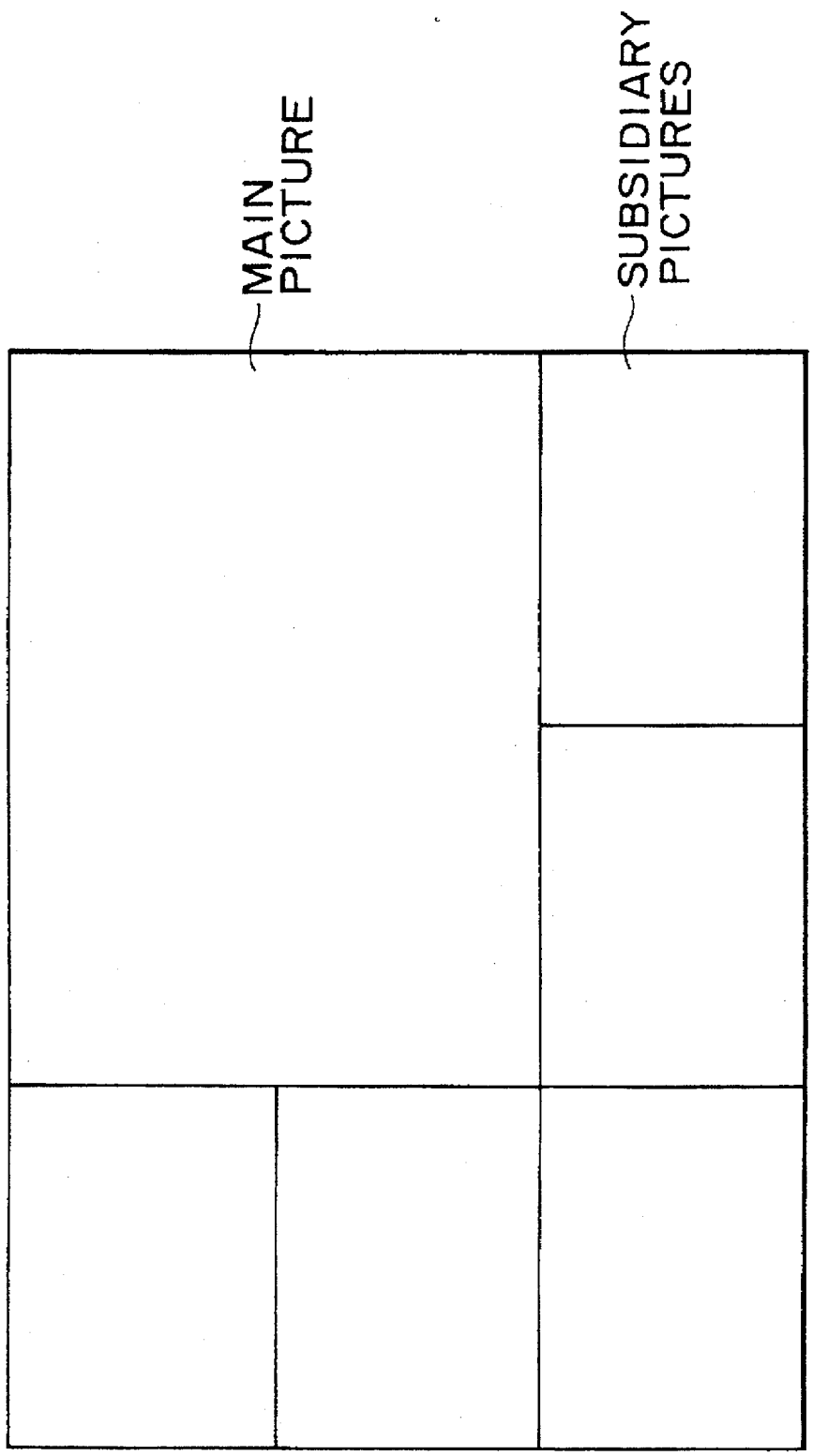
Figure 102:
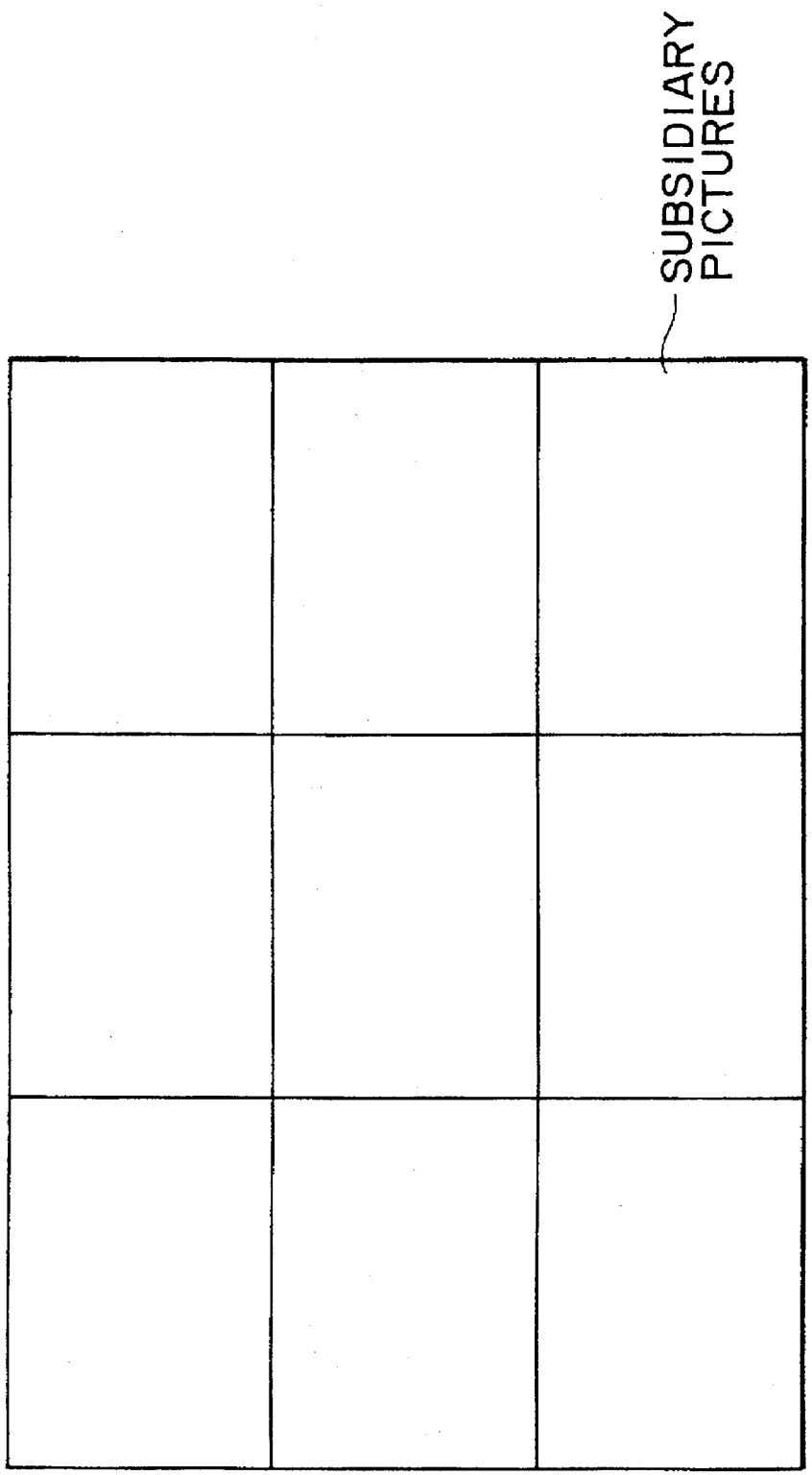

Although subsidiary pictures are displayed horizontally in the embodiments mentioned, such pictures may also be displayed vertically as illustrated in FIG. 99 for example.

Besides the above, it is further possible to display subsidiary pictures along the left vertical periphery of the CRT 4A, in addition to the example of FIG. 99 where the subsidiary pictures are displayed along the right vertical periphery of the CRT 4A.

It is to be noted that the present invention is applicable not merely to the IRD 2 in the embodiments mentioned but also to some other apparatus which is adapted for receiving video signals of a plurality of channels.

Thus, according to the television signal receiver with the picture display controller of the present invention, a main picture and subsidiary pictures are simultaneously displayable with a remarkable advantage that the pictures on subsidiary screens can be successively changed to those of different broadcast channels, so that it becomes possible to find the contents of programs in many other broadcast channels.

Moreover, marks are added to the pictures of the programs being displayed on a monitor unit, and the programs with such marks added thereto are Stored in a memory and are successively received, whereby any desired one of many broadcast channels can be selectively received with rapidity and certainty.

Further, the subsidiary pictures are successively displayed in different sizes together with the main picture, hence enabling a user to know the contents of the programs rapidly and certainly in a greater number of other broadcast channels.

Although the present invention has been described hereinabove with reference to some preferred embodiments thereof, it is to be understood that the invention is not limited to such embodiments alone, and a variety of other modifications and variations will be apparent to those skilled in the art without departing from the spirit of the invention.

The scope of the invention, therefore, is to be determined solely by the appended claims.

What is claimed is:

1. A television signal receiver for selecting a desired broadcast channel from signals of a plurality of received broadcast channels, comprising:

means for receiving and tuning television signals selectively;

manipulation means for commanding reception of signals of other broadcast channels in a state where a signal of a predetermined broadcast channel is being received;

display means responsive to an actuation of said manipulation means and displaying, on a main screen, the picture of the broadcast channel already received, while receiving the signals of the other broadcast channels and displaying the pictures of the other broadcast channels on subsidiary screens;

change means for sequentially changing the broadcast channels displayed on the subsidiary screens by said receiving means; and selection means for selecting a desired broadcast channel from the subsidiary pictures being displayed, wherein after completion of the operation of said selection means, display of the subsidiary pictures is terminated and the selected broadcast channel is received.

2. The television signal receiver according to claim 1, wherein said change means sequentially changes the broadcast channels, which are displayed on the subsidiary screens, in a predetermined period.

3. The television signal receiver according to claim 2, wherein said display means interrupts the displaying of the pictures on the subsidiary screens upon completion of one cycle of the sequential change of the broadcast channels displayed on the subsidiary screens, and displays the picture of the predetermined broadcast channel received prior to the display on the subsidiary screens.

4. The television signal receiver according to claim 1, wherein, when a predetermined command is inputted from said manipulation means in the state where a plurality of subsidiary pictures are displayed, said change means changes the broadcast channels being displayed on the subsidiary screens.

5. The television signal receiver according to claim 4, wherein said selection means includes a cursor which is produced and displayed by said display means and indicates the subsidiary picture being currently instructed, and in an initial state where the subsidiary pictures start to be displayed, said cursor indicates one subsidiary picture substantially at the center out of the plural subsidiary pictures being displayed.

6. The television signal receiver according to claim 5, wherein said selection means further comprises cursor shift means for shifting said cursor in response to a command transmitted by an operator, and designation means for designating a desired broadcast channel out of the subsidiary pictures being displayed; and when said designation means is actuated during sequential change of the broadcast channels displayed on the subsidiary screens, said selection means halts the change of the broadcast channels displayed on the subsidiary screens and then receives, while interrupting the display of the pictures, the broadcast channel being received on the subsidiary screen selected by said cursor shift means and said designation means during a halt of the subsidiary pictures.

7. The television signal receiver according to claim 6, wherein, when said cursor shift means is actuated a predetermined number of times during a halt of change of the subsidiary pictures, said change means releases the halt state of change of the broadcast channels displayed on the subsidiary screens, and then sequentially changes again, in a predetermined period, the broadcast channels displayed on the subsidiary screens.

8. The television signal receiver according to claim 7, wherein said change means sequentially changes, in accordance with each category, the broadcast channels displayed on the subsidiary screens.

9. The television signal receiver according to claim 6, wherein said cursor shift means and said designation means are incorporated in a remote commander.

10. The television signal receiver according to claim 3, wherein said receiving means has at least a first receiving section and a second receiving section capable of receiving signals independently of each other, and also has switching means which selectively switches said receiving sections in such a manner that, when said first receiving section is receiving the broadcast channel to be displayed on the subsidiary screen, said second receiving section is placed in a standby state ready for receiving the broadcast channel which is to be received next.

11. The television signal receiver according to claim 10, wherein, when said manipulation means is actuated during reception of a predetermined broadcast channel by said second receiving section, said first receiving section starts reception of the broadcast channels to be displayed on the subsidiary screens, and said change means sequentially changes, in a predetermined period, the broadcast channels receivedby said first receiving section, so that both the picture of the broadcast channel receivedby said second receiving section and the pictures of the broadcast channels received sequentially by said first receiving section are stored and processed as still pictures by said display means.

12. The television signal receiver according to claim 3, wherein, when said selection means is actuated, said display means additionally displays, relative to the picture on the subsidiary screen, a mark which signifies such actuation of said selection means; said display means further comprising storage means for storing information of the broadcast channel to which said mark is added, so that the information of the broadcast channel stored in said storage means is accessed by an actuation of said manipulation means and the stored broadcast channel is received.

13. The television signal receiver according to claim 12, wherein a mark displayed for the main picture and a mark for any subsidiary picture are different from each other.

14. The television signal receiver according to claim 12, further comprising means for receiving program schedule data transmitted with television signals and clock means for measuring a present time; wherein said storage means stores at least a channel number and a program end time as broadcast channel information, and the stored broadcast channel information is erased after the program end time.

15. The television signal receiver according to claim 3, wherein said display means executes such a process that the subsidiary picture being indicated by said cursor becomes dimensionally maximum and also that the sizes of the other subsidiary pictures are sequentially reduced as the channel numbers thereof recede from the broadcast channel of the subsidiary picture being indicated by said cursor.

16. A broadcast channel selecting method for selection of a desired broadcast channel from signals of a plurality of broadcast channels, comprising the steps of:

during reception of a signal of a predetermined broadcast channel by a first receiving section, outputting a command to sequentially change and receive signals of a plurality of other broadcast channels by a second receiving section;

sequentially storing, in a memory, pictures of the broadcast channels changed and received sequentially;

displaying, on a main screen, the picture of the predetermined broadcast channel already received by said first receiving section, while reading out the pictures of the stored other broadcast channels and displaying the read pictures on a plurality of subsidiary screens;

selecting a desired broadcast channel from the plurality of subsidiary pictures being displayed; and after selection of the desired broadcast channel, terminating the display of the subsidiary pictures and receiving the selected broadcast channel.

17. The broadcast channel selecting method according to claim 16, wherein the picture of the predetermined broadcast channel received by said first receiving section is also stored in said memory, and the picture received by said first receiving section and read out from said memory is displayed on the main screen, while the plurality of pictures received by said second receiving section and stored in said memory are read out therefrom and then are displayed on the subsidiary screens.

18. The broadcast channel selecting method according to claim 16, wherein the pictures of the broadcast channels received by said second receiving section and stored in said memory are updated in a predetermined period.

19. The broadcast channel selecting method according to claim 16, wherein the broadcast channels changed and received sequentially by said second receiving section are changed sequentially in accordance with each category.

* * * * *